US011272532B2

(12) United States Patent
Jeon et al.

(10) Patent No.: US 11,272,532 B2
(45) Date of Patent: Mar. 8, 2022

(54) RANDOM ACCESS RESPONSE RECEPTION

(71) Applicant: Comcast Cable Communications, LLC, Philadelphia, PA (US)

(72) Inventors: Hyoungsuk Jeon, Centreville, VA (US); Esmael Dinan, McLean, VA (US); Hua Zhou, Herndon, VA (US); Jinsook Ryu, Herndon, VA (US); Kyungmin Park, Herndon, VA (US); Ali Cirik, Herndon, VA (US); Alireza Babaei, Fairfax, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/672,045

(22) Filed: Nov. 1, 2019

(65) Prior Publication Data
US 2020/0146054 A1 May 7, 2020

Related U.S. Application Data

(60) Provisional application No. 62/754,527, filed on Nov. 1, 2018.

(51) Int. Cl.
| | |
|---|---|
| *H04W 74/00* | (2009.01) |
| *H04L 5/00* | (2006.01) |
| *H04W 72/04* | (2009.01) |
| *H04W 74/08* | (2009.01) |

(52) U.S. Cl.
CPC ......... *H04W 74/006* (2013.01); *H04L 5/0053* (2013.01); *H04W 72/0446* (2013.01); *H04W 74/008* (2013.01); *H04W 74/0833* (2013.01)

(58) Field of Classification Search
CPC ........... H04W 74/006; H04W 72/0446; H04W 74/008; H04W 74/0833; H04L 5/0053
See application file for complete search history.

(56) References Cited

U.S. PATENT DOCUMENTS

| | | | | |
|---|---|---|---|---|
| 2009/0238141 | A1* | 9/2009 | Damnjanovic | H04W 36/18 370/331 |
| 2012/0069788 | A1* | 3/2012 | Shen | H04W 74/006 370/315 |
| 2013/0250911 | A1* | 9/2013 | Kwon | H04W 36/0055 370/331 |
| 2014/0226621 | A1* | 8/2014 | Choi | H04W 36/0061 370/331 |
| 2014/0286240 | A1* | 9/2014 | Kim | H04W 76/28 370/328 |

(Continued)

OTHER PUBLICATIONS

R2-181xxxx 3GPP TSG-RAN WG2 Meeting #103bis, Chengdu, China, Oct. 8-12, 2018, Source: LG Electronics Inc., Title: Fast preamble transmission in NR-U.

(Continued)

*Primary Examiner* — Ayaz R Sheikh
*Assistant Examiner* — Tarell A Hampton
(74) *Attorney, Agent, or Firm* — Banner & Witcoff, Ltd.

(57) ABSTRACT

Wireless communications for random access procedures are described. One or more downlink control messages may indicate a system frame number corresponding to a random access preamble. The one or more downlink control messages may indicate the system frame number in a field and/or using a radio network identifier.

64 Claims, 55 Drawing Sheets

(56) References Cited

U.S. PATENT DOCUMENTS

| | | | | |
|---|---|---|---|---|
| 2015/0181624 | A1* | 6/2015 | Hwang | H04L 5/0053 370/329 |
| 2016/0029349 | A1* | 1/2016 | Vargantwar | H04W 74/006 370/329 |
| 2017/0135134 | A1* | 5/2017 | Rune | H04W 74/0833 |
| 2017/0332410 | A1 | 11/2017 | Babaei et al. | |
| 2019/0029051 | A1* | 1/2019 | Lu | H04W 74/0866 |
| 2020/0107373 | A1* | 4/2020 | Roy | H04L 5/001 |
| 2020/0281016 | A1* | 9/2020 | Ohara | H04W 72/0453 |

OTHER PUBLICATIONS

R2-1815194 3GPP TSG-RAN WG2 Meeting #103bis, Chengdu, China, Oct. 8-12, 2018, Source: LG Electronics Inc., Title: Transmission counting and timer in MAC with LBT.
R2-1815257 3GPP TSG-RAN WG2 Meeting #103bis, Chengdu, China, Oct. 8-12, 2018, Source: CMCC, Title: Consideration of RACH procedure in NR-U system.
R2-1815365 3GPP TSG-RAN WG2 Meeting #103bis, Chengdu, China, Oct. 8-12, 2018, Source: Huawei, HiSilicon, Title: Impact on RACH related counters and windows for NR-U.
R2-1815477 3GPP TSG-RAN WG2 Meeting #103bis, Chengdu, China, Oct. 8-12, 2018, Source: Fujitsu, Title: On CFRA in NR-U.
R2-1815448 3GPP TSG-RAN WG2 Meeting #103bis, Chengdu, China, Oct. 8-12, 2018, Source: Fujitsu, Title: Issue in RA procedure due to LBT failure.
R2-1815502 3GPP TSG-RAN WG2 Meeting #103bis, Chengdu, China, Oct. 8-12, 2018, Source: ITL, Title: RACH carrier selection for NR-U.
R2-1811483 3GPP TSG-RAN WG2 Meeting #103, Gothenburg, Sweden, Aug. 20-24, 2018, Source: ZTE, Sanechips, Title: CR for the reset of BFD in 38.321.
R2-1812108 3GPP TSG-RAN WG2 Meeting #103, Gothenburg, Sweden, Aug. 20-24, 2018, Source: Nokia, Nokia Shanghai Bell, Title: Reset of BFD.
3GPP TS 38.212 V15.6.0 (Jun. 2019), Technical Specification; 3rd Generation Partnership Project; Technical Specification Group Radio Access Network; NR; Multiplexing and channel coding (Release 15).
3GPP TS 38.213 V15.2.0 (Jun. 2018), Technical Specification, 3rd Generation Partnership Project; Technical Specification Group Radio Access Network; NR; Physical layer procedures for control (Release 15).
R2-1806229 3GPP TSG-RAN WG2 Meeting #101 bis, Sanya, China, Apr. 16-20, 2018, Source: Samsung, Title: Miscellaneous corrections.
R2-1811325 3GPP TSG-RAN WG2 Meeting #103, Gothenburg, Sweden, Aug. 20-24, 2018, Source: Samsung Electronics, Title: Handling Beam Failure Recovery Configuration Update.
3GPP TS 38.321 V15.2.0 (Jun. 2018), Technical Specification, 3rd Generation Partnership Project; Technical Specification Group Radio Access Network; NR; Medium Access Control (MAC) protocol specification (Release 15).
R2-1811149 3GPP TSG-RAN WG2 Meeting #103, Gothenburg, Sweden, Aug. 20-24, 2018, Source: OPPO, Title: CR on beam failure recovery configuration.
R2-1811593 3GPP TSG-RAN WG2 Meeting #103, Gothenburg, Sweden, Aug. 20-24, 2018, Source: ZTE Corporation, Sanechips, Title: CR for the configuration of BeamFailureRecoveryConfig.
3GPP TS 38.331 V15.2.1 (Jun. 2018), Technical Specification, 3rd Generation Partnership Project; Technical Specification Group Radio Access Network; NR; Radio Resource Control (RRC) protocol specification (Release 15).
R1-1810127 3GPP TSG RAN WG1 Meeting #94bis, Chengdu, China, Oct. 8-12, 2018, Source: Huawei, HiSilicon, Title: Initial Access in NR Unlicensed.
R1-1810327 3GPP TSG RAN WG1 Meeting #94bis, Chengdu, China, Oct. 8-12, 2018, Source: ZTE, Title: Discussion on initial access and mobility for NR-U.

R1-1810443 3GPP TSG RAN WG1 Meeting #94bis, Chengdu, China, Oct. 8-12, 2018, Source: MediaTek Inc., Title: On initial access procedure and mobility in NR-U.
R1-1810959 3GPP TSG RAN WG1 Meeting #94bis, Chengdu, China, Oct. 8-12, 2018, Source: OPPO, Title: Initial access and mobility for NR-U.
R2-1813586 3GPP TSG-RAN WG2 Meeting #103bis, Chengdu, China, Oct. 8-12, 2018, Source: OPPO, Title: Enhancements of 4-steps RACH in NR-U.
R2-1813587 3GPP TSG-RAN WG2 Meeting #103bis, Chengdu, China, Oct. 8-12, 2018, Source: OPPO, Title: Two-steps RACH procedure for NR-U.
R2-1813680 3GPP TSG-RAN WG2 Meeting #103bis, Chengdu, China, Oct. 8-12, 2018, Source: MediaTek Inc., Title: LBT and CAPC for Random Access in NR-U.
R2-1813690 3GPP TSG-RAN WG2 Meeting #103bis, Chengdu, China, Oct. 8-12, 2018, Source: Qualcomm Incorporated, Title: Report of Email Discussion [103#55][NR-U] 2-step RACH Model and Initial Information Contents (Qualcomm).
R2-1813715 3GPP TSG-RAN WG2 Meeting #103bis, Chengdu, China, Oct. 8-12, 2018, Source: Qualcomm Incorporated, Title: TP for RACH in NR-U.
R2-1813723 3GPP TSG-RAN WG2 Meeting #103bis, Chengdu, China, Oct. 8-12, 2018, Source: ZTE, Title: consideration on SR enhancement for NR-U operation.
R2-1813742 3GPP TSG-RAN WG2 Meeting #103bis, Chengdu, China, Oct. 8-12, 2018, Source: ZTE, Title: Considerations on BWP for NR-U.
R2-1813743 3GPP TSG-RAN WG2 Meeting #103bis, Chengdu, China, Oct. 8-12, 2018, Source: ZTE, Title: Considerations on configured grant for NR-U.
R2-1813745 3GPP TSG-RAN WG2 Meeting #103bis, Chengdu, China, Oct. 8-12, 2018, Source: ZTE, Title: Considerations on RAR window size for NR-U.
R2-1813874 3GPP TSG-RAN WG2 Meeting #103bis, Chengdu, China, Oct. 8-12, 2018, Source: Spreadtrum Communications, Title: Random Access Procedure in NR-U.
R2-1813964 3GPP TSG-RAN WG2 Meeting #103bis, Chengdu, China, Oct. 8-12, 2018, Source: MediaTek Inc., Title: Enhancements to the RACH procedure for NR-U.
R2-1813965 3GPP TSG-RAN WG2 Meeting #103bis, Chengdu, China, Oct. 8-12, 2018, Source: MediaTek Inc., Title: Further considerations on 2-step RACH.
R2-1813987 3GPP TSG-RAN WG2 Meeting #103bis, Gothenburg, Sweden, Aug. 20-24, 2018, Source: Intel Corporation, Title: Random access procedure for NR-u.
R2-1813988 3GPP TSG-RAN WG2 Meeting #103bis, Chengdu, China, Oct. 8-12, 2018, Source: Intel Corporation, Title: 2-step CBRA for NR licensed and unlicensed operation.
R2-1814007 3GPP TSG-RAN WG2 Meeting #103bis, Chengdu, China, Oct. 8-12, 2018, Source: InterDigital, Title: Random access in NR-Unlicensed.
R2-1814008 3GPP TSG-RAN WG2 Meeting #103bis, Chengdu, China, Oct. 8-12, 2018, Source: InterDigital, Title: 2-Step RACH Procedure.
R2-1814032 3GPP TSG-RAN WG2 Meeting #103bis, Chengdu, China, Oct. 8-12, 2018, Source: ZTE Corporation, Sanechips, Title: Msg1 payload contents for 2-step RACH.
R2-1814033 3GPP TSG-RAN WG2 Meeting #103bis, Chengdu, China, Oct. 8-12, 2018, Source: ZTE, Title: LS on Msg1 payload for 2-step RACH.
R2-1814034 3GPP TSG-RAN WG2 Meeting #103bis, Chengdu, China, Oct. 8-12, 2018, Source: ZTE Corporation, Sanechips, Title: Msg2 payload contents for 2-step RACH.
R2-1814262 3GPP TSG-RAN WG2 Meeting #103bis, Chengdu, China, Oct. 8-12, 2018, Source: Vivo, Title: Enhance RACH with Additional Transmission Opportunities.
R2-1814263 3GPP TSG-RAN WG2 Meeting #103bis, Chengdu, China, Oct. 8-12, 2018, Source: Vivo, Title: Enhance RAN2 impacts of 2-step RACH.
R2-1814281 3GPP TSG-RAN WG2 Meeting #103bis, Chengdu, China, Oct. 8-12, 2018, Source: Qualcomm Incorporated, Title: RACH design for NR-U.

(56) References Cited

OTHER PUBLICATIONS

R2-1814287 3GPP TSG-RAN WG2 Meeting #103bis, Chengdu, China, Oct. 8-12, 2018, Source: Nokia, Nokia Shanghai Bell, Title: Network control of 2-step random access procedure.
R2-1814291 3GPP TSG-RAN WG2 Meeting #103bis, Chengdu, China, Oct. 8-12, 2018, Source: Nokia, Nokia Shanghai Bell, Title: On the selection of PRACH resources for transmission of Msg1/MsgA in NR-U RA procedure.
R2-1814438 3GPP TSG-RAN WG2 Meeting #103bis, Chengdu, China, Oct. 8-12, 2018, Source: Motorola Mobility, Lenovo, Title: Modifications to RACH procedure due to LBT.
R2-1814580 3GPP TSG-RAN WG2 Meeting #103bis, Chengdu, China, Oct. 8-12, 2018, Source: Apple Inc., Title: RACH Enhancements in NR-U.
R2-1814736 3GPP TSG-RAN WG2 Meeting #103bis, Chengdu, China, Oct. 8-12, 2018, Source: Sony, Title: Considerations on initial access procedures for NR unlicensed operations.
R2-1814836 3GPP TSG-RAN WG2 Meeting #103bis, Chengdu, China, Oct. 8-12, 2018, Source: Motorola Mobility, Lenovo, Title: Diversity in RACH transmissions.
R2-1814865 3GPP TSG-RAN WG2 Meeting #103bis, Chengdu, China, Oct. 8-12, 2018, Source: Huawei, HiSilicon, Title: Two-step RACH procedure for NR-U.
R2-1814866 3GPP TSG-RAN WG2 Meeting #103bis, Chengdu, China, Oct. 8-12, 2018, Source: Huawei, HiSilicon, Title: Four-step RACH procedure for NR-U.
R2-1815026 3GPP TSG-RAN WG2 Meeting #103bis, Chengdu, China, Oct. 8-12, 2018, Source: Ericsson, Title: Discussions on RACH enhancement for NR-U.
R2-1815028 3GPP TSG-RAN WG2 Meeting #103bis, Chengdu, China, Oct. 8-12, 2018, Source: Ericsson, Title: Handling of RA counters and timers in NR-U.
R2-1815032 3GPP TSG-RAN WG2 Meeting #103bis, Chengdu, China, Oct. 8-12, 2018, Source: Ericsson, Title: Scheduling request for NR-U.
R2-1815111 3GPP TSG-RAN WG2 Meeting #103bis, Chengdu, China, Oct. 8-12, 2018, Source: ITRI, Title: RAR window extension for NR-U.
R2-1815153 3GPP TSG-RAN WG2 Meeting #103bis, Chengdu, China, Oct. 8-12, 2018, Source: LG Electronics Inc., Title: Enhanced RACH proceudre for NR-U.
R2-1815157 3GPP TSG-RAN WG2 Meeting #103bis, Chengdu, China, Oct. 8-12, 2018, Source: LG Electronics Inc., Title: 2-Step CBRA procedure for NR-U.
Mar. 19, 2020—European Extended Search Report—EP 19206741.1.
R2-1809841 3GPP TSG-RAN WG2 NR AH 1807 Meeting, Montreal, Canada, Jul. 2-6, 2018, Source: ZTE, Title: Considerations on channel access procedure for NR-U.
R2-1712977 3GPP TSG-RAN WG2 Meeting #100, Reno, USA, Nov. 27-Dec. 1, 2017, Source: Fujitsu, Title: RA-RNTI calculation.
R1-1719346 3GPP TSG-RAN WG1 Meeting #91, Reno, USA, Nov. 27-Dec. 1, 2017, Source: ZTE, Sanechips, Title: Remaining details of RACH procedure.
Huawei et al.: "Remaining details of RACH Procedures", 3GPP Draft; 3rd Generation Partnership Project (3GPP), Athens, Greece; Feb. 17, 2018.
May 11, 2021—European Office Action—EP 19206741.1.

* cited by examiner

User Plane Protocol Stack

Control Plane Protocol Stack

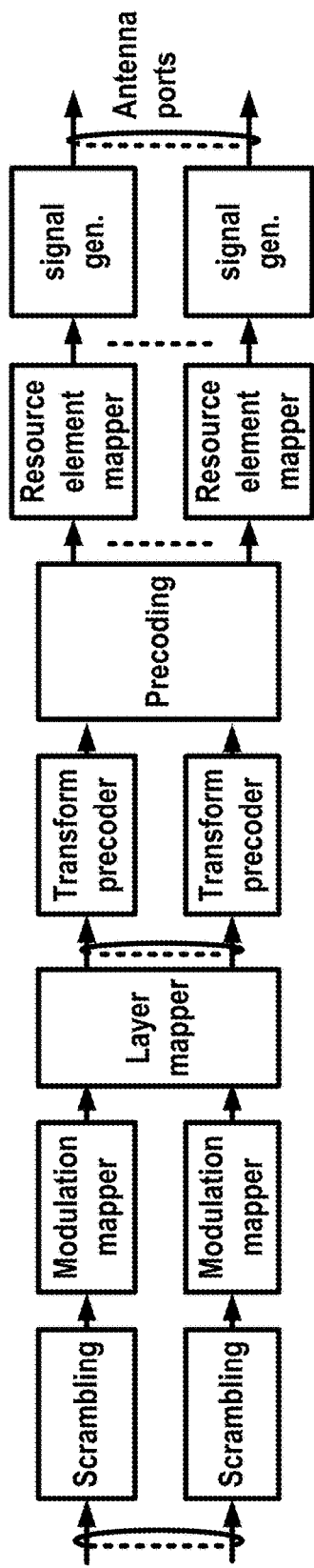
FIG. 4A
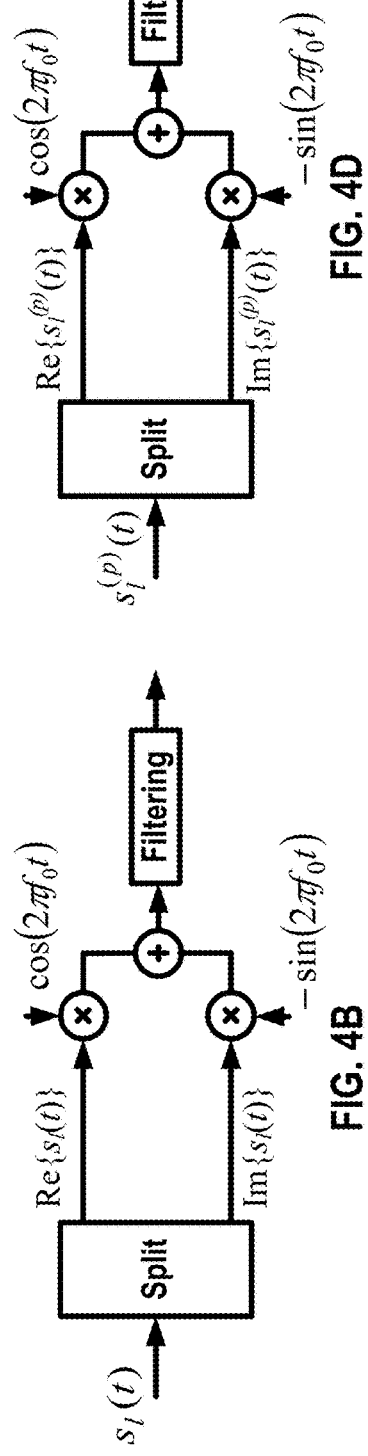
FIG. 4B
FIG. 4D
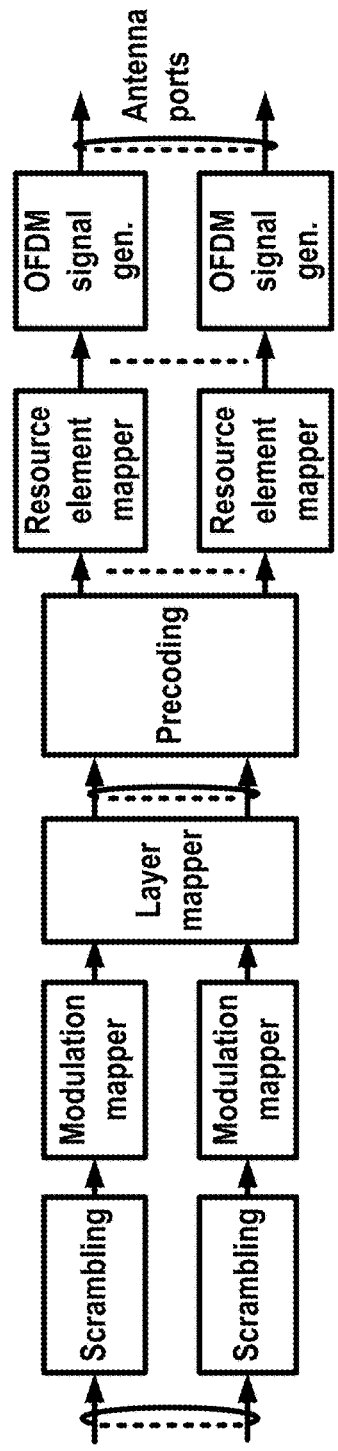
FIG. 4C
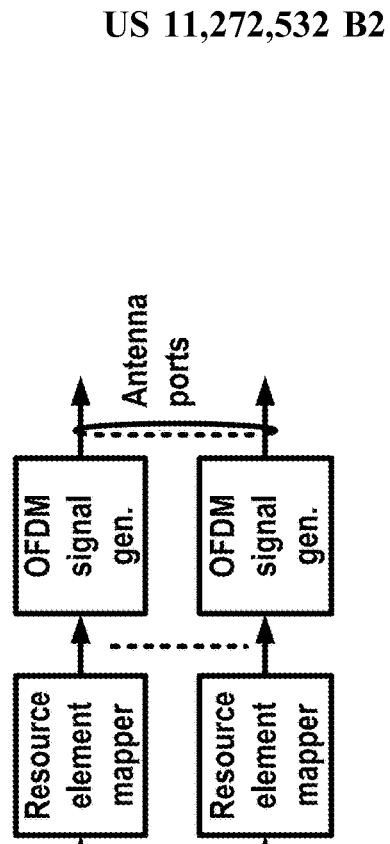

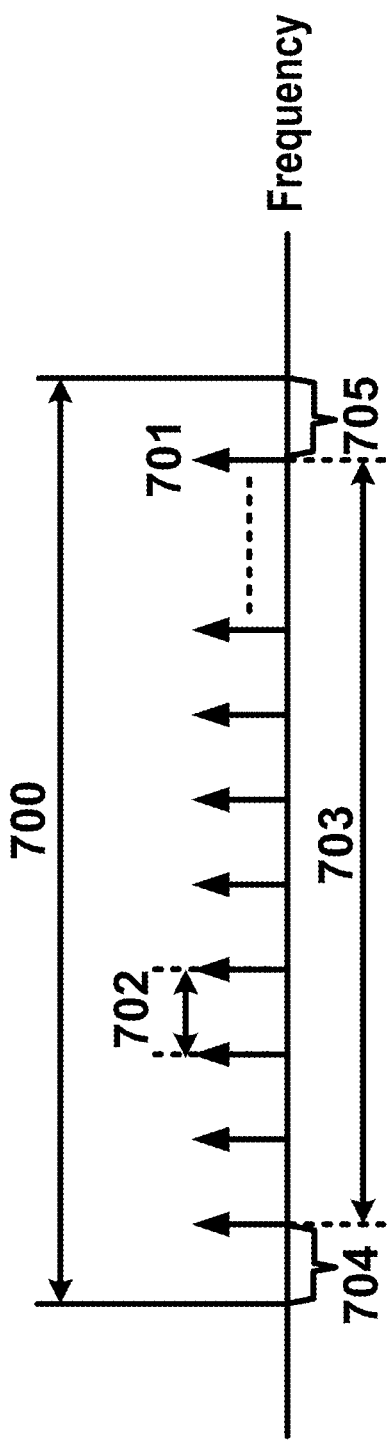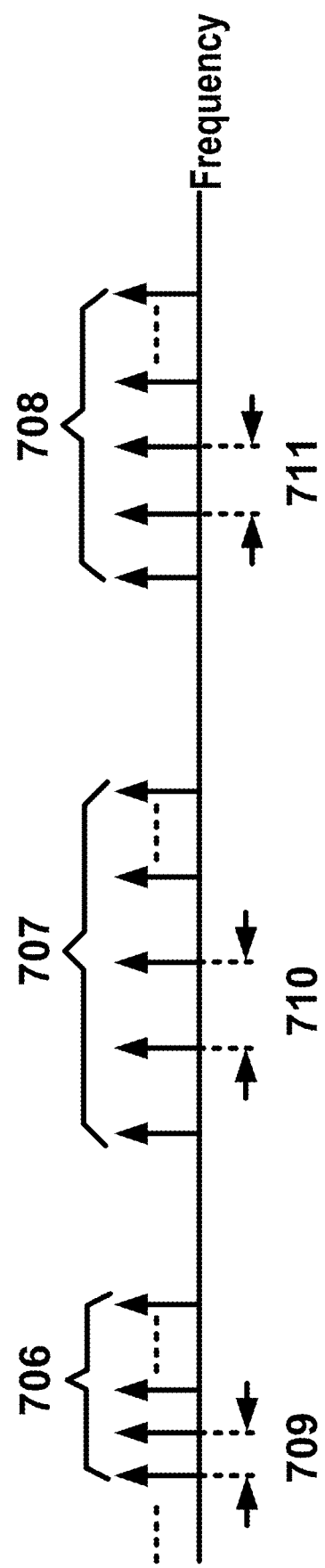
FIG. 7A
FIG. 7B

RACH-ConfigCommon information element

```
-- ASN1START
-- TAG-RACH-CONFIG-COMMON-START

RACH-ConfigCommon ::=              SEQUENCE {
    rach-ConfigGeneric                 RACH-ConfigGeneric,
    totalNumberOfRA-Preambles          INTEGER (1..63)                                                         OPTIONAL,    -- Need S
    ssb-perRACH-OccasionAndCB-PreamblesPerSSB  CHOICE {
        oneEighth                          ENUMERATED {n4,n8,n12,n16,n20,n24,n28,n32,n36,n40,n44,n48,n52,n56,n60,n64},
        oneFourth                          ENUMERATED {n4,n8,n12,n16,n20,n24,n28,n32,n36,n40,n44,n48,n52,n56,n60,n64},
        oneHalf                            ENUMERATED {n4,n8,n12,n16,n20,n24,n28,n32,n36,n40,n44,n48,n52,n56,n60,n64},
        one                                ENUMERATED {n4,n8,n12,n16,n20,n24,n28,n32,n36,n40,n44,n48,n52,n56,n60,n64},
        two                                ENUMERATED {n4,n8,n12,n16,n20,n24,n28,n32},
        four                               INTEGER (1..16),
        eight                              INTEGER (1..8),
        sixteen                            INTEGER (1..4)
    }                                                                                                          OPTIONAL,    -- Need M
    groupBconfigured                   SEQUENCE {
        ra-Msg3SizeGroupA                  ENUMERATED { b56, b144, b208, b256, b282, b480, b640,
                                                        b800, b1000, spare7, spare6, spare5, spare4, spare3, spare2, spare1},
        messagePowerOffsetGroupB           ENUMERATED { minusinfinity, dB0, dB5, dB8, dB10, dB12, dB15, dB18},
        numberOfRA-PreamblesGroupA         INTEGER (1..64)
    }                                                                                                          OPTIONAL,    -- Need R
    ra-ContentionResolutionTimer       ENUMERATED { sf8, sf16, sf24, sf32, sf40, sf48, sf56, sf64},
    rsrp-ThresholdSSB                  RSRP-Range                                                              OPTIONAL,    -- Need R
    rsrp-ThresholdSSB-SUL              RSRP-Range                                                              OPTIONAL,    -- Cond SUL
    prach-RootSequenceIndex            CHOICE {
        l839                               INTEGER (0..837),
        l139                               INTEGER (0..137)
    },
    msg1-SubcarrierSpacing             SubcarrierSpacing                                                       OPTIONAL,    -- Need S
    restrictedSetConfig                ENUMERATED {unrestrictedSet, restrictedSetTypeA, restrictedSetTypeB},
    msg3-transformPrecoding            ENUMERATED {enabled}                                                    OPTIONAL,    -- Need R
    ...
}

-- TAG-RACH-CONFIG-COMMON-STOP
-- ASN1STOP
```

FIG. 18

| RACH-ConfigCommon field descriptions | |
|---|---|
| *messagePowerOffsetGroupB* | Threshold for preamble selection (Value in dB). Value minus infinity corresponds to -infinity. Value dB0 corresponds to 0 dB., dB5 corresponds to 5 dB and so on. |
| *msg1-SubcarrierSpacing* | Subcarrier spacing of PRACH. One or more values, e.g., 15 or 30 kHz (<6GHz), 60 or 120 kHz (>6GHz) may be applicable. Corresponds to L1 parameter 'prach-Msg1SubcarrierSpacing'. If absent, a wireless device may apply the SCS as derived from the *prach-ConfigurationIndex* in *RACH-ConfigGeneric*. |
| *msg3-transformPrecoding* | may indicates to a wireless device whether transform precoding is enabled for data transmission (e.g., Msg3 in a four-step RA procedure and/or one or more TB transmission in a two-step RA procedure). Absence indicates that it is disabled. |
| *numberOfRA-PreamblesGroupA* | The number of CB preambles per SSB in group A. This may determine implicitly the number of CB preambles per SSB available in group B. The setting may be consistent with the setting of *ssb-perRACH-OccasionAndCB-PreamblesPerSSB*. |
| *prach-RootSequenceIndex* | PRACH root sequence index. May corresponds to L1 parameter 'PRACHRootSequenceIndex'. The value range may depend on whether L=839 or L=139. |
| *ra-ContentionResolutionTimer* | The initial value for the contention resolution timer. Value *ms8* corresponds to 8 ms, value *ms16* corresponds to 16 ms, and so on. |
| *ra-Msg3SizeGroupA* | Transport Blocks size threshold in bit below which a wireless device may employ a contention based RA preamble of group A. |
| *rach-ConfigGeneric* | Generic RACH parameters |
| *restrictedSetConfig* | Configuration of an unrestricted set or one of two types of restricted sets. |
| *rsrp-ThresholdSSB* | a wireless device may select the SS block and corresponding PRACH resource for path-loss estimation and (re)transmission based on SS blocks that satisfy the threshold |
| *rsrp-ThresholdSSB-SUL* | a wireless device may select an SUL carrier to perform random access based on this threshold |
| *ssb-perRACH-OccasionAndCB-PreamblesPerSSB* | Number of SSBs per RACH occasion (L1 parameter 'SSB-per-rach-occasion') and the number of Contention Based preambles per SSB (L1 parameter 'CB-preambles-per-SSB'). The total number of CB preambles in a RACH occasion may be given by CB-preambles-per-SSB * max(1,SSB-per-rach-occasion). |
| *totalNumberOfRA-Preambles* | Total number of preambles employed for contention based and contention free random access, excluding preambles employed for other purposes (e.g. for SI request). If the field is absent, a wireless device may use all 64 preambles for RA. |

RACH-ConfigGeneric information element

```
-- ASN1START
-- TAG-RACH-CONFIG-GENERIC-START

RACH-ConfigGeneric ::=          SEQUENCE {
    prach-ConfigurationIndex        INTEGER (0..255),
    msg1-FDM                        ENUMERATED {one, two, four, eight},
    msg1-FrequencyStart             INTEGER (0..maxNrofPhysicalResourceBlocks-1),
    zeroCorrelationZoneConfig       INTEGER (0..15),
    preambleReceivedTargetPower     INTEGER (-202..-60),
    preambleTransMax                ENUMERATED {n3, n4, n5, n6, n7, n8, n10, n20, n50, n100, n200},
    powerRampingStep                ENUMERATED {dB0, dB2, dB4, dB6},
    ra-ResponseWindow               ENUMERATED {sl1, sl2, sl4, sl8, sl10, sl20, sl40, sl80},
    ...
}

-- TAG-RACH-CONFIG-GENERIC-STOP
-- ASN1STOP
```

| RACH-ConfigGeneric field descriptions |
|---|
| msg1-FDM <br> The number of PRACH transmission occasions FDMed in one time instance. Corresponds to L1 parameter 'prach-FDM' (see 38.211, section FFS_Section) |
| msg1-FrequencyStart <br> Offset of lowest PRACH transmission occasion in frequency domain with respective to PRB 0. The value is configured so that the corresponding RACH resource is entirely within the bandwidth of the UL BWP. Corresponds to L1 parameter 'prach-frequency-start' (see 38.211, section FFS_Section) |
| powerRampingStep <br> Power ramping steps for PRACH (see 38.321, 5.1.3) |
| prach-ConfigurationIndex <br> PRACH configuration index. Corresponds to L1 parameter 'PRACHConfigurationIndex' (see 38.211, section 6.3.3.2) |
| preambleReceivedTargetPower <br> The target power level at the network receiver side (see 38.213, section 7.4, 38.321, section 5.1.2, 5.1.3). Only multiples of 2 dBm may be chosen (e.g. -202, -200, -198, ...). |
| preambleTransMax <br> Max number of RA preamble transmission performed before declaring a failure (see 38.321, section 5.1.4, 5.1.5) |
| ra-ResponseWindow <br> Msg2 (RAR) window length in number of slots. The network configures a value lower than or equal to 10 ms (see 38.321, section 5.1.4) |
| zeroCorrelationZoneConfig <br> N-CS configuration, see Table 6.3.3.1-3 in 38.211 |

*RACH-ConfigDedicated information element*

```
-- ASN1START
-- TAG-RACH-CONFIG-DEDICATED-START

--- FFS_Standalone: resources for msg1-based on-demand SI request

RACH-ConfigDedicated ::=    SEQUENCE {
    cfra                        CFRA                                                          OPTIONAL,  -- Need N
    ra-Prioritization           RA-Prioritization                                             OPTIONAL,  -- Need N
    ...
}

CFRA ::=                    SEQUENCE {
    occasions                   SEQUENCE {
        rach-ConfigGeneric          RACH-ConfigGeneric,
        ssb-perRACH-Occasion        ENUMERATED {oneEighth, oneFourth, oneHalf, one, two, four, eight, sixteen}  OPTIONAL,-- Cond SSB-CFRA
                                                                                                                OPTIONAL,  -- Need S
    resources                   CHOICE {
        ssb                         SEQUENCE {
            ssb-ResourceList            SEQUENCE (SIZE(1..maxRA-SSB-Resources)) OF CFRA-SSB-Resource,
            ra-ssb-OccasionMaskIndex    INTEGER (0..15)
        },
        csirs                       SEQUENCE {
            csirs-ResourceList          SEQUENCE (SIZE(1..maxRA-CSIRS-Resources)) OF CFRA-CSIRS-Resource,
            rsrp-ThresholdCSI-RS        RSRP-Range
        }
    },
    ...
}

CFRA-SSB-Resource ::=       SEQUENCE {
    ssb                         SSB-Index,
    ra-PreambleIndex            INTEGER (0..63),
    ...
}

CFRA-CSIRS-Resource ::=     SEQUENCE {
    csi-RS                      CSI-RS-Index,
    ra-OccasionList             SEQUENCE (SIZE(1..maxRA-OccasionsPerCSIRS)) OF INTEGER (0..maxRA-Occasions-1),
    ra-PreambleIndex            INTEGER (0..63),
    ...
}

-- TAG-RACH-CONFIG-DEDICATED-STOP
-- ASN1STOP
```

FIG. 21

CFRA-CSIRS-Resource field descriptions

*csi-RS*
The ID of a CSI-RS resource defined in the measurement object associated with this serving cell.

*ra-OccasionList*
RA occasions that a wireless device may employ when performing CF-RA upon selecting the candidate beam identified by this CSI-RS.

*ra-PreambleIndex*
The RA preamble index to use in the RA occasions associated with this CSI-RS.

CFRA field descriptions

*ra-ssb-OccasionMaskIndex*
Explicitly signalled PRACH Mask Index for RA Resource selection. The mask is valid for all SSB resources signalled in ssb-ResourceList.

*rach-ConfigGeneric*
Configuration of contention free random access occasions for CFRA.

*ssb-perRACH-Occasion*
Number of SSBs per RACH occasion.

CFRA-SSB-Resource field descriptions

*ra-PreambleIndex*
The preamble index that a wireless device may employ when performing CF-RA upon selecting the candidate beams identified by this SSB.

*ssb*
The ID of an SSB transmitted by this serving cell.

RACH-ConfigDedicated field descriptions

*cfra*
Parameters for contention free random access to a given target cell. If the field is absent, a wireless device may perform contention based random access.

*ra-prioritization*
Parameters which apply for prioritized random access procedure to a given target cell

| Conditional Presence | Explanation |
|---|---|
| SSB-CFRA | The field is mandatory present if the field resources in CFRA is set to ssb; otherwise it is not present. |

FIG. 22

PRACH Mask Index values

| PRACH Mask Index | Allowed PRACH occasion(s) of SSB |
|---|---|
| 0 | All |
| 1 | PRACH occasion index 1 |
| 2 | PRACH occasion index 2 |
| 3 | PRACH occasion index 3 |
| 4 | PRACH occasion index 4 |
| 5 | PRACH occasion index 5 |
| 6 | PRACH occasion index 6 |
| 7 | PRACH occasion index 7 |
| 8 | PRACH occasion index 8 |
| 9 | Every even PRACH occasion |
| 10 | Every odd PRACH occasion |
| 11 | Reserved |
| 12 | Reserved |
| 13 | Reserved |
| 14 | Reserved |
| 15 | Reserved |

FIG. 23

| Channel Access Priority Class ($p$) | QCI |
|---|---|
| 1 | 1, 3, 5, 65, 66, 69, 70 |
| 2 | 2, 7 |
| 3 | 4, 6, 8, 9 |
| 4 | - |

FIG. 24

```
BWP ::=                              SEQUENCE {
    locationAndBandwidth                 INTEGER (0..37949),
    subcarrierSpacing                    SubcarrierSpacing,
    cyclicPrefix                         ENUMERATED { extended }
        OPTIONAL -- Need R
}

BWP-Uplink ::=                       SEQUENCE {
    bwp-Id                               BWP-Id,
    bwp-Common                           BWP-UplinkCommon
        OPTIONAL, -- Need M
    bwp-Dedicated                        BWP-UplinkDedicated
        OPTIONAL, -- Need M
    ...
}

BWP-UplinkCommon ::=                 SEQUENCE {
    genericParameters                    BWP,
    rach-ConfigCommon                    SetupRelease { RACH-ConfigCommon }
        OPTIONAL,      -- Need M
    pusch-ConfigCommon                   SetupRelease { PUSCH-ConfigCommon }
        OPTIONAL,      -- Need M
    pucch-ConfigCommon                   SetupRelease { PUCCH-ConfigCommon }
        OPTIONAL,      -- Need M
    ...
}

BWP-UplinkDedicated ::=              SEQUENCE {
    pucch-Config                         SetupRelease { PUCCH-Config }
        OPTIONAL,      -- Need M
    pusch-Config                         SetupRelease { PUSCH-Config }
        OPTIONAL,      -- Cond SetupOnly
    configuredGrantConfig                SetupRelease { ConfiguredGrantConfig }
        OPTIONAL,      -- Need M
    srs-Config                           SetupRelease { SRS-Config }
        OPTIONAL,      -- Need M
    beamFailureRecoveryConfig            SetupRelease { BeamFailureRecoveryConfig }
        OPTIONAL, -- Cond SpCellOnly
    ...
}

BWP-Downlink ::=                     SEQUENCE {
    bwp-Id                               BWP-Id,
    bwp-Common                           BWP-DownlinkCommon
        OPTIONAL, -- Need M
    bwp-Dedicated                        BWP-DownlinkDedicated
        OPTIONAL, -- Need M
    ...
}

BWP-DownlinkCommon ::=               SEQUENCE {
    genericParameters                    BWP,
    pdcch-ConfigCommon                   SetupRelease { PDCCH-ConfigCommon }
        OPTIONAL, -- Need M
    pdsch-ConfigCommon                   SetupRelease { PDSCH-ConfigCommon }
        OPTIONAL, -- Need M
    ...
}

BWP-DownlinkDedicated ::=            SEQUENCE {
    pdcch-Config                         SetupRelease { PDCCH-Config }
        OPTIONAL, -- Need M
    pdsch-Config                         SetupRelease { PDSCH-Config }
        OPTIONAL, -- Need M
    sps-Config                           SetupRelease { SPS-Config }
        OPTIONAL,      -- Need M
    radioLinkMonitoringConfig            SetupRelease { RadioLinkMonitoringConfig }
        OPTIONAL, -- Need M
    ...
}
```

FIG. 25

```
ServingCellConfig ::=                    SEQUENCE {
    tdd-UL-DL-ConfigurationDedicated TDD-UL-DL-ConfigDedicated
        OPTIONAL,       -- Cond TDD initialDownlinkBWP                   BWP-DownlinkDedicated
        OPTIONAL,       -- Cond ServCellAdd
    downlinkBWP-ToReleaseList            SEQUENCE (SIZE (1..maxNrofBWPs)) OF BWP-Id
        OPTIONAL,       -- Need N
    downlinkBWP-ToAddModList             SEQUENCE (SIZE (1..maxNrofBWPs)) OF BWP-Downlink
        OPTIONAL,       -- Need N
    firstActiveDownlinkBWP-Id            BWP-Id
        OPTIONAL,       -- Cond SyncAndCellAdd
    bwp-InactivityTimer                  ENUMERATED { ms2, ms3, ms4, ms5, ms6, ms8, ms10, ms20, ms30,
                                                      ms40,ms50, ms60, ms80, ms100, ms200, ms300, ms500,
                                                      ms750, ms1280, ms1920, ms2560, spare10, spare9, spare8,
                                                      spare7, spare6, spare5, spare4, spare3, spare2, spare1 }
        OPTIONAL,       -- Need R
    defaultDownlinkBWP-Id                BWP-Id
        OPTIONAL,       -- Need S uplinkConfig                         UplinkConfig
        OPTIONAL,       -- Cond ServCellAdd-UL
    supplementaryUplink                  UplinkConfig
        OPTIONAL,       -- Cond ServCellAdd-SUL pdcch-ServingCellConfig              SetupRelease { PDCCH-ServingCellConfig }
        OPTIONAL,       -- Need M
    pdsch-ServingCellConfig              SetupRelease { PDSCH-ServingCellConfig }
        OPTIONAL,       -- Need M
    csi-MeasConfig                       SetupRelease { CSI-MeasConfig }
        OPTIONAL,       -- Need M
    sCellDeactivationTimer               ENUMERATED { ms20, ms40, ms80, ms160, ms200, ms240,
                                                      ms320, ms400, ms480, ms520, ms640, ms720,
                                                      ms840, ms1280, spare2,spare1}
        OPTIONAL,       -- Cond ServingCellWithoutPUCCH
    crossCarrierSchedulingConfig         CrossCarrierSchedulingConfig
        OPTIONAL,       -- Need M
    tag-Id                               TAG-Id,
    ue-BeamLockFunction                  ENUMERATED {enabled}
        OPTIONAL,       -- Need R
    pathlossReferenceLinking             ENUMERATED {pCell, sCell}
        OPTIONAL,       -- Cond SCellOnly
    servingCellMO                        MeasObjectId
        OPTIONAL,       -- Cond MeasObject
    ...
}

UplinkConfig ::=                         SEQUENCE {
    initialUplinkBWP                     BWP-UplinkDedicated
        OPTIONAL,       -- Cond ServCellAdd
    uplinkBWP-ToReleaseList              SEQUENCE (SIZE (1..maxNrofBWPs)) OF BWP-Id
        OPTIONAL,       -- Need N
    uplinkBWP-ToAddModList               SEQUENCE (SIZE (1..maxNrofBWPs)) OF BWP-Uplink
        OPTIONAL,       -- Need N
    firstActiveUplinkBWP-Id              BWP-Id
        OPTIONAL,       -- Cond SyncAndCellAdd pusch-ServingCellConfig              SetupRelease { PUSCH-ServingCellConfig }
        OPTIONAL,       -- Need M
    carrierSwitching                     SetupRelease { SRS-CarrierSwitching }
        OPTIONAL,       -- Need M
    ...
}
```

FIG. 26

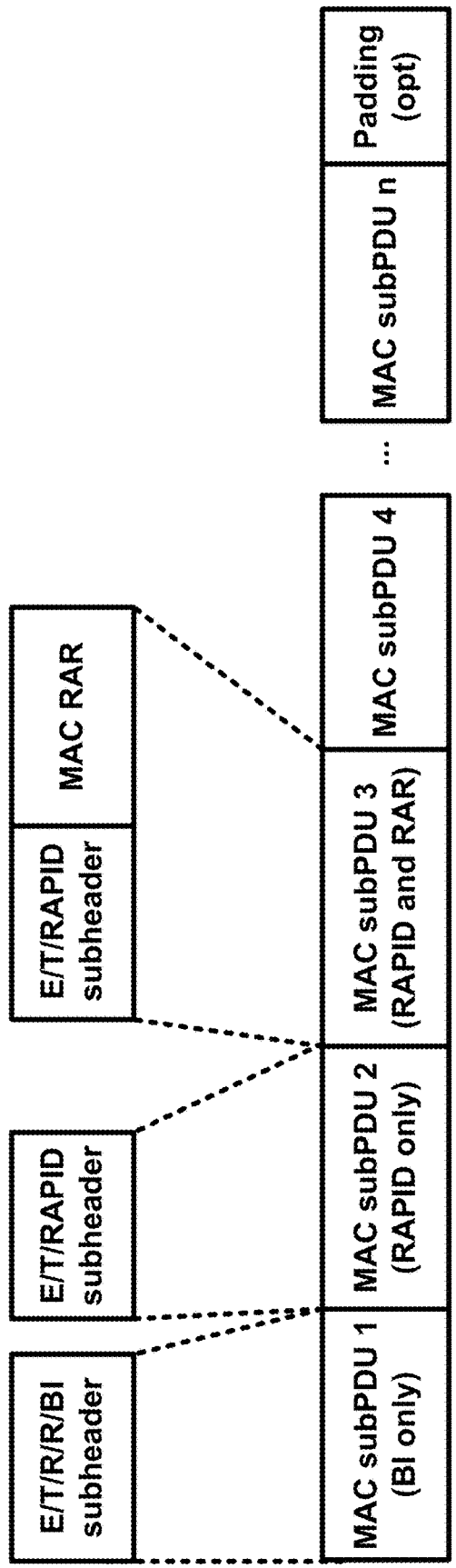
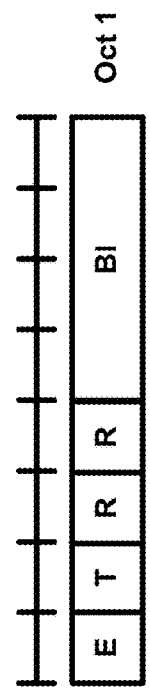
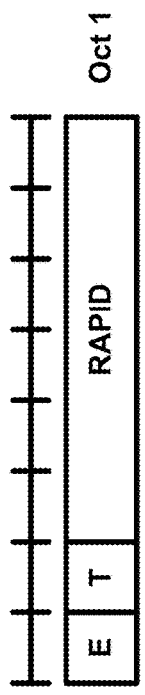
FIG. 27A
FIG. 27B
FIG. 27C

| | |
|---|---|
| R | Oct 1 |
| UE contention resolution identity | Oct 2 |
| UE contention resolution identity | Oct 3 |
| UE contention resolution identity | Oct 4 |
| UE contention resolution identity | Oct 5 |
| UE contention resolution identity | Oct 6 |

FIG. 30B

| | |
|---|---|
| R | Oct 1 |
| Temporary C-RNTI | Oct 2 |
| Temporary C-RNTI | Oct 3 |
| TC-RNT / UE contention resolution identity | Oct 4 |
| UE contention resolution identity | Oct 5 |
| UE contention resolution identity | Oct 6 |
| UE contention resolution identity | Oct 7 |
| UE contention resolution identity | Oct 8 |

FIG. 30A

| Numerology μ | Subcarrier spacing Δf=2^μ·15 [kHz] | Cyclic prefix | Num of symbols per slot | Num of slots per frame | Num of slots per subframe | Min Num of PRB | Max num of PRB |
|---|---|---|---|---|---|---|---|
| 0 | 15 | Normal | 14 | 10 | 1 | 20 | 275 |
| 1 | 30 | Normal | 14 | 20 | 2 | 20 | 275 |
| 2 | 60 | Normal | 14 | 40 | 4 | 20 | 275 |
| 2 | 60 | Extended | 12 | 40 | 4 | 20 | 275 |
| 3 | 120 | Normal | 14 | 80 | 8 | 20 | 275 |
| 4 | 240 | Normal | 14 | 160 | 16 | 20 | 138 |

** PRB: Physical resource block

FIG. 40

RANDOM ACCESS RESPONSE RECEPTION

CROSS-REFERENCE TO RELATED APPLICATIONS

This application claims the benefit of U.S. Provisional Application No. 62/754,527, titled "Random Access Response Reception" and filed on Nov. 1, 2018. The above-referenced application is hereby incorporated by reference in its entirety.

BACKGROUND

Wireless communications may use random access procedures to establish communication between devices. A communication device may send (e.g., transmit) a random access preamble to another communication device, for example, to establish timing synchronization between the communication devices. A communication device may respond to a random access preamble by sending a random access response. The random access response may interfere with another random access procedure that may be initiated by one or more additional communication devices which may lead to undesirable outcomes such as unsuccessful or delayed communications.

SUMMARY

The following summary presents a simplified summary of certain features. The summary is not an extensive overview and is not intended to identify key or critical elements.

A wireless device may initiate a random access procedure by sending a random access preamble to a base station. The wireless device may send the random access preamble in a system frame that may be indicated using a system frame number. The base station may send (e.g., based on or in response to the random access preamble) one or more downlink control signals and/or messages to the wireless device, which may indicate the system frame number corresponding to a transmission of a random access preamble. The wireless device may use the indication of system frame number to distinguish the one or more downlink control messages from other downlink control messages that may correspond to other system frames. This use and inclusion of system frame numbers may avoid potential collisions between multiple random access procedures in a network.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 4A, FIG. 4B, FIG. 4C, and FIG. 4D show examples of uplink and downlink signal transmission.

FIG. 7A and FIG. 7B show example sets of orthogonal frequency division multiplexing (OFDM) subcarriers.

FIG. 18 shows an example random access resource configuration.

FIG. 19 shows example field descriptions of a common random access resource configuration.

FIG. 20 shows an example generic random access resource configuration, and field descriptions.

FIG. 21 shows an example dedicated random access resource configuration.

FIG. 22 shows example field descriptions of a dedicated random access resource configuration.

FIG. 23 shows example random access occasion mask index values.

FIG. 24 shows an example channel access priority class values.

FIG. 25 shows an example bandwidth part configuration information element.

FIG. 26 shows an example serving cell configuration information element.

FIG. 27A, FIG. 27B, and FIG. 27C show examples of RA response (RAR), a MAC subheader with backoff indicator (BI), and a MAC subheader with a random access preamble identifier (RAPID), respectively.

FIG. 30A and FIG. 30B show example RAR formats.

FIG. 40 shows example parameters corresponding to different numerologies.

DETAILED DESCRIPTION

Figure 1:
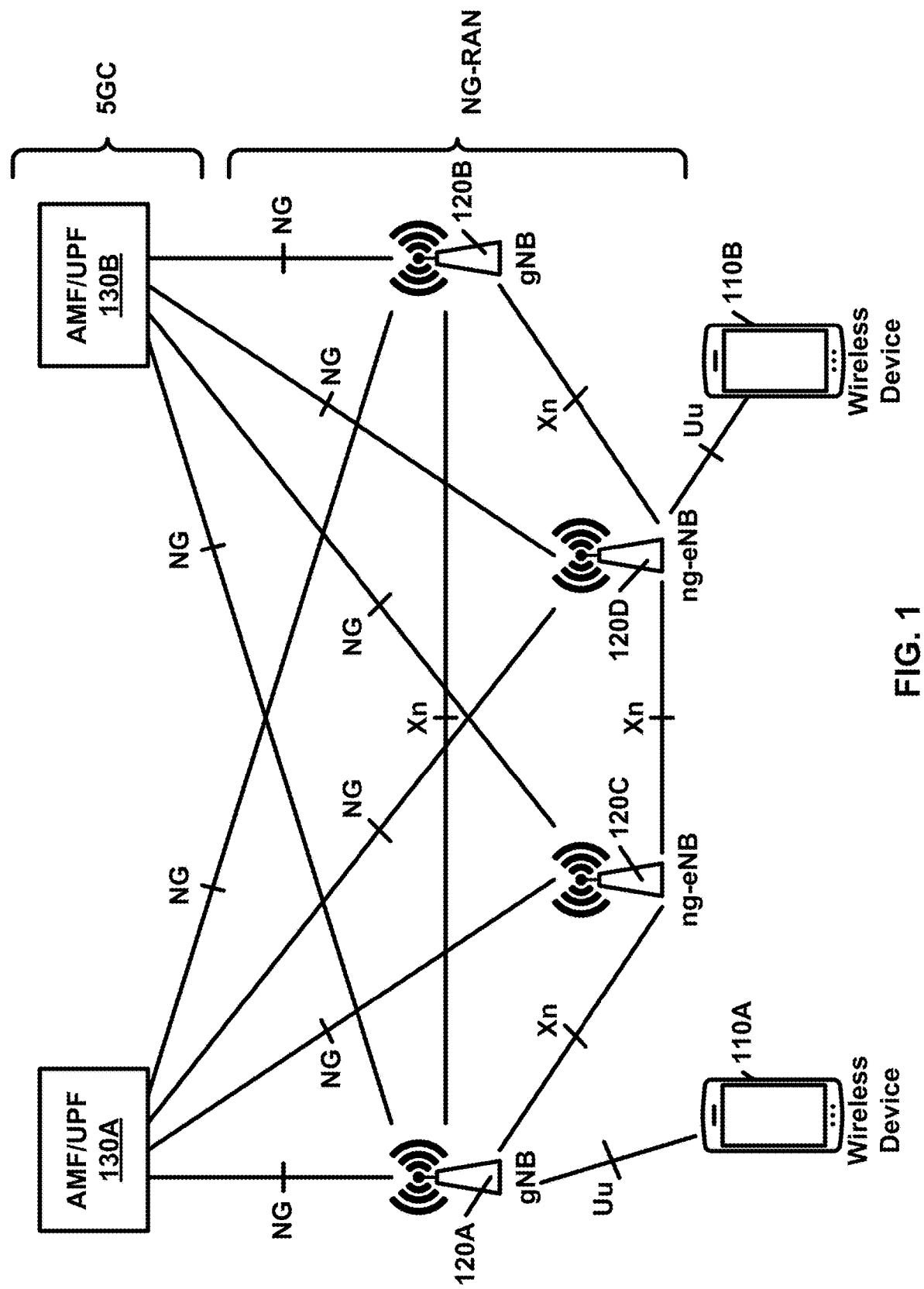
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

Examples are provided for operation of wireless communication systems which may be used in the technical field of multicarrier communication systems. More particularly, the technology described herein may relate to power control for wireless communications in multicarrier communication systems.

The following acronyms are used throughout the drawings and/or descriptions, and are provided below for convenience although other acronyms may be introduced in the detailed description:
3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BFR Beam Failure Recovery
BLER Block Error Rate
BPSK Binary Phase Shift Keying
BSR Buffer Status Report
BWP Bandwidth Part
CA Carrier Aggregation
CC Component Carrier
CCCH Common Control CHannel
CDMA Code Division Multiple Access
CN Core Network
CORESET Control Resource Set
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCH Logical Channel
LCID Logical Channel Identifier
LTE Long Term Evolution
MAC Medium Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
NUL Normal Uplink
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QCLed Quasi-Co-Located
QCL Quasi-Co-Location
QFI Quality of Service Indicator
QoS Quality of Service
QPSK Quadrature Phase Shift Keying
RA Random Access
RACH Random Access CHannel
RAN Radio Access Network
RAP Random Access Preamble
RAT Radio Access Technology
RA-RNTI Random Access-Radio Network Temporary Identifier
RB Resource Blocks
RBG Resource Block Groups
RI Rank indicator
RLC Radio Link Control
RLM Radio Link Monitoring
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SINR Signal-to-Interference-plus-Noise Ratio
SMF Session Management Function
SN Secondary Node
SpCell Special Cell
SR Scheduling Request
SRB Signaling Radio Bearer
SRS Sounding Reference Signal
SS Synchronization Signal
SSB Synchronization Signal Block
SSS Secondary Synchronization Signal
sTAG secondary Timing Advance Group
SUL Supplementary Uplink
TA Timing Advance
TAG Timing Advance Group
TAI Tracking Area Identifier
TAT Time Alignment Timer
TB Transport Block
TC-RNTI Temporary Cell-Radio Network Temporary Identifier
TCI Transmission Configuration Indication
TDD Time Division Duplex
TDMA Time Division Multiple Access
TRP Transmission and Receiving Point
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface. The wireless devices 110A and/or 110B may be structurally similar to wireless devices shown in and/or described in connection with other drawing figures. The Node B 120A, the Node B 120B, the Node B 120C, and/or the Node B 120D may be structurally similar to Nodes B and/or base stations shown in and/or described in connection with other drawing figures.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., a gNB and/or an ng-eNB) may be connected to an AMF via an NG-Control plane (NG-C) interface. The NG-C interface may provide, for example, NG interface management, wireless device (e.g., UE) context management, wireless device (e.g., UE) mobility management, transport of NAS messages, paging, PDU session management, configuration transfer, and/or warning message transmission, combinations thereof, and/or the like.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QoS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
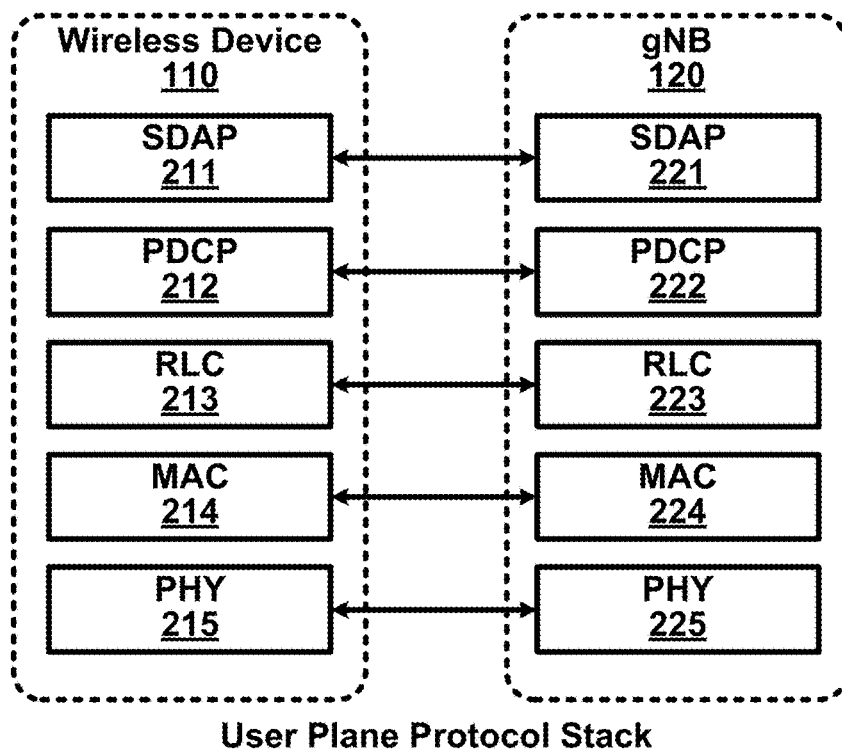
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Medium Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TBs) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
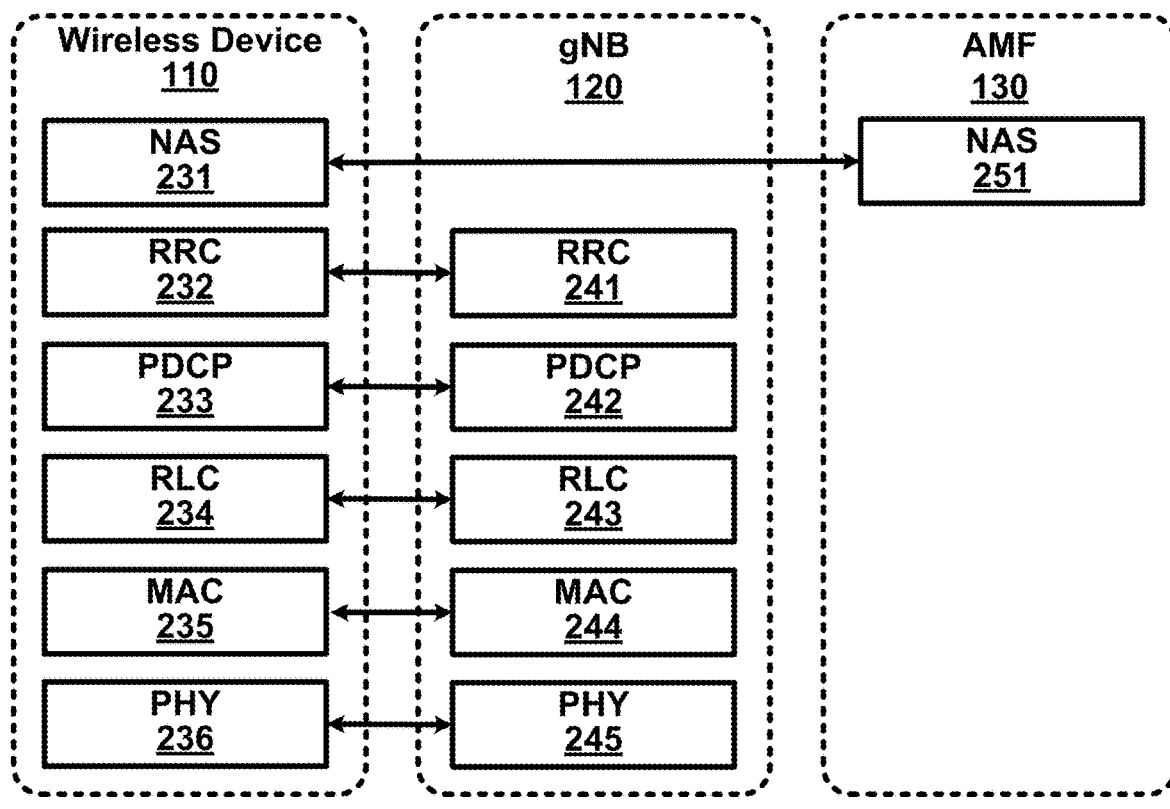
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a TB. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., TB). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel IDentifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MAC CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs that indicate one or more timing advance values for one or more Timing Advance Groups (TAGs).

Figure 3:
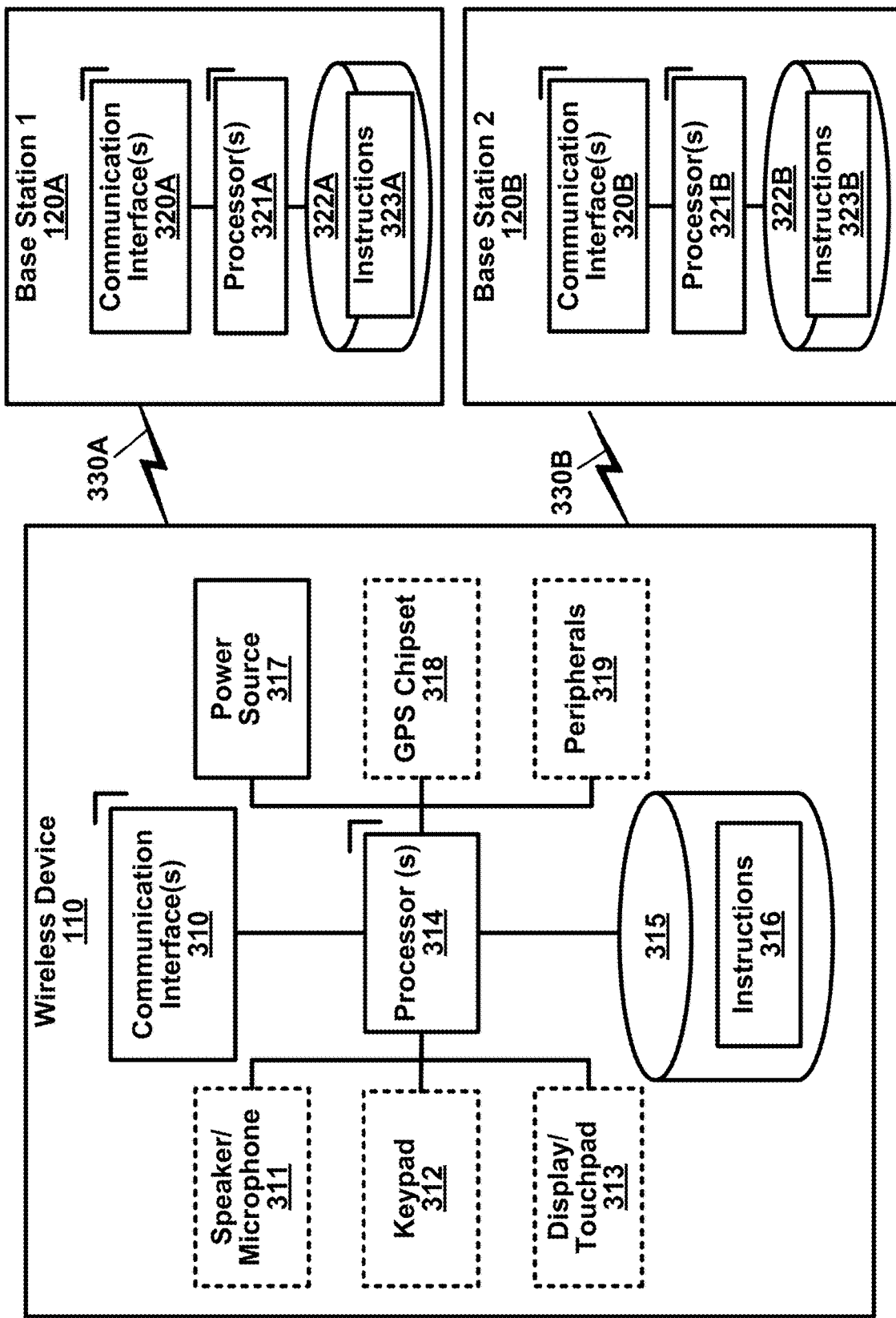
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any number of sectors, for example: 1, 2, 3, 4, or 6 sectors. A base station may comprise any number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an

RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterinformationBlock and SystemInformationBlockType1). Another SI may be transmitted via SystemInformationBlockType2. For a wireless device in an RRC_Connected state, dedicated RRC signaling may be used for the request and delivery of the other SI. For the wireless device in the RRC_Idle state and/or in the RRC_Inactive state, the request may trigger a RA procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message includes the sCellToReleaseList. The wireless device may perform SCell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to an E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive TBs, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g., AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

FIG. 4A, FIG. 4B, FIG. 4C and FIG. 4D show examples of uplink and downlink signal transmission. FIG. 4A shows an example uplink transmitter for at least one physical channel A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. A CP-OFDM signal for uplink transmission may be generated by FIG. 4A, for example, if transform precoding is not enabled. These functions are shown as examples and other mechanisms may be implemented.

FIG. 4B shows an example of modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; Doppler spread; Doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
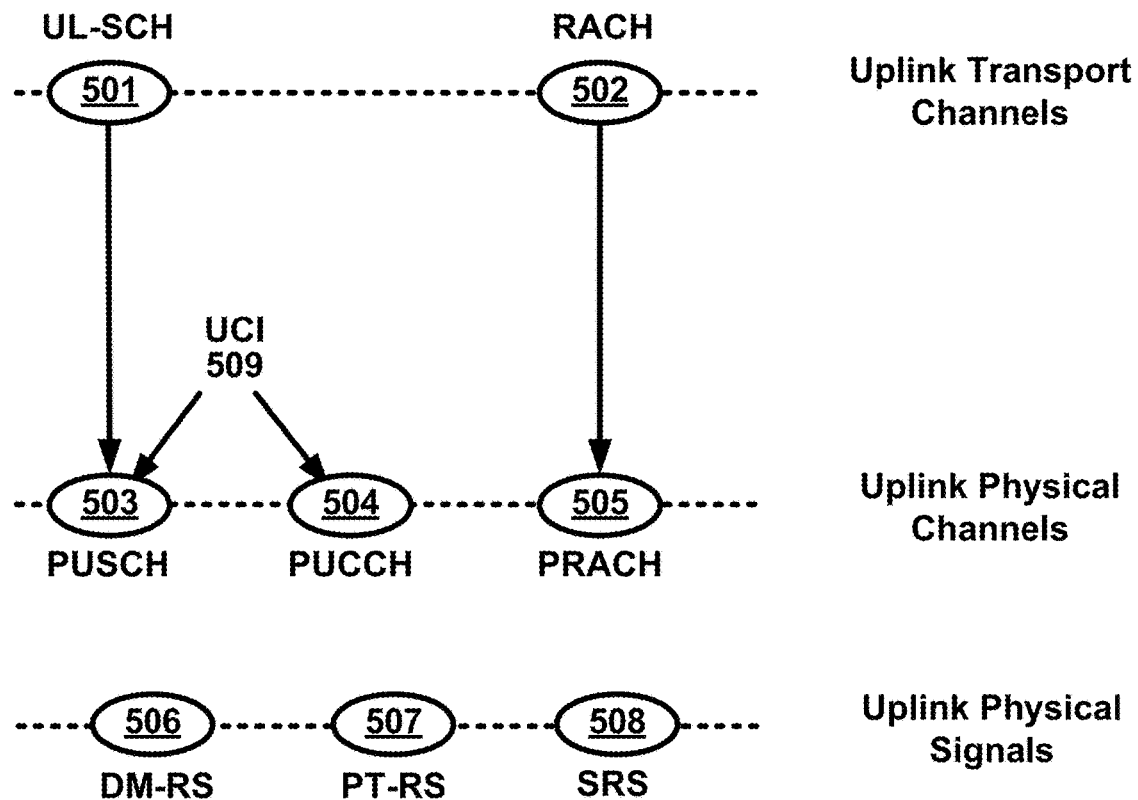
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum number of front-loaded DM-RS symbols for PUSCH and/or PUCCH. The wireless device may schedule a single-symbol DM-RS and/or double symbol DM-RS based on a maximum number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DMRS port and a PT-RS port. A number of PT-RS ports may be less than a number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, an SRS bandwidth, a frequency hopping bandwidth, a cyclic shift, and/or an SRS sequence ID.

Figure 5B:
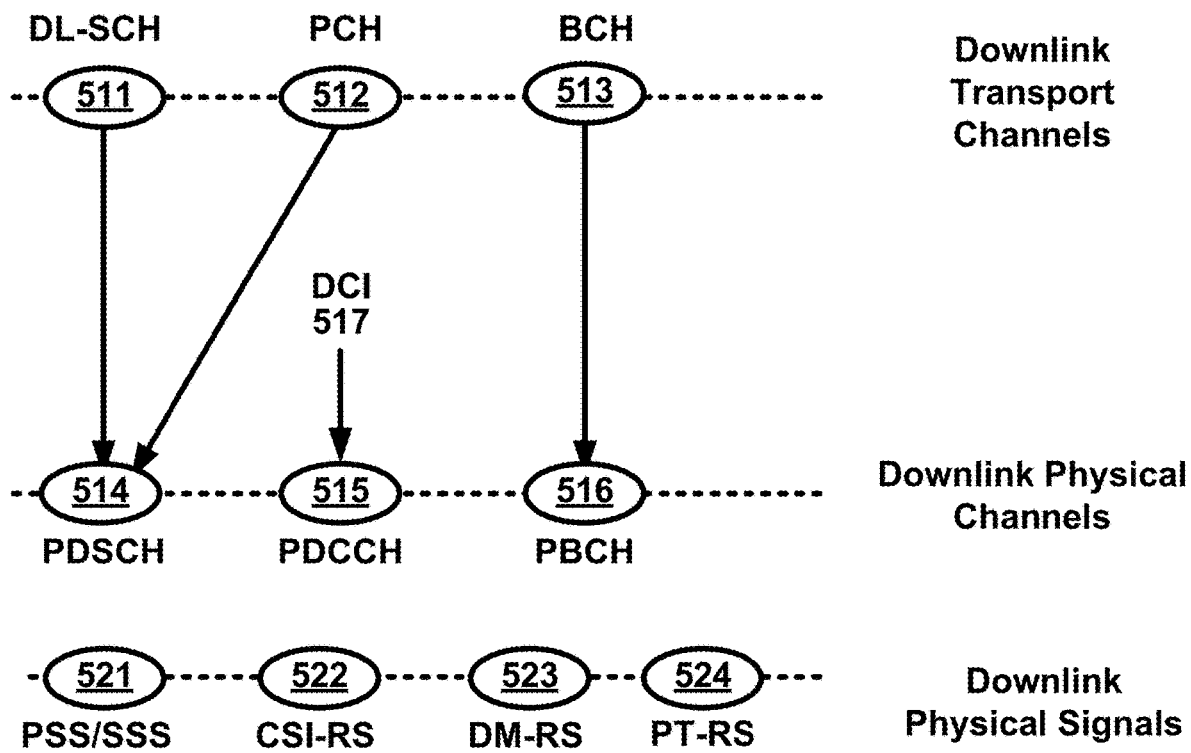
FIG. 5B shows an example downlink channel mapping and example downlink physical signals.

FIG. 5B shows an example downlink channel mapping and downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. A UL-SCH 501 may be mapped to a Physical Uplink Shared CHannel (PUSCH) 503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may carry UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency Domain, an SS/PBCH block may comprise one or more contiguous subcarriers (e.g., 240 contiguous subcarriers with the subcarriers numbered in increasing order from 0 to 239) within the SS/PBCH block. The PSS/SSS 521 may occupy, for example, 1 OFDM symbol and 127 subcarriers. The PBCH 516 may span across, for example, 3 OFDM symbols and 240 subcarriers. A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a number of antenna ports. A base station may configure a wireless device with 32 ports, or any other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SSB/PBCH, for example, if the downlink CSI-RS 522 and SSB/PBCH are spatially quasi co-located and resource elements associated with the downlink CSI-RS 522 are outside of the PRBs configured for the SSB/PBCH.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. A DM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DMRS port and a PT-RS port. A number of PT-RS ports may be less than a number of DM-RS ports in a scheduled resource. The downlink PT-RS 524 may be confined in the scheduled time/frequency duration for a wireless device.

Figure 6:
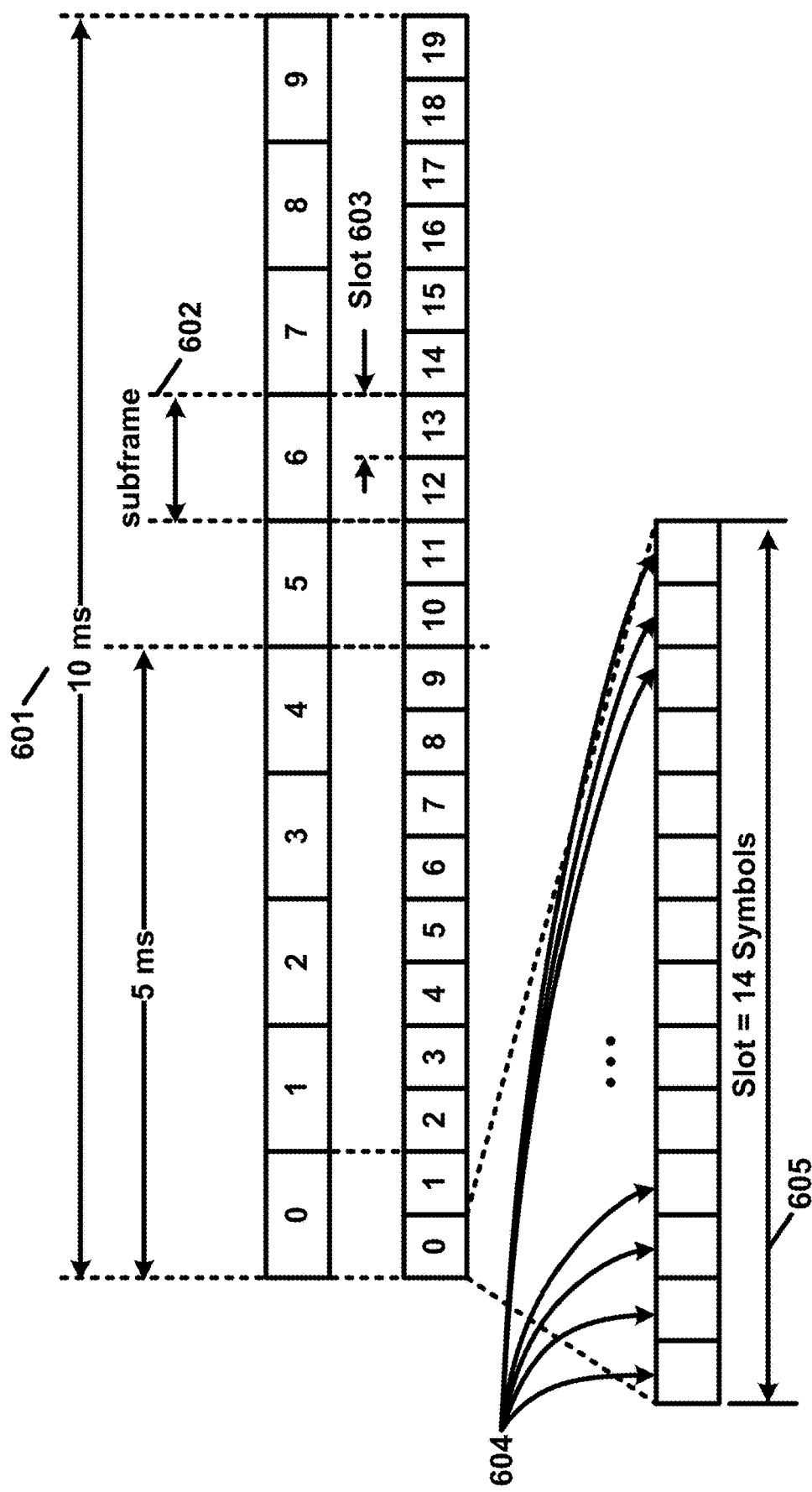
FIG. 6 shows an example transmission time and/or reception time for a carrier.

FIG. 6 shows an example transmission and/or reception time of a carrier, as well as an example frame structure, for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame structure. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

FIG. 7A shows example sets of OFDM subcarriers. A base station may communicate with a wireless device using a carrier having an example channel bandwidth 700. Arrow(s) may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a number of subcarriers 703 in a carrier. A bandwidth occupied by a number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

FIG. 7B shows examples of component carriers. A first component carrier may comprise a first number of subcarriers 706 having a first subcarrier spacing 709. A second component carrier may comprise a second number of subcarriers 707 having a second subcarrier spacing 710. A third component carrier may comprise a third number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
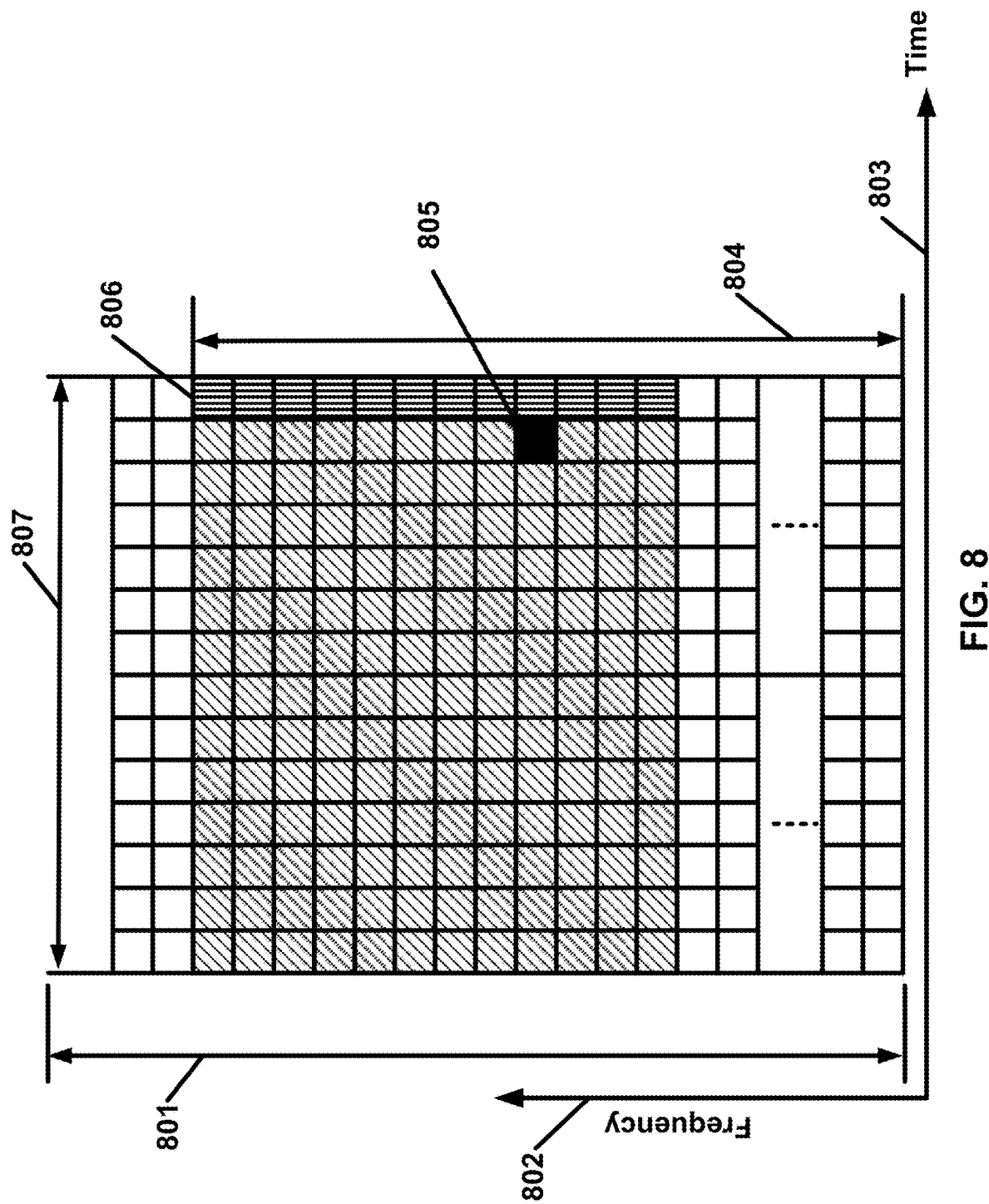
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first number of OFDM symbols in a subframe and a second number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a BWP of a carrier. A carrier may comprise multiple BWPs. A first BWP of a carrier may have a different frequency location and/or a different bandwidth from a second BWP of the carrier.

A base station may send (e.g., transmit), to a wireless device, a downlink control information comprising a downlink or uplink resource block assignment. A base station may send (e.g., transmit) to and/or receive from, a wireless device, data packets (e.g., TBs). The data packets may be scheduled on and transmitted via one or more resource blocks and one or more slots indicated by parameters in downlink control information and/or RRC message(s). A starting symbol relative to a first slot of the one or more slots may be indicated to the wireless device.

A base station may send (e.g., transmit) to and/or receive from, a wireless device, data packets.

The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

A base station may allocate Configured Scheduling (CS) resources for down link transmission to a wireless device. The base station may send (e.g., transmit) one or more RRC messages indicating a periodicity of the CS grant. The base station may send (e.g., transmit) DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more TBs. The DCI may indicate a downlink assignment indicating parameters for receiving one or more TBs. The DCI may be used by the base station to initiate a contention-free RA at the wireless device.

The base station may send (e.g., transmit) DCI comprising a slot format indicator (SFI) indicating a slot format. The base station may send (e.g., transmit) DCI comprising a preemption indication indicating the PRB(s) and/or OFDM symbol(s) in which a wireless device may assume no transmission is intended for the wireless device. The base station may send (e.g., transmit) DCI for group power control of the PUCCH, the PUSCH, and/or an SRS. DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI, etc.). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

Figure 9A:
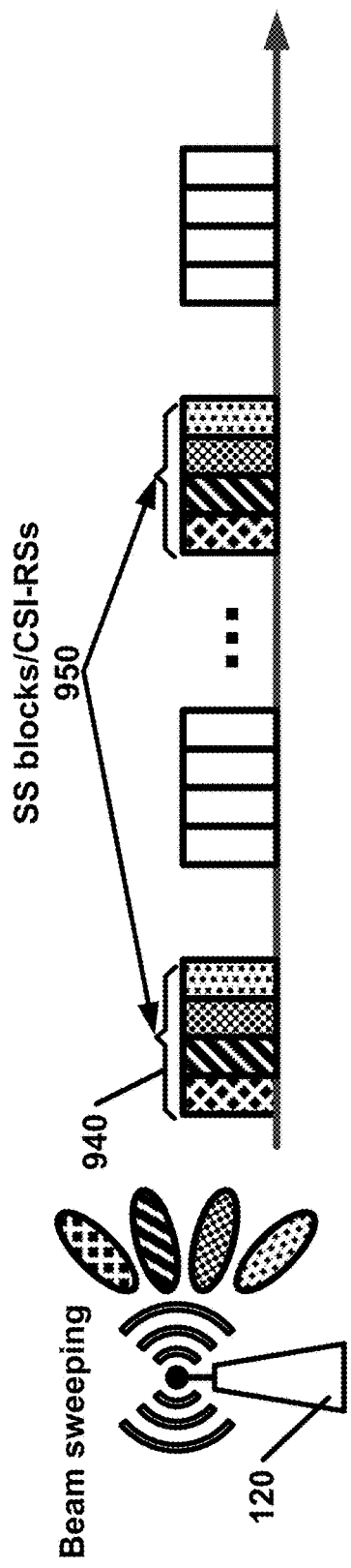
FIG. 9A shows an example channel state information reference signal (CSI-RS) and/or synchronization signal (SS) block transmission in a multi-beam system.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

Figure 9B:
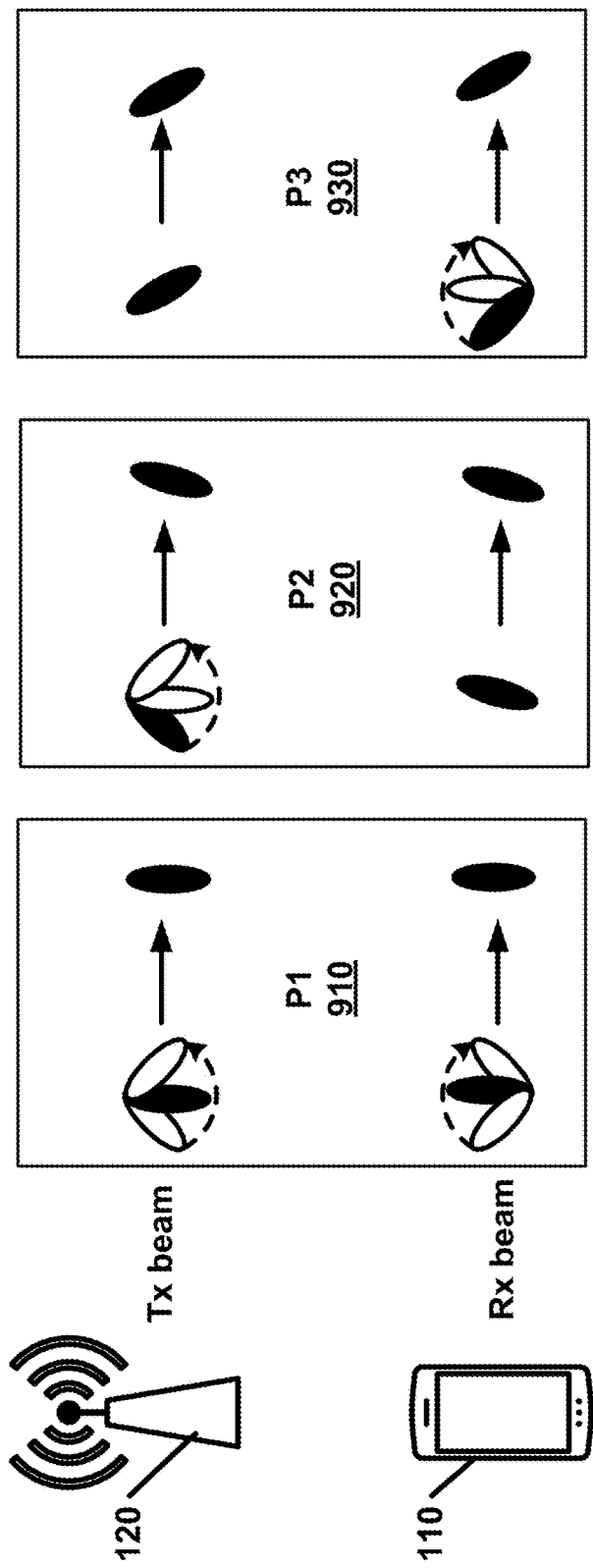
FIG. 9B shows an example downlink beam management procedure.

FIG. 9B shows an example of a beam management procedure, such as a new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth (s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
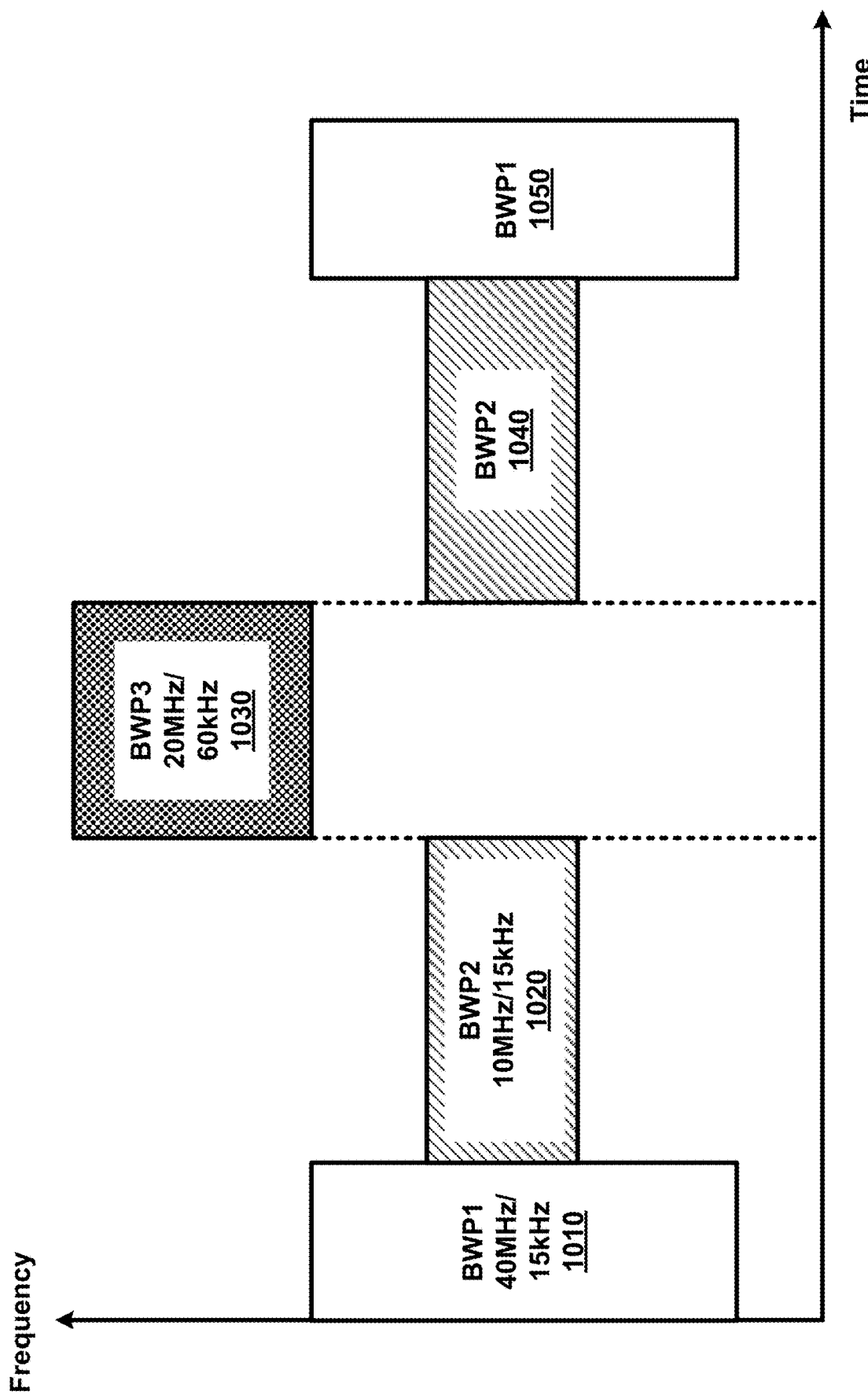
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and number of contiguous PRBs, a subcarrier spacing, or a cyclic prefix, for example, for a CORESETs for at least one common search space. For operation on the PCell, one or more higher layer parameters may indicate at least one initial UL BWP for a RA procedure. If a wireless device is configured with a secondary carrier on a primary cell, the wireless device may be configured with an initial BWP for RA procedure on a secondary carrier.

A wireless device may expect that a center frequency for a DL BWP may be same as a center frequency for a UL BWP, for example, for unpaired spectrum operation. A base station may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may not configure a wireless device without a common search space on a PCell, or on a PSCell, in an active DL BWP. For an UL BWP in a set of one or more UL BWPs, a base station may configure a wireless device with one or more resource sets for one or more PUCCH transmissions.

DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided a default DL BWP, a default BWP may be an initial active DL BWP.

A base station may configure a wireless device with a timer value for a PCell. A wireless device may start a timer (e.g., a BWP inactivity timer), for example, if a wireless device detects DCI indicating an active DL BWP, other than a default DL BWP, for a paired spectrum operation, and/or if a wireless device detects DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer.

A wireless device may switch an active BWP from BWP2 1020 to BWP3 1030, for example, after or in response to receiving DCI indicating BWP3 1030 as an active BWP. Switching an active BWP from BWP3 1030 to BWP2 1040 and/or from BWP2 1040 to BWP1 1050 may be after or in response to receiving DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
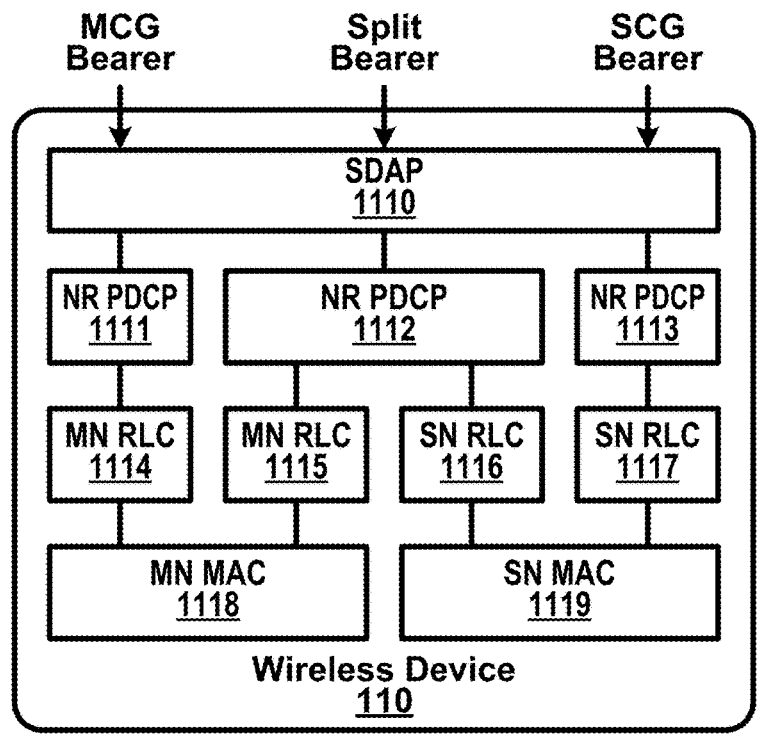
FIG. 11A and FIG. 11B show examples of multi connectivity.
Figure 11B:
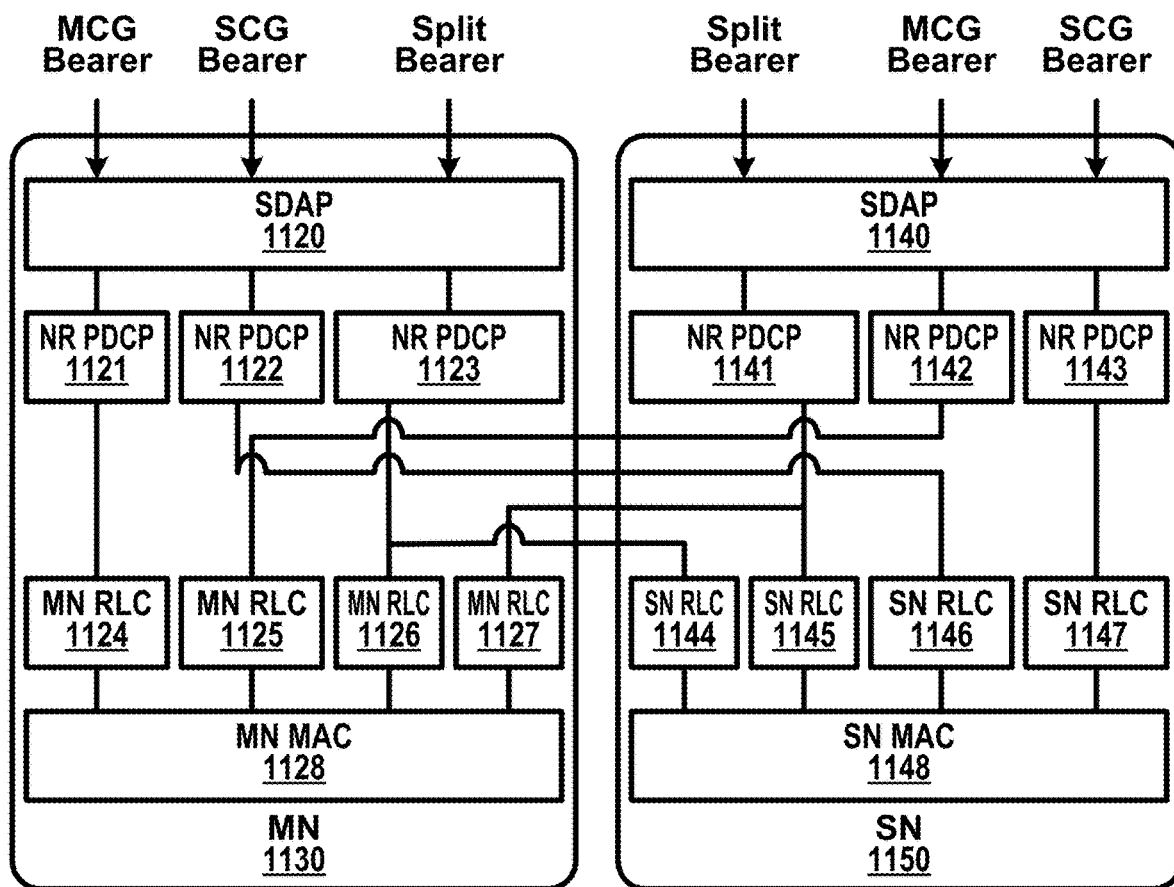

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations.

A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1119).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a RA problem on a PSCell, or a number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain RRM measurement configurations of a wireless device.

A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap).

Dedicated RRC signaling may be used for sending required system information of a cell as for CA, for example, if adding a new SCG SCell, except for an SFN acquired from an MIB of a PSCell of a SCG.

Figure 12:
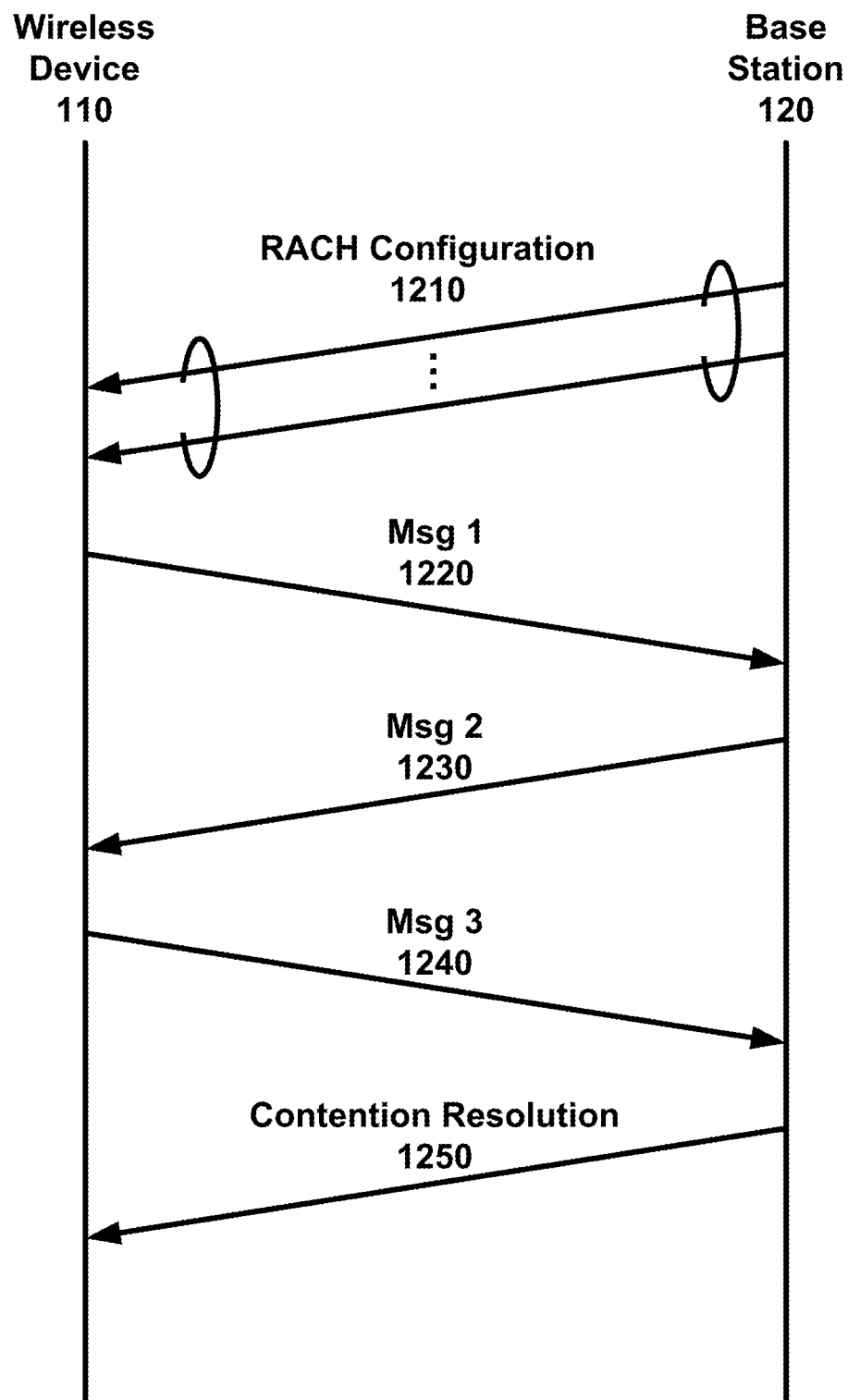
FIG. 12 shows an example of a random access procedure.

FIG. 12 shows an example of a RA procedure. One or more events may trigger a RA procedure.

For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a RA procedure.

A RA procedure may comprise or be one of at least a contention based RA procedure and/or a contention free RA procedure. A contention based RA procedure may comprise one or more Msg 1 1220 transmissions, one or more Msg2 1230 transmissions, one or more Msg3 1240 transmissions, and contention resolution 1250. A contention free RA procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step RA procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg1 1220 and Msg3 1240 of a four-step RA procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step RA procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble (RAP), initial preamble power (e.g., RAP initial received target power), an RSRP threshold for a selection of a SS block and corresponding PRACH resource, a power-ramping factor (e.g., RAP power ramping step), a RAP index, a maximum number of preamble transmissions, preamble group A and group B, a threshold (e.g., message size) to determine the groups of RAPs, a set of one or more RAPs for a system information request and corresponding PRACH resource(s) (e.g., if any), a set of one or more RAPs for a beam failure recovery request and corresponding PRACH resource(s) (e.g., if any), a time window to monitor RAR(s), a time window to monitor response(s) on a beam failure recovery request, and/or a contention resolution timer.

The Msg1 1220 may comprise one or more transmissions of a RAP. For a contention based RA procedure, a wireless device may select an SS block with an RSRP above the RSRP threshold. If RAPs group B exists, a wireless device may select one or more RAPs from a group A or a group B, for example, depending on a potential Msg3 1240 size. If a RAPs group B does not exist, a wireless device may select the one or more RAPs from a group A. A wireless device may select a RAP index randomly (e.g., with equal probability or a normal distribution) from one or more RAPs associated with a selected group. If a base station semi-statically configures a wireless device with an association between RAPs and SS blocks, the wireless device may select a RAP index randomly with equal probability from one or more RAPs associated with a selected SS block and a selected group.

A wireless device may initiate a contention free RA procedure, for example, based on a beam failure indication from a lower layer. A base station may semi-statically configure a wireless device with one or more contention free PRACH resources for a beam failure recovery request associated with at least one of SS blocks and/or CSI-RSs. A wireless device may select a RAP index corresponding to a selected SS block or a CSI-RS from a set of one or more RAPs for a beam failure recovery request, for example, if at least one of the SS blocks with an RSRP above a first RSRP threshold among associated SS blocks is available, and/or if at least one of CSI-RSs with a RSRP above a second RSRP threshold among associated CSI-RSs is available.

A wireless device may receive, from a base station, a RAP index via PDCCH or RRC for a contention free RA procedure. The wireless device may select a RAP index, for example, if a base station does not configure a wireless device with at least one contention free PRACH resource associated with SS blocks or CSI-RS. The wireless device may select the at least one SS block and/or select a RAP corresponding to the at least one SS block, for example, if a base station configures the wireless device with one or more contention free PRACH resources associated with SS blocks and/or if at least one SS block with a RSRP above a first RSRP threshold among associated SS blocks is available. The wireless device may select the at least one CSI-RS and/or select a RAP corresponding to the at least one CSI-RS, for example, if a base station configures a wireless device with one or more contention free PRACH resources associated with CSI-RSs and/or if at least one CSI-RS with a RSRP above a second RSPR threshold among the associated CSI-RSs is available.

A wireless device may perform one or more Msg1 1220 transmissions, for example, by sending (e.g., transmitting) the selected RAP. The wireless device may determine a PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected RAP via a selected PRACH occasions. The wireless device may determine a transmit power for a transmission of a selected RAP at least based on an initial preamble power and a power-ramping factor. The wireless device may determine an RA-RNTI associated with a selected PRACH occasion in which a selected RAP is sent (e.g., transmitted). The wireless device may not determine an RA-RNTI for a beam failure recovery request. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a RAR, Msg 2 1230. The wireless device may start a time window (e.g., ra-ResponseWindow) to monitor a RAR. For a beam failure recovery procedure, the base station may configure the wireless device with a different time window (e.g., bfr-ResponseWindow) to monitor response to on a beam failure recovery request. The wireless device may start a time window (e.g., ra-ResponseWindow or bfr-Response-Window) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one RAR identified by a RA-RNTI, or for at least one response to a beam failure recovery request identified by a C-RNTI, at a time that a timer for a time window is running.

A wireless device may determine that a reception of RAR is successful, for example, if at least one RAR comprises a random access preamble identifier (RAPID) corresponding to a RAP sent (e.g., transmitted) by the wireless device. The wireless device may determine that the contention free RA procedure is successfully completed, for example, if a reception of a RAR is successful. The wireless device may determine that a contention free RA procedure is successfully complete, for example, if a contention free RA procedure is triggered for a beam failure recovery request and if a PDCCH transmission is addressed to a C-RNTI. The wireless device may determine that the RA procedure is successfully completed, and may indicate a reception of an acknowledgement for a system information request to upper layers, for example, if at least one RAR comprises a RAPID. The wireless device may stop sending (e.g., transmitting) remaining preambles (if any) after or in response to a successful reception of a corresponding RAR, for example, if the wireless device has signaled multiple preamble transmissions.

The wireless device may perform one or more Msg 3 1240 transmissions, for example, after or in response to a successful reception of RAR (e.g., for a contention based RA procedure). The wireless device may adjust an uplink transmission timing, for example, based on a timing advanced command indicated by a RAR. The wireless device may send (e.g., transmit) one or more TBs, for example, based on an uplink grant indicated by a RAR. Subcarrier spacing for PUSCH transmission for Msg3 1240 may be provided by at least one higher layer (e.g., RRC) parameter. The wireless device may send (e.g., transmit) a RAP via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same RAR comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a RA procedure is successfully completed, for example, after or in response to detecting a C-RNTI on a PDCCH. If a wireless device has no valid C-RNTI, a contention resolution may be addressed by using a TC-RNTI.

If a MAC PDU is successfully decoded and a MAC PDU comprises a wireless device contention resolution identity MAC CE that matches or otherwise corresponds with the CCCH SDU sent (e.g., transmitted) in Msg3 1250, the wireless device may determine that the contention resolution (e.g., comprising contention resolution 1250) is successful and/or the wireless device may determine that the RA procedure is successfully completed.

RA procedures may be used to establish communications between a wireless device and a base station associated with a cell. A four-step RA procedure (e.g., such as shown in FIG. 12 and described above) may have an associated latency. The associated latency for the four-step RA procedure may be a minimum of a quantity (e.g., fourteen or any other quantity) of transmission time intervals (TTIs). A TTI may be any transmission time interval or other time duration. A minimum latency of fourteen TTIs may comprise, for example, three TTIs after a message from step 1 1220 of a four-step RA procedure, one TTI for a message from step 2 1230 of a four-step RA procedure, five TTIs after the message from step 2, one TTI for a message from step 3 1240 of a four-step RA procedure, three TTIs after the message from step 3, and one TTI for a message from step 4 1250 of a four-step procedure (e.g., 3+1+5+1+3+1=14). The minimum latency may comprise any quantity of TTIs. Any of the above-references messages may comprise any quantity of TTIs. Reducing the number of steps in an RA procedure may reduce latency. A four-step RA procedure may be reduced to a two-step RA procedure, for example, by using parallel transmissions. A two-step RA procedure may have an associated latency. The associated latency for a two-step RA procedure may be a minimum of four TTIs and which may be less than an associated latency for a four-step RA procedure. A minimum latency of four TTIs may be a minimum of a quantity (e.g., four or any other quantity) of TTIs.

A minimum latency of four TTIs may comprise, for example, three TTIs after a message from step 1 of a two-step RA procedure, and one TTI for a message from step 2 of a two-step RA procedure.

Figure 13:
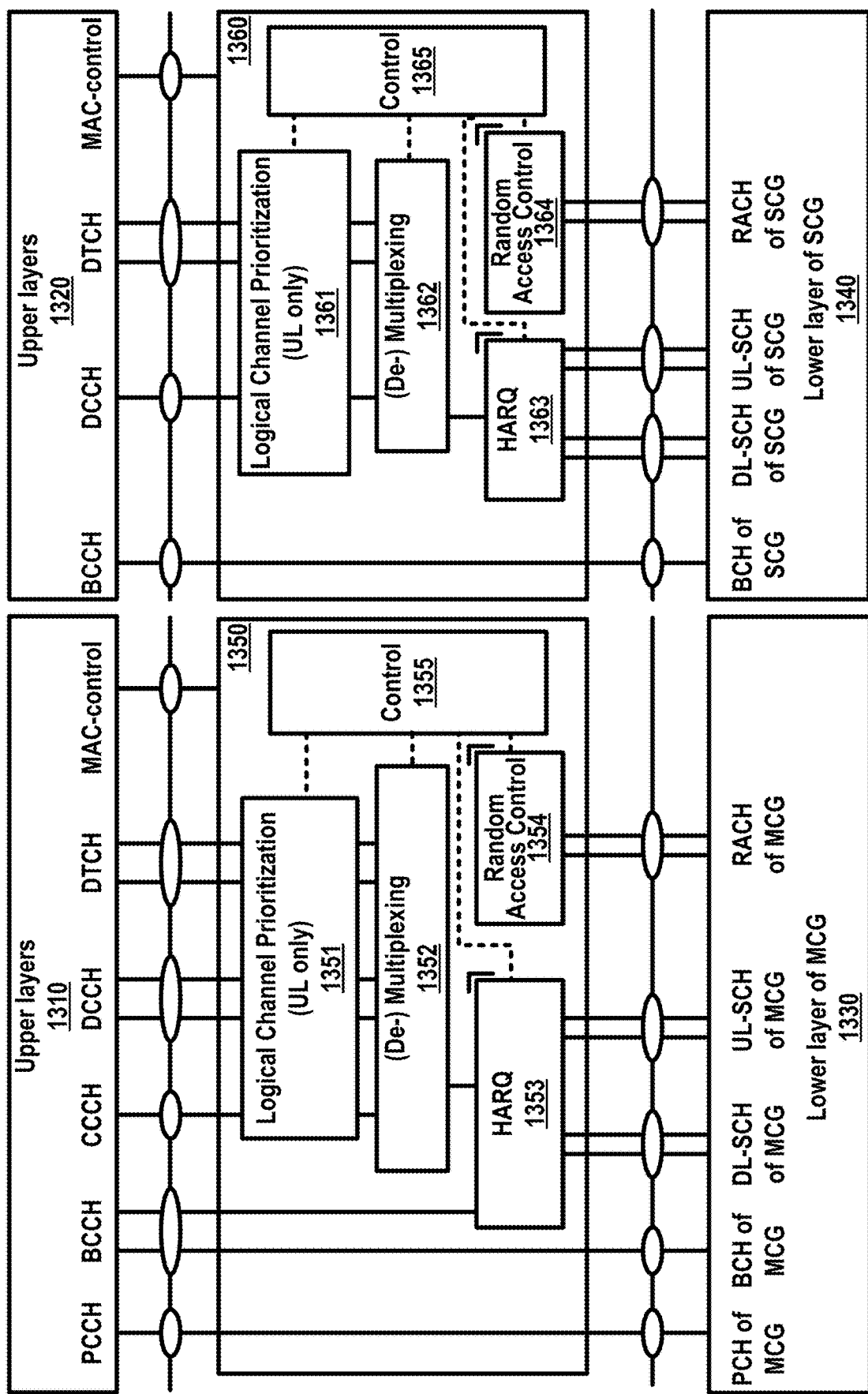
FIG. 13 shows example medium access control (MAC) entities.

FIG. 13 shows an example structure for MAC entities. A wireless device may be configured to operate in a multi-connectivity mode. A wireless device in RRC_CONNECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a RA problem on a PSCell, after or upon reaching a number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels.

To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel. A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG.

A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto TBs to be delivered to the physical layer on transport channels (e.g., in uplink), demultiplexing (e.g., (De-) Multiplexing 1352 and/or (De-) Multiplexing 1362) of MAC SDUs to one or different logical channels from TBs delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a RA process (e.g., Random Access Control 1354 and/or Random Access Control 1364).

Figure 14:
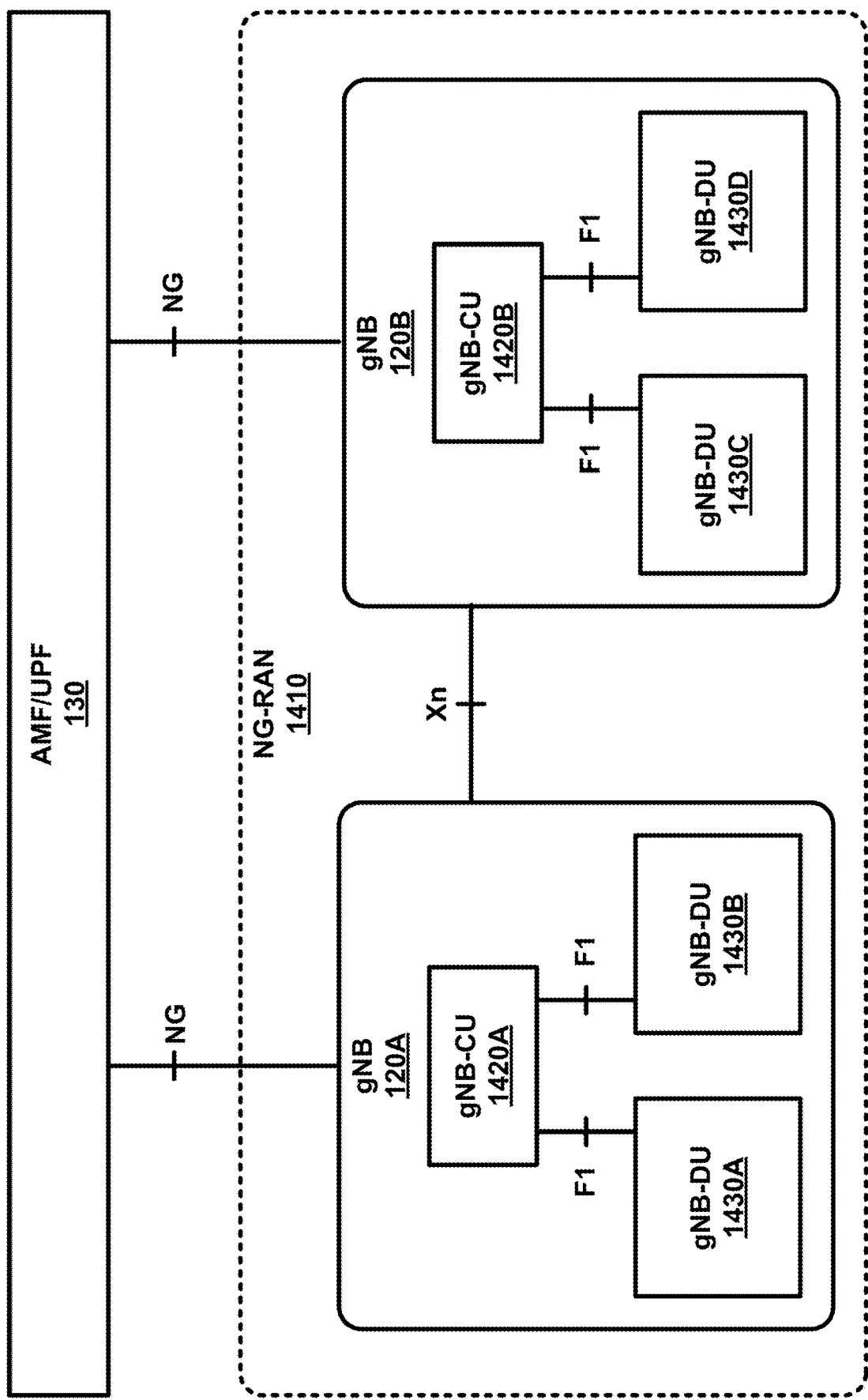
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
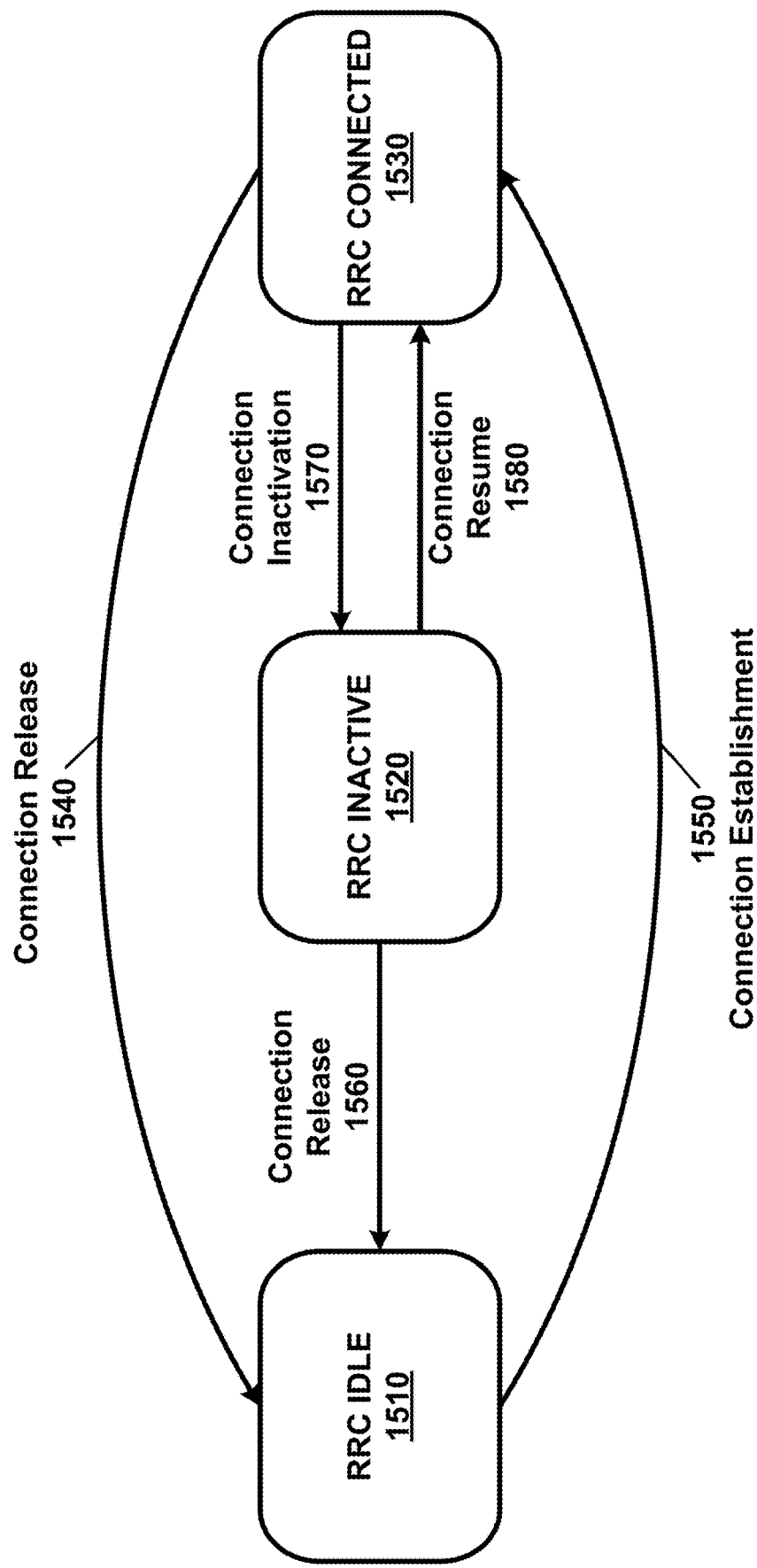
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a RA procedure by the wireless device and/or a context retrieve procedure (e.g., UE context retrieve). A context retrieve procedure may comprise: receiving, by a base station from a wireless device, a RAP; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a RA procedure to resume an RRC connection and/or to send (e.g., transmit) one or more packets to a base station (e.g., to a network). The wireless device may initiate a RA procedure to perform an RNA update procedure, for example, if a cell selected belongs to a different RNA from an RNA for the wireless device in an RRC inactive state. The wireless device may initiate a RA procedure to send (e.g., transmit) one or more packets to a base station of a cell that the wireless device selects, for example, if the wireless device is in an RRC inactive state and has one or more packets (e.g., in a buffer) to send (e.g., transmit) to a network. A RA procedure may be performed with two messages (e.g., 2-stage or 2-step random access) and/or four messages (e.g., 4-stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context.

A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station).

A base station may communicate with a wireless device via a wireless network using one or more technologies, such as new radio technologies (e.g., NR, 5G, etc.). The one or more radio technologies may comprise at least one of: multiple technologies related to physical layer; multiple technologies related to medium access control layer; and/or multiple technologies related to radio resource control layer. Enhancing the one or more radio technologies may improve performance of a wireless network. System throughput, and/or data rate of transmission, may be increased. Battery consumption of a wireless device may be reduced.

Latency of data transmission between a base station and a wireless device may be improved.

Network coverage of a wireless network may be improved. Transmission efficiency of a wireless network may be improved.

Figure 16:
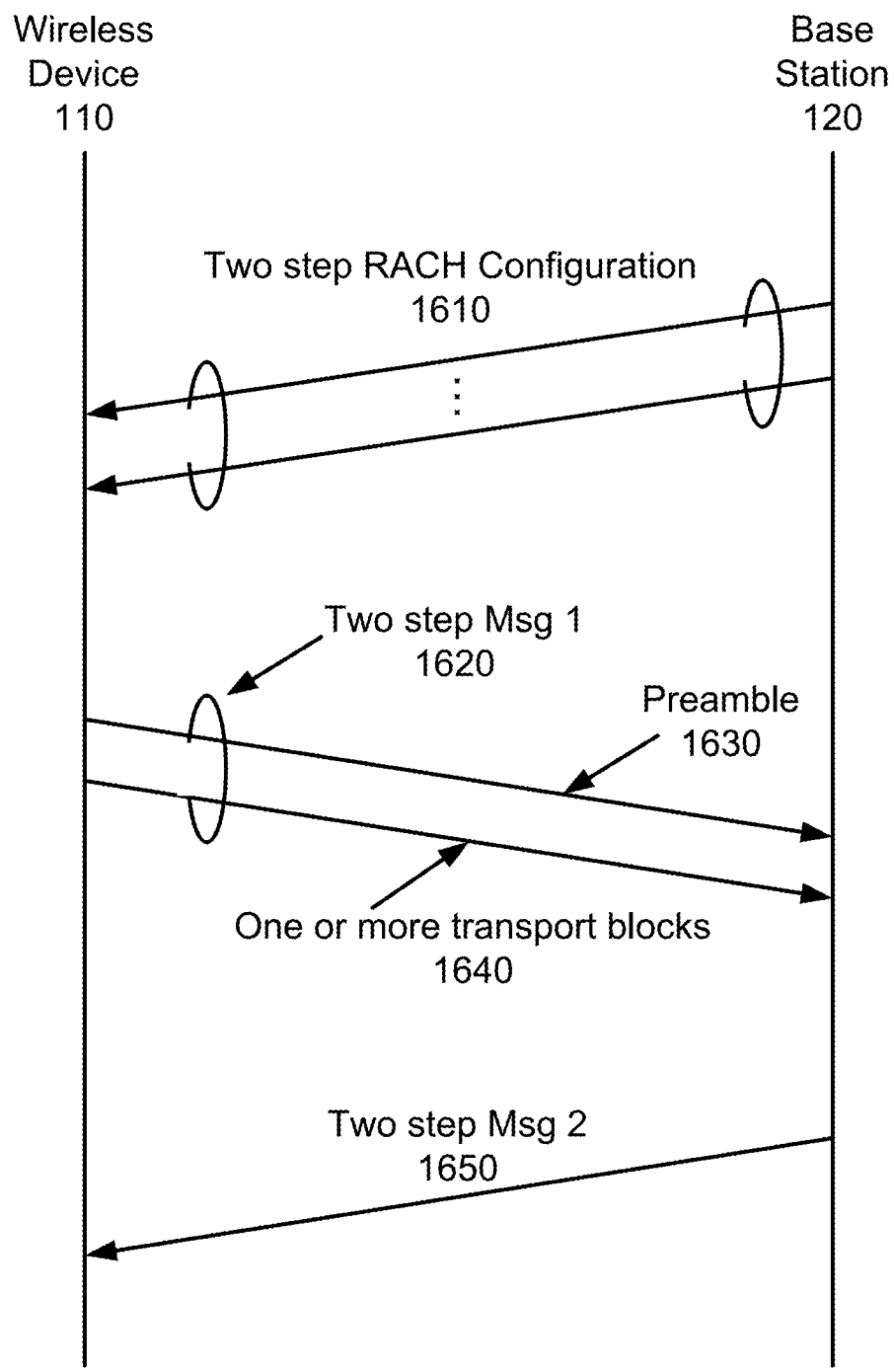
FIG. 16 shows an example of a two-step RA procedure.

FIG. 16 shows an example of a two-step RA procedure. The procedure may comprise an uplink (UL) transmission of a two-step Msg1 1620, for example, based on a two-step RACH configuration 1610 from a base station. The two-step Msg1 1620 may be referred to as message A (e.g., Msg A). The transmission may comprise a RAP transmission 1630 and one or more TBs for transmission 1640. The UL transmission may be followed by a downlink (DL) transmission of a two-step Msg2 1650 that may comprise a response (e.g., random access response (RAR)) corresponding to the uplink transmission. The two-step Msg2 1650 may be referred to as a message B (e.g., Msg B). The response may comprise contention resolution information.

A wireless device may receive (e.g., from a base station) one or more RRC messages to configure one or more parameters of a two step RACH configuration 1610. The one or more RRC messages may be broadcasted or multicasted to one or more wireless devices. The one or more RRC messages may be wireless device-specific messages (e.g., a dedicated RRC message sent (e.g., transmitted) to a wireless device indicating RRC INACTIVE 1520 or RRC CONNECTED 1530). The one or more RRC messages may comprise parameters for sending (e.g., transmitting) a two-step Msg1 1620. The parameters may indicate one or more of following: PRACH resource allocation, preamble format, SSB information (e.g., total number of SSBs, downlink resource allocation of SSB transmission, transmission power of SSB transmission, and/or other information), and/or uplink radio resources for one or more TB transmissions.

A base station may receive (e.g., from a wireless device via a cell), a RAP transmission for UL time alignment and/or one or more TBs (e.g., delay-sensitive data, wireless device ID, security information, device information such as IMSI, and/or other information), for example, in the UL transmission of a two-step RA procedure. A base station may send (e.g., transmit) a two-step Msg2 1650 (e.g., an RAR), for example, in the DL transmission of the two-step RA procedure. The two-step Msg2 1650 (e.g., an RAR) may comprise at least one of following: a timing advance command indicating the TA value, a power control command, an UL grant (e.g., radio resource assignment, and/or MCS), a wireless device ID for contention resolution, an RNTI (e.g., C-RNTI or TC-RNTI), and/or other information. The two-step Msg2 1650 (e.g., an RAR) may comprise a preamble identifier corresponding to the preamble 1630, a positive or negative acknowledgement of a reception of the one or more TBs 1640, and/or an indication of a successful decoding of the one or more TBs 1640. A two-step RA procedure may reduce RA latency compared with a four-step RA procedure for example, by integrating a RAP transmission (such as a process to obtain a timing advance value) with one or more TB transmissions.

A base station may receive (e.g., from a wireless device via a cell) an RAP in parallel with one or more TBs, for example, in the UL transmission of a two-step RA procedure. The wireless device may acquire one or more configuration parameters for the UL transmission before the wireless device starts a two-step RA procedure (e.g., at step 1610 in FIG. 16). The one or more configuration parameters may indicate one or more of following: PRACH resource allocation, preamble format, SSB information (e.g., a number of transmitting SSBs, downlink resource allocation of SSB transmissions, transmission power of SSB transmission, and/or other information), uplink radio resources (e.g., in terms of time, frequency, code/sequence/signature) for one or more TB transmissions, and/or power control parameters of one or more TB transmissions (e.g., cell and/or wireless device specific power adjustments used for determining (e.g., calculating) received target power, inter-cell interference control parameter that may be used as a scaling factor of pathloss measurement, reference signal power to determine (e.g., calculate for) pathloss measurement, and/or one or more margins).

A wireless device may generate an RAP. A two-step RACH configuration may comprise RAP generating parameters (e.g., a root sequence) that may be employed by the wireless device to generate an RAP. The wireless device may use the RAP generating parameters to generate one or more candidate preambles and may randomly select one of the candidate preambles as the RAP. The RAP generating parameters may be SSB-specific and/or cell-specific. RAP generating parameters for a first SSB may be different from or the same as RAP generating parameters for a second SSB. A base station may send (e.g., transmit) a control message (e.g., RRC message for a handover, and/or a PDCCH order for a secondary cell addition) that comprises a preamble index indicating an RAP dedicated to a wireless device to initiate a two-step RA procedure. The one or more candidate preambles may be organized into groups that may indicate an amount of data for transmission. The amount of data may indicate one or more TBs that remain in the buffer. Each of the groups may be associated with a range of data size.

A first group of the groups may comprise RAPs indicated for small data transmissions. A second group may comprise RAPs indicated for larger data transmissions. A wireless device may determine a group of RAPs by comparing one or more thresholds and an amount of data, for example, based on an RRC message comprising one or more thresholds (e.g., transmitted by a based station). The wireless device may be able to indicate a size of data the wireless device may have for transmission, for example, by sending (e.g., transmitting) an RAP from a specific group of RAPs.

In a two-step RA procedure, a wireless device may send (e.g., transmit) a RAP via a RACH resource indicated by a two-step RACH configuration. The wireless device may send (e.g., transmit) one or more TBs via an UL radio resource indicated by a two-step RACH configuration. The transmission of the RAP may be overlapped in time (e.g., partially or entirely) with the transmission of the one or more TBs. The two-step RACH configuration may indicate a portion of overlapping of radio resources between the RAP and one or more TB transmissions. The two-step RACH configuration may indicate one or more UL radio resources associated with one or more RAPs (and/or RAP groups) and/or the RACH resource. A wireless device may determine at least one UL radio resource in which the wireless device may send (e.g., transmit) one or more TBs as a part of a two-step RACH procedure, for example, based on a selection of an RAP, an RAP group, and/or an RACH resource The one or more UL radio resources may be indicated based on a frame structure (such as shown in FIG. 6), and/or OFDM radio structure (such as shown in FIG. 8), The indication may be with respect to an SFN (e.g., SFN=0), slot number, and/or OFDM symbol number for a time domain radio resource, and/or with respect to a subcarrier number, a number of resource elements, a number of resource blocks, RBG number, and/or frequency index for a frequency domain radio resource. The one or more UL radio resources may be indicated based on a time offset and/or a frequency offset with respect to one or more RACH resources of a selected RAP. The UL transmissions may occur (e.g., in the same subframe or slot/mini-slot) in consecutive subframes (or slot/mini-slot), or in the same burst.

A PRACH resource and one or more associated UL radio resources for a two-step Msg1 may be allocated with a time offset and/or frequency offset, for example, such as provided (e.g., configured, determined, indicated, etc.) by RRC messages (e.g., as a part of RACH config.) and/or predefined (e.g., as a mapping table).

Figures 17A, 17B, 17C:
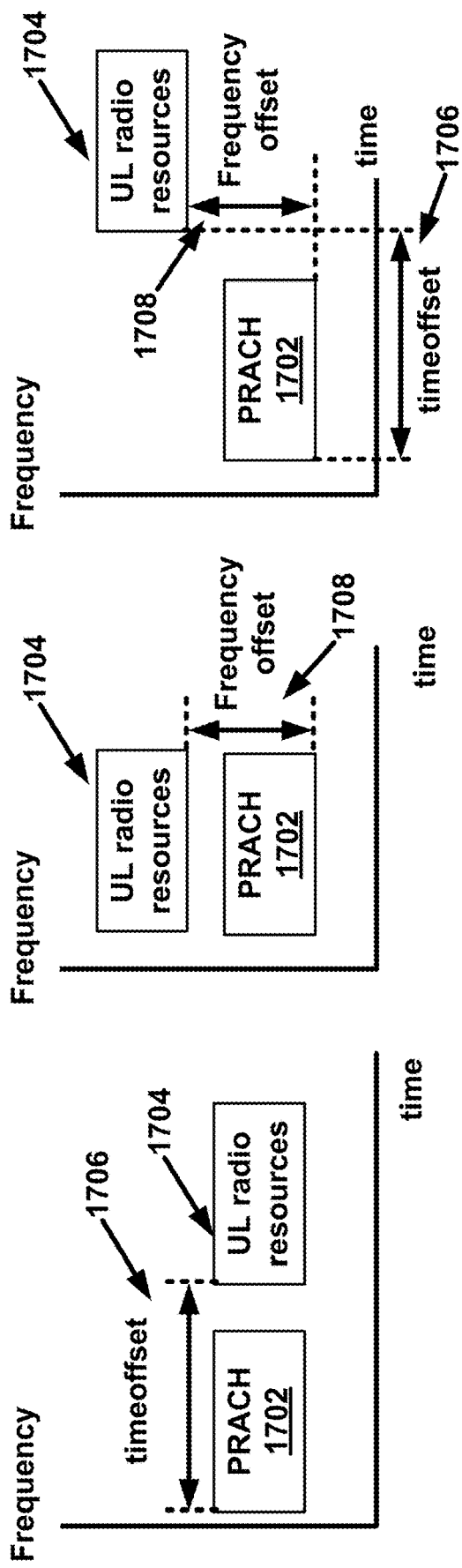
FIG. 17A, FIG. 17B, and FIG. 17C show examples of radio resource allocations of an RA resource and one or more associated radio resources.

FIG. 17A, FIG. 17B, and FIG. 17C show examples of radio resource allocations of a random access resource (e.g., PRACH) 1702 and one or more associated radio resources 1704. UL radio resources may be based on a time offset 1706, a frequency offset 1708, and a combination of a time offset 1706 and a frequency offset 1708, respectively. FIG. 17A, FIG. 17B, and FIG. 17C comprise a PRACH resource 1702 and a UL radio resource 1704 that are associated with a single SSB transmission. The PRACH resource 1702 and/or the UL radio resource 1704 may be associated with a first SSB transmission of one or more SSB transmissions.

A base station may acquire a UL transmission timing, for example, by detecting an RAP sent (e.g., transmitted) PRACH resource 1702 based on the time offset 1706 and/or the frequency offset 1708. A base station may detect and/or decode one or more TBs sent (e.g., transmitted) via one or more associated UL radio resources 1704, for example, based on the UL transmission timing acquired from the RAP detection. A base station may send (e.g., transmit) one or more SSBs. Each of the one or more SSBs may have one or more associated PRACH resources 1702 and/or UL radio resources 1704 provided by (e.g., configured by, indicated by, etc.) a two-step RACH configuration. A wireless device may measure one or more SSBs. The wireless device may select at least one SSB, for example, based on measured received signal strength (and/or based on other selection rule). The wireless device may respectively send (e.g., transmit) an RAP and/or one or more TBs: via PRACH resources 1702 associated with the at least one SSB, and/or via UL radio resources 1704 associated with the PRACH resources 1702 and/or UL radio resources 1704 associated with the at least one SSB.

A base station may use the RAP transmission to adjust UL transmission time for a cell and/or to aid in channel estimation for one or more TBs. A portion of the UL transmission for one or more TBs in a two-step RACH procedure may comprise one or more of: a wireless device ID, a C-RNTI, a service request such as buffer state reporting (e.g., a buffer status report) (BSR), a user data packet, and/or other information. A wireless device in an RRC CONNECTED state may use a C-RNTI as an identifier of the wireless device (e.g., a wireless device ID). A wireless device in an RRC INACTIVE state may use a C-RNTI (if available), a resume ID, and/or a short MAC-ID as an identifier of the wireless device. A wireless device in an RRC IDLE state may use a C-RNTI (if available), a resume ID, a short MACID, an IMSI (International Mobile Subscriber Identifier), a T-IMSI (Temporary-IMSI), and/or a random number as an identifier of the wireless device.

In a two-step RACH procedure, the UL transmission may comprise one or more TBs that may be sent (e.g., transmitted) in one or more ways. First resource(s) allocated for one or more TBs may be multiplexed with second resource(s) allocated for an RAP transmission in time and/or frequency domains. One or more resources may be configured (e.g., by a base station) to be reserved for the UL transmission that may be indicated to a wireless device before the UL transmission. A base station may send (e.g., transmit) in a two-step Msg2 1650 (e.g., an RAR) that may comprise a contention resolution message and/or an acknowledgement (ACK or NACK) message of the one or more TBs, for example, based on one or more TBs sent (e.g., transmitted) by a wireless device in a two-step Msg1 1620 of a two-step RA procedure. A wireless device may send (e.g., transmit) one or more second TBs after the reception of an RAR. The wireless device may send (e.g., transmit) an indicator, such as buffer state reporting, in a two-step Msg1 1620 of a two-step RA procedure. The indicator may indicate to a base station an amount of data the wireless device to send (e.g., transmit) and/or an amount of data remains in a buffer. The base station may determine a UL grant based on the indicator. The wireless device may receive (e.g., from a base station) the UL grant to via an RAR.

A wireless device may receive two separate responses in a two-step/RA procedure: a first response for RAP transmission, and a second response for one or more TB transmission. A wireless device may monitor or continue to monitor a common search space to detect the first response with a random access RNTI generated based on time and frequency indices of a PRACH resource in which the wireless device may send (e.g., transmit) an RAP. A wireless device may monitor or continue to monitor a common search space and/or a wireless device specific search space to detect the second response. The wireless device may employ a C-RNTI (e.g., if configured) and/or a random access RNTI generated based on one or more time indices and/or one or more frequency indices of a PRACH resource in which the wireless device may send (e.g., transmit) an RAP, for example, to detect the second response. The wireless device-specific search space may be predefined and/or configured by an RRC message.

One or more events may trigger a two-step RA procedure. The one or more events may be one or more of: an initial access from RRC_IDLE, a RRC connection re-establishment procedure, a handover, a DL or a UL data arrival during RRC_CONNECTED if UL synchronization status is non-synchronized, a transition from RRC_Inactive, a beam failure recovery procedure, and/or a request for other system information. A PDCCH order, a wireless device (e.g., a MAC entity of a wireless device), and/or a beam failure indication may initiate a RA procedure.

A two-step RA procedure may be initiated based on one or more case-based procedures, services, or radio conditions. One or more wireless devices may be configured (e.g., by a base station in the cell under its coverage) to use a two-step RA procedure, for example, based on a cell identified and/or indicated as small (e.g., there may be no need for a TA). A wireless device may acquire the configuration, via one or more RRC messages (e.g., system information blocks, multicast and/or unicast RRC signaling), and/or via L1 control signaling (e.g., PDCCH order) used to initiate a two-step RA procedure.

A wireless device (e.g., a stationary or near stationary wireless device such as a sensor-type wireless device) may have a stored and/or persisted TA value. A two-step RA procedure may be initiated based on the stored and/or persisted TA value. A base station having macro coverage may use broadcasting and/or dedicated signaling to configure a two-step RA procedure with one or more wireless devices having stored and/or persisted TA values under the coverage.

A wireless device in an RRC connected state may perform a two-step RA procedure. The two-step RA procedure may be initiated if a wireless device performs a handover (e.g., network-initiated handover), and/or if the wireless device requires or requests a UL grant for a transmission of delay-sensitive data and there are no physical-layer uplink control channel resources available to send (e.g., transmit) a scheduling request. A wireless device in an RRC INACTIVE state may perform a two-step RA procedure, for example, for a small data transmission while remaining in the RRC INACTIVE state or for resuming a connection. A wireless device may initiate a two-step RA procedure, for example, for initial access such as establishing a radio link, re-establishment of a radio link, handover, establishment of UL synchronization, and/or a scheduling request if there is no UL grant.

The following description presents one or more examples of a RACH procedure. The procedures and/or parameters described in the following may not be limited to a specific RA procedure. The procedures and/or parameters described in the following may be applied for a four-step RA procedure and/or a two-step RA procedure. A RA procedure may refer to a four-step RA procedure and/or a two-step RA procedure in the following description.

A wireless device may receive (e.g., from a base station) one or more messages indicating RA parameters of a four-step RA procedure (such as shown in FIG. 12) and/or a two-step RA procedure (such as shown in FIG. 16). The one or more messages may be a broadcast RRC message, a wireless device specific RRC message, and/or a combination thereof. The one or more messages may comprise a RA configuration (e.g., at least one of: RACH-ConfigCommon, RACH-ConfigGeneric, and/or RACH-ConfigDedicated). A wireless device may receive, from a base station, a common and/or a generic random access resource configuration (e.g., at least RACH-ConfigCommon and/or RACH-ConfigGeneric), for example, based on a contention based (e.g., four-step and/or a two-step) RA procedure. A wireless device may receive, from a base station, a dedicated random access resource configuration (e.g., at least RACH-ConfigDedicated), for example, based on a contention free (four-step and/or a two-step) RA procedure.

A base station may send (e.g., transmit), to a wireless device, one or more messages indicating RA parameters. The one or more messages may be broadcast via RRC message, via wireless device specific RRC message, and/or via a combination thereof. The one or more messages may comprise at least one of a common, generic, and/or dedicated random access resource configuration (e.g., RACH-ConfigCommon, RACH-ConfigGeneric, and/or RACH-ConfigDedicated). A wireless device may receive, from a base station, a common and/or a generic random access resource configuration (e.g., RACH-ConfigCommon and/or RACH-ConfigGeneric), for example, for a contention based RA procedure. A wireless device may receive, from a base station, at least a dedicated random access resource configuration (e.g., RACH-ConfigDedicated), for example, for a contention free RA procedure.

FIG. 18 shows an example common random access resource configuration (e.g., a RACH-ConfigCommon IE). FIG. 19 shows example field descriptions of a common random access resource configuration (e.g., a RACH-ConfigCommon IE). FIG. 20 shows an example generic random access resource configuration (e.g., a RACH-ConfigGeneric IE), and example field descriptions. FIG. 21 shows an example dedicated random access resource configuration (e.g., a RACH-ConfigDedicated IE). FIG. 22 shows example field descriptions of the dedicated random access resource configuration (e.g., RACH-ConfigDedicated).

A RA procedure may be initiated in different ways, for example, based at least on one of a common random access resource configuration (e.g., RACH-ConfigCommon), a generic random access resource configuration (e.g., RACH-ConfigGeneric), and/or a dedicated random access resource configuration (e.g., RACH-ConfigDedicated). The RA procedure may be initiated by a PDCCH order sent (e.g., transmitted) by a base station, by the wireless device (e.g., a MAC entity of a wireless device) of a wireless device, and/or by RRC. A RA procedure may be ongoing at any point in time in a wireless device (e.g., a MAC entity of a wireless device). A RA procedure on an SCell may be initiated by a PDCCH order with an index (e.g., ra-PreambleIndex) different from 0b000000. The wireless device may continue with the ongoing procedure and/or start with the new procedure (e.g. for an SI request), for example, if the wireless device (e.g., a MAC entity of a wireless device) receives a request for a RA procedure at a time that another RA procedure is already ongoing in the wireless device (e.g., a MAC entity of a wireless device).

A base station may send (e.g., transmit) one or more RRC messages to configure a wireless device that include one or more parameters. A random access index parameter (e.g., prach-ConfigIndex) may indicate an available set of random access resource occasions (e.g., PRACH occasions) for transmission of the RAP. A random access power parameter (e.g., preambleReceivedTargetPower) may indicate an initial RAP power.

A RSRP SSB threshold parameter (e.g., rsrp-ThresholdSSB) may indicate an RSRP threshold for a selection of the SSB and corresponding RAP and/or random access resource occasion (e.g., PRACH occasion). The RSRP SSB threshold parameter may refer to a RSRP SSB threshold parameter in a beam failure recovery configuration (e.g., BeamFailureRecoveryConfig IE), for example, if the RA procedure is initiated for beam failure recovery.

A RSRP CSI-RS threshold parameter (e.g., rsrp-ThresholdCSI-RS) may indicate an RSRP threshold for the selection of CSI-RS and corresponding RAP and/or random access resource occasion (e.g., PRACH occasion). A RSRP CSI-RS threshold parameter may be set to a value calculated by multiplying the RSRP CSI-RS threshold parameter in a beam failure recovery configuration (e.g., BeamFailureRecoveryConfig 1E) by a power control offset parameter (e.g., powerControlOffset), for example, if the RA procedure is initiated for beam failure recovery. A RSRP SSB SUL parameter (e.g., rsrp-ThresholdSSB-SUL) may indicate an RSRP threshold for the selection between the NUL carrier and the SUL carrier.

A power control offset parameter (e.g., powerControlOffset) may indicate a power offset between a RSRP SSB threshold parameter (e.g., rsrp-ThresholdSSB) and a RSRP CSI-RS threshold parameter (e.g., rsrp-ThresholdCSI-RS) to be used, for example, if the RA procedure is initiated for beam failure recovery. A power ramping step parameter (e.g., powerRampingStep) may indicate a power-ramping factor. A power ramping step high priority parameter (e.g., powerRampingStepHighPriority) may indicate a power-ramping factor in case of a differentiated RA procedure. A preamble index parameter (e.g., ra-PreambleIndex) may indicate a RAP index.

FIG. 23 shows example random access occasion mask index values for a random access occasion mask parameter (e.g., ra-ssb-OccasionMaskIndex). The random access occasion mask index values may define random access resource occasion(s) (e.g., PRACH occasion) associated with an SSB in which the wireless device (e.g., a MAC entity of a wireless device) may send (e.g., transmit) a RAP.

An occasion list parameter (e.g., ra-OccasionList) may define a random access resource occasion(s) (e.g., PRACH occasion) associated with a CSI-RS in which the wireless device (e.g., a MAC entity of a wireless device) may send (e.g., transmit) a RAP. A preamble maximum transmission parameter (e.g., preambleTransMax) may define the maximum quantity of RAP transmissions. A SSB mapping parameter (e.g., ssb-perRACH-OccasionAndCB-PreamblesPerSSB) may define a quantity of SSBs mapped to each random access resource occasion (e.g., PRACH occasion). A quantity of RAPs mapped to each SSBA RAP occasion parameter may indicate: a set of RAPs and/or random access resource occasions (e.g., PRACH occasions) for SI request, if any; and/or a set of RAPs and/or random access resource occasions (e.g., PRACH occasions) for beam failure recovery request, if any. A response window parameter (e.g., ra-ResponseWindow) may indicate a time window to monitor RAR(s). A contention resolution timer parameter (e.g., ra-ContentionResolutionTimer) may indicate a configuration for the Contention Resolution Timer.

A RA procedure may be initiated for beam failure detection and recovery. A wireless device may be configured by RRC with a beam failure recovery procedure that may be used for indicating to the serving base station of a SSB or CSI-RS, for example, if beam failure is detected on the serving SSB(s)/CSI-RS(s). Beam failure may be detected by counting beam failure instance indication from the lower layers of the wireless device (e.g., a MAC entity of a wireless device). A base station may configure, via RRC, the parameters in a beam failure recovery configuration (e.g., BeamFailureRecoveryConfig) for a beam failure detection and recovery procedure. A beam failure maximum count parameter (e.g., beamFailureInstanceMaxCount) may indicate a maximum count value for the beam failure detection. A beam failure timer parameter (e.g., beamFailureDetectionTimer) may indicate a configuration for a timer for the beam failure detection. A beam failure recovery timer parameter (e.g., beamFailureRecoveryTimer) may indicate a configuration for a timer for a beam failure recovery procedure. A RSRP SSB threshold (e.g., rsrp-ThresholdSSB) may indicate an RSRP threshold for the beam failure recovery.

A power ramping step parameter (e.g., powerRampingStep) may indicate a power ramping factor for a beam failure recovery. A preamble target power parameter (e.g., preambleReceivedTargetPower) may indicate a target power for the beam failure recovery. A maximum quantity of preambles parameter (e.g., preambleTransMax) may indicate a maximum quantity of preambles for the beam failure recovery. A response window parameter (e.g., ra-ResponseWindow) may indicate a time window to monitor response(s) for the beam failure recovery using contention-free RAP. A random access configuration index parameter (e.g., prach-ConfigIndex) may indicate a preamble format and PRACH subframe assignment index for the beam failure recovery. An occasion mask index parameter (e.g., ra-ssb-OccasionMaskIndex) may indicate a SSB mask index for the beam failure recovery. An occasion list parameter (e.g., ra-OccasionList) may indicate random access resource occasions for the beam failure recovery.

A wireless device may use one or more parameters for a RA procedure. A wireless device may use at least one of PREAMBLE_INDEX; PREAMBLE_TRANSMISSION_COUNTER; PREAMBLE_POWER_RAMPING_COUNTER; PREAMBLE_POWER RAMPING_STEP; PREAMBLE_RECEIVED_TARGET_POWER; PREAMBLE BACKOFF; PCMAX; SCALING_FACTOR_BI; and/or TEMPORARY_C-RNTI.

A wireless device may perform random access resource selection for selecting one or more preambles and one or more random access resource occasions (e.g., PRACH occasions) (or resources comprising time, frequency, and/or code). A wireless device may determine one or more operations have occurred or settings configured. A RA procedure may be initiated for beam failure recovery. The beamFailureRecoveryTimer may be running or not configured. The contention-free random access resources for beam failure recovery request associated with any of the SSBs and/or CSI-RSs may be explicitly provided by RRC signaling. At least one of the SSBs may be available, for example, based on SS-RSRP above a threshold (e.g., rsrp-ThresholdSSB) among the SSBs in a candidate beam list (e.g., candidateBeamRSList), and/or the CSI-RSs with CSI-RSRP above a threshold (e.g., rsrp-ThresholdCSI-RS) among the CSI-RSs in a candidate beam list (e.g., candidateBeamRSList). The wireless device may select an SSB with SS-RSRP above a threshold (e.g., rsrp-ThresholdSSB) among the SSBs in a candidate beam list (e.g., candidateBeamRSList) or a CSI-RS with CSI-RSRP above a threshold (e.g., rsrp-ThresholdCSI-RS) among the CSI-RSs in a candidate beam list (e.g., candidateBeamRSList), for example, based these observations by the wireless device. A wireless device may set a PREAMBLE_INDEX to a preamble index parameter (e.g., ra-PreambleIndex) corresponding to the SSB in a candidate beam list (e.g., candidateBeamRSList) which is quasi-collocated with the selected CSI-RS, for example, if CSI-RS is selected, and there is no ra-PreambleIndex associated with the selected CSI-RS. The wireless device may set the PREAMBLE_INDEX to the preamble index parameter corresponding to the selected SSB or CSI-RS from the set of RAPs for beam failure recovery request.

A RA procedure may be initiated and/or a preamble index parameter (e.g., ra-PreambleIndex) may be explicitly provided via PDCCH and/or RRC signaling. The preamble index parameter may not be 0b000000, and/or a contention-free random access resource associated with SSBs and/or CSI-RSs may not be explicitly provided by RRC signaling. A wireless device may set the PREAMBLE_INDEX to the signaled preamble index parameter.

A RA procedure may be initiated, and/or the contention-free random access resources associated with SSBs may be explicitly provided, via RRC, and at least one SSB with SS-RSRP above a threshold (e.g., rsrp-ThresholdSSB) among the associated SSBs may be available. The wireless device may select an SSB with SS-RSRP above the threshold (e.g., rsrp-ThresholdSSB) among the associated SSBs. The wireless device may set the PREAMBLE_INDEX to a preamble index parameter (e.g., ra-PreambleIndex) corresponding to the selected SSB.

A wireless device may initiate a RA procedure. Contention-free random access resources associated with CSI-RSs may be explicitly provided via RRC signaling, and at least one CSI-RS with CSI-RSRP above a threshold (e.g., rsrp-ThresholdCSI-RS) among the associated CSI-RSs may be available. A wireless device may select a CSI-RS with CSI-RSRP above a threshold (e.g., rsrp-ThresholdCSI-RS) among the associated CSI-RSs. The wireless device may set the PREAMBLE_INDEX to a preamble index parameter (e.g., ra-PreambleIndex) corresponding to the selected CSI-RS.

A wireless device may initiate a RA procedure, for example, based on at least one of the SSBs with SS-RSRP above a threshold (e.g., rsrp-ThresholdSSB) being available. A wireless device may select an SSB with SS-RSRP above a threshold (e.g., rsrp-ThresholdSSB). Alternatively, the wireless device may select any SSB. The wireless device may perform a random access resource selection, for example, if Msg3 is being resent (e.g., retransmitted). A wireless device may select a same group of RAPs as was used for the RAP transmission attempt corresponding to a first transmission of Msg3. A wireless device may select a preamble index parameter (e.g., ra-PreambleIndex) randomly (e.g., with equal probability from the RAPs associated with the selected SSB and the selected RAPs group), for example, if the association between RAPs and SSBs is configured. If the association between RAPs and SSBs is not configured, a wireless device may select a preamble index parameter (e.g., ra-PreambleIndex) randomly (e.g., with equal probability from the RAPs within the selected RAPs group). A wireless device may set the PREAMBLE_INDEX to the selected a preamble index parameter (e.g., ra-PreambleIndex).

A wireless device may determine the next available random access resource occasion (e.g., PRACH occasion) from the random access resource occasions (e.g., PRACH occasions) corresponding to the selected SSB permitted by the restrictions given by the occasion mask index parameter (e.g., ra-ssb-OccasionMaskIndex), for example, if configured, if an SSB is selected, and/or an association between random access resource occasions (e.g., PRACH occasions) and SSBs is configured. The wireless device (e.g., a MAC entity of a wireless device) may select a random access resource occasion (e.g., PRACH occasion) randomly (e.g., with equal probability among the random access resource occasions (e.g., PRACH occasions) occurring simultaneously but on different subcarriers, corresponding to the selected SSB). The wireless device (e.g., a MAC entity of a wireless device) may take into account the possible occurrence of measurement gaps, for example, if determining the next available random access resource occasion (e.g., PRACH occasion) corresponding to the selected SSB.

A wireless device may determine the next available random access resource occasion (e.g., PRACH occasion) from the random access resource occasions (e.g., PRACH occasions) in an occasion list parameter (e.g., ra-OccasionList) corresponding to the selected CSI-RS, for example, if a CSI-RS is selected and an association between random access resource occasions (e.g., PRACH occasions) and CSI-RSs is configured. The wireless device (e.g., a MAC entity of a wireless device) may select a random access resource occasion (e.g., PRACH occasion) randomly (e.g., with equal probability among the random access resource occasions (e.g., PRACH occasions) occurring simultaneously but on different subcarriers, corresponding to the selected CSI-RS). The wireless device (e.g., a MAC entity of a wireless device) may take into account the possible occurrence of measurement gaps during determining the next available random access resource occasion (e.g., PRACH occasion) corresponding to the selected CSI-RS.

A wireless device may determine the next available random access resource occasion (e.g., PRACH occasion) from the random access resource occasions (e.g., PRACH occasions), for example, permitted by the restrictions given by an occasion mask index parameter (e.g., ra-ssb-OccasionMaskIndex), if configured. The occasion mask index parameter may correspond to the SSB in the candidateBeamRSList, which may be quasi-collocated with the selected CSI-RS, if a CSI-RS is selected and/or if there is no contention-free random access resource associated with the selected CSI-RS. The wireless device (e.g., a MAC entity of a wireless device) may take into account the possible occurrence of measurement gaps, for example, during determining the next available random access resource occasion (e.g., PRACH occasion) corresponding to the SSB which may be quasi-collocated with the selected CSI-RS.

A wireless device may determine a next available random access resource occasion (e.g., PRACH occasion). The wireless device (e.g., a MAC entity of a wireless device) may select a random access resource occasion (e.g., PRACH occasion) randomly (e.g., with equal probability among the random access resource occasions (e.g., PRACH occasions) occurring simultaneously but on different subcarriers). The wireless device (e.g., a MAC entity of a wireless device) may take into account a possible occurrence of measurement gaps during determining the next available random access resource occasion (e.g., PRACH occasion).

A wireless device may perform a RAP transmission, for example, based on a selected PREABLE INDEX and random access resource occasion (e.g., PRACH occasion). A wireless device may increment a power ramping counter (e.g., PREAMBLE_POWER_RAMPING_COUNTER) by 1, for example, if a notification of suspending power ramping counter has not been received from lower layers (e.g., lower layer entities of the wireless device); and/or if SSB selected is not changed (e.g., a same SSB as a previous RAP transmission). The wireless device may select a value of DELTA_PREAMBLE that may be predefined and/or semi-statistically configured by a base station. The wireless device may set PREAMBLE_RECEIVED_TARGET_POWER to preambleReceivedTargetPower+DELTA_PREAMBLE+ (PREAMBLE_POWER_RAMPING_COUNTER−1)× PREAMBLE_POWER_RAMPING_STEP. The wireless device (e.g., via an entity of the wireless device) may instruct a physical layer entity of the wireless device to send (e.g., transmit) the RAP via the selected random access resource (e.g., PRACH), corresponding RA-RNTI (if available), PREAMBLE_INDEX, and/or PREAMBLE_RECEIVED_TARGET_POWER. The wireless device may determine an RA-RNTI associated with the random access resource occasion (e.g., PRACH occasion) in which the RAP is sent (e.g., transmitted). The RA-RNTI associated with the PRACH in which the RAP is sent, may be determined as:

$$RA\text{-}RNTI = 1 + s\_id + 14 \times t\_id + 14 \times 80 \times f\_id + 14 \times 80 \times 8 \times ul\_carrier\_id \qquad \text{Equation (1)}$$

s_id may be the index of the first OFDM symbol of the specified PRACH (0≤s_id<14). t_id may be the index of the first slot of the specified PRACH in a system frame (0≤t_id<80). f_id may be the index of the specified PRACH in the frequency domain (0≤f_id<8). ul_carrier_id may be the UL carrier used for Msg1 transmission (0 for NUL carrier, and 1 for SUL carrier, or vice versa).

A wireless device may monitor a downlink control channel (e.g., after or in response to transmitting an RAP) for a downlink control message (e.g., an RAR) corresponding to the RAP.

The wireless device may not account for a possible occurrence of a measurement gap to determine a time instant at which the wireless device may start to monitor a downlink control channel.

The wireless device may start an RAR window (e.g., ra-ResponseWindow), configured in beam management configuration parameters (e.g., BeamFailureRecoveryConfig), at a first downlink control channel (e.g., PDCCH) occasion from an end of the RAP transmission, for example, if the wireless device performs a contention-free RA procedure for a beam failure recovery request. The wireless device may monitor the first downlink control channel of an SpCell for a response to a beam failure recovery request (e.g., identified by a C-RNTI). The wireless device may monitor the downlink control channel, for example, if (e.g., while) the random access window is running.

The wireless device may start an RAR window (e.g., ra-ResponseWindow), configured in an RA configuration parameter (e.g., RACH-ConfigCommon) at a first downlink control channel occasion from an end of an RAP transmission, for example, if the wireless device does not perform a contention-free RA procedure for beam a failure recovery request. The wireless device may monitor the first downlink control channel occasion of the SpCell for RAR(s) identified by an RA-RNTI. The wireless device may monitor the downlink control channel, for example, during an RA response window (e.g., ra-ResponseWindow).

The wireless device may receive a downlink assignment via a downlink control channel (e.g., PDCCH). The wireless device may receive a downlink control signal (e.g., message) comprising one or more RARs. For example, the downlink control signal (e.g., message) is a TB (e.g., a MAC PDU) comprising one or more RARs. The MAC PDU may comprise a MAC subPDU with an RAP indicator (e.g. identifier) corresponding to an RAP that the wireless device transmits to a base station. The wireless device may determine that RAP reception is successful, for example, if the MAC PDU comprises the MAC subPDU with the RAP indicator corresponding to the RAP that the wireless device transmits to the base station. The MAC subPDU may comprise a preamble index (e.g., RAPID), for example, for an RA procedure initiated for a system information request.

An amount of data traffic carried over a network may be expected to change over time. A quantity of users and/or devices may increase. Each user and/or device may access an increasing quantity and/or variety of services (e.g., video delivery, large files, images, etc.).

Network access may not only require high capacity, but also may cause provisioning very high data rates to meet user expectations for interactivity and/or responsiveness. More spectrum may be needed for operators to meet the increasing demand. It may be beneficial that more spectrum be made available for deploying macro cells as well as small cells for communications systems, for example, considering user expectations of high data rates along with seamless mobility.

There may be increasing interest from operators in deploying some complementary access utilizing unlicensed spectrum to meet traffic growth, for example, striving to meet the market demands. Operator-deployed Wi-Fi networks and the 3GPP standardization of interworking solutions with Wi-Fi (e.g., LTE/WLAN interworking) may indicate operator interest. This interest may indicate that unlicensed spectrum, if present, may be an effective complement to licensed spectrum for network operators to help address traffic increase. In at least some systems (e.g., LTE), licensed assisted access (LAA) and/or new radio on unlicensed band(s) (NR-U) may offer an alternative for operators to make use of unlicensed spectrum for managing a network. This use of unlicensed spectrum may offer new possibilities for optimizing a network's efficiency.

LBT may be implemented for transmission in a cell (which may be referred to as an LAA cell and/or a NR-U cell). An LAA cell, NR-U cell, and/or any other cell may be interchangeable and may refer a cell operating in unlicensed band. The cell may be operated as non-standalone or standalone, with or without an anchor cell in licensed band, configured in an unlicensed band. An LBT procedure may comprise a clear channel assessment. In an LBT procedure, a wireless device and/or a base station may apply a clear channel assessment (CCA) check before using the channel. The CCA may utilize at least energy detection to determine the presence or absence of other signals on a channel in order to determine whether a channel is occupied or clear. A regulation of a country may alter configurations of the LBT procedure. European and Japanese regulations may mandate the usage of LBT in the unlicensed bands, for example, in a 5 GHz unlicensed band. Carrier sensing via LBT may be used for equitable sharing of the unlicensed spectrum.

Discontinuous transmission on an unlicensed carrier with limited maximum transmission duration may be enabled. Channel reservation may be enabled by the transmission of signals (e.g., by an NR-U node), after gaining channel access via a successful LBT operation. Channel reservation may enable other nodes that receive a sent (e.g., transmitted) signal with energy above a certain threshold a capability to sense the channel to be occupied. Functions that may need to be supported by one or more signals for operation in unlicensed band with discontinuous downlink transmission may include one or more of: detection of the downlink transmission in unlicensed band (including cell identification) by wireless devices; and/or time and frequency synchronization of wireless devices.

DL transmission and frame structure design for an operation in unlicensed band may use subframe boundary alignment according to carrier aggregation timing relationships across serving cells aggregated by CA. Base station transmissions may not start at the subframe boundary. LAA, NR-U, and/or any other technologies may support sending messages via PDSCH, for example, if not all OFDM symbols are available for transmission in a subframe according to LBT. Delivery of necessary control information for the PDSCH may also be supported.

LBT procedures may be used for coexistence of 3GPP systems (e.g., LTE, NR, and/or any other communications system or technology) with other operators and technologies operating in unlicensed spectrum. LBT procedures on a node attempting to send (e.g., transmit) on a carrier in unlicensed spectrum may require the node to perform a clear channel assessment to determine if the channel is free for use. An LBT procedure may involve, at least, energy detection to determine if the channel is being used. Regulatory requirements in some regions, (e.g., in Europe) may specify an energy detection threshold. If a node receives energy greater than a threshold, the node may determine that the channel is not clear. While nodes may follow such regulatory requirements, a node may optionally use a lower threshold for energy detection than that specified by regulatory requirements. NR-U and/or other technologies may use a mechanism to adaptively change the energy detection threshold. A mechanism may be used to adaptively lower the energy detection threshold from an upper bound. An adaptation mechanism may not preclude static or semi-static setting of the threshold. A Category 4 LBT mechanism or other type of LBT mechanisms may be implemented.

Various LBT mechanisms may be used. An LBT procedure may not be performed by the transmitting entity, for example, for some signals. A Category 1 (CAT1, e.g., no LBT) may be used. A channel in an unlicensed band may be held by a base station for DL transmission. A wireless device may take over the channel for UL transmission. The wireless device may perform the UL transmission without performing LBT. A Category 2 (CAT2, e.g. LBT without random back-off) may be used. The duration of time that the channel may be sensed to be idle before the transmitting entity sends may be deterministic. A Category 3 (CAT3, e.g. LBT with random back-off with a contention window of fixed size) may be used. A transmitting entity may draw a random number N within a contention window. A size of the contention window may be specified by a minimum and maximum value of N. The size of the contention window may be fixed. The random number N may be used in the LBT procedure to determine the duration of time that the channel is sensed to be idle before the transmitting entity sends via the channel.

A Category 4 (CAT4, e.g. LBT with random back-off with a contention window of variable size) may be used. A transmitting entity may draw a random number N within a contention window. The size of contention window may be specified by the minimum and maximum value of N. The transmitting entity may vary the size of the contention window based on drawing the random number N. The random number N may be used in the LBT procedure to determine the duration of time that the channel is sensed to be idle before the transmitting entity sends (e.g., transmits) on the channel.

A wireless device may use uplink LBT. The UL LBT may be different from the DL LBT (e.g. by using different LBT mechanisms or parameters). The UL may be based on scheduled access that affects a wireless device's channel contention opportunities. Other UL LBT configurations include, but are not limited to, multiplexing of multiple wireless devices in a subframe (slot, and/or mini-slot).

A DL transmission burst may be a continuous transmission from a DL transmitting node with no transmission immediately before or after from the same node via the same component carrier (CC). An UL transmission burst from a wireless device perspective may be a continuous transmission from a wireless device with no transmission immediately before or after from the same wireless device via the same CC. An UL transmission burst may be defined from a wireless device perspective. An UL transmission burst may be defined from a base station perspective. A base station may operate DL+UL via a same unlicensed carrier. DL transmission burst(s) and UL transmission burst(s) may be scheduled in a TDM manner via the same unlicensed carrier. An instant in time may be part of a DL transmission burst or an UL transmission burst.

Channel observation time (COT) sharing may be used. COT sharing may be a mechanism (e.g., enabled by ETSI-BRAN) wherein one device acquires a COT using CAT4 LBT and another device shares it using a 25 is LBT with a gap, for example, provided the amount of transmission does not exceed the MCOT limit for the given priority class. COT sharing may allow a concession for UL via an unlicensed band in which a base station sends (e.g., transmits) a grant to a wireless device before it can be sent (e.g., transmitted) via the UL. The delay between the grant and the corresponding UL transmission may be a period of time (e.g., at least 4 ms). A pause (e.g., 4 ms) may not be accounted in the COT duration. A base station may indicate the remaining time to one or more wireless devices via a PDCCH, for example, if the base station acquired a COT and sent a message indicating the COT via the DL without exhausting the full COT. The wireless device may perform UL transmissions with dynamic grant and/or configured grant (e.g., Type 1, Type2, autonomous UL) with 25 is LBT in the configured period Single and multiple DL to UL and UL to DL switching within a shared COT may be supported.

LBT requirements to support single or multiple switching points, may be different for different gaps. No-LBT may be used, for example, for a gap of less than 16 µs. A one-shot LBT may be used, for example, for a gap of between 16 µs and 25 µs. A one-shot LBT may be used, for example, for single switching point, and for the gap from DL transmission to UL transmission exceeding 25 µs. A one-shot LBT may be used, for example, for multiple switching points, and for the gap from DL transmission to UL transmission exceeding 25 µs.

A signal that facilitates detection with low complexity may be useful for wireless device power saving, improved coexistence, spatial reuse (which may be within the same operator network), serving cell transmission burst acquisition, etc. Operation of at least some technologies (e.g., NR-U) may use a signal comprising at least SS/PBCH block burst set transmission. Other channels and signals may be sent together as part of the signal. The design of this signal may determine that there are no gaps within the time span the signal is sent, for example, at least within a beam. Gaps may be needed for beam switching. The occupied channel bandwidth may be satisfied. A block-interlaced based message via a PUSCH may be used. The same interlace structure for messages via a PUCCH and/or a PUSCH may be used. Interlaced based messages via a PRACH may be used.

An initial active DL/UL BWP may be approximately 20 MHz for a first unlicensed band (e.g., 5 GHz band). An initial active DL/UL BWP may be approximately 20 MHz for a second unlicensed band (e.g., 6 GHz band), if similar channelization as the first unlicensed band (e.g., 5 GHz band) is used for the second unlicensed band (e.g., 6 GHz band). Wideband may be configured (e.g., by a base station) with one or more BWPs. Four BWPs may be configured (e.g., by a base station), for example, with about 20 MHz bandwidth configured for each BWP, or 80 MHz allocated for the four BWPs. An active BWP (DL and/or UL) may be switched one to another at least based on BWP switching mechanism. The wideband may be configured (e.g., by a base station) with one or more subbands. Four subbands may be configured (e.g., by a base station), for example, with about 20 MHz configured for each subband, or 80 MHz allocated for the four subbands. A wireless device may perform an LBT procedure subband by subband, and may send (e.g., transmit) data via scheduled resources on one or more subbands where the LBT procedure indicates idle.

HARQ acknowledge and negative acknowledge (A/N) for the corresponding data may be sent in the same shared COT. The HARQ A/N may be sent in a separate COT from the one the corresponding data was sent. Flexible triggering and/or multiplexing of HARQ feedback may be used for one or more DL HARQ processes, for example, if UL HARQ feedback is sent on unlicensed band. The dependencies of HARQ process information to the timing may be removed. UCI messages via PUSCH may carry HARQ process ID, NDI, RVID. Downlink Feedback Information (DFI) may be used for transmission of HARQ feedback for a configured grant.

CBRA and CFRA may be supported on an SpCell. CFRA may be supported on SCells. An RAR may be sent via an SpCell, for example, in a non-standalone configuration. An RAR may be sent via an SpCell and/or via an SCell, for example, in a standalone configuration. A predefined HARQ process ID for an RAR may be used.

Carrier aggregation between a licensed band PCell (e.g., NR (PCell)) and an SCell (e.g., NR-U (SCell)) may be supported. An SCell may have both DL and UL, or DL-only. Dual connectivity between various licensed band PCells (e.g., LTE (PCell)) and PSCells (e.g., NR-U (PSCell)) may be supported. Stand-alone cells (e.g., NR-U) in which all carriers are in one or more unlicensed bands may be supported. A cell (e.g., an NR cell) with a DL in an unlicensed band and an UL in a licensed band, or vice versa, may be supported. Dual connectivity between licensed band cells (e.g., a NR (PCell) and NR-U (PSCell)) may be supported.

An operating bandwidth may be an integer multiple of 20 MHz, for example, if an absence of Wi-Fi cannot be guaranteed (e.g., by regulation) in a band (e.g., sub-7 GHz) via which a communications network or system (e.g., NR-U) is operating. LBT may be performed in units of 20 MHz, for example, for bands where absence of Wi-Fi cannot be guaranteed (e.g., by regulation). Receiver assisted LBT (e.g., RTS/CTS type mechanism) and/or on-demand receiver assisted LBT (e.g., for example receiver assisted LBT enabled only if needed) may be used. Techniques to enhance spatial reuse may be used. Preamble detection may be used.

A network may gain access to the channel to send (e.g., transmit) a message via PDCCH such that a wireless device may need to perform LBT again prior to sending via the channel, for example, with scheduled PUSCH transmissions via an unlicensed carrier. The procedure may tend to increase latency and may become worse if the channel is loaded. A mechanism of autonomous uplink transmission may be used. A wireless device may be pre-allocated with a resource for transmission (e.g., similar to UL SPS) and may perform LBT prior to using the resource. Autonomous uplink may be based on the configured grant functionality (e.g., Type 1 and/or Type 2).

A HARQ process identity may be sent by the wireless device (e.g., as UCI). A wireless device may use the first available transmission opportunity irrespective of the HARQ process. UCI messages via PUSCH may be used to carry HARQ process ID, NDI and RVID.

A UL dynamic grant scheduled UL transmission may increase a delay and/or transmission failure possibility due to at least two LBTs of the wireless device and the base station, for example, for unlicensed bands. A pre-configured grant (e.g., such as configured grant in NR) may be used (e.g., such as for NR-U). The pre-configured grant may decrease a quantity of LBTs performed and control signaling overhead. An uplink grant may be provided by an RRC message (e.g., in a Type 1 configured grant). An uplink grant may be stored as configured uplink grant. An uplink grant (e.g., a Type 1 configured grant) may be initiated based on or in response to receiving the RRC. An uplink grant may be provided by a PDCCH. An uplink grant may be stored and/or cleared as a configured uplink grant, for example, based on L1 signaling indicating configured grant activation and/or deactivation (e.g. using a Type 2 configured grant).

A dependency between HARQ process information to the timing may not exist. UCI messages via a PUSCH may carry HARQ process ID, NDI, RVID, etc. A wireless device may autonomously select one HARQ process ID that is informed to a base station by UCI message(s). A wireless device may perform non-adaptive retransmission with the configured uplink grant. The wireless device may attempt to send (e.g., transmit) in the next available resource with configured grant, for example, if dynamic grant for configured grant retransmission is blocked due to LBT.

Downlink Feedback Information (DFI) may be sent (e.g., using DCI) and may include HARQ feedback for configured grant transmission. The wireless device may perform transmission/retransmission using configured grant according to DFI comprising HARQ feedback. Wideband carrier with more than one channels may be supported, for example, via an unlicensed cell.

There may be one active BWP in a carrier. A BWP with one or more channels may be activated.

LBT may be performed in units of 20 MHz, for example, if absence of Wi-Fi cannot be guaranteed (e.g., by regulation). There may be multiple parallel LBT procedures for a BWP. The actual transmission bandwidth may be subject to subband with LBT success, which may result in dynamic bandwidth transmission within the active wideband BWP.

One or more active BWPs may be supported. The BWP bandwidth may be the same as the bandwidth of subband for LBT (e.g., LBT may be carried out on each BWP), for example, which may improve the BWP utilization efficiency. The network may activate and/or deactivate the BWPs based on data volume to be sent.

One or more non-overlapped BWPs may be activated for a wireless device within a wide component carrier (e.g., which may be similar to carrier aggregation in LTE LAA). The BWP bandwidth may be the same as the bandwidth of subband for LBT (e.g., LBT may be carried out on each BWP), for example, which may improve the BWP utilization efficiency. A wireless device may have a capability to support one or more narrow RF and/or a wide RF which may comprise the one or more activated BWPs, for example, if more than one subband LBT success occurs.

A single wideband BWP may be activated for a wireless device within a component carrier.

The bandwidth of wideband BWP may be in the unit of subband for LBT. The wideband BWP bandwidth may comprise multiple 20 MHz, for example, if the subband for LBT is 20 MHz in 5 GHz band. An actual transmission bandwidth may be subject to subband with LBT success, which may result in dynamic bandwidth transmission within this active wideband BWP.

Active BWP switching may be achieved using scheduling DCI. The network may indicate to a wireless device a new active BWP to use for an upcoming, and/or any subsequent, data transmission/reception. A wireless device may monitor multiple, configured BWPs to determine which has been acquired for DL transmissions by the base station. A wireless device may be configured with a monitoring occasion periodicity and/or offset for each configured BWP. The wireless device may determine if a BWP has been acquired by the base station during the monitoring occasions. The wireless device may continue with a BWP as its active BWP, for example, at least until indicated otherwise or a Maximum Channel Occupancy Time (MCOT) has been reached, and/or after successfully determining that the channel is acquired.

A wireless device may attempt blind detection of PDCCH information in configured CORESETs, for example, if a wireless device has determined that a BWP is active. The wireless device may perform measurements on aperiodic and/or SPS resources.

A wireless device may be configured with multiple UL resources, which may be in different BWPs, for example, for UL transmissions. The wireless device may have multiple LBT configurations, each associated with a BWP and/or a beam pair link. The wireless device may be granted with UL resources associated with (e.g., linked to) one or more LBT configurations.

The wireless device may be provided with (e.g., made available, received, stored, etc.) multiple autonomous uplink (AUL) and/or grant-free resources, each using different LBT configurations. Providing a wireless device with multiple AUL resources over multiple BWPs may ensure that if LBT fails using a first LBT configuration for a first AUL resource in one BWP, a wireless device may attempt transmission in a second AUL resource in another BWP.

This use of multiple AUL resources may reduce the channel access latency and/or improve spectral efficiency of the over-all unlicensed carrier.

Carrier aggregation with at least one SCell operating in an unlicensed spectrum may be performed in LAA. A configured set of serving cells for a wireless device may include at least one SCell operating in an unlicensed spectrum according to a first frame structure (e.g., frame structure Type 3). An SCell operating in LAA may be referred to as an LAA SCell.

A maximum frequency separation between any two carrier center frequencies on which LAA SCell transmissions are performed may be less than or equal to 62 MHz (or any other frequency), for example, if the absence of devices (e.g., IEEE802.11n/11ac devices) sharing the carrier cannot be guaranteed on a long term basis (e.g., by regulation), and/or if the maximum quantity of unlicensed channels via which a network may simultaneously send is equal to or less than 4 (or any other quantity). A wireless device may be required to support frequency separation.

A base station and/or a wireless device may apply LBT before performing a transmission on an LAA SCell. A transmitter (e.g., of a wireless device and/or of a base station) may listen to and/or sense the channel to determine whether the channel is free or busy, for example, if LBT is applied. The transmitter may perform the transmission, if the channel is determined to be free and/or clear. The transmitter may not perform the transmission, if the channel is not determined to be free and/or clear. A base station may continue to meet a LAA maximum energy detection threshold requirement, for example, if the base station uses channel access signals (e.g., of other technologies) for the purpose of channel access.

A combined time of transmissions compliant with the channel access procedure by a base station may not exceed a threshold time period (e.g., 50 ms) in any contiguous time period (e.g., 1 second period) on an LAA SCell. An LBT type (e.g., type 1 or type 2 uplink channel access) that the wireless device applies may be signaled via uplink grant for uplink PUSCH message transmission on LAA SCells. For AUL message transmissions the LBT may not be signaled via the uplink grant.

FIG. 24 shows an example channel access priority class values. A base station may signal the channel access priority class for a logical channel, for example, for type 1 uplink channel access on AUL. A wireless device may select a highest channel access priority class (e.g., with a lower number) of the logical channel(s) with a MAC SDU multiplexed into a MAC PDU. The MAC CEs (e.g., except padding BSR) may use the lowest channel access priority class. The wireless device may select logical channels corresponding to any channel access priority class for UL transmission in the subframes signaled by a base station via common downlink control signaling, for example, for type 2 uplink channel access on AUL.

A base station may not schedule a wireless device with more subframes than a minimum necessary to send (e.g., transmit) traffic corresponding to a selected channel access priority class or lower (e.g., having a lower number) than the channel access priority class signaled in a UL grant. The base station may schedule the wireless device, for example, based on: the latest BSR and/or received uplink traffic from the wireless device (e.g., for uplink LAA operation), if type 1 uplink channel access procedure is signaled to the wireless device; channel access priority class used by the base station based on the downlink traffic; and/or the latest BSR and/or received UL traffic from the wireless device, if type 2 uplink channel access procedure is signaled to the wireless device.

A first quantity (e.g., four) of channel access priority classes may be used during performing uplink and downlink transmissions in LAA carriers. A channel access priority class may be used by traffic belonging to different standardized QCIs. A non-standardized QCI (e.g., operator specific QCI) may use a suitable channel access priority class of the standardized QCIs that best matches the traffic class of the non-standardized QCI. For uplink, the base station may select a channel access priority class by taking into account the lowest priority QCI in a logical channel group.

Four (or any other quantity) channel access priority classes may be used. A base station may ensure several requirements and/or limitations, for example, if a DL transmission burst with PDSCH is sent, for which channel access has been obtained using channel access priority class P (1 . . . 4). The base station may limit the transmission duration of the DL transmission burst so as to not exceed a minimum duration needed to send (e.g., transmit) all available buffered traffic corresponding to channel access priority class(es)≤P. The base station may limit the transmission duration of the DL transmission burst so as to not exceed a maximum channel occupancy time for channel access priority class P. The base station may ensure additional traffic corresponding to channel access priority class(s)>P be included in the DL transmission burst once no more data corresponding to channel access priority class ≤P is available for transmission. The base station may maximize occupancy of the remaining transmission resources in the DL transmission burst with such additional traffic. A DL transmission burst may refer to a continuous transmission by the base station after a successful LBT.

A wireless device may be scheduled for downlink transmission via a PDCCH of a serving cell. A wireless device may be scheduled for uplink transmission via a PDCCH of one other serving cell, for example, if the PDCCH of an LAA SCell is configured and/or if cross-carrier scheduling applies to uplink transmission. The wireless device may be scheduled for uplink transmission and downlink transmission via its PDCCH, for example, if the PDCCH of an LAA SCell is configured and/or if self-scheduling applies to both uplink transmission and downlink transmission.

FIG. 25 shows an example BWP configuration information element (e.g., a BWP IE). A BWP IE may be used to configure a BWP. The network may configure at least an initial BWP comprising at least a downlink BWP and one (e.g., if the serving cell is configured with an uplink) or two (e.g., if using supplementary uplink (SUL)) uplink BWPs, for example, for each serving cell. The network may configure additional uplink and downlink BWPs for a serving cell.

The BWP configuration may be split into uplink and downlink parameters and/or into common and dedicated parameters. Common parameters (e.g., BWP-UplinkCommon and BWP-DownlinkCommon) may be cell specific and/or the network may ensure the necessary alignment with corresponding parameters of other wireless devices. Common parameters of the initial BWP of the PCell may be provided via system information. The network may provide the common parameters via dedicated signaling.

A field, IE, or prefix (e.g., cyclic prefix) may indicate whether to use the extended cyclic prefix for this BWP. The wireless device may use the normal cyclic prefix (CP), for example, if the CP is not set. Normal CP may be supported for all numerologies and slot formats. Extended CP may be supported only for 60 kHz subcarrier spacing (or some other frequency subcarrier spacing). A parameter (e.g., locationAndBanddwidth) may indicate a frequency domain location and/or a bandwidth of this BWP. The value of the field may be interpreted as a RIV.

A first PRB may be a PRB determined by a subcarrier spacing parameter (e.g., subcarrierSpacing) of this BWP and/or an offset parameter (e.g., offsetToCarrier (configured in SCS-SpecificCarrier contained within FrequencyInfoDL)) corresponding to this subcarrier spacing. A BWP-pair (e.g., UL BWP and DL BWP with the same index) may have the same center frequency, for example, based on use of TDD. The subcarrier spacing parameter may indicate subcarrier spacing to be used in this BWP for channels and reference signals unless explicitly configured elsewhere. The value kHz15 may correspond to $\mu=0$, kHz30 to $\mu=1$, and so on. The values 15, 30, or 60 kHz may be used. A BWP index (e.g., bwp-Id) may indicate an identifier for a BWP.

Other parts of the RRC configuration may use the BWP index (e.g., BWP-Id) to associate with a particular BWP. A BWP ID=0 may be associated with an initial BWP and/or may not be used with other BWPs. The network (NW) may trigger the wireless device to switch UL or DL BWP using a DCI field. The four code points in the DCI field may map to the RRC-configured BWP index (e.g., BWP-Id). The DCI code point may be equivalent to the BWP ID (initial=0, first dedicated=1, . . . ), for example, for up to three configured BWPs (in addition to the initial BWP). The BWPs may be identified by DCI code points 0 to 3, for example, if the NW configures 4 dedicated BWPs. It may not be possible to switch to the initial BWP using the DCI field, for example, with this configuration. The BWP index (e.g., bwp-Id) may indicate an identifier for a BWP. Other parts of the RRC configuration may use the BWP index (e.g., BWP-Id) to associate themselves with a particular BWP. A BWP ID=0 may be associated with the initial BWP and may not be used in other BWPs.

The NW may trigger the wireless device to switch an UL BWP and/or a DL BWP using a DCI field. The four code points in that DCI field may map to the RRC-configured BWP index (e.g., BWP-ID). The DCI code point may be equivalent to the BWP index (e.g., BWP ID where initial=0, first dedicated=1, . . . ), for example, for up to three configured BWPs (in addition to the initial BWP). The BWPs may be identified by DCI code points 0 to 3, for example, if the NW configures four dedicated BWPs. It may not be possible to switch to the initial BWP using the DCI field, for example, with this configuration. A common random access configuration (e.g., rach-ConfigCommon) may indicate configuration of cell specific RA parameters that the wireless device may use for contention based random access, contention free random access, and/or contention based beam failure recovery. The NW may configure SSB-based RA (including RACH-ConfigCommon) for UL BWPs, for example, based on the linked DL BWPs allowing the wireless device to acquire the SSB associated to the serving cell.

An uplink control channel configuration (e.g., PUCCH-config) may indicate an uplink control channel configuration (e.g., PUCCH configuration) for one BWP of the regular UL or SUL of a serving cell. The network may configure PUCCH on the BWPs of one of the uplinks (UL or SUL), for example, if the wireless device is configured with SUL.

The network may configure PUCCH-Config for each SpCell. The network may configure one additional SCell of a cell group with an uplink control channel configuration (e.g., PUCCH-Config for a PUCCH SCell), for example, if supported by the wireless device. The IE BWP-Id may be used to refer to BWP. The initial BWP may be referred to by a zero index (e.g., BWP-Id 0). The other BWPs may be referred to by a non-zero index (e.g., BWP-Id 1 to a maximum number/quantity of BWPs (e.g., maxNrofBWPs)).

FIG. 26 shows an example serving cell configuration information element. A serving cell configuration (e.g., ServingCellConfig IE) may be used to configure (e.g., add or modify) the wireless device with a serving cell. The serving cell may be the SpCell or an SCell of an MCG or SCG. The parameters of the serving cell configuration may comprise wireless device specific parameters and/or cell specific parameters (e.g. additionally configured BWPs).

An inactivity timer (e.g., bwp_InactivityTimer) may be configured to have a duration in milliseconds (ms) after which the wireless device may fall back to the default BWP. A value 0.5 ms may be applicable for carriers greater than 6 GHz. If the network releases the timer configuration, the wireless device may stop the timer without switching to the default BWP.

A default downlink BWP index (e.g., defaultDownlinkBWP-Id) may correspond to a default L1 downlink BWP parameter (e.g., 'default-DL-BWP'). The initial BWP may be referred to by a BWP index (e.g., BWP-Id=0). The ID of the downlink BWP may be used after timer expiry.

This ID field may be wireless device specific. The wireless device may use the initial BWP as default BWP, for example, if the field is absent.

A downlink BWP list (e.g., downlinkBWP-ToAddModList) may indicate a list of additional downlink BWPs to be added or modified. A downlink BWP release list (e.g., downlinkBWP-ToReleaseList) may indicate a list of additional downlink BWPs to be released.

The active DL BWP index may contain the ID of the DL BWP to be activated, for example, based on or upon performing the reconfiguration in which it is received, for example, if an active DL BWP index (e.g., firstActiveDownlinkBWP-Id) is configured for an SpCell. The RRC reconfiguration may not impose a BWP switch (which may correspond to L1 parameter 'active-BWP-DL-Pcell'), for example, if the field is absent. The field may contain the ID of the downlink BWP to be used upon MAC-activation of an SCell, for example, if configured for an SCell. The initial BWP may be referred to by a zero index (e.g., BWP-Id=0).

An initial DL BWP parameter (e.g., initialDownlinkBWP) may indicate a dedicated (e.g., UE-specific) configuration for the initial downlink bandwidth-part. An active UL BWP index (e.g., firstActiveUplinkBWP-Id) may contain an ID of the DL BWP to be activated upon performing the reconfiguration in which it is received, for example, if configured for an SpCell. The RRC reconfiguration may not impose a BWP switch (e.g., corresponding to L1 parameter 'active-BWP-UL-Pcell'), for example, if the field is absent. The field may contain the ID of the uplink BWP to be used upon MAC-activation of an SCell, for example, if configured for an SCell. The initial BWP may be used in a BWP parameter (e.g., BandwidthPartId=0). An initial uplink BWP parameter (e.g., initialUplinkBWP) may indicate a dedicated (UE-specific) configuration for the initial uplink bandwidth-part.

FIG. 27A, FIG. 27B, and FIG. 27C show respectively examples of RAR, MAC subheader with backoff indicator (BI), and a MAC subheader with a RAPID. A wireless device may receive from a base station at least one RAR as a response of Msg1 1220 (as shown in FIG. 12) or two-step Msg1 1620 (shown in FIG. 16) using an RA procedure. An RAR may be in a form of MAC PDU comprising one or more MAC subPDUs and/or (optionally) padding. FIG. 27A is an example of an RAR. A MAC subheader may be octet-aligned. Each MAC subPDU may comprise one or more of the following: a MAC subheader with BI only; a MAC subheader with RAPID only (e.g., acknowledgment for SI request); a MAC subheader with RAPID and MAC RAR. FIG. 27B shows an example of a MAC subheader with BI. A MAC subheader with BI may comprise one or more header fields (e.g., E/T/R/R/BI) as shown in FIG. 27B and described below. A MAC subPDU with BI may be placed at the beginning of the MAC PDU, if included. MAC subPDU(s) with RAPID only, and/or MAC subPDU(s) with RAPID and MAC RAR, may be placed anywhere after a MAC subPDU with BI and, before padding as shown in FIG. 27A. A MAC subheader with RAPID may comprise one or more header fields (e.g., E/T/RAPID) as shown in FIG. 27C. Padding may be placed at the end of the MAC PDU, if present. Presence and length of padding may be implicit, for example, based on TB size, and/or a size of MAC subPDU (s).

A field (e.g., an E field) in a MAC subheader may indicate an extension field that may be a flag indicating if the MAC subPDU (including the MAC subheader) is the last MAC subPDU or not in the MAC PDU. The E field may be set to "1" to indicate at least one more MAC subPDU follows. The E field may be set to "0" to indicate that the MAC subPDU including this MAC subheader is a last MAC subPDU in the MAC PDU. A field (e.g., a T field) may be a flag indicating whether the MAC subheader contains a RAPID or a BI (e.g., one or more backoff values may predefined and BI may indicate one of backoff value). The T field may be set to "0" to indicate the presence of a field (e.g., a BI field) in the subheader. The T field may be set to "1" to indicate the presence of a RAPID field in the subheader. A field (e.g., an R field) may indicate a reserved bit that may be set to "0." A field (e.g., a BI field) may indicate an overload condition in the cell. A size of the BI field may be 4 bits. A field (e.g., a RAPID field) may be a RAPID field that may identify and/or indicate the transmitted RAP. A MAC RAR may not be included in the MAC subPDU, for example, based on the RAPID in the MAC subheader of a MAC subPDU corresponding to one of the RAPs configured for an SI request.

There may be one or more MAC RAR formats. At least one MAC RAR format may be employed in a four-step or a two-step RA procedure.

Figure 28:
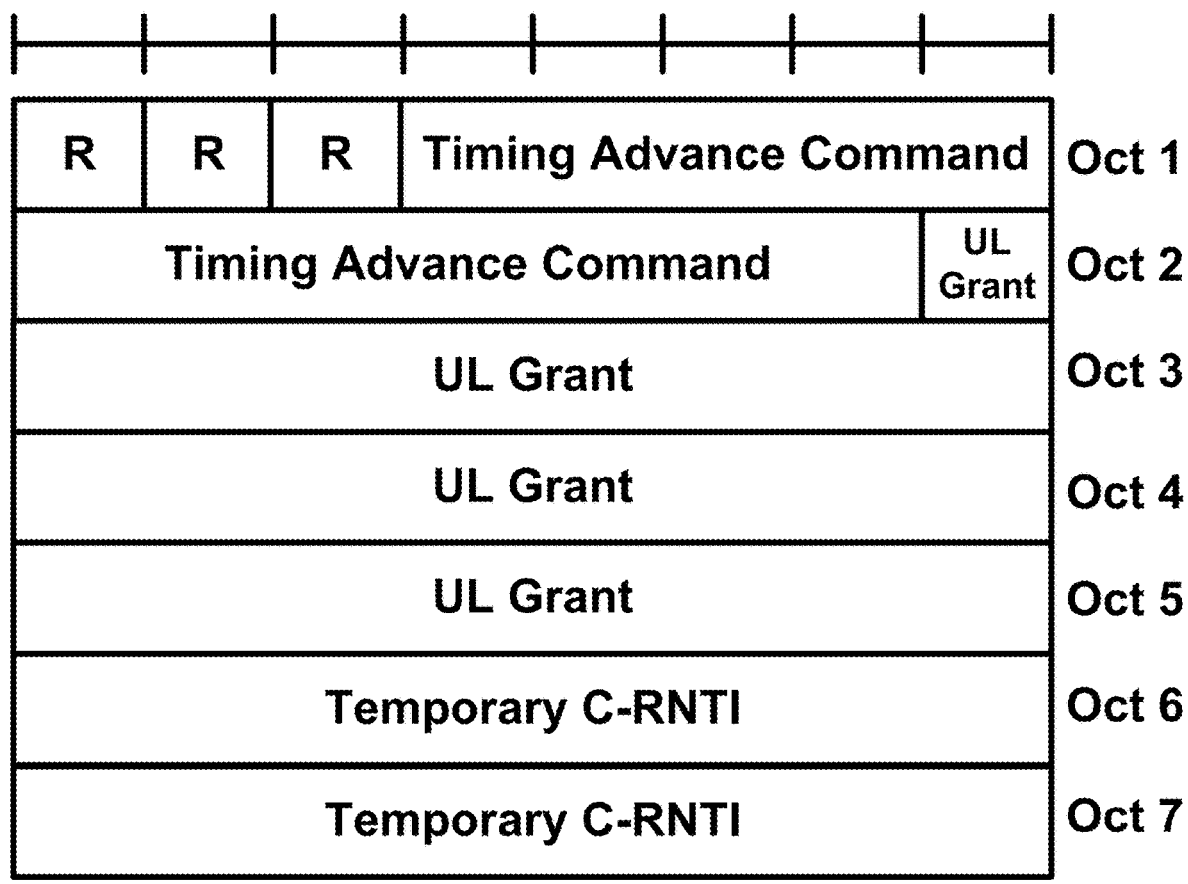
FIG. 28 shows an example MAC RAR format.

FIG. 28 shows an example MAC RAR format. The MAC RAR may be fixed size as shown in FIG. 28. The MAC RAR may comprise one or more of the following fields: an R field that may indicate a reserved bit, which may be set to "0"; a timing advance (TA) command field that may indicate the index value for TA employed to control the amount of timing adjustment; a UL grant field that indicates the resources to be employed on an uplink; and an RNTI field (e.g., temporary C-RNTI and/or C-RNTI) that may indicate an identity that is employed during RA. An RAR may comprise one or more of following for a two-step RA procedure: a UE contention resolution identity, an RV ID for retransmission of one or more TBs, decoding success or failure indicator of one or more TB transmissions, and one or more fields from the MAC RAR formats.

A base station may multiplex, in a MAC PDU, RARs for two-step and/or four-step RA procedures. A wireless device may not use an RAR length indicator field. The wireless device may determine the boundary of each RAR in the MAC PDU based on pre-determined RAR size information, for example, based on RARs for two-step and four-step RA procedures having the same size.

Figure 29:
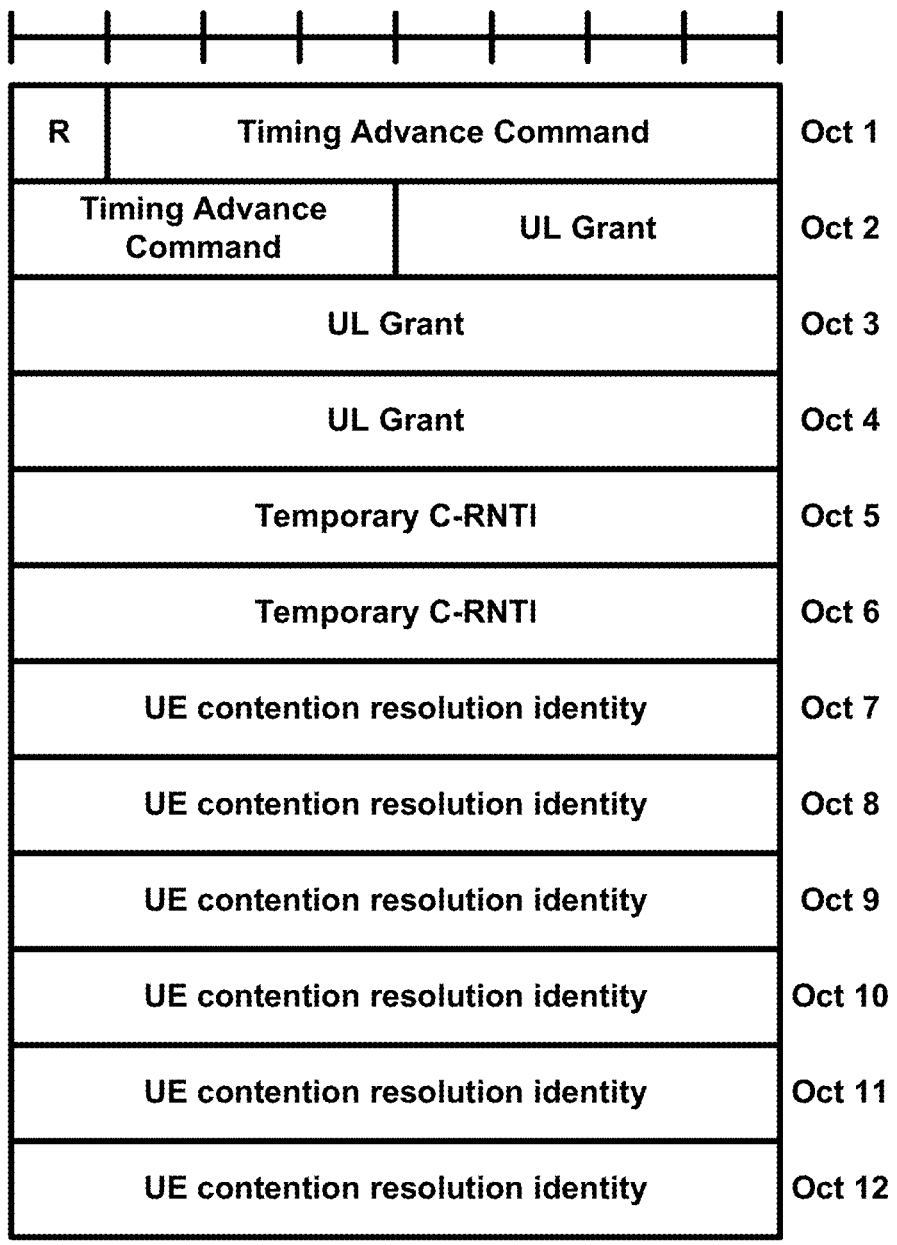
FIG. 29 shows an example RAR format.

FIG. 29 shows an example RAR format. The RAR format may be employed in a MAC PDU, for example, that may multiplex RARs for two-step and four-step RA procedures. The RAR shown in FIG. 29 may use a fixed size, for example, using the same format for two-step and four-step RA procedures.

FIG. 30A, and FIG. 30B show example RAR formats. The RAR formats may be employed for a two-step RA procedure. An RAR for a two-step RA procedure may have a different format, size, and/or fields, from an RAR for a four-step RA procedure. An RAR may have a field to indicate a type of RAR (e.g., a reserved "R" field as shown in FIG. 28, for example, based on RARs for two-step and four-step RA procedures being multiplexed into a MAC PDU, and/or the RARs having different formats between two-step and four-step RA procedure). FIG. 30A, and FIG. 30B may be employed to indicate a type of RAR. A field for indicating an RAR type may be in a subheader (such as a MAC subheader) and/or in an RAR. An RAR may comprise different types of fields that may correspond with an indicator in a subheader and/or in an RAR.

A wireless device may determine the boundary of one or more RARs in a MAC PDU, for example, based on one or more indicators.

A serving cell may be configured with one or multiple BWPs. a maximum number of BWP per serving cell may be a first number. BWP switching for a serving cell may be used to activate an inactive BWP and deactivate an active BWP at a determined time. BWP switching may be controlled by a PDCCH message (e.g., signal) indicating a downlink assignment or an uplink grant (e.g., by the bwp-Inactivity-Timer, by RRC signalling, or by the wireless device (e.g., MAC entity of the wireless device) itself upon initiation of RA procedure). The DL BWP and UL BWP indicated by a first active downlink BWP identifier (e.g., firstActiveDownlinkBWP-Id) and a first active uplink BWP identifier (e.g., firstActiveUplinkBWP-Id) respectively may be active without receiving a message (e.g., signal) via PDCCH indicating a downlink assignment or an uplink grant, for example, based on or in response to addition of an SpCell or activation of an SCell. The active BWP for a serving cell may be indicated by either an RRC message or PDCCH message (e.g., signal). A DL BWP may be paired with a UL BWP, and BWP switching may be common for both UL and DL, for example, based on an unpaired spectrum.

An activated serving cell may be configured with a BWP. A BWP may be activated and the wireless device (e.g., MAC entity of the wireless device) may: send (e.g., transmit) via a UL-SCH on the BWP; send (e.g., transmit) via a RACH on the BWP; monitor or continue to monitor the PDCCH on the BWP; send (e.g., transmit) a PUCCH signal on the BWP; send (e.g., transmit) an SRS signal on the BWP; receive a DL-SCH message on the BWP; and/or (re-)initialize any suspended configured uplink grants of configured grant Type 1 on the active BWP. The BWP activation may be based on a stored configuration, if any.

An activated serving cell may be configured with a BWP. The BWP may be deactivated and the wireless device (e.g., MAC entity of the wireless device) may: not send (e.g., transmit) via a UL-SCH on the BWP; not send (e.g., transmit) via a RACH on the BWP; may not monitor or continue to not monitor the PDCCH on the BWP; not send (e.g., transmit) via a PUCCH on the BWP; not report CSI for the BWP; not send (e.g., transmit) an SRS signal on the BWP; not receive a DL-SCH message on the BWP; clear any configured downlink assignment and configured uplink grant of configured grant Type 2 on the BWP; and suspend any configured uplink grant of configured grant Type 1 on the inactive BWP.

The wireless device (e.g., MAC entity of the wireless device) may switch the active UL BWP to BWP indicated by an initial uplink BWP parameter (e.g., initialUplinkBWP), for example, based on or in response to initiation of the RA procedure on a serving cell and/or, PRACH occasions not being configured for the active UL BWP. The wireless device (e.g., MAC entity of the wireless device) may switch the active DL BWP to BWP indicated by an initial downlink BWP parameter (e.g., initialDownlinkBWP), for example, based on the serving cell being a SpCell. The wireless device (e.g., MAC entity of the wireless device) may perform the RA procedure on the active DL BWP of SpCell and active UL BWP of this serving cell.

The wireless device (e.g., MAC entity of the wireless device) may switch the active DL BWP to the DL BWP with the same BWP index (e.g., bwp-Id) as the active UL BWP, for example, based on or in response to initiation of the RA procedure on a serving cell, the PRACH occasions being configured for the active UL BWP, the serving cell is a SpCell, and/or if the active DL BWP does not have the same BWP index (e.g., bwp-Id) as the active UL BWP. The wireless device (e.g., MAC entity of the wireless device) may perform the RA procedure on the active DL BWP of SpCell and active UL BWP of this serving cell.

The wireless device (e.g., MAC entity of the wireless device) may perform BWP switching to a BWP indicated by a PDCCH message, for example, based on the wireless device (e.g., MAC entity of the wireless device) receiving a PDCCH message for BWP switching of a serving cell; there being no ongoing RA procedure associated with this serving cell; and/or the ongoing RA procedure associated with this serving cell being successfully completed upon reception of the PDCCH message addressed to C-RNTI. A wireless device may determine whether to switch BWP or ignore the PDCCH message for BWP switching, for example, based on the wireless device (e.g., MAC entity of the wireless device) receiving a PDCCH message for BWP switching for a serving cell while a RA procedure associated with that serving cell is ongoing in the wireless device (e.g., MAC entity of the wireless device). The wireless device may perform BWP switching to a BWP indicated by the PDCCH message, for example, based on the PDCCH reception for BWP switching addressed to the C-RNTI for successful RA procedure completion. The wireless device (e.g., MAC entity of the wireless device) may stop the ongoing RA procedure and may initiate a RA procedure on the new activated BWP, for example, based on or in response to reception of the PDCCH message for BWP switching other than successful contention resolution, and/or the wireless device (e.g., MAC entity of the wireless device) deciding to perform BWP switching. The wireless device (e.g., MAC entity of the wireless device) may continue with the ongoing RA procedure on the active BWP, for example, based on the wireless device deciding to ignore the PDCCH message for BWP switching.

The wireless device (e.g., MAC entity of the wireless device), for each activated serving cell, may start or restart a BWP inactivity timer (e.g., bwp-InactivityTimer) associated with the active DL BWP. The start or restart may be based on the BWP inactivity timer (e.g., bwp-InactivityTimer) being configured, the default downlink BWP parameter (e.g., defaultDownlinkBWP) being configured, and/or the active DL BWP is not the BWP indicated by the default downlink BWP parameter (e.g., defaultDownlinkBWP). The start or restart may be based on the default downlink BWP parameter (e.g., defaultDownlinkBWP) not being configured, and/or the active DL BWP not being the initial downlink BWP parameter (e.g., initialDownlinkBWP). The start or restart may be based on a PDCCH message addressed to C-RNTI or CS-RNTI indicating downlink assignment or uplink grant is received on the active BWP. The start or restart may be based on a PDCCH message addressed to C-RNTI or CS-RNTI indicating downlink assignment or uplink grant being received for the active BWP. The start or restart may be based on a MAC PDU being sent (e.g., transmitted) in a configured uplink grant, and/or received in a configured downlink assignment: if there is no ongoing RA procedure associated with this serving cell; and/or if the ongoing RA procedure associated with this serving cell is successfully completed upon reception of this PDCCH message addressed to C-RNTI.

The wireless device (e.g., MAC entity of the wireless device), for each activated serving cell, may start or restart the BWP inactivity timer (e.g., bwp-InactivityTimer) associated with the active DL BWP, for example, based on the BWP inactivity timer (e.g., bwp-InactivityTimer) being configured, the default downlink BWP parameter (e.g., defaultDownlinkBWP) being configured, and/or the active DL BWP is not the BWP indicated by the default downlink BWP parameter (e.g., defaultDownlinkBWP). The start or restart may be based on the default downlink BWP parameter (e.g., defaultDownlinkBWP) not being configured, the active DL BWP not being the initial downlink BWP parameter (e.g., initialDownlinkBWP), a PDCCH message for BWP switching being received on the active DL BWP, and/or the wireless device (e.g., MAC entity of the wireless device) switching the active BWP.

The wireless device (e.g., MAC entity of the wireless device), for each activated serving cell, may stop the BWP inactivity timer (e.g., bwp-InactivityTimer) associated with the active DL BWP of this serving cell, if running, for example, based on the BWP inactivity timer (e.g., bwp-InactivityTimer) being configured, the default downlink BWP parameter (e.g., defaultDownlinkBWP) being configured, and the active DL BWP not being the BWP indicated by the default downlink BWP parameter (e.g., defaultDownlinkBWP), the default downlink BWP parameter (e.g., defaultDownlinkBWP) not being configured, the active DL BWP not being the initial downlink BWP parameter (e.g., initialDownlinkBWP), and/or RA procedure being initiated on this serving cell. The wireless device (e.g., MAC entity of the wireless device) may stop the BWP inactivity timer (e.g., bwp-InactivityTimer) associated with the active DL BWP of SpCell, if running, for example, based on if the serving cell is SCell The wireless device (e.g., MAC entity of the wireless device) may perform BWP switching to a BWP indicated by the default downlink BWP parameter (e.g., defaultDownlinkBWP), for example, based on the BWP inactivity timer (bwp-InactivityTimer) being configured, the default downlink BWP parameter (e.g., defaultDownlinkBWP) being configured, and/or the active DL BWP is not the BWP indicated by the default downlink BWP parameter (e.g., defaultDownlinkBWP). The wireless device (e.g., MAC entity of the wireless device) may perform BWP switching to a BWP indicated by the default downlink BWP parameter (e.g., defaultDownlinkBWP), for example, based on the default downlink BWP parameter (e.g., defaultDownlinkBWP) not being configured, the active DL BWP not being the initial downlink BWP parameter (e.g., initialDownlinkBWP), the BWP inactivity timer (e.g., bwp-InactivityTimer) associated with the active DL BWP expiring, and/or the default downlink BWP parameter (e.g., defaultDownlinkBWP) being configured. Otherwise the wireless device (e.g., MAC entity) may perform BWP switching to the initial downlink BWP parameter (e.g., initialDownlinkBWP).

A wireless device, configured for operation in BWPs of a serving cell, may be configured by higher layers for the serving cell a set of at most a first threshold value (e.g., 4, 8, 16, 32 or any other quantity) of BWPs for reception by the wireless device in a DL bandwidth (e.g., a DL BWP set) by a BWP downlink parameter (e.g., BWP-Downlink) and a set of at most a second threshold value (e.g., 4, 8, 16, 32 or any other quantity) BWPs for transmissions by the wireless device in an UL bandwidth (e.g., a UL BWP set) by a BWP uplink parameter (e.g., BWP-Uplink) for the serving cell.

An initial active DL BWP may be defined by a location and number of contiguous PRBs, a subcarrier spacing, and a cyclic prefix, for the control resource set for a downlink common search space (e.g., Type0-PDCCH common search space). A wireless device may be provided (e.g., configured with, indicated by, etc.) an initial active UL BWP by a higher layer initial uplink BWP parameter (e.g., initialuplinkBWP) for example, for operation on the primary cell or on a secondary cell The wireless device may be provided (e.g., configured with, indicated by, etc.) an initial UL BWP on the supplementary carrier by a higher layer initial uplink BWP parameter (e.g., initialUplinkBWP) in a supplementary uplink, for example, based on the wireless device being configured with a supplementary carrier.

The wireless device may be provided by (e.g., configured by, indicated by, etc.) a higher layer first active downlink BWP index parameter (e.g., firstActiveDownlinkBWP-Id) a first active DL BWP for reception and, by a higher layer first active uplink BWP index parameter (e.g., firstActiveUplinkBWP-Id), a first active UL BWP for transmissions on the primary cell, for example, based on a wireless device having a dedicated BWP configuration.

The wireless device may be configured with the following parameters for the serving cell for each DL BWP or UL BWP in a set of DL BWPs or UL BWPs, respectively: a subcarrier spacing provided by (e.g., configured by, stored in, indicated by, etc.) a parameter (e.g., a higher layer parameter such as, for example, subcarrierSpacing); a cyclic prefix provided by (e.g., configured by, stored in, indicated by, etc.) a parameter (e.g., a higher layer parameter such as, for example, cyclicPrefix); a first PRB and a number of contiguous PRBs indicated by a parameter (e.g., a higher layer parameter such as, for example, locationAndBandwidth) that may be interpreted as RIV, setting BWP=275, and the first PRB being a PRB offset relative to the PRB indicated by parameters (e.g., a higher layer parameter such as, for example, offsetToCarrier and subcarrierSpacing); an index in the set of DL BWPs or UL BWPs via a parameter (e.g., a higher layer parameter such as, for example, bwp-Id); and/or a set of BWP-common and a set of BWP-dedicated parameters via parameters (e.g., a higher layer parameter such as, for example, bwp-Common and bwp-Dedicated).

A DL BWP from the set of configured DL BWPs with index provided by (e.g., configured by, indicated by, etc.) higher layer BWP index parameter (e.g., bwp-Id) for the DL BWP is linked with an UL BWP from the set of configured UL BWPs with index provided (e.g., configured by, indicated by, etc.) by higher layer BWP index parameter (e.g., bwp-Id) for the UL BWP if the DL BWP index and the UL BWP index are equal, for example, based on unpaired spectrum operation A wireless device may not expect to receive a configuration where the center frequency for a DL BWP is different than the center frequency for an UL BWP if the BWP index parameter (bwp-Id) of the DL BWP is equal to the bwp-Id of the UL BWP, for example, based on unpaired spectrum operation.

A wireless device may be configured control resource sets for every type of common search space and for wireless device-specific search space, for example, for each DL BWP in a set of DL BWPs on the primary cell. The wireless device may not expect to be configured without a common search space on the PCell, or on the PSCell, in the active DL BWP. The wireless device may be configured resource sets for PUCCH transmissions, for example, for each UL BWP in a set of UL BWPs.

A wireless device may receive PDCCH messages and PDSCH messages via a DL BWP according to a configured subcarrier spacing and CP length for the DL BWP. A wireless device may send (e.g., transmit) PUCCH messages and PUSCH messages via an UL BWP according to a configured subcarrier spacing and CP length for the UL BWP.

A field (e.g., a BWP indicator field) value may indicate the active DL BWP, from the configured DL BWP set, for DL receptions, for example, based on a BWP indicator field being configured in DCI format 1_1. The BWP indicator field value may indicate the active UL BWP, from the configured UL BWP set, for UL transmissions, for example, based on a BWP indicator field being configured in DCI format 0_1.

The wireless device may prepend zeros to the information field until its size is the one required for the interpretation of the information field for the UL BWP or DL BWP prior to interpreting a DCI format 0_1 or DCI format 1_1 information fields, respectively, for example, based on a BWP indicator field being configured in DCI format 0_1 or DCI format 1_1 and/or indicating an UL BWP or a DL BWP different from the active UL BWP or DL BWP, respectively, for each information field in the received DCI format 0_1 or DCI format 1_1; and/or the size of the information field being smaller than the one required for the DCI format 0_1 or DCI format 1_1 interpretation for the UL BWP or DL BWP that is indicated by the BWP indicator, respectively. The wireless device may use a number of least significant bits of DCI format 0_1 or DCI format 1_1 equal to the one required for the UL BWP or DL BWP indicated by BWP indicator prior to interpreting the DCI format 0_1 or DCI format 1_1 information fields, respectively, for example, based on the size of the information field being larger than the one required for the DCI format 0_1 or DCI format 1_1 interpretation for the UL BWP or DL BWP that is indicated by the BWP indicator, respectively. The wireless device may set the active UL BWP or DL BWP to the UL BWP or DL BWP indicated by the BWP indicator in the DCI format 0_1 or DCI format 1_1, respectively.

A wireless device may expect to detect a DCI format 0_1 indicating active UL BWP change, or a DCI format 1_1 indicating active DL BWP change, for example, based on a corresponding PDCCH message being received within a first threshold (e.g., 3, 4, 5, or any other quantity) of symbols of a slot.

A wireless device may be provided by (e.g., configured by, indicated by, etc.) a higher layer default downlink BWP index parameter (e.g., defaultDownlinkBWP-Id) a default DL BWP among the configured DL BWPs, for example, for the primary cell The default DL BWP may be the initial active DL BWP, for example, based on a wireless device not being provided (e.g., configured by, indicated by, etc.) a default DL BWP by higher layer default downlink BWP index parameter (e.g., defaultDownlinkBWP-Id.)

A wireless device may be configured for a secondary cell with higher layer default downlink BWP index parameter (e.g., defaultDownlinkBWP-Id) indicating a default DL BWP among the configured DL BWPs. The wireless device may be configured with higher layer BWP inactivity timer parameter (e.g., bwp-InactivityTimer) indicating a timer value. The wireless device procedures on the secondary cell may be the same as on the primary cell, using a timer value for the secondary cell and the default DL BWP for the secondary cell.

The wireless device may increment a timer every interval of a first duration (e.g., 1 millisecond or any other duration) for frequency range 1, or every second duration (e.g., 0.5 milliseconds or any other duration) for frequency range 2, for example, based on the wireless device being configured by higher layer BWP inactivity timer parameter (e.g., bwp-InactivityTimer), a timer value for the primary cell and the timer is running, the wireless device not detecting a DCI format for PDSCH reception on the primary cell for paired spectrum operation, if the wireless device not detecting a DCI format for PDSCH reception, and/or a DCI format for PUSCH transmission on the primary cell for unpaired spectrum operation during the interval. A wireless device may increment a timer every interval of a first duration (e.g., 1 millisecond or any other duration) for frequency range 1 or every second duration (e.g., 0.5 milliseconds or any other duration) for frequency range 2, for example, based on a wireless device being configured by higher layer BWP inactivity timer parameter (e.g., BWP-InactivityTimer), a timer value for a secondary cell, the timer being running, the wireless device not detecting a DCI format for PDSCH reception on the secondary cell for paired spectrum operation, the wireless device not detecting a DCI format for PDSCH reception, and/or a DCI format for PUSCH transmission on the secondary cell for unpaired spectrum operation during the interval. The wireless device may deactivate the secondary cell if the timer expires.

The wireless device may use the indicated DL BWP and the indicated UL BWP on the secondary cell as the respective first active DL BWP and first active UL BWP on the secondary cell or supplementary carrier, for example, based on a wireless device being configured by a higher layer first active downlink BWP index parameter (e.g., firstActive-DownlinkBWP-Id), a first active DL BWP, and by higher layer first active uplink BWP index parameter (e.g., firstActiveUplinkBWP-Id), and/or a first active UL BWP on a secondary cell or supplementary carrier. A wireless device does not expect to send (e.g., transmit) HARQ-ACK information on a PUCCH resource indicated by a DCI format 1_0 or a DCI format 1_1, for example, based on paired spectrum operation, the wireless device changes its active UL BWP on the PCell between a time of a detection of the DCI format 1_0 or the DCI format 1_1, and/or a time of a corresponding HARQ-ACK information transmission on the PUCCH. A wireless device may not expect to monitor or continue to monitor PDCCH if the wireless device performs RRM via a bandwidth that is not within the active DL BWP for the wireless device.

A type of LBT procedure (e.g., CAT1, CAT2, CAT3, and/or CAT4) may be configured via control messages (e.g., RRC, MAC CE, and/or DCI) per a cell, for example, in an unlicensed band. A type of LBT procedure (e.g., CAT1, CAT2, CAT3, and/or CAT4) may be configured via control messages (e.g., RRC, MAC CE, and/or DCI) per BWP. A type of LBT procedure (e.g., CAT1, CAT2, CAT3, and/or CAT4) may be determined at least based on a numerology configured in a BWP. BWP switching may change a type of LBT procedure.

A wireless device may be configured (e.g., by a base station) with one or more UL carriers associated with one DL carrier of a cell. One of one or more UL carriers configured with a DL carrier may be referred to as a supplementary uplink (SUL) carrier or a normal UL (NUL or may be referred to as a non-SUL) carrier. A base station may enhance UL coverage and/or capacity by configuring an SUL carrier. A base station may configure a BWP configuration per an uplink (e.g., per uplink carrier) associated with a cell. One or more BWPs on an SUL may be configured (e.g., by a base station) separately from one or more BWPs on a NUL. A base station may control an active BWP of an SUL independently of an active BWP of a NUL. A base station may control two or more uplink transmissions on two or more ULs (e.g., NUL and SUL) to avoid overlapping PUSCH transmissions in time.

A base station may avoid configuring parallel uplink transmissions via a SUL and an NUL of a cell, wherein the parallel uplink transmissions may be PUCCH transmissions (and/or PUSCH transmissions) via SUL and PUCCH transmissions (and/or PUSCH) via NUL. A base station may send (e.g., transmit) one or more RRC message (e.g., wireless device specific RRC signaling) to configure and/or reconfigure a location of a PUCCH transmissions on an SUL carrier and/or on a NUL carrier. A wireless device may receive (e.g., from a base station) one or more RRC messages comprising configuration parameters for a carrier. The configuration parameters may indicate at least one of: an RA procedure configuration, BWP configurations (e.g., number of DL/UL BWPs, a bandwidth and/or index of configured DL/UL BWP, and/or initial, default, and/or active DL/UL BWP), a PUSCH configuration, a PUCCH configuration, an SRS configuration, and/or a power control parameter.

An SUL carrier and a NUL carrier may be configured (e.g., by a base station) to support a RA procedure (e.g., initial access). Support for a RA to a cell configured with SUL is shown in FIG. 12, described above. A RACH configuration 1210 of an SUL may be configured (e.g., by a base station) independent of a RACH configuration 1210 of an NUL. One or more parameters associated with Msg1 1220, Msg 2 1230, Msg 3 1240, and/or contention resolution 1250 via an SUL may be configured independent of one or more parameters associated with Msg1 1220, Msg 2 1230, Msg 3 1240, and/or contention resolution 1250 via an NUL. One or more parameters associated with PRACH transmissions in Msg 1 1220 via an SUL may be independent of one or more parameters associated with PRACH transmission via an NUL.

A wireless device may determine which carrier (e.g., between NUL and SUL) to use, for example, based on an RA procedure in licensed bands and/or a measurement (e.g., RSRP) of one or more DL pathloss references A wireless device may select a first carrier (e.g., SUL or NUL carrier) if a measured quality (e.g., RSRP) of DL pathloss references is less than a broadcast threshold (e.g., an RRC parameter, rsrp-ThresholdSSB-SUL in FIG. 18). One or more uplink transmissions associated with the RA procedure may remain on the selected carrier, for example, based on a wireless device selecting a carrier between SUL carrier and NUL carrier for an RA procedure.

An NUL and an SUL may be configured (e.g., by a base station) with a TAG. A wireless device may employ a TA value received during a RA procedure via a second carrier (e.g., NUL) of the cell, for example, based on an uplink transmission of a first carrier (e.g., SUL) of a cell.

Figure 31:
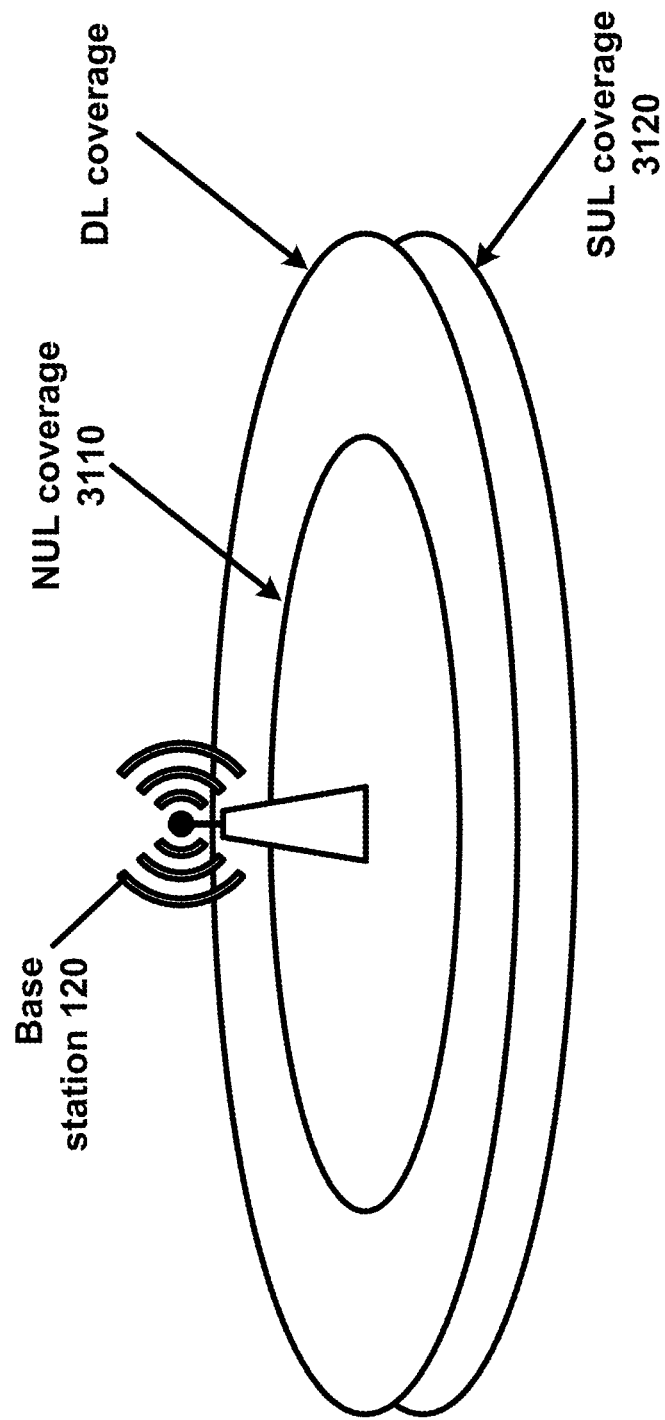
FIG. 31 shows an example of a coverage of a cell configured with a downlink and two uplinks.

FIG. 31 shows an example of a coverage of a cell configured with a DL and two ULs. A base station may configure a NUL and DL over a first frequency (e.g., high frequency). An SUL may be configured over a second frequency (e.g., low frequency) to support uplink transmission (e.g., in terms of coverage and/or capacity) of a cell. A broadcast threshold (e.g., an RRC parameter, rsrp-ThresholdSSB-SUL) for a wireless device to select a carrier may be determined such that a wireless device located outside a NUL coverage 3110 but inside an SUL coverage 3120 may start a RA procedure via an SUL. A wireless device located inside a NUL coverage 3110 may start a RA procedure via a NUL. A wireless device may use a RACH configuration associated with a selected carrier for a RA procedure.

A wireless device may perform a contention based RA procedure and/or a contention free RA procedure. A wireless device may perform a RA procedure on an UL selected based on a broadcast threshold (e.g., rsrp-ThresholdSSB-SUL). A base station may not indicate (e.g., explicitly) to the wireless device which carrier to start a RA procedure. A base station may indicate which carrier a wireless device performs a RA procedure by sending a RACH configuration with an SUL indicator (e.g., 0 may indicates a NUL carrier, 1 may indicate an SUL carrier or vice versa). A base station may indicate (e.g., explicitly) to a wireless device which UL carrier is to be used for a contention free or contention based RA procedure. A base station may indicate a contention free RA procedure by sending a RACH configuration with a dedicated preamble index. A base station may indicate a contention based RA procedure by sending a RACH configuration without a dedicated preamble index.

It may be beneficial for a network to receive one or more measurements of NUL carrier(s) and/or SUL carrier(s) to initiate a (contention free or contention based) RA procedure for a wireless device. A base station may configure a wireless device (e.g., a wireless device in RRC Connected) with one or more measurements on one or more DL reference signals associated with NUL carrier(s) and/or SUL carrier(s) of a cell.

A base station may select a carrier between NUL carrier(s) and/or SUL carrier(s), for example, based on the quality of the one or more measurements and/or if a wireless device sends quality information of one or more measurements on one or more DL reference signals associated with NUL carrier(s) and/or SUL carrier(s). A base station may indicate, to a wireless device, a selected carrier via RRC signaling (e.g., handover) and/or PDCCH order (e.g., SCell addition) for initiating a (contention free or contention based) RA procedure. For load balancing between NUL carrier(s) and/or SUL carrier(s), a base station may select one of NUL and SUL carrier by taking into consideration congestion in NUL carrier(s) and/or SUL carrier(s). A base station may better select a carrier (e.g., NUL or SUL) of a target cell for a (contention free or contention based) RA procedure for a handover, for example, based on one or more measurement reports associated with NUL carrier(s) and/or SUL carrier(s). A base station may better select a carrier (e.g., NUL or SUL) of an SCell (e.g., if the SCell is configured with at least a NUL carrier and an SUL carrier) for a (contention free or contention based) RA procedure for an SCell addition, for example, based on one or more measurement reports associated with NUL carrier(s) and/or SUL carrier(s).

A source base station may make a decision on a handover to one or more target cells, for example, for a handover of a wireless device. A source base station may indicate a handover decision to a target base station associated with one or more target cells that the source base station selects. A target base station may indicate to a wireless device (e.g., through a cell of a source gNB) which carrier (between NUL carrier(s) and SUL carrier(s)) to use via a handover command. A handover command received by a wireless device may comprise an SUL indicator (e.g., 1 bit) along with one or more RACH parameters (e.g., dedicated preamble index, and/or PRACH mask index), wherein the SUL indicator may indicate if the one or more RACH parameters are associated with an SUL or NUL carrier.

It may be useful that a source base station informs a target base station about measured results on NUL carrier(s) and SUL carrier(s), e.g., high frequency carrier(s) and low frequency carrier(s), so that the target base station determines a carrier on which a wireless device may perform a (contention free or contention based) RA procedure for a handover. The source base station may need to know whether SUL carrier(s) is (are) configured in the target gNB, and/or which carrier is allowed to be used for a handover, for example, if a source base station configures DL measurements on one or more cells association with a NUL carrier(s) and/or SUL carrier(s) of a target gNB. A target base station may inform a source base station of one or more configurations of NUL carrier(s) and/or SUL carrier(s) of one or more cells in the target gNB. A source base station may configure DL measurement on one or more cells in the target gNB, based on one or more configurations indicating carrier configurations at the one or more cells in the target gNB.

A base station may be aware of whether SUL carrier(s) is (are) configured in an SCell, and/or which carrier is allowed to be used for an SCell addition. A base station may configure DL measurements on NUL carrier(s) and/or SUL carrier(s). A base station may configure a wireless device with one or more RACH configurations for an SCell, e.g., a first RACH configuration for an SUL carrier, a second RACH configuration for a NUL carrier, and so on.

A base station may send (e.g., transmit), to a wireless device via a PDCCH order comprising a parameter indicating in which carrier the wireless device starts a (contention free or contention based) RA procedure. A PDCCH order triggering a (contention free or contention based) RA procedure may comprise one or more parameters indicating at least one of at least one preamble (e.g., preamble index), one or more PRACH resources (e.g., PRACH mask index), an SUL indicator, and/or a BWP indicator. A wireless device receiving a PDCCH order may send (e.g., transmit) at least one preamble via one or more PRACH resources of a BWP indicated by a BWP indicator of a carrier indicated by an SUL indicator, for example, for a RA procedure.

A wireless device may determine a RA procedure unsuccessfully completed. The wireless device may consider the RA procedure unsuccessfully completed, for example, if a wireless device receives no RAR corresponding to one or more preambles sent by the wireless device during a RA procedure. There may be a number of preamble transmissions allowed during a RA procedure (e.g., preambleTransMax in FIG. 20), wherein the number of preamble transmissions may be semi-statically configured by RRC. The wireless device may consider a RA procedure unsuccessfully completed, for example, if a wireless device receives no RAR corresponding to the number of preamble transmissions. A wireless device may indicate a problem to upper layer(s), for example, after an unsuccessful completion of a RA procedure, and after the indicated problem. The upper layers(s) may trigger radio link failure that may lead to prolonged RA delay and degraded user experience.

A base station (source base station and/or a target gNB) configuring a wireless device with a RACH configuration for a RA (for a handover and/or SCell addition) may not allow to reuse the RACH configuration if the RA is unsuccessfully completed.

A failure of a (contention free or contention based) RA may result in a long delay of RA. A wireless device may initiate a contention based RA procedure, for example, if a contention free random access is unsuccessfully completed, instead of a contention free random access. The wireless device may perform an initial access to the target base station based on a contention based random access, for example, if a wireless device fails a contention free random access to a target base station during a handover. A wireless device performing a contention based random access procedure may compete with one or more wireless devices to get an access to a gNB, which may not guarantee a success of the contention based random access procedure, and/or which may take long (e.g., four step procedure of the contention based random access procedure comparing with a contention free random access comprising MSG 1 1220 and MSG 2 1230 transmissions) to receive a corresponding RAR.

The wireless device may wait until a base station sends a message (e.g., PDCCH order) indicating a RACH configuration, for example, based on which the wireless device may initiate a RA for an SCell addition and/or if a wireless device fails a contention free random access for an SCell addition. It may take long for a base station to detect a failure of a RA for an SCell addition. A wireless device may wait for a message (e.g., PDCCH order) sent to a base station for an SCell addition unnecessarily long.

Figure 32:
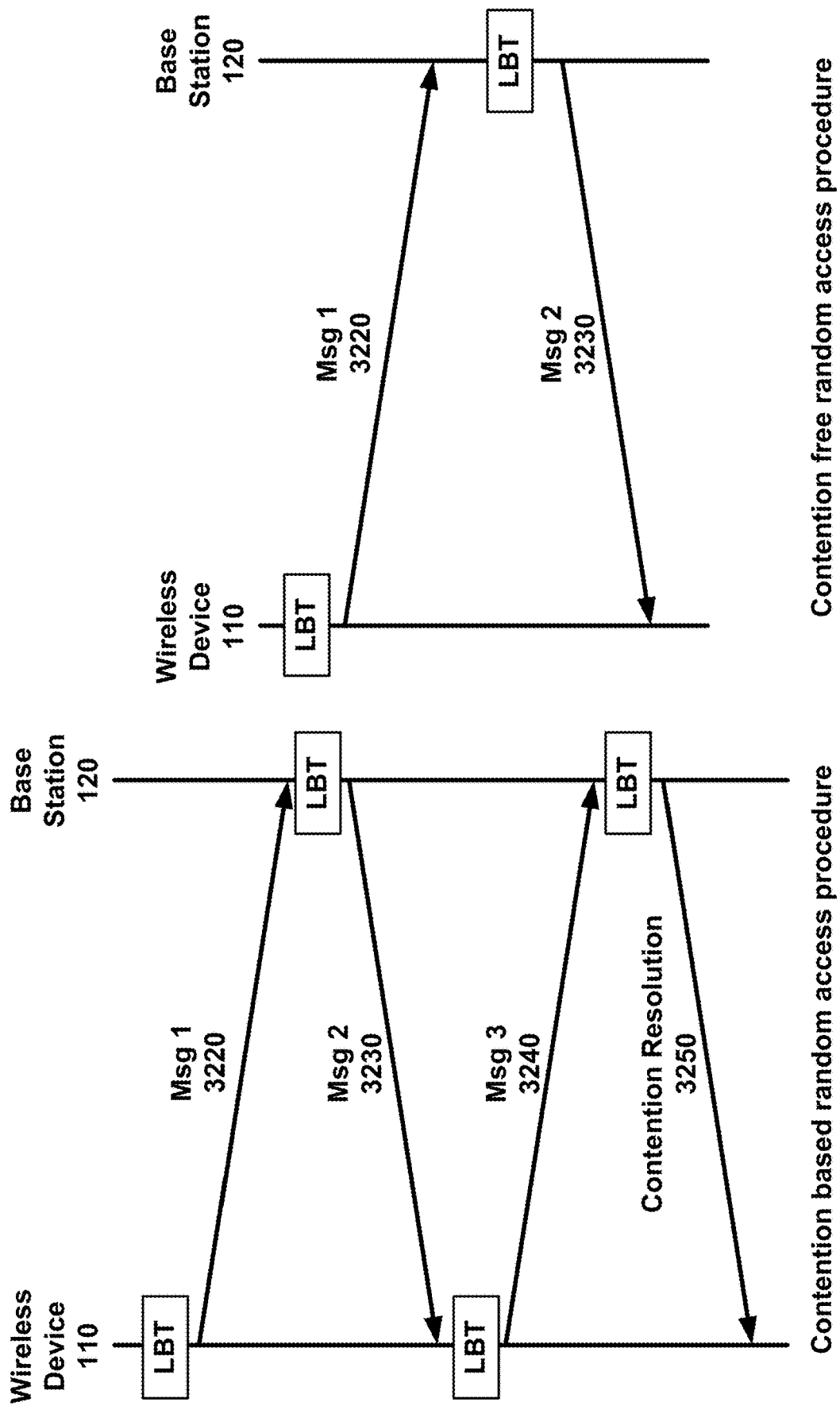
FIG. 32 shows an example of contention based and contention-free random access (RA) procedures with LBT.

FIG. 32 shows contention based and contention-free random access procedures with LBT. A successful contention based random access procedure may use Msg 1 3220, Msg 2 3230, Msg 3 3240, and contention resolution 3250 to perform the RA procedure with the wireless device 110 and base station 120. The wireless device may perform a first LBT, determine that the medium is clear, and send Msg 1 3220 to a base station 120. The base station 120 may perform a second LBT, determine that the medium is clear, and send Msg 2 3230 to the wireless device 110. The wireless device 110 may perform a third LBT, determine the medium is clear, and send Msg 1 3240 to the base station 120. The base station 1120 may perform a fourth LBT, determine that the medium is clear, and sends contention resolution 3250 to the wireless device 110.

A successful contention-free based RA procedure may use Msg 1 3220 and Msg 2 3230 to perform the RA procedure with the wireless device 110 and the base station 120. The wireless device 110 may perform a first LBT, determine that the medium is clear, and send Msg 1 3220 to the base station 120. The base station 120 may perform a second LBT, determine that the medium is clear, and send Msg 2 3230 to the wireless device 110.

A failure of a RA may occur due to LBT, for example, in an unlicensed band. At least one LBT may be performed prior to DL and/or UL transmission. Msg 1 1220, Msg 2 1230, Msg 3 1240, and/or contention resolution 1250 may require at least one LBT before the transmission (e.g., at least 4 LBTs), for example, in a contention based random access procedure. Msg 1 1220 and Msg2 1230 may require at least one LBT each (e.g., at least 2 LBTs), for example, for a contention-free random access procedure. A base station and/or a wireless device may not send (e.g., transmit) a message (e.g., Msg 1 3220, Msg 2 3230, Msg 3 3240, and/or contention resolution 3250) for a RA procedure, for example, if the LBT procedure has failed prior to sending the message (e.g., CCA in LBT determines that a channel in unlicensed band is busy (e.g., occupied by another device)).

A failure of an LBT procedure may result in degrading a user experience (e.g., in terms of QoS, capacity (e.g., throughput), and/or coverage). A base station and/or a wireless device may wait until the channel becomes idle. This waiting may result in a latency problem to make a radio link connection between a base station and a wireless device. A failure of an LBT during a RA procedure may lead a long delay for a wireless device to receive an UL grant and/or TA value from a base station. This delay may result in a call drop and/or traffic congestion. A failure of an LBT procedure in a RA procedure for an SCell addition may lead a cell congestion (e.g., load imbalancing) on one or more existing cells (e.g., if an SCell may not take over traffic from the one or more existing cells in time).

An efficiency of RA procedure operating in an unlicensed band may degrade with LBT failure, which may cause a latency/delay, and/or performance degradation. Selecting two or more SSBs and performing one or more LBT procedures via one or more PRACH occasions associated with the two or more SSBs may increase a success rate of LBT procedures. A wireless device may measure a plurality of downlink reference signals (e.g., SSBs or CSI-RSs, if CSI-RS is configured by RRC). The wireless device may select two or more SSBs by comparing RSRPs of the plurality of downlink reference signals and a threshold. The threshold may comprise a RSRP threshold SSB parameter (e.g., rsrp-ThresholdSSB) if the plurality of downlink reference signals are SSBs. The threshold may comprise a RSRP threshold CSI-RS parameter (e.g., rsrp-Threshold-CSI-RS) if the plurality of downlink reference signals are CSI-RSs. The wireless device may select two or more downlink referencing signals (SSBs or CSI-RSs) having RSRPs that are higher than the threshold. The wireless device may determine one or more PRACH occasions associated with the selected two or more downlink reference signals (e.g., SSBs), for example, based on SSBs being configured with the wireless device. The wireless device may determine the one or more PRACH transmissions based on an association between PRACH occasions and SSBs that may be indicated by one or more RRC parameters (e.g., ra-ssb-OccasionMaskIndex). The wireless device may determine one or more PRACH occasions associated with the selected two or more downlink reference signals (e.g., CSI-RSs), for example, based on CSI-RSs being configured with the wireless device. The wireless device may determine the one or more PRACH transmissions based on an association between PRACH occasions and CSI-RSs that may be indicated by one or more RRC parameters (e.g., ra-OccasionList).

Figure 33:
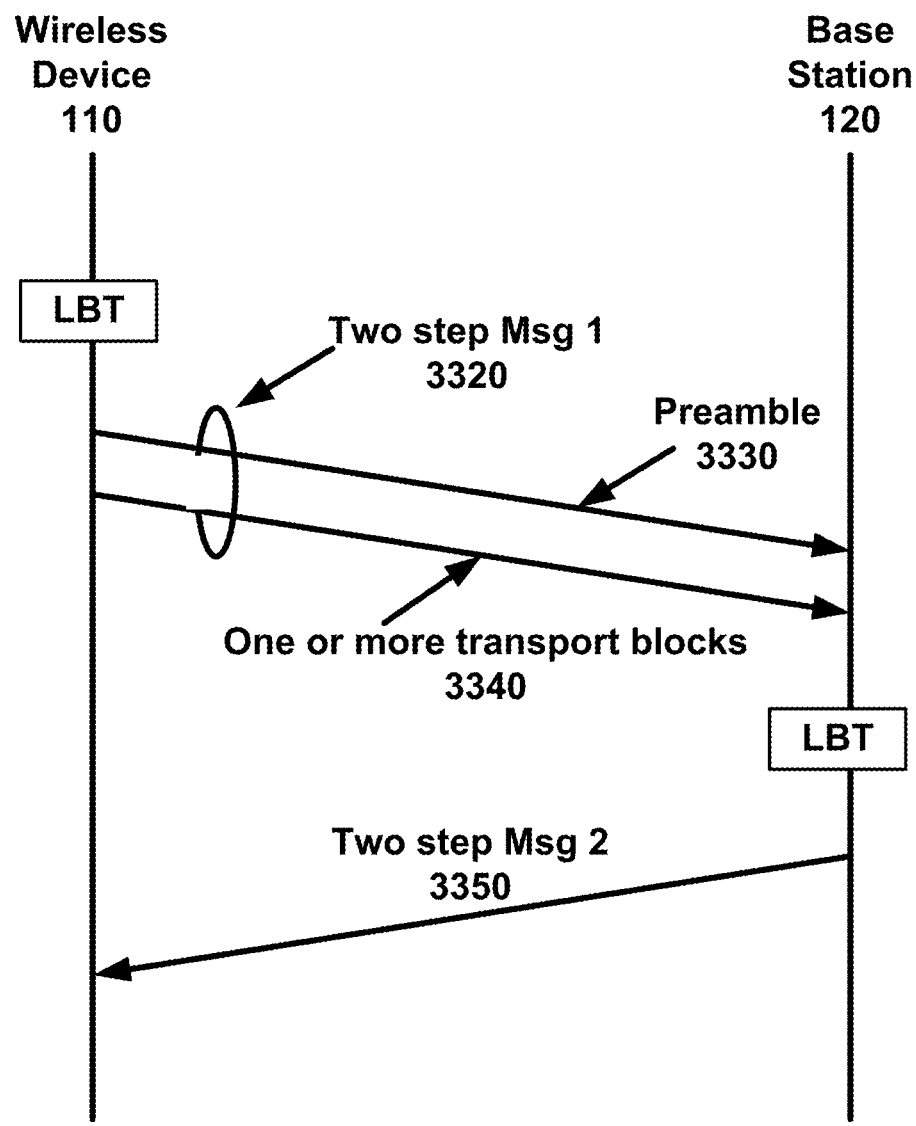
FIG. 33 shows an example of a two-step RA procedure with LBT.

FIG. 33 is an example diagram of a two-step RA procedure with LBT. A two-step RA procedure may employ LBT in an unlicensed band. A base station and/or a wireless device may not send (e.g., transmit) a message (e.g., two-step Msg 1 3320, preamble 3330, one or more TBs 3340, and/or two-step Msg 2 3350) for a RA procedure if LBT is failed prior to sending (e.g., transmitting) the message (e.g., CCA in LBT determines that a channel in unlicensed band is busy, e.g., occupied by other device). The transmissions of the preamble 3330 and for one or more TBs 3340 may have a same LBT procedure and/or different LBT procedures.

Radio resources for transmissions of a preamble 3330 and one or more TBs 3340 may be configured in a same channel (or a same subband or a same BWP or a same UL carrier), where a wireless device performs an LBT procedure for the transmissions (e.g., based on a regulation). An LBT result on the same channel (or the same subband or the same BWP or the same UL carrier) may be applied for transmissions of the preamble 3330 and for one or more TBs 3340.

Figure 34:
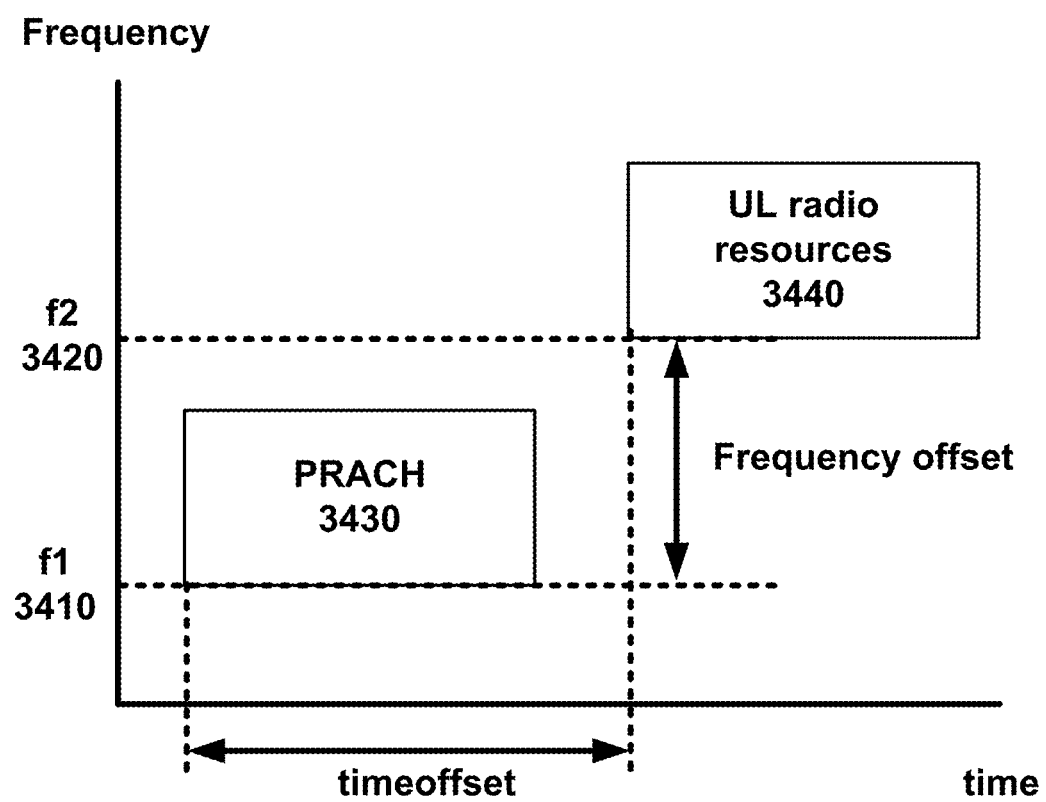
FIG. 34 shows an example of radio resource allocation for a two-step RA procedure.

FIG. 34 is an example of radio resource allocation for a two-step RA procedure. PRACH resource 3430 and UL radio resources 3440 may be time-multiplexed, for example, based on a frequency offset in FIG. 34 being zero. PRACH 3430 resource and UL radio resources 3440 may be frequency-multiplexed, for example, based on a timeoffset in FIG. 34 being zero. The frequency offset in FIG. 34 may be an absolute number in terms of Hz, MHz, and/or GHz, and/or a relative number (e.g., one of index from a set of frequency indices that are predefined/preconfigured). The timeoffset in FIG. 34 may be an absolute number in terms of micro-second, milli-second, and/or second and/or a relative number (e.g., in terms of subframe, slot, mini-slot, OFDM symbol). PRACH resource 3430 for transmission of the preamble 3330 and UL radio resources for transmission of one or more TBs 3340 may be subject to one LBT procedure if f1 3410 and f2 3420 are configured in the same channel (or a same subband or a same BWP or a same UL carrier). One LBT procedure before a PRACH resource 3430 may be performed by a wireless device (e.g., based on a regulation of unlicensed band). A quantity of LBT procedures may be determined based on a value of the timeoffset. One LBT procedure before a PRACH resource 3430 may be performed by a wireless device, for example, if the value of a time offset is equal to and/or less than a threshold (e.g., that may be configured and/or defined by a regulation). The one LBT procedure may determine idle and a wireless device may perform a transmission of the preamble 3230 via PRACH resource 3430 followed by a second transmission of one or more TBs 3340 via the UL radio resources 3440 with no LBT procedure (the transmission order may be switched if the UL radio resources 3440 is allocated before PRACH resource 3430 in time domain). PRACH and UL radio resources may be allocated closely enough in time domain. A wireless device may perform a first LBT procedure before a PRACH resource 3430 and perform a second LBT procedure before Ul radio resources 3440, for example, based on the value of timeoffset being larger than the threshold A bandwidth of BWP and/or UL carrier may be larger than a first value (e.g., 20 MHz). f1 3410 and f2 3420 may be configured in the bandwidth. A wireless device may perform an LBT procedure and apply a result (e.g., idle or busy) of the LBT procedure to the transmission of the preamble 3330 and UL radio resources for transmission of one or more TBs 3340. A wireless device may perform the transmissions of the preamble 3330 and for one or more TBs 3340. If the channel is busy, a wireless device may not perform the transmissions of the preamble 3330 and for one or more TBs 3340, for example, based on the channel being idle.

A bandwidth of BWP and/or UL carrier may be less than a first value (e.g., 20 MHz). f1 3410 and f2 3420 may be configured in the bandwidth. A wireless device may perform an LBT procedure and apply a result (e.g., idle or busy) of the LBT procedure to the transmission of the preamble 3330 and UL radio resources for transmission of one or more TBs 3340. A wireless device may perform a first transmission of the preamble 3330 followed by a second transmission of one or more TBs 3340, for example, based on if the channel being idle. A wireless device may not perform the transmissions of the preamble 3330 and for one or more TBs 3340, for example, based on the channel being busy.

Radio resources for transmissions of the preamble 3330 and one or more TBs 3340 may be configured in different channels, different subbands, different BWPs, and/or different UL carriers (e.g., one in NUL and the other one in SUL) that may require separate LBT procedures. A wireless device may perform a LBT procedure per one or more channels, per one or more subbands, per one or more BWPs, and/or per one or more UL carriers.

Figure 35:
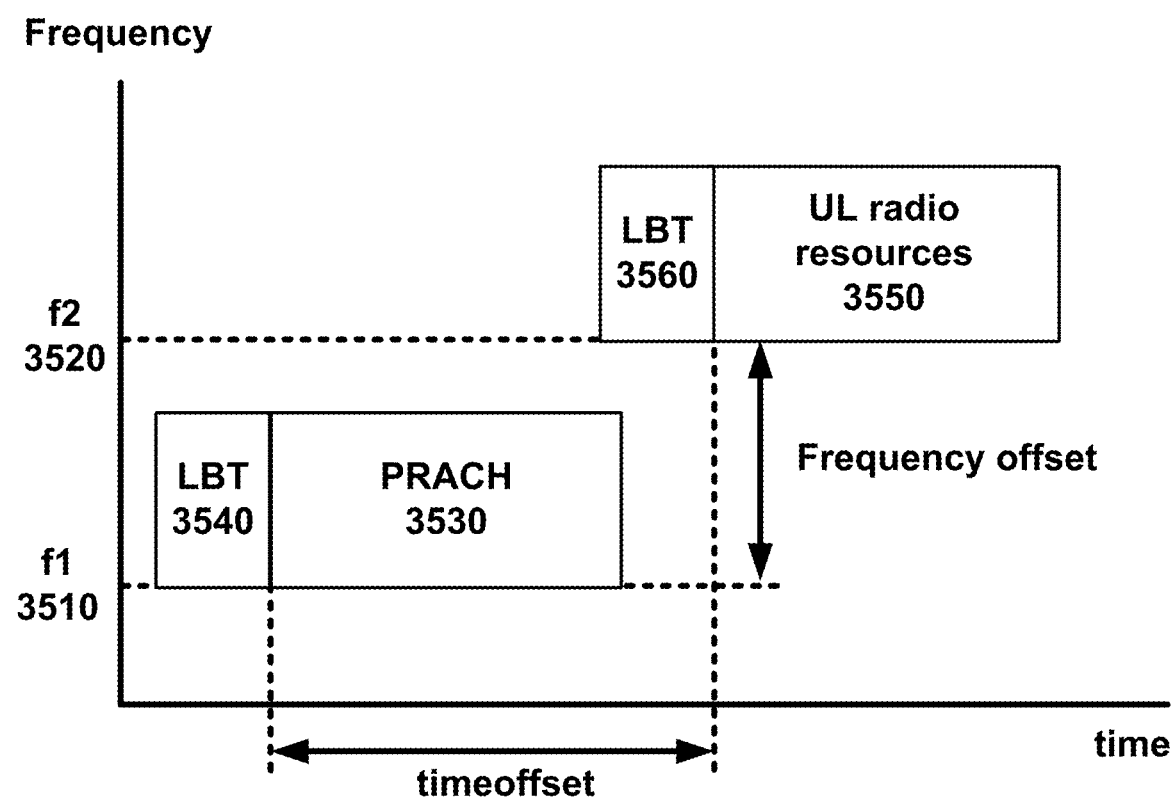
FIG. 35 shows an example of one or more LBT procedures for a two-step RA procedure.

FIG. 35 shows an example of one or more LBT procedures performed for a two-step RA procedure UL radio resources 3550 may be allocated before or aligned with PRACH resources 3530 in time. A wireless device may perform a first LBT procedure (e.g., LBT 3540 in FIG. 35) before a first transmission of preamble 3330 (e.g., via PRACH resources 3530) and perform a second LBT procedure (e.g., LBT 3560 in FIG. 35) before a second transmission of one or more TBs 3340 (e.g., via UL radio resources 3550). A wireless device may perform none of, one of, or both of the first transmission and the second transmission, depending on results of the first LBT procedure and second LBT procedure. Separate LBTs before a PRACH message and/or data may provide benefits, such as: earlier transmission of the first transmission and/or second transmission by a wireless device, earlier transmission of a preamble than if a larger LBT were used, and increased probability that a transmission will be successful.

The first transmission may be performed if a first result of the first LBT procedure is idle. The second transmission may be independent of the first result. The second transmission may be performed if a second result of the second LBT procedure is idle. A wireless device may send (e.g., transmit) the preamble 3330, for example, in response to the first LBT procedure being idle. The wireless device may not be able to send (e.g., transmit) one or more TBs 3340 in response to the second LBT procedure being busy. A wireless device may not send (e.g., transmit) the preamble 3330 in response to the first LBT procedure being busy. The wireless device may send (e.g., transmit) one or more TBs 3340 in response to the second LBT procedure being idle. In a two-step RA procedure, one or more TBs may comprise an identifier of the wireless device, for example, so that a base station may identify and/or indicate which wireless device sent (e.g., transmitted) the one or more TBs. The identity may be configured by the base station and/or may be at least a portion of wireless device-specific information (e.g., resume ID, DMRS sequence/index, IMSI, etc). A base station may identify and/or indicate the wireless device based on the identity in the one or more TBs, for example, based on a wireless device sending (e.g., transmitting) one or more TBs with no preamble 3330 (e.g., if a channel, e.g. PRACH 3530 is busy). Separate LBT procedures for transmissions of a preamble and one or more TBs may be performed, for example, based on a two-step RA procedure configured in an unlicensed band.

A wireless device may be configured (e.g., by a base station) with separate LBT procedures for a wideband operation (e.g., based on a bandwidth greater than 20 MHz). A wireless device may be configured (e.g., by a base station) with a wideband comprising one or more subbands and/or one or more BWPs, for example, based on wideband operation. Some of the one or more subbands may overlap in the frequency domain. Some of the one or more subbands may not overlap in the frequency domain. Some of the one or more BWPs overlap in the frequency domain. Some of the one or more BWPs may not overlap in the frequency domain. Separate LBT procedures may be used for transmissions via the two radio resources, for example, based on a wideband operation and/or two radio resources being allocated with a space larger than a threshold (e.g., 20 MHz). A wideband may comprise one or more subbands, and two radio resources may be allocated in different subbands. A first transmission scheduled in a first subband may use a first LBT procedure, and a second transmission scheduled in a second subband may use a second LBT procedure. The first LBT procedure and the second LBT procedure may be independent of each other.

UL radio resources for transmission of one or more TBs 3340 may be subject to a first LBT procedure (e.g., LBT 3560) and be independent of a second LBT procedure (e.g., LBT 3540) for transmission of the preamble 3330. PRACH resources 3530 for transmission of the preamble 3330 may be subject to a second LBT procedure (e.g., LBT 3560) and be independent of a first LBT procedure (e.g., LBT 3560) for transmission of one or more TBs 3340. A wireless device may perform separate LBT procedures for a first transmissions of the preamble 3330 and a second transmission of one or more TBs 3340, for example, based on f1 3410 and f2 3420 being configured in different channels, different subbands, different BWPs, and/or different UL carriers.

Figure 36A:
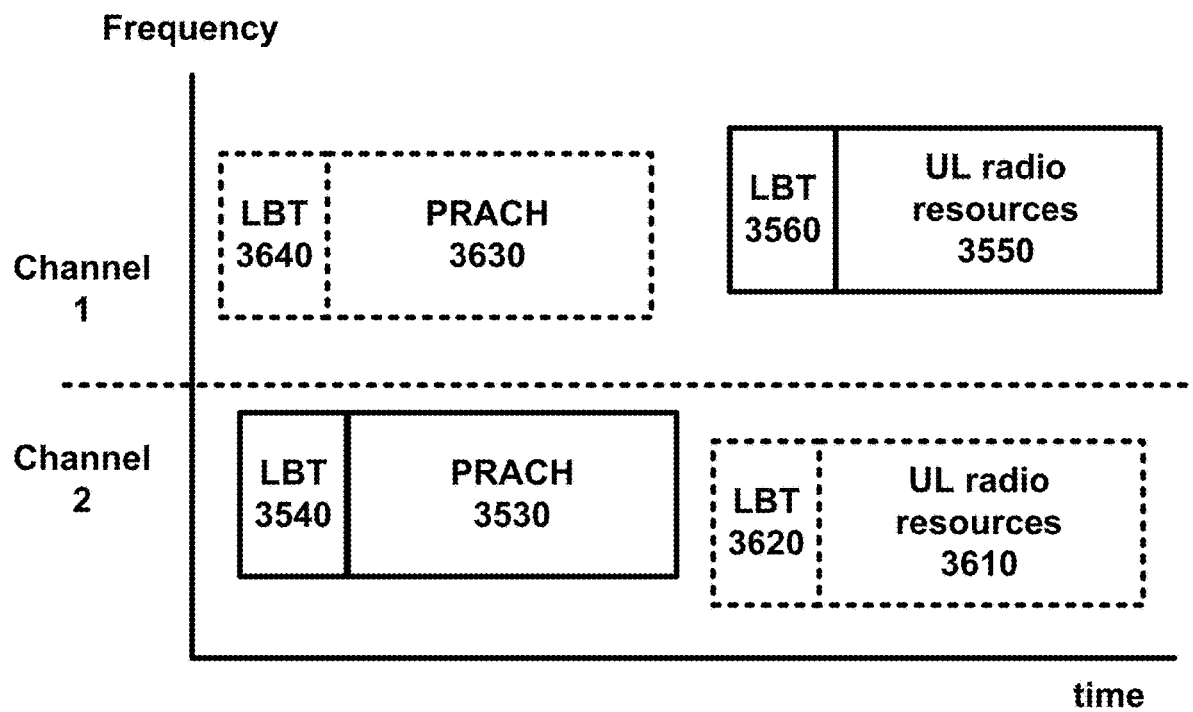
FIG. 36A and FIG. 36B show examples of one or more LBT procedures for a two-step RA procedure in an unlicensed band.
Figure 36B:
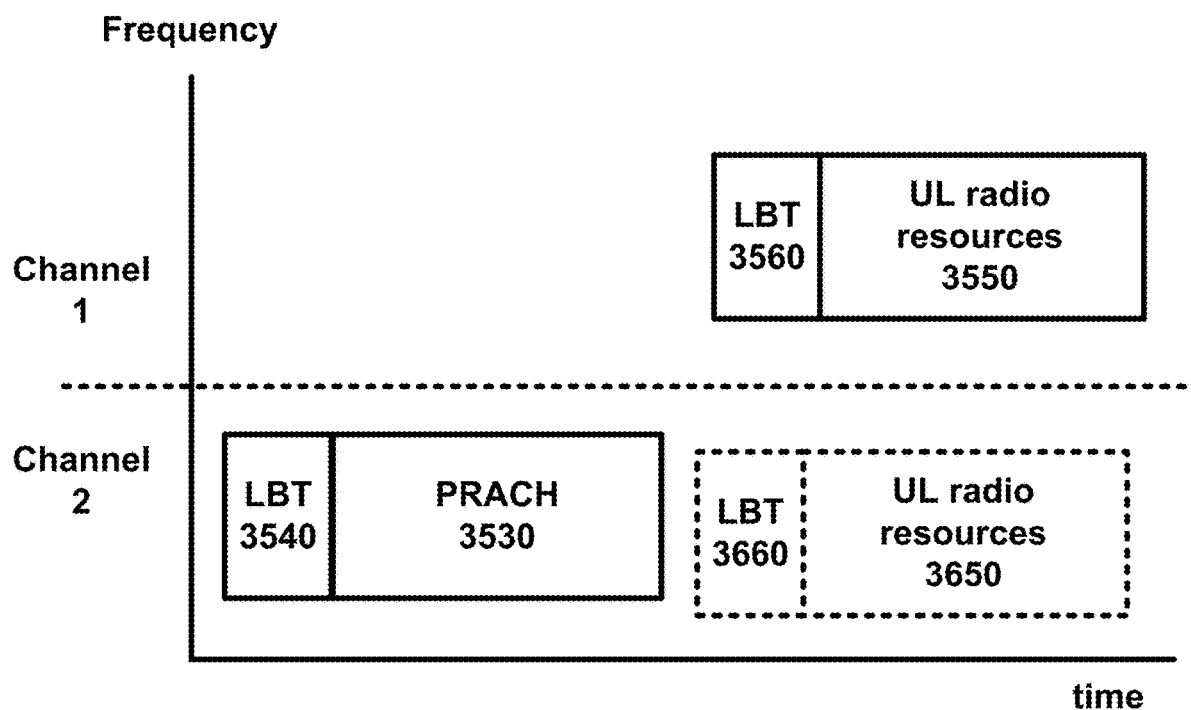

FIG. 36A and FIG. 36B are examples of one or more LBT procedures performed for a two-step RA procedure in an unlicensed band. The resource allocation and the separate LBT procedures in FIG. 35 may be resulted from FIG. 36A and/or FIG. 36B. A wireless device may be configured (e.g., by a base station) with one or more PRACH resources and one or more UL radio resources in different channels (BWPs and/or UL carriers). The wireless device may one or more first opportunities to send (e.g., transmit) preambles and one or more second opportunities to send (e.g., transmit) one or more TBs. A wireless device may have two opportunities via random access resources (e.g., PRACH resource 3630 and PRACH resource 3530) for preamble transmission, for example, as shown in FIG. 36A. A wireless device may select one of two opportunities, for example, based on LBT results. A wireless device may perform a first LBT procedure (e.g., LBT 3640) and a second LBT procedure (e.g., LBT 3540 as shown in FIG. 36A). A wireless device may select one of PRACH resources associated either a first LBT procedure or a second LBT procedure (e.g., based on random selection), for example, based on the results of the first and second LBT procedures being idle. A wireless device may select a PRACH resource associated with the LBT result being idle for preamble transmission, for example, based on one of LBT result being idle and the other of LBT result being busy. A wireless device may not send (e.g., transmit) a preamble and may perform one or more LBT procedures for one or more TB transmissions, for example, based on the first and second LBT procedure results being busy.

A wireless device may have one or more opportunities for transmission of one or more TBs via UL radio resources (e.g., in a similar way that a wireless device has for preamble transmission above). The one or more opportunities for transmission of one or more TBs may be independent of one or more opportunities for transmission of preamble. The wireless device may perform one or more LBT procedures to gain access to a channel to send (e.g., transmit) one or more TBs, for example, based on a wireless device not sending (e.g., transmitting) a preamble due to a result (e.g., busy) of LBT procedure. A wireless device may perform a first LBT procedure (e.g., LBT 3620) followed by a first transmission opportunity of one or more TBs via first UL radio resources 3610 and a second LBT procedure (e.g., LBT 3560 in FIG. 36A) followed by a second transmission opportunity of one or more TBs via second UL radio resources 3550, as shown in FIG. 36A. A wireless device may select one of the opportunities, for example, depending on LBT results. A wireless device may send (e.g., transmit) one or more TBs via UL radio resources 3550, for example, based on LBT 3620 being busy and/or LTB 3560 being idle as shown in FIG. 36A. A wireless device may not send (e.g., transmit) any preamble, for example, based on one or more LBT procedures (e.g., LBT 3540 and LBT 3640 in FIG. 36A) to gain access for sending (e.g., transmitting) a preamble result in busy. A wireless device may perform one or more second LBT procedures (e.g., LBT 3620 and LBT 3560 in FIG. 36A) for transmission of one or more TBs.

The wireless device may receive, from a base station, one or more control message (e.g., RRC messages and/or PDCCH messages) indicating one or more associations between PRACH resources and UL radio resources, for example, before a wireless device initiates a two-step RA procedure. The associations may be one-to-one, multi-to-one, one-to-multi, and/or multi-to-multi between one or more PRACHs resources and one or more UL radio resources. A wireless device may determine which UL radio resources and/or which PRACH resources to select, for example, based on the associations. The associations may indicate one-to-multi association from PRACH resource 3530 to UL radio resources 3550 and UL radio resources 3610, for example, as shown in FIG. 36A. The associations may indicate one-to-one association from PRACH resources 3630 to UL radio resources 3550. A wireless device may perform one or more LBT procedures (depending on a regulation and/or resource allocation whether the resources are in the same channel) for transmission of one or more TBs depending on a selection of PRACH resources. A wireless device may perform two LBT procedures (LBT 3540 and LBT 3640), for example, as shown in FIG. 36A. A wireless device may send (e.g., transmit) a preamble via PRACH resources 3530, for example, based on LBT 3540 being idle but LBT 3640 being busy. The wireless device may determine (e.g., select) one or more candidate UL radio resources based on a configured association of PRACH resources 3530, which may be one-to-multi from PRACH resources 3530 to UL radio resources 3550 and UL radio resources 3610. The wireless device may perform LBT 3620 and LBT 3560 based on the configured association. A wireless device may send (e.g., transmit) one or more TBs, depending on the results of the LBT procedures. FIG. 36B is an example of a two-step RA procedure. UL radio resources are associated with one PRACH resource. An association may be configured (e.g., by a base station) from PRACH resource 3530 to UL radio resource 3550 and UL radio resources 3650.

The PRACH resource and/or UL radio resources in FIG. 34, FIG. 35, FIG. 36A, and/or FIG. 36B may be associated with at least one reference signal configuration (e.g., SSB, CSI-RS, DM-RS). A wireless device may receive (e.g., from a base station) at least one control message to indicate such an association. A configuration of each reference signal may have an association with at least one PRACH resource, that may be configured by RRC message and/or PDCCH signals, for example, based on the base station sending (e.g., transmitting) a plurality of reference signals. In one or more downlink channels, there may be a plurality of PRACH resources and a plurality of UL radio resources associated with the plurality of PRACH resources.

A failure of a LBT procedure may result in degrading a user experience (e.g., in terms of QoS, capacity (throughput), and/or coverage). A base station and/or a wireless device may wait until the channel becomes idle. This wait may result in a latency problem to make a radio link connection between a base station and a wireless device. A failure of an LBT procedure during a RA procedure may lead a long delay for a wireless device to receive an UL grant and/or TA value from a base station. This failure may result in a call drop and/or traffic congestion. A failure of an LBT in a RA procedure for an SCell addition may lead to cell congestion (e.g., load imbalancing) on one or more existing cells, for example, because an SCell may not take over traffic from the one or more existing cells in time.

Figure 37:
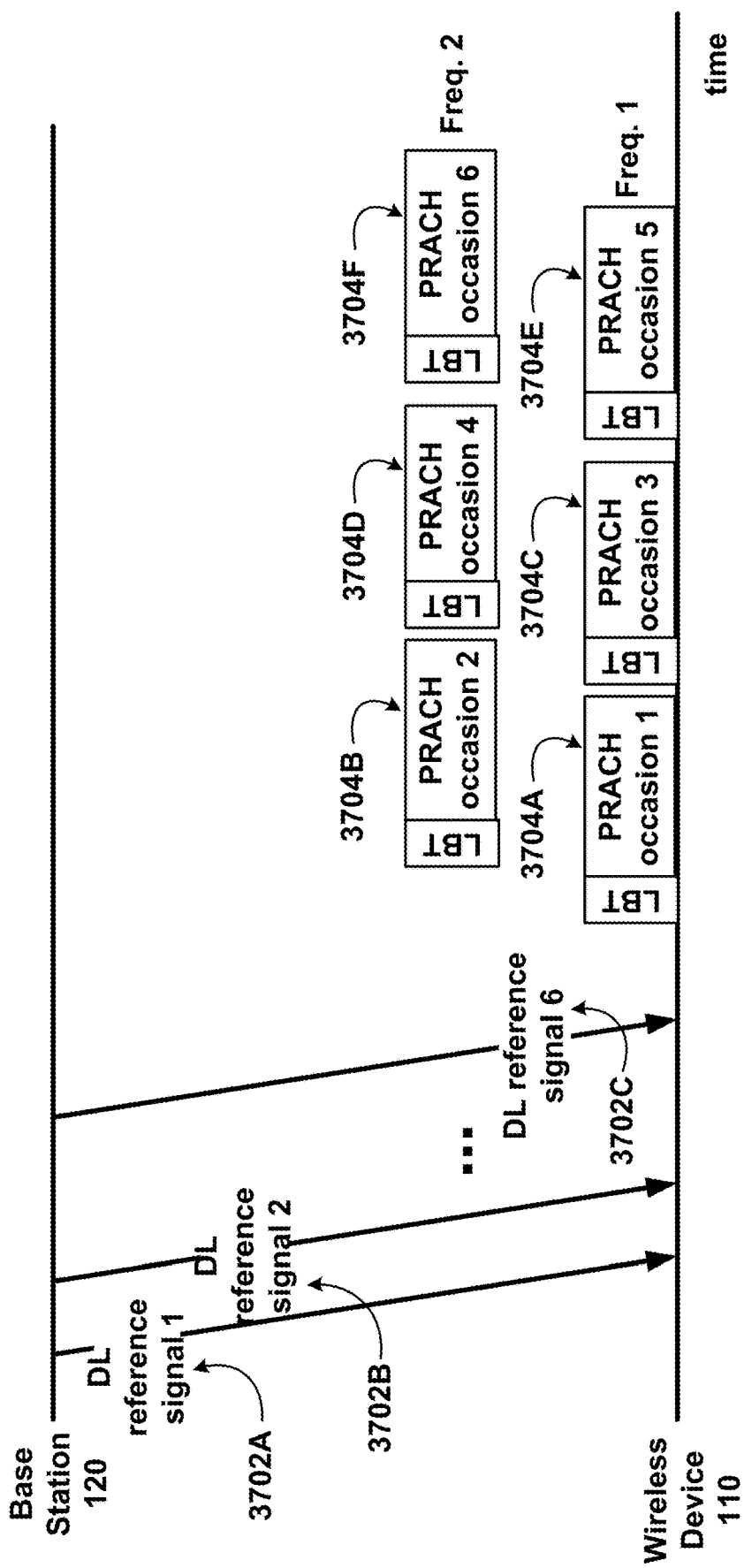
FIG. 37 shows an example of one or more PRACH occasion configurations.

FIG. 37 shows an example of an association between downlink reference signals and random access resource (e.g., PRACH) occasions. A base station 120 may send a plurality (e.g., a burst, such as up to K quantity) of DL reference signals 3702A-3702K. A wireless device 110 may select one or more random access resources (e.g., PRACH occasions 3704A-3704K that may each correspond to at least one of a K quantity of DL reference signals 3702A-3702K) to attempt a RA procedure (e.g., send a RAP). The wireless device 110 may perform the RA procedure on a first available (e.g., clear) random access resource.

An association between a DL reference signal and random access resources (e.g., PRACH occasions) may be one-to-one mapping and/or multi-to-one mapping between DL reference signals and random access resource occasions (e.g., PRACH occasions). A wireless device 110 may measure k DL reference signals. A wireless device 110 may select DL reference signal 1 3702A, DL reference signal 2 3702B, and DL reference signal 3 3702C. The wireless device 110 may perform up to a particular quantity of LBT procedures (e.g., at most 3 LBTs). Each LBT procedure may be performed prior to each of the selected random access resource occasions (e.g., PRACH occasions), for example, if random access resource occasion (e.g., PRACH occasion) 1 3704A, random access resource occasion (e.g., PRACH occasion) 2 3704B, and random access resource occasion (e.g., PRACH occasion) 3 3704C are associated with DL reference signal 1 3702A, DL reference signal 2 3702B, and DL reference signal 3 3702C, respectively.

A type of LBT may be pre-defined and/or semi-statically by a base station. A base station may indicate a type of LBT of random access resource occasions (e.g., PRACH occasions) in a RACH configuration. The type may be one of CAT 1, CAT 2, CAT 3, CAT 4 (or long LBT and/or short LBT).

A wireless device may send (e.g., transmit) one or more preambles via the first random access resource occasion (e.g., PRACH occasion). The wireless device may not perform one or more LBT procedures in other random access resource occasions (e.g., PRACH occasions) that may be available after the first random access resource occasions (e.g., PRACH occasions) in the same PRACH burst, for example, if an LBT success occurs (e.g., channel is idle) in a first random access resource occasion (e.g., PRACH occasion). The wireless device may not perform another LBT procedure on random access resource occasion (e.g., PRACH occasion) 3 3704C, for example, if the wireless device selects random access resource occasion (e.g., PRACH occasion) 1 3704A and a random access resource occasion (e.g., PRACH occasion) 3 3704C, and an LBT procedure on random access resource occasion (e.g., PRACH occasion) 1 3704A is successful. The wireless device may perform one or more LBT procedures prior to each of random access resource occasions (e.g., PRACH occasions) in a first frequency (e.g., Freq. 1) at least until an LBT procedure is successful, for example, if a wireless device selects all random access resource occasions (e.g., PRACH occasions) in the first frequency (e.g., Freq. 1 in FIG. 37). The wireless device may send (e.g., transmit) one or more preambles associated with a random access resource occasion (e.g., PRACH occasion) if the LBT procedure is successful, for example, based on or in response to the LBT procedure being successful.

A wireless device may perform an LBT procedure for the one or more random access resource occasions (e.g., PRACH occasions) FDM-ed, which may be firstly available and/or may be randomly selected, for example, if one or more random access resource occasions (e.g., PRACH occasions) are frequency domain multiplexed (FDM-ed), e.g., random access resource occasion (e.g., PRACH occasion) 1 3704A and random access resource occasion (e.g., PRACH occasion) 2 3704B. A wireless device may (e.g., based on RSRPs of DL reference signals) select random access resource occasion (e.g., PRACH occasion) 1 3704A and random access resource occasion (e.g., PRACH occasion) 2 3704B FDM-ed. The wireless device may perform LBT procedure(s) on random access resource occasion (e.g., PRACH occasion) 1 3704A and random access resource occasion (e.g., PRACH occasion) 2 3704B. The wireless device may randomly select one of these random access resource occasions, for example, if both LBT procedures are successful. The wireless device may select an available random access resource occasion first in time domain, for example, if both LBT procedures are successful. The wireless device may select a random access resource occasion corresponding to a DL reference signal having an RSRP that is greater than other DL reference signals, for example, if both LBT procedures are successful. Random access resource occasion (e.g., PRACH occasion) 1 3704A and random access resource occasion (e.g., PRACH occasion) 2 3704B may be FDM-ed within a threshold (e.g., less than a bandwidth threshold). The wireless device may perform a wideband LBT procedure that may cover a frequency range of random access resource occasion (e.g., PRACH occasion) 1 3704A and random access resource occasion (e.g., PRACH occasion) 2 3704B. The wireless device may select one of the random access resource occasions (e.g., PRACH occasions) based on: a random selection, time location of random access resource occasions (e.g., PRACH occasions), and/or RSRPs of corresponding DL reference signals, for example, if the wideband LBT procedure is successful.

A wireless device may perform a long LBT on a first random access resource occasion (e.g., PRACH occasion) firstly available. The wireless device may perform a short LBT on a second random access resource occasion (e.g., PRACH occasion) following (e.g., after) the first random access resource occasion (e.g., PRACH occasion), for example, if the LBT on the first random access resource occasion (e.g., PRACH occasion) fails (e.g., a long LBT procedure for random access resource occasion (e.g., PRACH occasion) 1 3704A fails and/or a short LBT procedure for random access resource occasion (e.g., PRACH occasion) 3 3704C fails). A type of LBT procedure on the second random access resource occasion (e.g., PRACH occasion) may be configured by a base station. A type of LBT procedure on the second random access resource occasion (e.g., PRACH occasion) may be determined by a time difference of two random access resource occasions (e.g., PRACH occasions). The first random access resource occasion (e.g., PRACH occasion) and the second random access resource occasion (e.g., PRACH occasion) may have a guard time less than a threshold (e.g., configurable or pre-defined, such as 25 as, 16 as, or any other duration). The wireless device may perform a short LBT procedure on the second random access resource occasion (e.g., PRACH occasion), for example, if the first random access resource occasion and the second random access resource occasion have a guard time less than a threshold. The wireless device may perform a long LBT procedure, for example, if the first random access resource occasion and the second random access resource occasion have a guard time greater than or equal to the threshold.

The wireless device 110 may perform an LBT procedure before each selected random access resource occasion, for example, at least until successful or until an LBT procedure before each of the selected random access resource occasions have failed. The wireless device 110 may perform a RA procedure on a random access resource occasion associated with a successful LBT procedure. The two or more random access resource occasions (e.g., PRACH occasions) 3704A-3704F may not be aligned.

A wireless device may select two or more random access resource occasions (e.g., PRACH occasions), for example, based on RSRPs of DL reference signals. A wireless device may select random access resource occasion (e.g., PRACH occasion) 1 3704A, random access resource occasion (e.g., PRACH occasion) 2 3704B, and/or random access resource occasion (e.g., PRACH occasion) 3 3704C. The wireless device may perform a first LBT procedure on a first random access resource occasion (e.g., PRACH occasion) available firstly in time (e.g., random access resource occasion (e.g., PRACH occasion) 1 3704A). The wireless device may determine a second LBT procedure on a second random access resource occasion (e.g., PRACH occasion), for example, based on the first LBT procedure. The wireless device may send (e.g., transmit) a preamble via the first random access resource occasion (e.g., PRACH occasion), for example, if the first LBT procedure was successful. The wireless device may determine to perform a second LBT procedure on a second random access resource occasion (e.g., PRACH occasion) available firstly after the first random access resource occasion (e.g., PRACH occasion) (e.g., random access resource occasion (e.g., PRACH occasion) 2 3704B), for example, if the first LBT procedure was not successful. The wireless device may perform a third LBT procedure on a third random access resource occasion (e.g., PRACH occasion), for example, if the second LBT procedure on the second random access resource occasion (e.g., PRACH occasion) has failed. The wireless device may perform a wideband LBT, for example, if one or more FDM-ed random access resource occasions (e.g., PRACH occasions) are configured within a guard time less than a threshold. The wireless device may perform LBT procedures on the one or more FDM-ed random access resource occasions (e.g., PRACH occasions). A wireless device may send (e.g., transmit) a plurality of preambles via a plurality of random access resource occasions (e.g., PRACH occasions).

Figure 38:
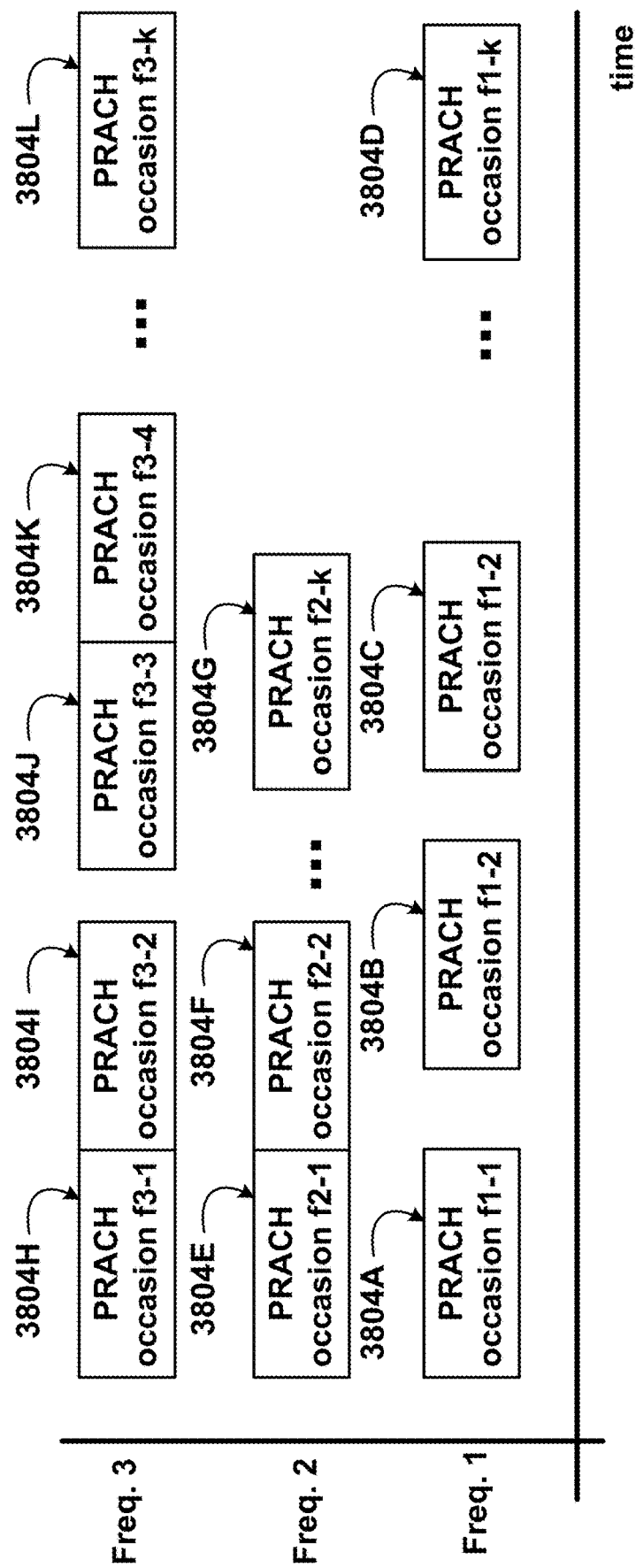
FIG. 38 shows an example of one or more PRACH occasion configurations.

FIG. 38 shows an example one or more random access resource occasion configurations (e.g., PRACH occasions). The random access resource occasions may be separated by time and/or frequencies (e.g., TDM-ed and/or FDM-ed). The random access resource occasions may be separated by gaps (e.g., PRACH occasions 3804A-3804D via freq. 1). The random access resources may not be separated by gaps (e.g., PRACH occasions 3804E-3804G via freq. 2).

Groups of random access resources occasions may be separated by gaps (e.g., PRACH occasions 3804H-3804L via freq. 3). The random access resources occasions may occur in different frequencies (e.g., PRACH occasions 3804A-3804D via freq. 1, PRACH occasions 3804E-3804G via freq. 2, and/or PRACH occasions 3804H-3804L via freq. 3).

Random access resource occasions (e.g., PRACH occasions) may be time division multiplexed (TDM-ed) with a guard time (e.g., a time difference or gap), for example, via Freq 1. A wireless device may perform an LBT procedure in each random access resource occasion (e.g., PRACH occasion) in a first frequency (e.g., Freq. 1), for example, for multiple preamble transmissions.

A wireless device may perform a long LBT procedure and/or short LBT procedure, for example, depending on the guard time between two random access resource occasions (e.g., PRACH occasions). A wireless device may perform a short LBT procedure (or no LBT procedure) on a random access resource occasion (e.g., PRACH occasion) available later than the other, for example, if the guard time (e.g., time difference) is less than a threshold (25 µs, 16 µs, or any other duration). The wireless device may perform a long LBT procedure, for example, if the guard time (e.g., time difference) is greater than or equal to the threshold. A type of LBT procedure in each random access resource occasion (e.g., PRACH occasion) may be configured by an RRC message. A type of LBT procedure in each random access resource occasion (e.g., PRACH occasion) may be determined by a wireless device by comparing with a guard time between random access resource occasions (e.g., PRACH occasions) and the threshold.

One or more random access resource occasions (e.g., PRACH occasions) may be TDM-ed without a guard time (or less than a threshold), for example, via a second frequency (e.g., Freq 2 in FIG. 38). A wireless device may perform an LBT procedure on the first random access resource occasion (e.g., PRACH occasion) that occurs firstly among the selected random access resource occasions (e.g., PRACH occasions) via the second frequency (e.g., Freq 2). A wireless device may avoid performing an LBT procedure if the LBT on the first random access resource occasion (e.g., PRACH occasion) was successful, for example, for subsequent random access resource occasions (e.g., PRACH occasions) followed by the first random access resource occasion (e.g., PRACH occasion) via the second frequency (e.g., Freq 2). The LBT procedure on the first random access resource occasion (e.g., PRACH occasion) may be a long LBT procedure. An LBT procedure on subsequent random access resource occasions (e.g., PRACH occasions) may be a short LBT procedure if the LBT on the first random access resource occasion (e.g., PRACH occasion) was successful. A wireless device may perform a long LBT or a short LBT, for example, if the selected random access resource occasions (e.g., PRACH occasions) are not contiguous in time. A type of LBT may be configured by a base station and/or determined based on a time difference of the selected random access resource occasions (e.g., PRACH occasions) that may be non-contiguous. One or more random access resource occasions (e.g., PRACH occasions) may be grouped without a guard time, for example, via a third frequency (e.g., Freq 3 in FIG. 38). There may be a guard time between two groups as shown in random access resource occasion (e.g., PRACH occasion) f3-2 3804I and random access resource occasion (e.g., PRACH occasion) f3-3 3804J in FIG. 38. Similar procedures for determining an LBT procedure via a second frequency (e.g., Freq. 2) and via a first frequency (e.g., Freq. 1) may be applied to the grouped PRACH occasions via the first frequency (e.g., Freq. 3), for example, using no LBT procedure, a long LBT procedure, or a short LBT procedure, for example, based on gaps and/or timing.

Using an LBT procedure in an unlicensed spectrum may result in one or more uplink and/or downlink transmissions being blocked. A wireless device and/or a base station may not transmit any message in a four-step RA procedure and/or two-step RA procedure, for example, if a channel is busy (e.g., the channel is determined as occupied by other device(s) based on an LBT procedure).

A wireless device may send (e.g., transmit) at least one preamble (e.g., RAPs) to a base station on an unlicensed spectrum. A wireless device may perform one or more LBT procedures (e.g., for preamble transmissions, for example, as described with reference to FIGS. 32-38). The wireless device may transmit at least one preamble to a base station, for example, if a UL RA channel is idle on an unlicensed spectrum. A base station may receive at least one preamble that may be transmitted by a wireless device. The base station may perform one or more LBT procedures to transmit at least one downlink control message (e.g., a downlink medium access control packet comprising an RAR, a downlink control signal) corresponding to the at least one preamble. The base station may perform a second LBT procedure, for example, if a channel is determined as busy based on a first LBT procedure. The second LBT procedure may be performed, for example, after a certain period of time (e.g., backoff time) following the first LBT procedure.

A wireless device may monitor a downlink control channel for a downlink control message (e.g., a downlink medium access control packet comprising an RAR, a downlink control signal). A base station may send (e.g., transmit), to the wireless device, the downlink control message (e.g., the downlink medium access control packet comprise the RAR, a downlink control signal), for example, based on an RAP received from the wireless device. The wireless device may monitor the downlink control channel, for example, in an RAR window. A base station may send (e.g., transmit) a message comprising an indication of a value (e.g., size, duration, length, etc.) of an RAR window. A message comprising RA configuration parameters (e.g., RACH-ConfigGeneric IE in FIG. 20) may indicate a value of an RAR window (e.g., a response window parameter such as the ra-ResponseWindow in FIG. 20). The value of an RAR window may be fixed, for example, to 10 ms, or another time duration. The value of an RAR window may be defined in terms of a quantity (e.g., number) of slots (e.g., as shown in FIG. 20).

Figure 39A:
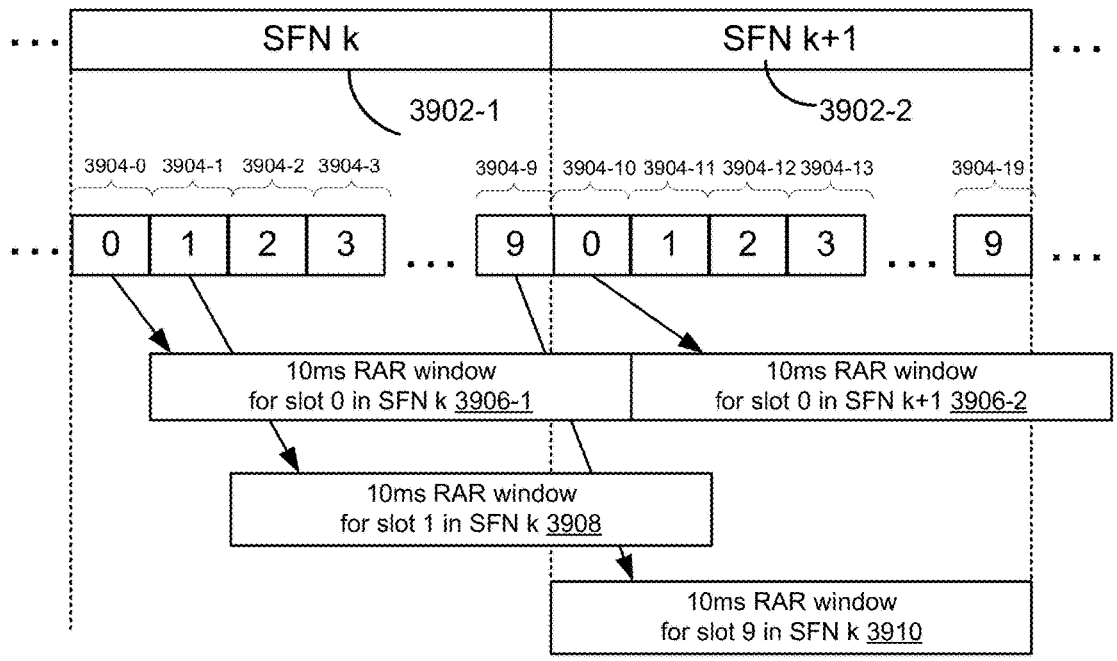
FIG. 39A and FIG. 39B show example RAR window management procedures for different numerologies.
Figure 39B:
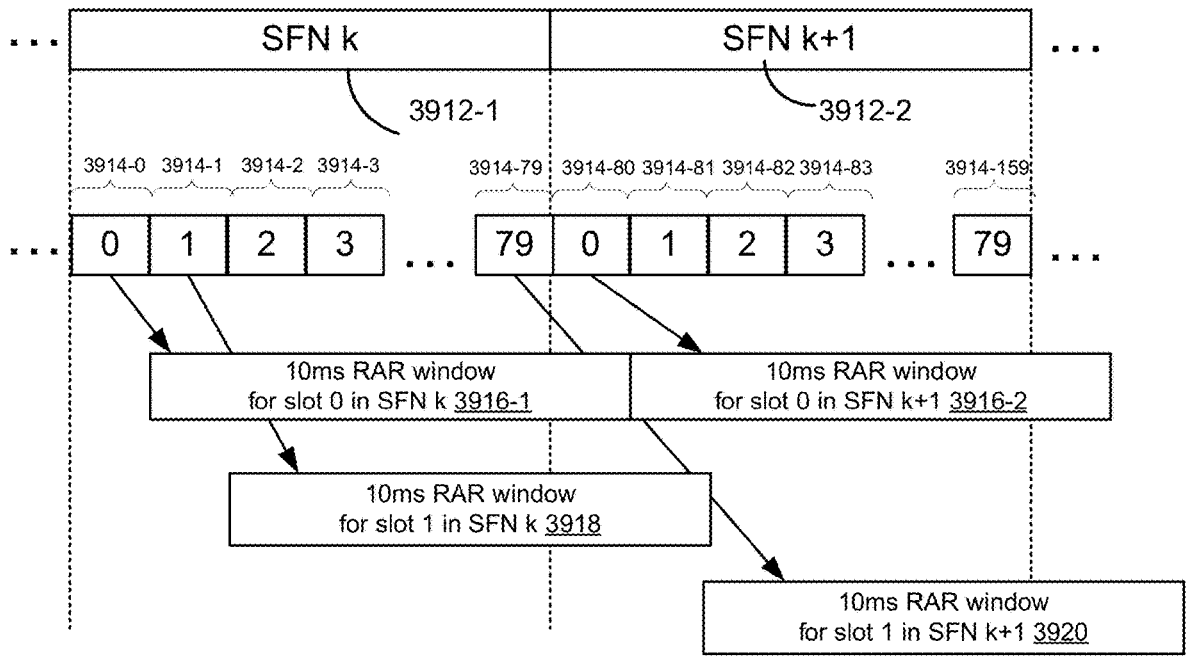

FIG. 39A and FIG. 39B show example RAR window management procedures for different numerologies in a communication system. A frame structure may comprise one or more system frames and one or more slots. A system frame may be referenced by a corresponding system frame number (SFN). A system frame may comprise one or more slots. A quantity (e.g., number) of one or more slots in each system frame may be determined based on a numerology.

FIG. 39A shows an example of a first numerology (e.g., numerology μ=0) using system frames 3902. The system frames 3902 may be indexed using corresponding system frame numbers (SFN) (e.g., k, k+1 . . . ). A duration (e.g., length) of each system frame 3902 may be 10 ms, or any other duration. Each system frame 3902 may comprise 10 slots 3904. Each slot 3904 may comprise a slot duration of 1 ms (or any other duration). Slots in each system frame 3902 may be indexed using slot numbers ranging from 0 to 9 (or 1 to 10). The slot numbers may restart from 0 (or 1) in other system frame(s). System frame 3902-1, corresponding to SFN k may comprise, for example, 10 slots with slot numbers ranging from 0 to 9. Slot numbers in the next system frame 3902-2, corresponding to SFN k+1, may restart at 0. Slot 0 3904-0 to slot 9 3904-9 may comprise the SFN k 3902-1. Slot 0 3904-10 to slot 9 3904-19 may comprise the SFN k+1 3902-2. The first numerology may use a 15 kHz subcarrier spacing.

RAR windows 3906-1, 3906-1, 3908, and 3910 may have a time duration (e.g., length) of less than or equal to a duration of a system frame (e.g., 10 ms). The RAR window 3906-1 for slot 0 in SFN k may begin at slot 1 of SFN k and end at slot 0 of SFN k+1. The RAR window 3908 for slot 1 in SFN k may begin at slot 2 of SFN k and end at slot 1 of SFN k+1. The RAR window 3910 for slot 9 in SFN k may begin at slot 0 of SFN k+1 and end at slot 9 of SFN k+1.

The RAR window 3906-2 for slot 0 in SFN k+1 may begin at slot 1 of SFN k+1 and end at slot 0 of SFN k+2.

FIG. 39B shows an example of a second numerology (e.g., numerology=3) with system frames 3902. The system frames 3912 may be indexed using corresponding SFNs (e.g., k, k+1, . . . ). A duration of each system frame may be 10 m, or any other duration. Each system frame 3912 may comprise 80 slots 3914. Each slot may have a slot duration of 0.125 ms, or any other duration. Slots in each system frame 3912 may be indexed using slot numbers ranging from 0 to 79 (or 1 to 80). The slot numbers may restart from 0 (or 1) in other system frame(s).

System frame 3912-1, corresponding to SFN k, may comprise, for example, 80 slots comprising slot numbers ranging from 0 to 79. Slot numbers in the next system frame 3912-2, corresponding to SFN k+1, may restart at 0. Slot 0 3914-0 to slot 79 3914-79 may comprise the SFN k 3912-1. Slot 0 3904-80 to slot 79 3904-159 may comprise the SFN k+1 3912-2. The second numerology may use a 120 kHz subcarrier spacing.

RAR windows 3916, 3918, and 3920, may have a time duration (e.g., length) of less than or equal to a duration of a system frame (e.g., 10 ms). The RAR window 3916-1 for slot 0 in SFN k may begin at slot 1 of SFN k and end at slot 0 of SFN k+1. The RAR window 3918 for slot 1 in SFN k may begin at slot 2 of SFN k and end at slot 1 of SFN k+1. The RAR window 3916-2 for slot 0 in SFN k+1 may begin at slot 1 of SFN k+1 and end at slot 0 of SFN k+2. The RAR window 3920 for slot 1 in SFN k+1 may begin at slot 2 of SFN k+1 and end at slot 1 of SFN k+2. RAR windows may correspond to any time duration other than 10 ms. The RAR window 3916-1 may correspond to an RAR window for an RAP transmitted in slot 0 in SFN k, the RAR window 3916-2 may correspond to an RAR window for an RAP preamble transmitted in slot 0 in SFN k+1, the RAR window 3918 may correspond to an RAR window for an RAP preamble transmitted in slot 1 in SFN k, and the RAR window 3920 may correspond to an RAR window for an RAP transmitted in slot 1 in SFN k+1.

A base station may configure a wireless device with a duration of an RAR window that is less than or equal to a time duration of a system frame (e.g., less than or equal to 10 ms). The base station may configure the duration of the RAR window, for example, by sending (e.g., transmitting) a control message (e.g., an RRC message). A duration of an RAR window may be less than or equal to 10 ms, for example, in FIGS. 39A and 39B with 10 ms system frames.

A wireless device may determine a size of an RAR window, for example, based on a quantity (e.g., number) of slots and a numerology configured for an RA procedure. A base station in a communication system using the first numerology, as shown in FIG. 39A, may configure a wireless device, for example, with one of sl1, sl2, sl4, sl8 and/or sl10 as a value of a response window parameter (e.g., ra-ResponseWindow), to configure a duration of an RAR window. sl1 may correspond to an RAR window of 1 slot (e.g., 1 ms RAR window), sl2 may correspond to an RAR window of 2 slots (e.g., 2 ms RAR window), sl4 may correspond to an RAR window of 4 slots (e.g., 4 ms RAR window), sl8 may correspond to an RAR window of 8 slots (e.g., 8 ms RAR window), and/or sl10 may correspond to an RAR window of 10 slots (e.g., 10 ms RAR window).

A base station in a communication system using the second numerology, as shown in FIG. 39B, may configure a wireless device, for example, with one of sl1, sl2, sl4, sl8, sl10, sl20, sl40, and/or sl80 as a value of a response window parameter (e.g., ra-ResponseWindow). sl1 may correspond to an RAR window of 1 slot (e.g., 0.125 ms RAR window), sl2 may correspond to an RAR window of 2 slots (e.g., 0.25 ms RAR window), sl4 may correspond to an RAR window of 4 slots (e.g., 0.5 ms RAR window), sl8 may correspond to an RAR window of 8 slots (e.g., 1 ms RAR window), sl10 may correspond to an RAR window of 10 slots (e.g., 1.25 ms RAR window), sl20 may correspond to an RAR window of 20 slots (e.g., 2.5 ms RAR window), sl40 may correspond to an RAR window of 40 slots (e.g., 5 ms RAR window), and sl80 may correspond to an RAR window of 80 slots (e.g., 10 ms RAR window). A value of a response window parameter in FIGS. 39A and 39B may be defined in terms of a quantity (e.g., number) of symbols, slots, subframes, and/or system frames.

A wireless device may start an RAR window based on (e.g., after or in response to) an RAP. There may be a predefined and/or semi-statically configured time offset between an RAP transmission and an RAR window. A wireless device may start an RAR window with a time offset that may be measured based on a last symbol of PRACH resource in which the RAP is transmitted and/or based on a last symbol of an RAP. The time offset may be configured, for example, using one or more RRC messages.

FIG. 39A and FIG. 39B show examples in which a time offset may be set to 0 ms and/or 0 slots. The wireless device may start an RAR window from a next slot following transmission of an RAP. The RAR window 3906-1 for slot 0 in SFN k may correspond to an RAR window for an RAP transmitted in slot 0 in SFN k, the RAR window 3906-2 for slot 0 in SFN k+1 may correspond to an RAR window for an RAP transmitted in slot 0 in SFN k+1, the RAR window 3908 for slot 1 in SFN k may correspond to an RAR window for an RAP transmitted in slot 1 in SFN k, and the RAR window 3910 for slot 9 in SFN k may correspond to an RAR window for an RAP transmitted in slot 9 in SFN k.

A wireless device may manage one or more channels (e.g., BWPs, subbands, channels, and/or carriers) having the same or different numerologies (e.g., in an unlicensed band). A wireless device may perform one or more LBT procedures in the one or more channels and send (e.g., transmit) at least one preamble via one of the one or more channels. The wireless device may monitor (e.g., after or in response to the transmitting the at least one preamble) the one or more channels to detect and/or receive at least one response corresponding to the at least one preamble. The one or more channels may be configured with one or more numerologies. A wireless device may have a first RAR window in a first channel and a second RAR window in a second channel. The first RAR window duration (e.g., corresponding to a first quantity of slots) and the second RAR window duration (e.g., corresponding to a second quantity of slots) may be different, for example, if the first channel and the second channel have different numerologies. The first RAR window duration and the second RAR window duration may be the same duration.

Defining the response window parameter in terms of a quantity (e.g., number) of slots may result in a change in an RAR window duration, for example, if a wireless device switches an active BWP (e.g., from a first BWP with a first numerology to a second BWP with a second numerology) in an RA procedure. This may result in a change in a duration of an RAR window. A value of a response window parameter may be defined as an absolute time duration (e.g., a quantity or number of milliseconds, microseconds, etc.) of an RAR window such that a duration of a response window may not change based on BWP switching.

FIG. 40 shows example parameters corresponding to different numerologies (e.g., ip). Each numerology may correspond to a communication protocol. The parameters correspond to a subcarrier spacing, a length of a cyclic prefix, a quantity of symbols per slot, a quantity of slots per frame, a quantity of slots per subframe, a minimum quantity of PRBs, and a maximum quantity of PRBs. Other communication protocols may use a different quantity of numerologies and/or different values for the parameters.

A wireless device and/or a base station using a communication protocol may determine a size (e.g., duration) of an RAR window, for example, using parameters corresponding to a selected numerology. The parameters may be indicated to a wireless device by a base station, for example, using RRC messages. The parameters may indicate, for example, a maximum quantity of slots corresponding to a size of an RAR window. The parameters may indicate, for example, a maximum of 10 slots (e.g., ra-ResponseWindow=s110) for the numerology $\mu=0$, a maximum of 20 slots (e.g., ra-ResponseWindow=s120) for the numerology $\mu=1$, a maximum of 40 slots (e.g., ra-ResponseWindow=s140) for the numerology $\mu=2$, and/or a maximum of 80 slots (e.g., ra-ResponseWindow=s180) for the numerology $\mu=3$. The ra-ResponseWindow may be indicated in one or more RRC message(s). An RA-RNTI may be determined, for example, based on a selected numerology. Equation (1), for example, may correspond to determining an RA-RNTI for the selected numerology.

A wireless device may initiate an RA procedure by sending (e.g., transmitting) an RAP to a base station. The wireless device may determine a radio network identifier (e.g., an RA-RNTI calculated using Equation (1)) based on the RAP. The base station may send (e.g., transmit), based on or in response to the RAP, a downlink control message (e.g., a downlink medium access control packet comprising an RAR, a downlink control signal) to the wireless device.

The RAR may be identified based on a radio network identifier (e.g., an RA-RNTI calculated using Equation (1)). The radio network identifier may be used for identifying a downlink control message (e.g., a downlink medium access control packet comprising an RAR, a downlink control signal). The wireless device may detect the RAR based on the radio network identifier. The wireless device may compare the radio network identifier of the downlink control message with the radio network identifier calculated by the wireless device. The wireless device may determine that the RAR corresponds to the RAP transmitted by the wireless device, for example, if the radio network identifier of the downlink control message indicating the RAR corresponds (e.g., is identical, substantially similar, etc.) to the radio network identifier calculated by the wireless device.

Parameters (e.g., as shown in FIG. 40) may be used to calculate an RA-RNTI. Equation (1) may be used to calculate an RA-RNTI+. Equation (1) may not use a system frame number for a calculation of an RA-RNTI. RA-RNTIs for different RA procedures in different system frames may be identical, in at least some situations. A wireless device monitoring a downlink control message (e.g., a downlink medium access control packet comprising an RAR, a downlink control signal) with an RA-RNTI (e.g., used for scrambling) as calculated using Equation (1) may need an RAR window size less than or equal to a time duration of a system frame (e.g., less than or equal to 10 ms) to avoid collision between two RA procedures that may be initiated by different wireless devices in different system frames.

Uplink transmission(s) and/or downlink transmission(s) may be blocked, for example, due to an LBT procedure result (e.g., channel is busy). As described with reference to FIG. 32, a base station may use an LBT procedure prior to transmission of an RAR. A base station may perform one or more LBT procedures on one or more channels (e.g., BWPs, subbands, and/or carriers) to increase a number of opportunities for transmitting an RAR. The base station may delay a transmission of an RAR, for example, if the LBT procedure fails (e.g., a channel is determined to be occupied).

Figure 41:
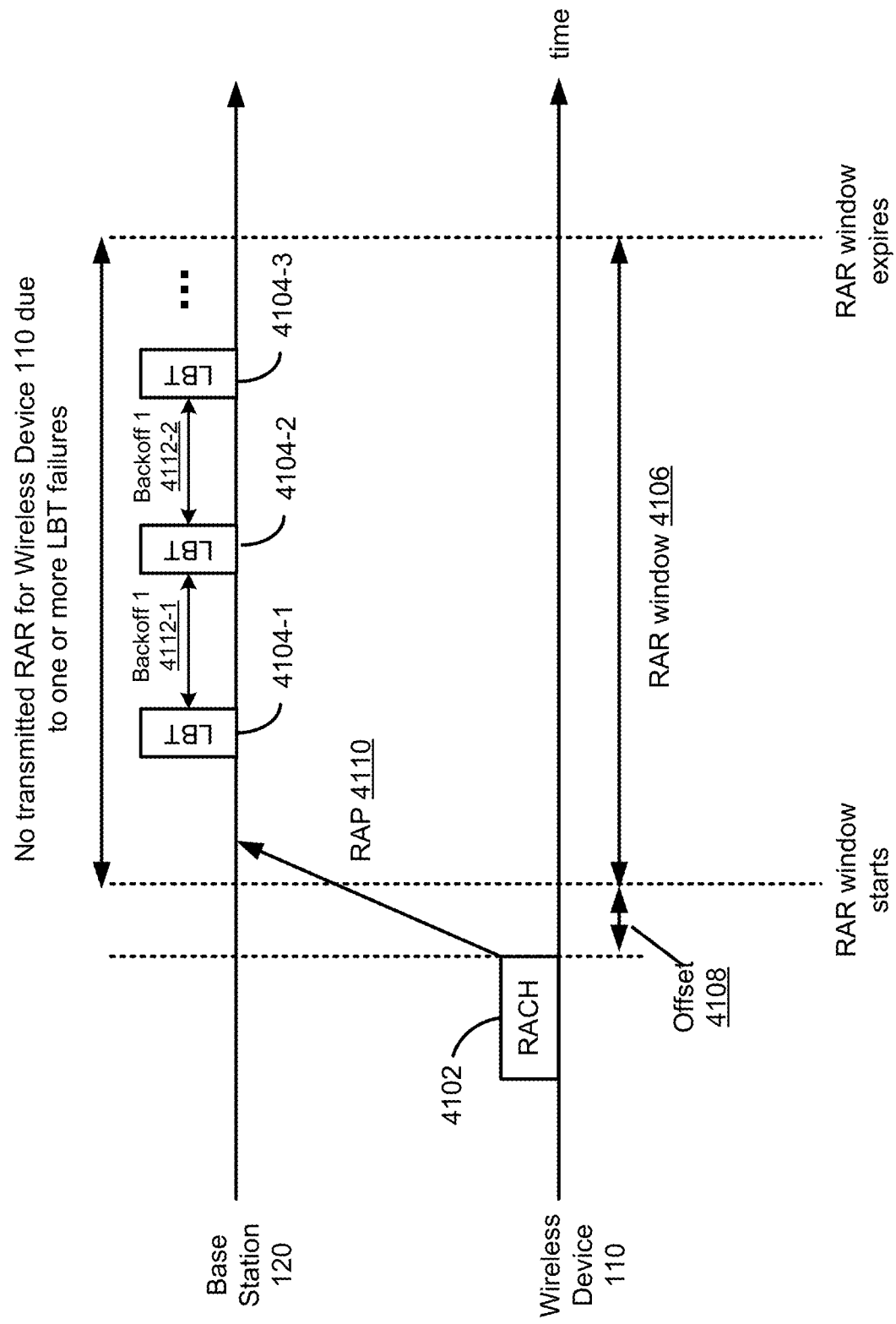
FIG. 41 shows an example LBT procedure.

FIG. 41 shows an example LBT procedure. A base station (e.g., the base station 120) may perform an LBT procedure on a same channel (e.g., BWP, subband, and/or carrier). A wireless device (e.g., the wireless device 110) may send (e.g., transmit) at least one RAP 4110 via at least one random access radio resource (e.g., RACH 4102). The wireless device may start an RAR window 4106 based on (e.g., after or in response to) transmitting the at least one RAP 4110. The starting time of the RAR window 4106 may be associated with a time of the at least one RAP transmission. The RAR window 4106 may start, for example, at the end of the at least one preamble transmission with a time offset (e.g., an offset 4108). The starting time of the RAR window 4106 may be associated with the at least RA radio resource. The RAR window 4106 may start from a last symbol of the at least RA radio resource with a time offset (e.g., the offset 4108). The starting time of the RAR window 4106 may be associated with a PDCCH resource where the wireless device starts to monitor for an RAR. The RAR window may start from a first symbol of the PDCCH resource with a time offset (e.g., the offset 4108) following the RAP transmission in RACH 4102.

The wireless device may monitor a control channel (e.g., one or more PDCCHs that may be configured as a part of an RA configuration) to detect a downlink control message (e.g., a downlink MAC packet comprising an RAR, a downlink control signal) corresponding to the at least one RAP 4110. The base station may perform a first LBT procedure 4104-1. The base station may determine that the channel is occupied, for example, based on the first LBT procedure 4104-1. The base station may perform a second LBT procedure 4104-2 (e.g., after a backoff time 4112-1). The base station may again determine that the channel is occupied, for example, based on the second LBT procedure 4104-2. The base station may perform a third LBT procedure 4104-3 (e.g., after a backoff time 4112-2). The base station may again determine that the channel is occupied, for example, based on the third LBT procedure 4104-3. The base station may not transmit an RAR to the wireless device in the RAR window 4106, for example, if all (or one or more) LBT procedures 4104 fail.

Figure 42:
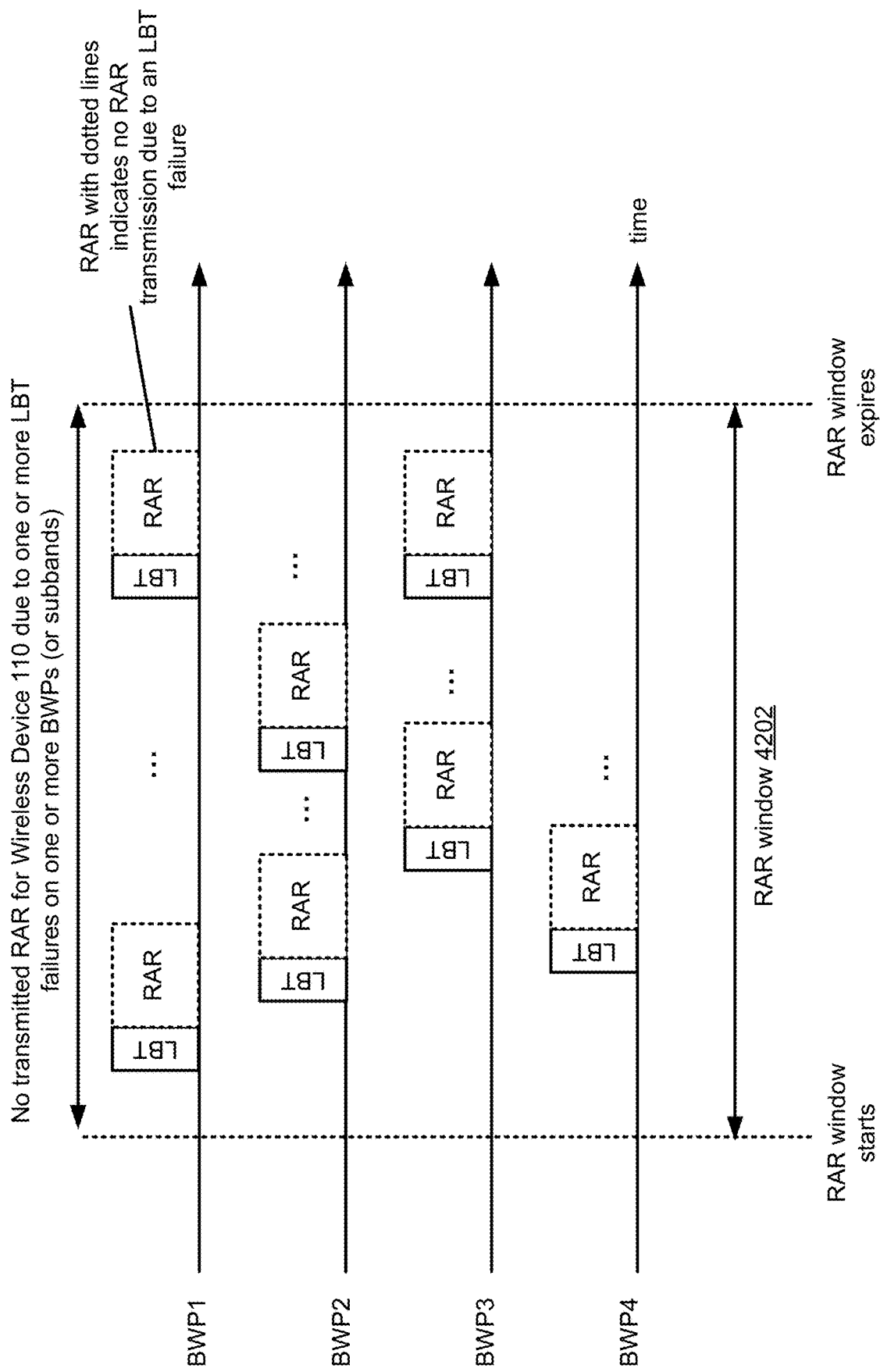
FIG. 42 shows an example LBT procedure.

FIG. 42 shows an example LBT procedure. A base station may perform an LBT procedure on 4 BWPs configured for a wireless device. The base station may perform the LBT procedures, for example, based on receiving RAP(s). A different quantity of BWPs may be used in other examples. A BWP in FIG. 42 may be interchangeable with a channel, a subband, and/or a carrier. A base station may perform one or more LBT procedures on one or more BWPs, channels, subbands, carriers, and/or a combination thereof. The base station may fail to transmit a downlink control message (e.g., a downlink MAC packet comprising an RAR, a downlink control signal), for example, if all (or one or more) LBT procedures in the RAR window 4202 fail.

Failure in transmitting a downlink control message (e.g., a downlink MAC packet comprising an RAR, a downlink control signal) due to LBT procedure failures may cause delay in an RA procedure. A wireless device that does not receive any RAR in an RAR window may determine that an RAR reception was not successful and may transmit another RAP to initiate the RA procedure. Failure in transmitting an RAR due to LBT procedure failures may increase power consumption of a wireless device. The wireless device may, for example, increase a transmit power (e.g., incremented by a ramping power step) and retransmit an RAP. The wireless device may, for example, consume more power to monitor a control channel as a quantity of retransmissions gets larger.

Figure 43:
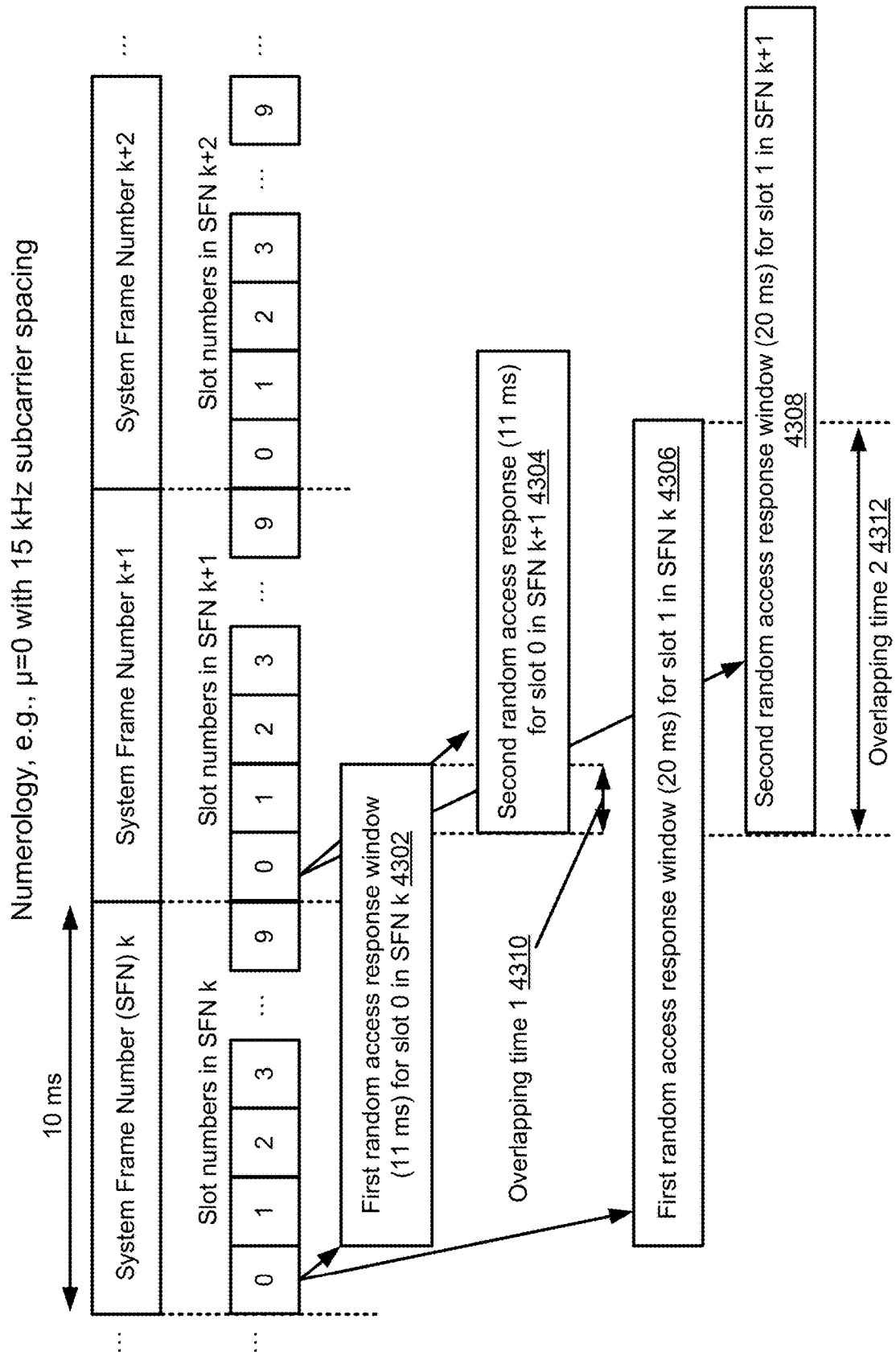
FIG. 43 shows an example of RAR window management procedure.

Increasing a length of an RAR window may provide, to a base station, more transmission opportunities to transmit an RAR, but a length of a system frame (e.g., 10 ms) may limit the size of an RAR window. FIG. 43 shows an example RAR window management procedure corresponding to RAR windows with lengths greater than a system frame length. FIG. 43 corresponds to numerology $\mu=0$. A length of a system frame may be, for example, 10 ms (or any other length). RAR windows may be extended beyond a length of a system frame (e.g., any length greater than 10 ms).

A first wireless device may start a first RAR window 4302 (e.g., 11 ms length) from slot 1 in SFN k. The first RAR window 4302 may expire at a last symbol (e.g., at the end of or during the last symbol) of slot 1 in SFN k+1. A second wireless device may start a second RAR window 4304 (e.g., 11 ms length) from slot 1 in SFN k+1. The second RAR window 4304 may expire at a last symbol (e.g., at the end of or during the last symbol) of slot 1 in SFN k+2. The first RAR window 4302 and the second RAR window 4304 may overlap in at least a portion of the slot 1 in SFN k+1 (e.g., shown as overlapping time 4310).

The first wireless device may send (e.g., transmit) a first RAP via slot 0 of SFN k. The second wireless device may send (e.g., transmit) a second RAP via slot 0 of SFN k+1. A base station may send (e.g., transmit) a first RAR in the first RAR window 4302 and a second RAR in the second RAR window 4304. The first wireless device may receive the first RAR based on a first radio network identifier (e.g., a first RA_RNTI). The second wireless device may receive a second RAR based on a second radio network identifier (e.g., a second RA-RNTI).

Using an RA-RNTI equation that may not use an SFN for calculating RA-RNTI (e.g., Equation (1)) may result in the first RA-RNTI and the second RA-RNTI being identical. This may be because both the first RAPs and the second RAPs may be transmitted in a same slot number (e.g., slot 0). Both the first RAP and the second RAP, for example, may have identical t_ids. A base station may send (e.g., transmit) an RAR during the overlapping time 4310. The first wireless device and the second wireless device may not determine whether the response is for the first wireless device or the second wireless device, for example if the first RA-RNTI and the second RA-RNTI are identical.

It may be uncertain (e.g., at the wireless device) whether a downlink control message (e.g., an RAR such as the first RAR or the second RAR) is for the first wireless device or the second wireless device, for example, if a base station transmits an RAR using an RA-RNTI that does not dependent on a system frame number (e.g., an RA-RNTI determined using Equation (1)).

The first wireless device may detect the first RAR and the second RAR (or at least one of the first RAR and the second RAR) in the overlapping time 4310, for example, and may be unable to distinguish which of the first RAR and the second RAR corresponds the first RAP transmitted by the first wireless device.

The base station may not transmit (e.g., refrain from transmitting) one or more a downlink control messages (e.g., RARs such as the first RAR and/or the second RAR) in the overlapping time 4310, for example, to avoid the above problem from overlapping RARs. This lack of transmission may result in a delay in completing an RA procedure. The base station may not transmit (e.g., refrain from transmitting), for example, the second RAR for the second wireless device in the overlapping time 4310. This lack of transmission may result in a delay in completing an RA procedure at the second wireless device.

The delay in completing an RA procedure may increase proportionally relative to a difference between an RAR window size and a system frame duration. The first wireless device may start a first RAR window 4306 (e.g., 20 ms length) from slot 1 in SFN k. The first RAR window 4306 may expire at a last symbol (e.g., at the end of or during the last symbol) of slot 0 in SFN k+2. The second wireless device may start a second RAR window 4308 (e.g., 20 ms length) from slot 1 in SFN k+1. The second RAR window 4308 may expire at a last symbol (e.g., at the end of or during the last symbol) of slot 0 in SFN k+3. The first RAR window and the second RAR window may overlap in at least a portion of the SFN k+1 and SFN k+2 (e.g., shown as overlapping time 4312). The base station may transmit a first RAR to the first wireless device, for example, in the overlapping time 4312 and may refrain from transmitting a second RAR to the second wireless device in the overlapping time 4312. This may cause at least a 10 ms delay in transmission of the second RAR.

As described with reference to FIG. 43, an RAR window that is longer than a length of a system frame may provide, to a base station, more transmission opportunities, but may cause a collision between downlink control messages (e.g., an medium access control packet comprising RARs, a downlink control signal), corresponding to different wireless devices. A downlink control message (e.g., an medium access control packet comprising an RAR, a downlink control signal) may be configured to indicate a system frame number corresponding to an RA procedure to avoid collision. A radio network identifier (e.g., an RA-RNTI) used in an RA procedure may be calculated based on an indication of a system frame number (e.g., an SFN_id) corresponding to the RA procedure. The system frame number corresponding to the RA procedure may be a system frame in which an RAP is transmitted. A downlink control message (e.g., a medium access control packet comprising an RAR, a downlink control signal) may be configured to indicate (e.g., in a MAC subheader) a system frame number in which a corresponding RAP is transmitted.

A wireless device and/or a base station may determine (e.g., calculate) an RA-RNTI as:

$$RA\text{-RNTI} = 1 + s\_id + 14 \times t\_id + 14 \times 80 \times f\_id + 14 \times 80 \times 8 \times ul\_carrier\_id + 14 \times 80 \times 8 \times 2 \times SFN\_id, \text{ or} \quad \text{Equation (2)}$$

$$RA\text{-RNTI} = 1 + s\_id + 14 \times t\_id + 14 \times 80 \times f\_id + 14 \times 80 \times 8 \times SFN\_id + 14 \times 80 \times 8 \times \max SFN\_id \times ul\_carrier\_id, \text{ or} \quad \text{Equation (3)}$$

$$RA\text{-RNTI} = 1 + s\_id + 14 \times t\_id + 14 \times 80 \times SFN\_id + 14 \times 80 \times \max SFN\_id \times f\_id + 14 \times 80 \times 8 \times \max SFN\_id \times ul\_carrier\_id, \quad \text{Equation (4)}$$

where s_id may be an index of a first OFDM symbol of a specified PRACH (e.g., 0≤s_id<14), t_id may be an index of a first slot of the specified PRACH in a first system frame (e.g., 0≤t_id<80), f_id may be an index of the specified PRACH in the frequency domain (e.g., 0≤f_id<8), ul_carrier_id may be an UL carrier (e.g., 0 for NUL carrier, and 1 for SUL carrier, or vice versa) used for Msg1 (e.g., Msg1 1220 and/or 1620) transmission, SFN_id may be an index of the first system frame (e.g., 0≤SFN_id<1023), and maxSFN_id may be predefined, and/or may be associated with a range and/or a size of SFNs. The first system frame may be, for example, a system frame in which an RAP is transmitted. MaxSFN_id may be 1+max(SFN_id) (e.g., maxSFN_id=1024). MaxSFN_id may be 1+total quantity of SFNs (e.g., maxSFN_id=1024). The Equations (2)-(4) correspond to an example where a numerology t=3 μs used. RA-RNTI calculation may be generalized, for example, for other numerologies as:

$$\begin{aligned}RA\text{-}RNTI = & \ 1 + s\_id + (num\_s\_id \times t\_id) + \\ & (num\_s\_id \times num\_t\_id \times f\_id) + \\ & (num\_s\_id \times num\_t\_id \times num\_f\_id \times ul\_carrier\_id) + \\ & (num\_s\_id \times num\_t\_id \times num\_f\_id \times \\ & \quad num\_ul\_carrier\_id \times SFN\_id), \text{ or}\end{aligned} \quad \text{Equation (5)}$$

$$\begin{aligned}RA\text{-}RNTI = & \ 1 + s\_id + (num\_s\_id \times t\_id) + \\ & (num\_s\_id \times num\_t\_id \times f\_id) + \\ & (num\_s\_id \times num\_t\_id \times \\ & \quad num\_f\_id \times SFN\_id) + \\ & (num\_s\_id \times num\_t\_id \times num\_f\_id \times \\ & \quad num\_SFN\_id \times ul\_carrier\_id), \text{ or}\end{aligned} \quad \text{Equation (6)}$$

$$\begin{aligned}RA\text{-}RNTI = & \ 1 + s\_id + (num\_s\_id \times t\_id) + \\ & (num\_s\_id \times num\_t\_id \times SFN\_id) + \\ & (num\_s\_id \times num\_t\_id \times num\_SFN\_id \times \\ & \quad f\_id) + (num\_s\_id \times num\_t\_id \times \\ & \quad num\_SFN\_id \times \\ & \quad num\_f\_id \times ul\_carrier\_id),\end{aligned} \quad \text{Equation (7)}$$

where s_id may be an index of a first OFDM symbol of a specified PRACH (e.g., 0≤s_id<num_s_id), t_id may be an index of a first slot of the specified PRACH in a first system frame (e.g., 0≤t_id<num_t_id), f_id may be an index of the specified PRACH in the frequency domain (e.g., 0≤f_id<num_f_id), ul_carrier_id may be an UL carrier (e.g., 0 for NUL carrier, and 1 for SUL carrier or vice versa) used for Msg1 transmission (e.g., Msg1 1220 and/or 1620), SFN_id may be an index of the first system frame (e.g., 0≤SFN_id<num_SFN_id). The first system frame may be, for example, a system frame in which an RAP is transmitted. Other ranges may be used for one or more of the variables s_id, t_id, SFN_id, f_id, and/or ul_carrier_id. A range of s_id may be 1≤s_id<num_s_id+1. The range of s_id may be expressed as 1≤s_id<num_s_id*, where num_s_id*=num_s_id+1. Equations (5)-(7) may be modified based on a maximum value of each variable. Num_s_id may be replaced by num_s_id* in the Equations (5)-(7). T_id, SFN_id, f_id, and ul_carrier_id may be modified in a similar manner.

Num_s_id may be a total quantity (e.g., number) of symbols in a slot according to a configured numerology. As shown in FIG. 40, for example, a quantity of symbols in a slot may be defined as per a configured numerology. There may be, for example, 14 symbols in a slot for numerology $\mu=0$ and $\mu=1$, and 12 symbols in a slot for numerology $\mu=2$ with an extended cyclic prefix. A wireless device and/or a base station may determine num_s_id, for example, based on the configured numerology. Num_s_id may be 12, for example, if a wireless device is configured with a numerology $\mu=2$ with an extended cyclic prefix. Num_s_id may be fixed to one of possible candidate values. Num_s_id may be fixed to a largest value among available values. Num_s_id may be 14, for example, if a wireless device is configured with a numerology $\mu=2$ with an extended cyclic prefix. An RA procedure may not support numerology $\mu=4$, in one or more examples. Num_s_id may be set to a largest value among available values in one one or more supported numerologies. Num_s_id may be set to 14, for example, if numerologies t=0, 1, 2, and 3 are available as per the numerology configuration of FIG. 40.

Num_t_id may be a total quantity (e.g., number) of slots in a system frame according to a configured numerology. As shown in FIG. 40, for example, a quantity of slots in a system frame may be defined determined per a configured numerology. There may be, for example, 14 symbols in a slot for numerology $\mu=0$ and 1, and 20 slots in a system frame for numerology $\mu=1$. A wireless device and/or a base station may determine num_t_id, for example, based on the configured numerology. Num_t_id may be 20, for example, if a wireless device is configured with a numerology=1Num_t_id may be fixed to one of possible candidate values. Num_t_id may be fixed to a largest value among available values. Num_t_id may be 160, for example, if a wireless device is configured with a numerology $\mu=1$. An RA procedure may not support numerology one or more numerologies in one or more examples. An RA procedure may not support numerology $\mu=4$, in one or more examples. Num_t_id may be set to 80, for example, if numerologies $\mu=0$, 1, 2, and 3 are available as per the numerology configuration of FIG. 40.

Num_SFN_id may be a total quantity (e.g., number) of system frames in a system. SFN may be defined within a range from 0 to 1023 (and/or from 1 to 1024). SFN may be defined within a range from $2^0-1$ to $2^x-1$ (and/or from $2^0$ to $2^x$), where x may be zero or a positive integer.

Num_SFN_id may be a total quantity of SFNs in the range. Num_SFN_id may be, for example, $2^x-2^0+1$. Num_SFN_id may be a largest quantity in a range (e.g., $2^x-1$ for a range from $2^0-1$ to $2^x-1$ or $2^x$ for a range from $2^0$ to $2^x$).

An RA-RNTI may be determine (e.g., calculated) without using an ul_carrier_id, for example, depending on an SUL configuration. An RA-RNTI may be, for example, for a cell with an SUL carrier:

$$RA\text{-}RNTI = 1 + s\_id + (num\_s\_id \times t\_id) + \\ (num\_s\_id \times num\_t\_id \times f\_id) + \\ (num\_s\_id \times num\_t\_id \times num\_f\_id \times SFN\_id) + \\ (num\_s\_id \times num\_t\_id \times num\_f\_id \times \\ num\_SFN\_id \times ul\_carrier\_id), \text{ or} \quad \text{Equation (8)}$$

$$RA\text{-}RNTI = 1 + s\_id + (num\_s\_id \times t\_id) + \\ (num\_s\_id \times num\_t\_id \times SFN\_id) + \\ (num\_s\_id \times num\_t\_id \times num\_SFN\_id \times f\_id) + \\ (num\_s\_id \times num\_t\_id \times \\ num\_SFN\_id \times num\_f\_id \times ul\_carrier\_id). \quad \text{Equation (9)}$$

-continued

For a cell without an *SUL* carrier, an *RA-RNTI* may be: Equation (10)

$$RA\text{-}RNTI = 1 + s\_id + (num\_s\_id \times t\_id) + \\ (num\_s\_id \times num\_t\_id \times f\_id) + \\ (num\_s\_id \times num\_t\_id \times num\_f\_id \times SFN\_id), \text{ or}$$

$$RA\text{-}RNTI = 1 + s\_id + (num\_s\_id \times t\_id) + \\ (num\_s\_id \times num\_t\_id \times SFN\_id) + \\ (num\_s\_id \times num\_t\_id \times num\_SFN\_id \times f\_id). \quad \text{Equation (11)}$$

Equations (8) and (9) use an ul_carrier_id and Equations (10) and (11) do not use an ul_carrier_id for calculating an RA-RNTI.

An RA-RNTI may be determined (e.g., calculated) using a BWP index, for example, in a communication system using multiple BWPs. An RA-RNTI may be determined (e.g., calculated) as:

$$RA\text{-}RNTI = 1 + s\_id + (num\_s\_id \times t\_id) + \\ (num\_s\_id \times num\_t\_id \times SFN\_id) + \\ (num\_s\_id \times num\_t\_id \times num\_SFN\_id \times f\_id) + \\ (num\_s\_id \times num\_t\_id \times \\ num\_SFN\_id \times num\_f\_id \times bwp\_id) + \\ (num\_s\_id \times num\_t\_id \times num\_SFN\_id \times \\ num\_f\_id \times num\_bwp\_id \times ul\_carrier\_id), \quad \text{Equation (12)}$$

where num_bwp_id may be a total quantity (e.g., number) of configured UL BWPs, bwp_id may be an indicator of a BWP, among the configured UL BWPs, in which a wireless device may transmit an RAP. Bwp_id may be calculated as a BWP index (e.g., in a decimal value)−1. A BWP index for a third BWP may be 3, a bwp_id corresponding to the BWP index may be 2, and num_bwp_id may be 4, for example, if a wireless device is configured with 4 BWPs and transmits on the third BWP. A wireless device may be configured with an initial BWP (and/or a single BWP). An RA-RNTI may be determine (e.g., calculated) as:

$$RA\text{-}RNTI = 1 + s\_id + (num\_s\_id \times t\_id) + \\ (num\_s\_id \times num\_t\_id \times SFN\_id) + \\ (num\_s\_id \times num\_t\_id \times num\_SFN\_id \times f\_id) + \\ (num\_s\_id \times num\_t\_id \times num\_SFN\_id \times \\ num\_f\_id \times ul\_carrier\_id). \quad \text{Equation (13)}$$

Figure 44:
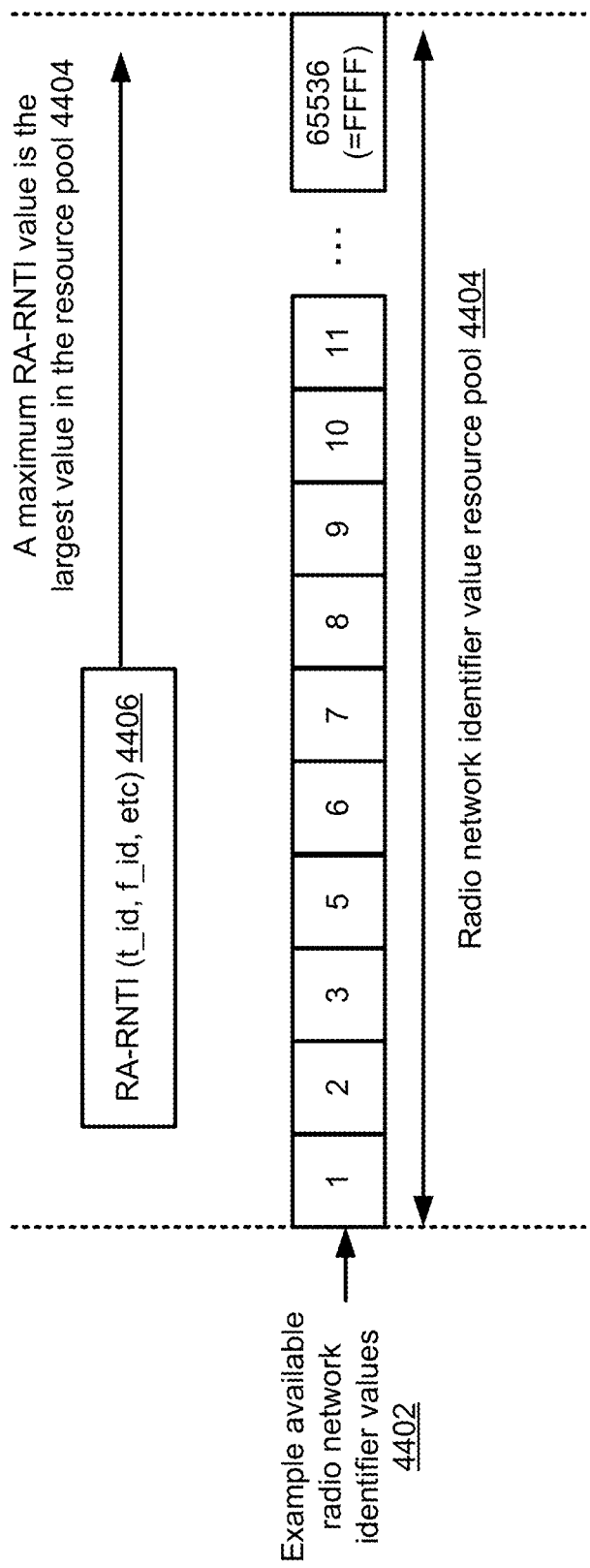
FIG. 44 shows example candidate radio network identifier values.

A radio access technology system may limit a maximum value of (and/or a range of) a RA-RNTI. A base station may assign a fixed quantity (e.g., number) of bits to represent RA-RNTI. A base station and a wireless device may assign 16 bits for representing an RA-RNTI value. FIG. 44 shows an example of possible candidate radio network identifier values 4402 in a resource pool 4404. The possible candidate radio network identifiers 4402 may be RNTIs (e.g., RA-RNTIs). The possible radio network identifiers 4402 may correspond to an example in which 16 bits are assigned to represent a radio network identifier value. An RA-RNTI 4406 may be one of values in a range from 1 to 65536 (or FFFF in hexadecimal). Other numbers of bits may be used to represent the radio network identifiers 4402. A base station may reserve one or more values within this range (e.g., values in the resource pool 4402) for other purposes. The base station may reserve the one or more values, for example, for future use and/or for representing other types of RNTIs different from RA-RNTIs (e.g., paging-RNTIs, system information-RNTIs, etc.). A wireless device and/or a base station may not use the reserved one or more values as RA-RNTI values.

A quantity (e.g., number) of RA-RNTI values in the resource pool 4404 may increase, for example, if a range of any of variables used for calculating an RA-RNTI gets larger and/or more variables are introduced for calculating an RA-RNTI. Using a system frame number for calculating an RA-RNTI, for example, may increase the quantity of RA-RNTI values in the resource pool 4404. The quantity of RA-RNTI values in the resource pool 4404 may increase, for example, as a range of any of variables used in an RA-RNTI equation (e.g., Equations (1)-(12)) gets larger. Num_t_id may be 160, for example, if numerology $\mu=4$ µs supported in an RA procedure. This value of num_t_id may result in an RA-RNTI value that may be larger than an RA-RNTI value generated using Num_t_id=80 (e.g., corresponding to numerology $\mu=3$). The RA-RNTI resource pool 4404 may become larger, for example, if more than 4 BWPs are allowable. A maximum value of an RA-RNTI may be 17920, for example, in a first communication protocol (e.g., in an NR communication system) that supports numerology $\mu=3$ with 80 slots per system frame in an RA procedure. This value may result from using Equation (1) with an SUL carrier (e.g., 1+13+14×79+14×80×7+14×80×8×1=17920). A maximum RA-RNTI value may be 35840, for example, in a second communication protocol (e.g., in an NR communication system) that supports numerology $\mu=4$ with 160 slots per system frame in an RA procedure. An RA-RNTI, for example, if numerology $\mu=4$ with 160 slots per system frame is supported, may be determined (e.g., calculated) as:

$$RA\text{-}RNTI = 1 + s\_id + 14 \times t\_id + 14 \times 160 \times f\_id + 14 \times 160 \times 8 \times ul\_carrier\_id \quad (14)$$

A maximum RA-RNTI value determined (e.g., calculated) as per Equation (14) may be 35840 (e.g., 1+13+14×159+14×160×7+14×160×8×1=35840).

A communication system may assign one or more additional bits to represent a larger RA-RNTI. Assigning additional one or more bits may be beneficial, for example, if an RNTI value resource pool does not have enough values to support the communication system.

In at least some communication protocols, increasing a quantity of parameters used for an RA-RNTI calculation, and/or changing a range (e.g., increasing the range) of one or more parameters, may result in one or more RA-RNTI values exceeding a range that may be supported by RA procedures (e.g., corresponding to one or more communication protocols). Assigning additional bits to accommodate a larger RA-RNTI range may cause inefficient usage of radio resources. A radio access technology system may need only a small quantity (e.g., number) of RA-RNTI values from the resource pool, for example, for one or more of a total quantity of RACH occasions in a system frame. Using Equations (1)-(12) to determine (e.g., generate) an RA-RNTI may increase an RA-RNTI value, for example, even if only a small number of RA-RNTIs are required. Determining an RA-RNTI value using one or more additional parameters (e.g., SFN_id as used in Equations (1)-(13)) may be accommodated using additional bits. These added bits may result in unnecessary overhead if an existing RA-RNTI resource pool (e.g., that does not use an SFN_id parameter) has enough values to support a communication system.

Figure 45:
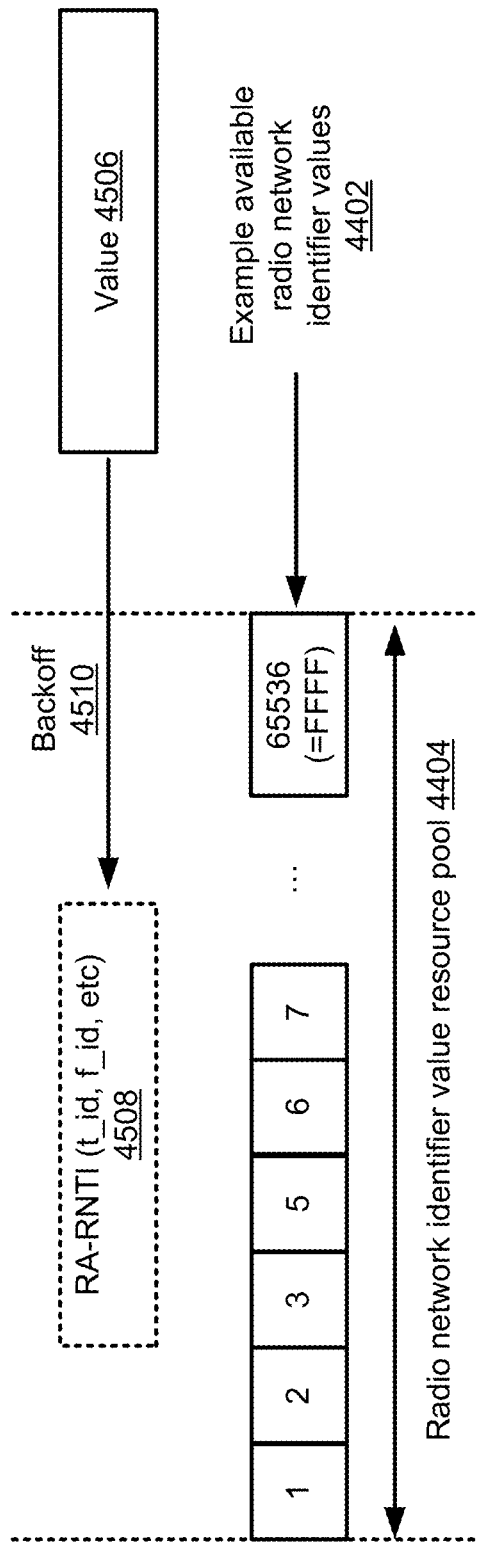
FIG. 45 shows an example of an enhanced radio network identifier calculation.

An enhanced RA mechanism as described herein may improve RA-RNTI allocation without increasing a number of bits. FIG. 45 shows an example of an enhanced radio network identifier calculation. The enhanced radio network identifier (e.g., RA-RNTI) calculation may use a backoff mechanism to reduce a quantity (e.g., number) of bits that may be required to represent the radio network identifier value. The backoff may be generated based on modulo operation, subtraction, etc. A device (e.g., base station, wireless device, etc.) may determine (e.g., generate) a value 4506 (e.g., using one or more of Equations (1)-(14)). The device may perform a backoff operation 4510 to determine a radio network identifier 4508. The backoff operation 4510 may ensure that the generated radio network identifier is within the resource pool 4404 that may be represented by a smaller quantity of bits.

A radio network identifier (e.g., an RA-RNTI) may be determined (e.g., calculated) using a modulo operation to reduce a quantity of bits required to represent the radio network identifier.

The modulo operation may use one or more values selected from a range of radio network identifier values that may be supported by a communication system. Various equations for determining (e.g., calculating) an RA-RNTI value may be modified to include a modulo operation, for example, to reduce a quantity of bits. Equations (1)-(14) for determining an RA-RNTI may be modified to include a modulo operation with one of values between 1 and 65536, for example, if the communication system uses 16 bits for representing an RA-RNTI. The one of values may be a largest value in a RNTI values, barring one or more reserved RNTI values.

The one of values may be 65535, for example, if 65536 is reserved for other purposes.

A wireless device and/or a base station may determine (e.g., calculate) an RA-RNTI as:

$$RA\text{-}RNTI = (1 + s\_id + 14 \times t\_id + 14 \times 80 \times f\_id + 14 \times 80 \times 8 \times ul\_carrier\_id + 14 \times 80 \times 8 \times 2 \times SFN\_id) \bmod maxRNTI, \text{ or} \quad \text{Equation (15)}$$

$$RA\text{-}RNTI = (1 + s\_id + 14 \times t\_id + 14 \times 80 \times f\_id + 14 \times 80 \times 8 \times SFN\_id + 14 \times 80 \times 8 \times maxSFN\_id \times ul\_carrier\_id) \bmod maxRNTI, \text{ or} \quad \text{Equation (16)}$$

$$RA\text{-}RNTI = (1 + s\_id + 14 \times t\_id + 14 \times 80 \times SFN\_id + 14 \times 80 \times maxSFN\_id \times f\_id + 14 \times 80 \times 8 \times maxSFN\_id \times ul\_carrier\_id) \bmod maxRNTI, \quad \text{Equation (17)}$$

where s_id may be an index of a first OFDM symbol of a specified PRACH (e.g., $0 \le s\_id < 14$), t_id may be an index of a first slot of the specified PRACH in a first system frame (e.g., $0 \le t\_id < 80$), f_id may be an index of the specified PRACH in the frequency domain (e.g., $0 \le f\_id < 8$), ul_carrier_id may be an UL carrier (e.g., 0 for NUL carrier, and 1 for SUL carrier or vice versa) used for Msg1 transmission (e.g., Msg1 1220 and/or Msg1 1620), SFN_id may be an index of the first system frame (e.g., $0 \le SFN\_id < 1023$), maxSFN_id may be predefined, and/or may be associated with a range and/or a size of SFNs. The first system frame may be, for example, a system frame in which an RAP is transmitted. MaxSFN_id may be 1+max(SFN_id) (e.g., maxSFN_id=1024). MaxSFN_id may be 1+total quantity of SFNs (e.g., maxSFN_id=1024). a mod b may be a modulo operation that may return a remainder after division of a by b, where a may be a dividend and b may be a divisor. MaxRNTI may be a value selected from a range of RNTI values supported by a given quantity of bits representing the RNTI values. The RA-RNTI determinations (e.g., calculation, equations, etc.) described herein may comprise a modulo operation using one of values between 1 and 65536, for example, if an RNTI value is represented using 16 bits. The one of values may be 65536. The one of values may be a largest value in a range of RA-RNTI values, barring one or more reserved RNTI values. The one of values may be 65535, for example, if 65536 µs reserved for other purposes.

A wireless device and/or a base station may determine (e.g., calculate) an RA-RNTI as:

$$RA\text{-}RNTI = (1 + s\_id + (num\_s\_id \times t\_id) + \\ (num\_s\_id \times num\_t\_id \times f\_id) + \\ (num\_s\_id \times num\_t\_id \times num\_f\_id \times ul\_carrier\_id) + \\ (num\_s\_id \times num\_t\_id \times num\_f\_id \times \\ num\_ul\_carrier\_id \times SFN\_id)) \bmod maxRNTI, \text{ or} \quad \text{Equation (18)}$$

$$RA\text{-}RNTI = (1 + s\_id + (num\_s\_id \times t\_id) + \\ (num\_s\_id \times num\_t\_id \times f\_id) + \\ (num\_s\_id \times num\_t\_id \times num\_f\_id \times SFN\_id) + \\ (num\_s\_id \times num\_t\_id \times num\_f\_id \times num\_SFN\_id \times \\ ul\_carrier\_id)) \bmod maxRNTI, \text{ or} \quad \text{Equation (19)}$$

$$RA\text{-}RNTI = (1 + s\_id + (num\_s\_id \times t\_id) + \\ (num\_s\_id \times num\_t\_id \times SFN\_id) + \\ (num\_s\_id \times num\_t\_id \times num\_SFN\_id \times f\_id) + \\ (num\_s\_id \times num\_t\_id \times num\_SFN\_id \times \\ num\_f\_id \times ul\_carrier\_id)) \bmod maxRNTI, \quad \text{Equation (20)}$$

where s_id may be an index of a first OFDM symbol of a specified PRACH (e.g., 0≤s_id<num_s_id), t_id may be an index of a first slot of the specified PRACH in a first system frame (e.g., 0≤t_id<num_t_id), f_id may be an index of the specified PRACH in the frequency domain (e.g., 0≤f_id<num_f_id), ul_carrier_id may be the UL carrier (e.g., 0 for NUL carrier, and 1 for SUL carrier or vice versa) used for Msg1 transmission (e.g., Msg1 1220 and/or Msg1 1620), and SFN_id may be an index of the first system frame (e.g., 0≤SFN_id<num_SFN_id). The first system frame may be, for example, a system frame in which an RAP is transmitted. Other ranges may be used for one or more of the variables s_id, t_id, SFN_id, f_id, and ul_carrier_id may be shifted. A range of s_id may be 1≤s_id<num_s_id+1. The range of s_id may be expressed as 1≤s_id<num_s_id*, where num_s_id*=num_s_id+1.

Equations (18)-(20) may be modified based on a maximum value of each variable. Num_s_id may be replaced by num_s_id* in the Equations (18)-(20)). T_id, SFN_id, f_id, and ul_carrier_id may be modified in a similar way. MaxRNTI may be a value selected from a range of RNTI values supported by a given number of bits representing the RNTI values. The RA-RNTI determination (e.g., calculation) equations in this disclosure may comprise a modulo operation with one of values between 1 and 65536, for example, if an RNTI value is represented using 16 bits. The one of values may be 65536. The one of values may be a largest value in a range of RA-RNTI values, barring one or more reserved RNTI values. The one of values may be 65535, for example, if 65536 µs reserved for other purpose.

An RA-RNTI may be determined without using an ul_carrier_id, for example, depending on an SUL configuration. An RA-RNTI may be, for example, for a cell with an SUL carrier:

$$RA\text{-}RNTI = (1 + s\_id + (num\_s\_id \times t\_id) + \\ (num\_s\_id \times num\_t\_id \times f\_id) + \\ (num\_s\_id \times num\_t\_id \times num\_f\_id \times SFN\_id) + \\ (num\_s\_id \times num\_t\_id \times num\_f\_id \times num\_SFN\_id \times \\ ul\_carrier\_id)) \bmod maxRNTI, \text{ or} \quad \text{Equation (21)}$$

$$RA\text{-}RNTI = (1 + s\_id + (num\_s\_id \times t\_id) + \\ (num\_s\_id \times num\_t\_id \times SFN\_id) + \\ (num\_s\_id \times num\_t\_id \times num\_SFN\_id \times f\_id) + \\ (num\_s\_id \times num\_t\_id \times num\_SFN\_id \times \\ num\_f\_id \times ul\_carrier\_id)) \bmod maxRNTI. \quad \text{Equation (22)}$$

An RA-RNTI may be, for example, for a cell without an SUL carrier:

$$RA\text{-}RNTI = (1 + s\_id + (num\_s\_id \times t\_id) + (num\_s\_id \times \\ num\_t\_id \times f\_id) + (num\_s\_id \times num\_t\_id \times \\ num\_f\_id \times SFN\_id)) \bmod maxRNTI, \text{ or} \quad \text{Equation (23)}$$

$$RA\text{-}RNTI = (1 + s\_id + (num\_s\_id \times t\_id) + (num\_s\_id \times \\ num\_t\_id \times SFN\_id) + (num\_s\_id \times num\_t\_id \times \\ num\_SFN\_id \times f\_id)) \bmod maxRNTI. \quad \text{Equation (24)}$$

Equations (21) and (22) use an ul_carrier_id and Equations (23) and (24) do not use an ul_carrier_id for determining an RA-RNTI.

An RA-RNTI may be determined using a bwp index, for example, in a communication system using multiple BWPs. An RA-RNTI may be determined (e.g., calculated) as:

$$RA\text{-}RNTI = (1 + s\_id + (num\_s\_id \times t\_id) + \\ (num\_s\_id \times num\_t\_id \times SFN\_id) + \\ (num\_s\_id \times num\_t\_id \times num\_SFN\_id \times f\_id) + \\ (num\_s\_id \times num\_t\_id \times num\_SFN\_id \times \\ num\_f\_id \times bwp\_id) + \\ (num\_s\_id \times num\_t\_id \times num\_SFN\_id \times num\_f\_id \times \\ num\_bwp\_id \times ul\_carrier\_id)) \bmod maxRNTI, \quad \text{Equation (25)}$$

where num_bwp_id may be a total quantity of configured UL BWPs, bwp_id may be an indicator of a BWP, among the configured UL BWPs, in which a wireless device may transmit an RAP. Bwp_id may be equal to BWP index (e.g., an index in a decimal value)−1. A BWP index for a third BWP may be 3, a bwp_id corresponding to the BWP index may be 2, and num_bwp_id may be 4, for example, if a wireless device is configured with 4 BWPs and transmits on the third BWP. A wireless device may be configured with an initial BWP (and/or a single BWP). An RA-RNTI may be determined (e.g., calculated) as:

$$RA\text{-}RNTI = (1 + s\_id + (num\_s\_id \times t\_id) + \\ (num\_s\_id \times num\_t\_id \times SFN\_id) + \\ (num\_s\_id \times num\_t\_id \times num\_SFN\_id \times f\_id) + \\ (num\_s\_id \times num\_t\_id \times num\_SFN\_id \times \\ num\_f\_id \times ul\_carrier\_id)) \bmod maxRNTI. \quad \text{Equation (26)}$$

Various equations for determining (e.g., calculating) an RA-RNTI value may be modified to include a subtraction operation to reduce a quantity of bits. A wireless device and/or a base station may determine (e.g., calculate) an RA-RNTI based on a backoff value, backoff, as:

$$RA\text{-}RNTI = (1 + s\_id + 14 \times t\_id + 14 \times 80 \times f\_id + 14 \times 80 \times 8 \times ul\_carrier\_id + 14 \times 80 \times 8 \times 2 \times SFN\_id) - \text{backoff, or} \quad \text{Equation (27)}$$

$$RA\text{-}RNTI = (1 + s\_id + 14 \times t\_id + 14 \times 80 \times f\_id + 14 \times 80 \times 8 \times SFN\_id + 14 \times 80 \times 8 \times \text{maxSFN}\_id \times ul\_carrier\_id) - \text{backoff, or} \quad \text{Equation (28)}$$

$$RA\text{-}RNTI = (1 + s\_id + 14 \times t\_id + 14 \times 80 \times SFN\_id + 14 \times 80 \times \text{maxSFN}\_id \times f\_id + 14 \times 80 \times 8 \times \text{maxSFN}\_id \times ul\_carrier\_id) - \text{backoff}, \quad \text{Equation (29)}$$

where s_id may be an index of a first OFDM symbol of a specified PRACH (e.g., $0 \leq s\_id < 14$), t_id may be an index of a first slot of the specified PRACH in a first system frame (e.g., $0 \leq t\_id < 80$), f_id may be an index of the specified PRACH in the frequency domain (e.g., $0 \leq f\_id < 8$), ul_carrier_id may be an UL carrier (e.g., 0 for NUL carrier, and 1 for SUL carrier or vice versa) used for Msg1 transmission (e.g., Msg1 1220 and/or Msg1 1620), SFN_id may be an index of the first system frame (e.g., $0 \leq SFN\_id < 1023$), maxSFN_id may be predefined, and/or may be associated with a range and/or a size of SFNs. The first system frame may be, for example, a system frame in which an RAP is transmitted. MaxSFN_id may be 1+max(SFN_id) (e.g., maxSFN_id=1024). MaxSFN_id may be 1+total quantity of SFNs (e.g., maxSFN_id=1024). A value of backoff may be a predefined value or a value determined (e.g., calculated) based on one or more configured parameters. Backoff may be a largest value within a range of RNTI values supported by a given quantity of bits representing RNTI values. Backoff may be 65536, for example, if an RNTI value may be represented using 16 bits. Backoff may be a largest value in a range of RA-RNTI values, barring one or more reserved RNTI values. Backoff may be 65535, for example, if 65536 μs reserved for other purposes.

A wireless device and/or a base station may determine (e.g., calculate) an RA-RNTI as:

$$RA\text{-}RNTI = (1 + s\_id + (num\_s\_id \times t\_id) + (num\_s\_id \times num\_t\_id \times f\_id) + (num\_s\_id \times num\_t\_id \times num\_f\_id \times ul\_carrier\_id) + (num\_s\_id \times num\_t\_id \times num\_f\_id \times num\_ul\_carrier\_id \times SFN\_id)) - \text{backoff, or} \quad \text{Equation (30)}$$

$$RA\text{-}RNTI = (1 + s\_id + (num\_s\_id \times t\_id) + (num\_s\_id \times num\_t\_id \times f\_id) + (num\_s\_id \times num\_t\_id \times num\_f\_id \times SFN\_id) + (num\_s\_id \times num\_t\_id \times num\_f\_id \times num\_SFN\_id \times ul\_carrier\_id)) - \text{backoff, or} \quad \text{Equation (31)}$$

$$RA\text{-}RNTI = (1 + s\_id + (num\_s\_id \times t\_id) + (num\_s\_id \times num\_t\_id \times SFN\_id) + (num\_s\_id \times num\_t\_id \times num\_SFN\_id \times f\_id) + (num\_s\_id \times num\_t\_id \times num\_SFN\_id \times num\_f\_id \times ul\_carrier\_id)) - \text{backoff}, \quad \text{Equation (32)}$$

where s_id may be an index of a first OFDM symbol of a specified PRACH (e.g., $0 \leq s\_id < num\_s\_id$), t_id may be an index of a first slot of the specified PRACH in a first system frame (e.g., $0 \leq t\_id < num\_t\_id$), f_id may be an index of the specified PRACH in the frequency domain (e.g., $0 \leq f\_id < num\_f\_id$), ul_carrier_id may be the UL carrier (e.g., 0 for NUL carrier, and 1 for SUL carrier or vice versa) used for Msg1 transmission (e.g., Msg1 1220 and/or Msg1 1620), and SFN_id may be an index of the first system frame (e.g., $0 \leq SFN\_id < num\_SFN\_id$). The first system frame may be, for example, a system frame in which an RAP is transmitted. Other ranges may be used for one or more of the variables s_id, t_id, SFN_id, f_id, and ul_carrier_id may be shifted. A range of s_id may be $1 \leq s\_id < num\_s\_id + 1$. The range of s_id may be expressed as $1 \leq s\_id < num\_s\_id^*$, where num_s_id*=num_s_id+1.

Equations (30)-(32) may be modified based on a maximum value of each variable. Num_s_id may be replaced by num_s_id* in the Equations (30)-(32)). T_id, SFN_id, f_id, and ul_carrier_id may be modified in a similar way. Backoff may be a predefined value or a value determined (e.g., calculated) based on one or more configured parameters. Backoff may be a largest value within a range of RNTI values supported by a given quantity of bits representing RNTI values. Backoff may be 65536, for example, if an RNTI value may be represented using 16 bits. Backoff may be a largest value in a range of RA-RNTI values, barring one or more reserved RNTI values. Backoff may be 65535, for example, if 65536 μs reserved for other purposes.

An RA-RNTI may be determined (e.g., calculated) without using an ul_carrier_id, for example, depending on an SUL configuration. An RA-RNTI may be, for example, for a cell with an SUL carrier:

$$RA\text{-}RNTI = (1 + s\_id + (num\_s\_id \times t\_id) + (num\_s\_id \times num\_t\_id \times f\_id) + (num\_s\_id \times num\_t\_id \times num\_f\_id \times SFN\_id) + (num\_s\_id \times num\_t\_id \times num\_f\_id \times num\_SFN\_id \times ul\_carrier\_id)) - \text{backoff, or} \quad \text{Equation (33)}$$

$$RA\text{-}RNTI = (1 + s\_id + (num\_s\_id \times t\_id) + (num\_s\_id \times num\_t\_id \times SFN\_id) + (num\_s\_id \times num\_t\_id \times num\_SFN\_id \times f\_id) + (num\_s\_id \times num\_t\_id \times num\_SFN\_id \times num\_f\_id \times ul\_carrier\_id)) - \text{backoff}. \quad \text{Equation (34)}$$

An RA-RNTI may be, for example, for a cell without an SUL carrier:

$$RA\text{-}RNTI = (1 + s\_id + (num\_s\_id \times t\_id) + (num\_s\_id \times num\_t\_id \times f\_id) + (num\_s\_id \times num\_t\_id \times num\_f\_id \times SFN\_id)) - \text{backoff, or} \quad \text{Equation (35)}$$

$$RA\text{-}RNTI = (1 + s\_id + (num\_s\_id \times t\_id) + (num\_s\_id \times num\_t\_id \times SFN\_id) + (num\_s\_id \times num\_t\_id \times num\_SFN\_id \times f\_id)) - \text{backoff}. \quad \text{Equation (36)}$$

Equations (33) and (34) use an ul_carrier_id and Equations (35) and (36) do not use an ul_carrier_id for determining an RA-RNTI.

An RA-RNTI may be determined (e.g., calculated) using a bwp index, for example, in a communication system using multiple BWPs. An RA-RNTI may be determined (e.g., calculated) as:

$$RA\text{-}RNTI = (1 + s\_id + (num\_s\_id \times t\_id) + (num\_s\_id \times num\_t\_id \times SFN\_id) + (num\_s\_id \times num\_t\_id \times num\_SFN\_id \times f\_id) + (num\_s\_id \times num\_t\_id \times num\_SFN\_id \times num\_f\_id \times bwp\_id) + \quad \text{Equation (37)}$$

-continued $$(num\_s\_id \times num\_t\_id \times num\_SFN\_id \times$$
$$num\_f\_id \times num\_bwp\_id \times$$
$$ul\_carrier\_id)) - backoff,$$

where num_bwp_id may be a total quantity of configured UL BWPs, bwp_id may be an indicator of a BWP, among the configured UL BWPs, in which a wireless device may transmit an RAP. Bwp_id may be equal to BWP index (e.g., an index in a decimal value)−1. A BWP index for a third BWP may be 3, a bwp_id corresponding to the BWP index may be 2, and num_bwp_id may be 4, for example, if a wireless device is configured with 4 BWPs and transmits on the third BWP. A wireless device may be configured with an initial BWP (and/or a single BWP). An RA-RNTI may be determined (e.g., calculated) as:

$$RA\text{-}RNTI = (1 + s\_id + (num\_s\_id \times t\_id) +$$ Equation (38)
$$(num\_s\_id \times num\_t\_id \times SFN\_id) +$$
$$(num\_s\_id \times num\_t\_id \times num\_SFN\_id \times f\_id) +$$
$$(num\_s\_id \times num\_t\_id \times num\_SFN\_id \times$$
$$num\_f\_id \times ul\_carrier\_id)) - backoff.$$

An RA-RNTI determination (e.g., calculation) may need not account for all SFNs in a range of SFNs. An RA-RNTI determination may only use a quantity of system frames comprising a response window (e.g., defined by a response window parameter, such as ra-ResponseWindow). A value of the response window parameter may be a configured value (e.g., using RRC messaging), a variable value, or may be a fixed value. A response window may comprise at most two system frames, for example, if ra-ResponseWindow is set to 20 ms. An RA-RNTI determination may need to account for at most two system frames, for example, if ra-ResponseWindow is set to 20 ms. Accounting for a length of a response window in an RA-RNTI determination may prevent an RA-RNTI value from getting large (e.g., above a threshold).

Figure 46:
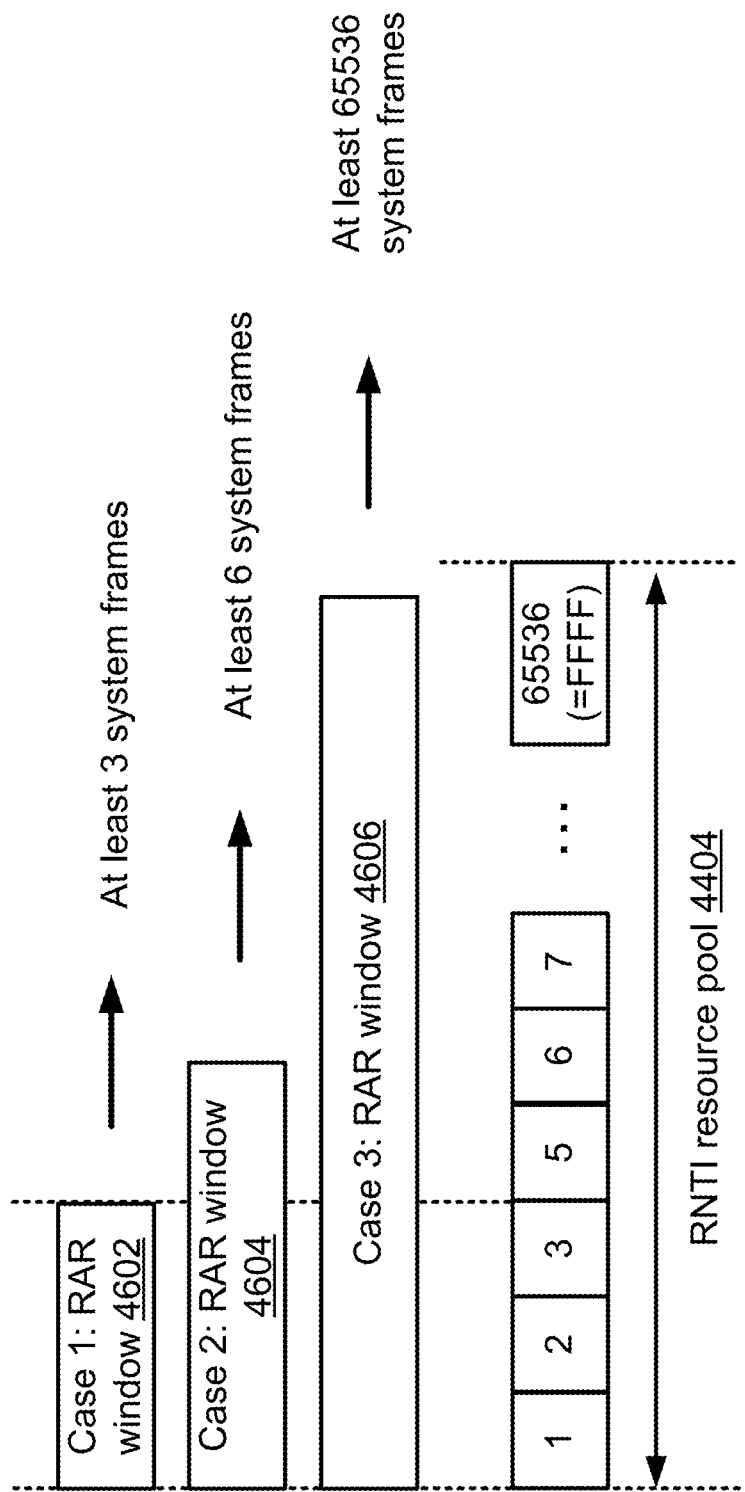
FIG. 46 shows an example dependency of RAR window size and a quantity of system frames in an RAR window.

FIG. 46 shows an example dependency of RAR window size and a quantity of system frames in an RAR window. Case 1 corresponds to an RAR window 4602 spanning at least 3 system frames. Case 2 corresponds to an RAR window 4604 spanning at least 6 system frames. Case 3 corresponds to an RAR window 4606 spanning at least 65536 system frames. With reference to case 2, at least 6 system frames need to be considered for RA-RNTI determination (e.g., calculation) since 6 system frames are included in an RAR window, but using too many system frames may result in larger RA-RNTI values.

A wireless device and/or a base station may determine (e.g., calculate) an RA-RNTI as:

$$RA\text{-}RNTI = 1 + s\_id + 14 \times t\_id +$$ Equation (39)
$$14 \times 80 \times f\_id + 14 \times 80 \times 8 \times ul\_carrier\_id +$$
$$14 \times 80 \times 8 \times 2 \times (SFN\_id \bmod RARms/SFNms), \text{ or}$$

$$RA\text{-}RNTI =$$ Equation (40)
$$1 + s\_id + 14 \times t\_id + 14 \times 80 \times f\_id + 14 \times 80 \times 8 \times$$
$$(SFN\_id \bmod RARms/SFNms) + 14 \times 80 \times 8 \times$$
$$(maxSFN\_id \bmod RARms/SFNms) \times ul\_carrier\_id, \text{ or}$$

$$RA\text{-}RNTI = 1 + s\_id + 14 \times t\_id +$$ Equation (41)
$$14 \times 80 \times (SFN\_id \bmod RARms/SFNms) +$$
$$14 \times 80 \times (maxSFN\_id \bmod RARms/SFNms) \times f\_id +$$
$$14 \times 80 \times 8 \times$$
$$(maxSFN\_id \bmod RARms/SFNms) \times ul\_carrier\_id,$$

where s_id may be an index of a first OFDM symbol of a specified PRACH (e.g., 0≤s_id<14), t_id may be an index of a first slot of the specified PRACH in a first system frame (e.g., 0≤t_id<80), f_id may be an index of the specified PRACH in the frequency domain (e.g., 0≤f_id<8), ul_carrier_id may be an UL carrier (e.g., 0 for NUL carrier, and 1 for SUL carrier or vice versa) used for Msg1 transmission (e.g., Msg1 1220 and/or Msg1 1620), SFN_id may be an index of the first system frame (e.g., 0≤SFN_id<1023), maxSFN_id may be predefined, and/or may be associated with a range and/or a size of SFNs. The first system frame may be, for example, a system frame in which an RAP is transmitted. MaxSFN_id may be 1+max(SFN_id) (e.g., maxSFN_id=1024). MaxSFN_id may be 1+total quantity of SFNs (e.g., maxSFN_id=1024). RARms may be a time duration of an RAR window in milliseconds. SFNms may be a time duration of a system frame in milliseconds (e.g., 10 ms). RARms/SFNms may be a quantity of system frames included in the ra-ResponseWindow. RARms/SFNms may be replaced by a predefined and/or fixed value (e.g., 4 or 8). The predefined and/or fixed value may be independent of RARms and/or SFNms.

A wireless device and/or a base station may determine (e.g., calculate) an RA-RNTI as:

$$RA\text{-}RNTI = 1 + s\_id + (num\_s\_id \times t\_id) +$$ Equation (42)
$$(num\_s\_id \times num\_t\_id \times f\_id) +$$
$$(num\_s\_id \times num\_t\_id \times num\_f\_id \times ul\_carrier\_id) +$$
$$(num\_s\_id \times num\_t\_id \times num\_f\_id \times$$
$$num\_ul\_carrier\_id \times$$
$$(SFN\_id \bmod RARms/SFNms)), \text{ or}$$

$$RA\text{-}RNTI = 1 + s\_id + (num\_s\_id \times t\_id) +$$ Equation (43)
$$(num\_s\_id \times num\_t\_id \times f\_id) + (num\_s\_id \times num\_t\_id \times$$
$$num\_f\_id \times (SFN\_id \bmod RARms/SFNms)) +$$
$$(num\_s\_id \times num\_t\_id \times num\_f\_id \times$$
$$(num\_SFN\_id \bmod RARms/SFNms) \times$$
$$ul\_carrier\_id), \text{ or}$$

$$RA\text{-}RNTI = 1 + s\_id + (num\_s\_id \times t\_id) +$$ Equation (44)
$$(num\_s\_id \times num\_t\_id \times$$
$$(SFN\_id \bmod RARms/SFNms)) +$$
$$(num\_s\_id \times num\_t\_id \times$$
$$(num\_SFN\_id \bmod RARms/SFNms) \times$$
$$f\_id) + (num\_s\_id \times num\_t\_id \times$$
$$(num\_SFN\_id \bmod RARms/SFNms) \times$$
$$num\_f\_id \times ul\_carrier\_id),$$

where s_id may be an index of a first OFDM symbol of a specified PRACH (e.g., 0≤s_id<num_s_id), t_id may be an index of a first slot of the specified PRACH in a first system frame (e.g., 0≤t_id<num_t_id), f_id may be an index of the specified PRACH in the frequency domain (e.g., 0≤f_id<num_f_id), ul_carrier_id may be the UL carrier (e.g., 0 for NUL carrier, and 1 for SUL carrier or vice versa) used for Msg1 transmission (e.g., Msg1 1220 and/or Msg1 1620), and SFN_id may be an index of the first system frame (e.g., 0≤SFN_id<num_SFN_id). The first system frame may be, for example, a system frame in which an RAP is transmitted. Other ranges may be used for one or more of the variables s_id, t_id, SFN_id, f_id, and ul_carrier_id may be shifted. A range of s_id may be 1≤s_id<num_s_id+1. The range of s_id may be expressed as 1≤s_id<num_s_id*, where num_s_id*=num_s_id+1.

Equations (42)-(44) may be modified based on a maximum value of each variable. Num_s_id may be replaced by num_s_id* in the Equations (42)-(44)). T_id, SFN_id, f_id, and ul_carrier_id may be modified in a similar way.

An RA-RNTI may be determined without using an ul_carrier_id, for example, depending on an SUL configuration. An RA-RNTI may be, for example, for a cell with an SUL carrier:

$$RA\text{-}RNTI = 1 + s\_id + (num\_s\_id \times t\_id) + \\ (num\_s\_id \times num\_t\_id \times f\_id) + (num\_s\_id \times num\_t\_id \times \\ num\_f\_id \times (SFN\_id \bmod RARms/SFNms)) + \\ (num\_s\_id \times num\_t\_id \times num\_f\_id \times \\ (num\_SFN\_id \bmod RARms/SFNms) \times \\ ul\_carrier\_id), \text{ or} \quad \text{Equation (45)}$$

$$RA\text{-}RNTI = \\ 1 + s\_id + (num\_s\_id \times t\_id) + (num\_s\_id \times num\_t\_id \times \\ (SFN\_id \bmod RARms/SFNms)) + (num\_s\_id \times \\ num\_t\_id \times (num\_SFN\_id \bmod RARms/SFNms) \times \\ f\_id) + (num\_s\_id \times num\_t\_id \times \\ (num\_SFN\_id \bmod RARms/SFNms) \times \\ num\_f\_id \times ul\_carrier\_id). \quad \text{Equation (46)}$$

For a cell without an SUL carrier, an RA-RNTI may be:

$$RA\text{-}RNTI = 1 + s\_id + (num\_s\_id \times t\_id) + \\ (num\_s\_id \times num\_t\_id \times f\_id) + (num\_s\_id \times num\_t\_id \times \\ num\_f\_id \times (SFN\_id \bmod RARms/SFNms)), \text{ or} \quad \text{Equation (47)}$$

$$RA\text{-}RNTI = 1 + s\_id + (num\_s\_id \times t\_id) + \\ (num\_s\_id \times num\_t\_id \times \\ (SFN\_id \bmod RARms/SFNms)) + \\ (num\_s\_id \times num\_t\_id \times \\ (num\_SFN\_id \bmod RARms/SFNms) \times f\_id). \quad \text{Equation (48)}$$

Equations (45) and (46) use an ul_carrier_id and Equations (47) and (48) do not use an ul_carrier_id for determining an RA-RNTI.

An RA-RNTI may be determined using a bwp index, for example, in a communication system using multiple BWPs. An RA-RNTI may be determined as:

$$RA\text{-}RNTI = \\ 1 + s\_id + (num\_s\_id \times t\_id) + (num\_s\_id \times num\_t\_id \times \\ (SFN\_id \bmod RARms/SFNms)) + \\ (num\_s\_id \times num\_t\_id \times \\ (num\_SFN\_id \bmod RARms/SFNms) \times f\_id) + \\ (num\_s\_id \times num\_t\_id \times \\ (num\_SFN\_id \bmod RARms/SFNms) \times \\ num\_f\_id \times bwp\_id) + (num\_s\_id \times num\_t\_id \times \\ (num\_SFN\_id \bmod RARms/SFNms) \times \\ num\_f\_id \times num\_bwp\_id \times ul\_carrier\_id), \quad \text{Equation (49)}$$

where num_bwp_id may be a total quantity of configured UL BWPs, bwp_id may be an indicator of a BWP, among the configured UL BWPs, in which a wireless device may transmit an RAP. Bwp_id may be equal to BWP index (e.g., an index in a decimal value)−1. A BWP index for a third BWP may be 3, a bwp_id corresponding to the BWP index may be 2, and num_bwp_id may be 4, for example, if a wireless device is configured with 4 BWPs and transmits on the third BWP. A wireless device may be configured with an initial BWP (and/or a single BWP). An RA-RNTI may be determined as:

$$RA\text{-}RNTI = 1 + s\_id + (num\_s\_id \times t\_id) + \\ (num\_s\_id \times num\_t\_id \times SFN\_id) + \\ (num\_s\_id \times num\_t\_id \times num\_SFN\_id \times f\_id) + \\ (num\_s\_id \times num\_t\_id \times num\_SFN\_id \times \\ num\_f\_id \times ul\_carrier\_id). \quad \text{Equation (50)}$$

A base station may indicate information (e.g., system frame information) to a wireless device using downlink control signaling (e.g., one or more downlink control messages). The downlink control signaling may comprise physical layer signaling (e.g., DCI), MAC layer signaling (e.g., a medium access control packet such as MAC PDU), and/or any other layer signaling. System frame information may indicate an SFN, such as the SFN in which a preamble may be transmitted (e.g., by the wireless device).

One or more downlink control messages (e.g., downlink control signals) may comprise system frame information that may indicate an SFN. A MAC PDU may comprise an RAR that may correspond to an RAP. A downlink control message may correspond to a MAC PDU and/or an RAR. A MAC PDU and/or an RAR (e.g., transmitted based on an RAP) may be configured to indicate SFN(s). The SFN may correspond to a system frame in which the RAP is transmitted.

One or more fields in a MAC PDU (e.g., comprising one or more RARs) may indicate SFN(s).

A wireless device may send (e.g., transmit), to a base station, a preamble (e.g., an RAP). The wireless device may receive a downlink control message (e.g., a downlink control signal) from a base station. The wireless device may determine, based on an RA-RNTI and/or a system frame information field in the downlink control message, whether the downlink control message comprises one or more RARs corresponding to one or more preambles transmitted via time and frequency resources in which the wireless device transmits the preamble. The RA-RNTI may not be based on a system frame information. The RA-RNTI may be determined, for example, based on Equation (1). The time and frequency resources correspond to an OFDM symbol number (e.g., s_id), a slot number (e.g., t_id), a frequency resource indicator (e.g., f_id), an SFN, and/or an uplink carrier ID (e.g., ul_carrier_id). The wireless device may use the RA-RNTI to determine whether the one or more RARs correspond to one or more preambles transmitted via an OFDM symbol corresponding to the OFDM symbol number (e.g., s_id), a slot corresponding to the slot number (e.g., t_id), a frequency resource corresponding to the frequency resource indicator (e.g., f_id), and/or an uplink carrier corresponding to the uplink carrier ID (e.g., ul_carrier_id), in which the wireless device transmits the preamble. The wireless device may use the RA-RNTI to receive a downlink control message comprising one or more RARs corresponding to one or more preambles transmitted at least via an OFDM symbol corresponding to the OFDM symbol number (e.g., s_id), a slot corresponding to the slot number (e.g., t_id), a frequency resource corresponding to the frequency resource (e.g., f_id), and/or an uplink carrier corresponding to the uplink carrier ID (e.g., ul_carrier_id) in which the wireless device transmits the preamble. The downlink control message may indicate an SFN associated with the OFDM symbol number (e.g., s_id), the slot number (e.g., t_id), a frequency resource (e.g., f_id), and/or an uplink carrier ID (e.g., ul_carrier_id). The wireless device may determine to parse the one or more RARs, for example, if the OFDM symbol number (e.g., s_id), the slot number (e.g., t_id), the frequency resource indicator (e.g., f_id), and/or an uplink carrier ID (e.g., ul_carrier_id) indicated by the RA-RNTI and the SFN indicated by the downlink control message are the same time and frequency resources in which the wireless device transmits the preamble. Each of the one or more RARs may comprise a field indicating an index of a preamble associated with an RAR. The wireless device may identify an RAR corresponding to the preamble, for example, based on an index of the preamble in the RAR. The wireless device may continue to monitor a downlink control channel for the RAR, for example if the one or more RARs does not comprise the RAR corresponding to the preamble and/or if the RAR window does not expire.

Figure 47:
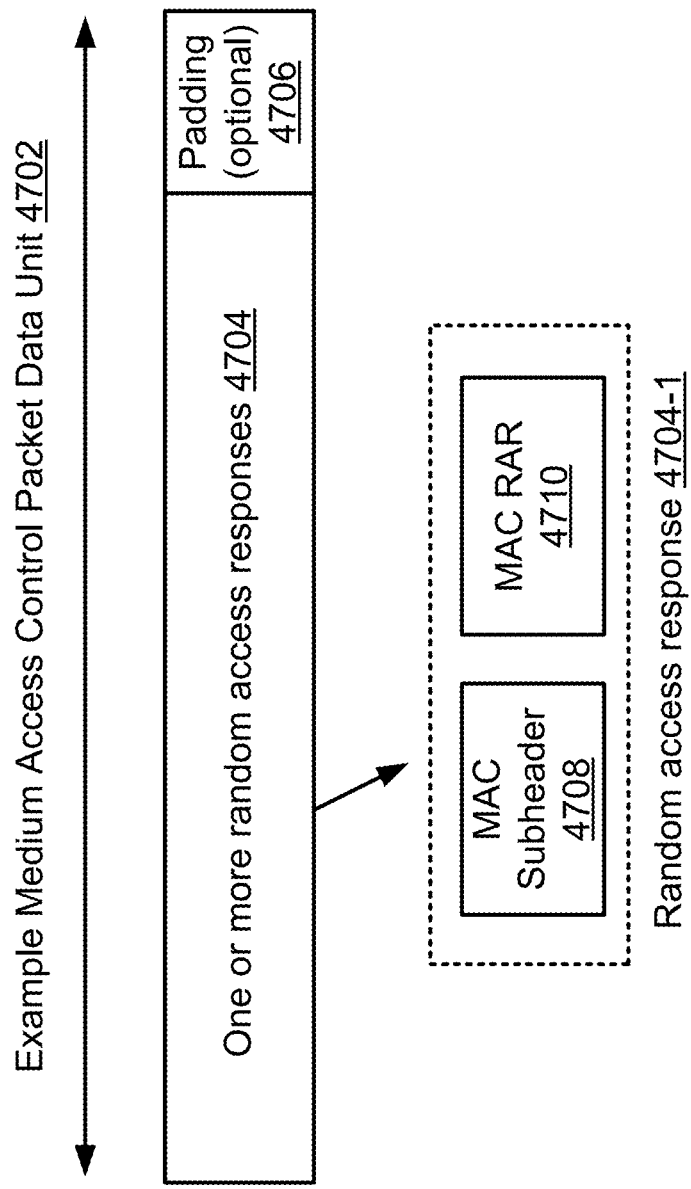
FIG. 47 shows an example MAC PDU.

FIG. 47 shows an example MAC PDU 4702. The MAC PDU 4702 may comprise one or more downlink control messages (e.g., RARs 4704). The MAC PDU 4702 may comprise padding bits 4706. A RAR in the one or more RARs 4704 may comprise one or more MAC subPDUs. An RAR 4704-1 in the one or more RARs 4704 may comprise a MAC subheader 4708 and a MAC RAR 4710.

A wireless device may determine (e.g., identify) a downlink control message (e.g., a downlink control signal, a MAC packet comprising an RAR) corresponding to an RAP transmitted in a system frame, for example, based on an indication of an SFN in the downlink control message. One or more fields in the RAR 4704-1 (e.g., the MAC subheader 4708 and/or the MAC RAR 4704) may comprise an indication of an SFN. The indication of the SFN may be, for example, at least a portion (e.g., one or more bits) of a bit string associated with the SFN. A number of bits in a bit string associated with the SFN may depend on a number of system frames that are to be represented. Ten bits may used to represent, for example, 1024 system frames. All zeros of 10 bits may indicate SFN=0, and all ones of 10 bits may indicate SFN=1023, and so on. The indication of the SFN may be, for example, one or more most significant bits (MSBs) of the SFN, one or more least significant bits (LSBs) of the SFN, one or more other bits, or all the bits of the SFN. The SFN may correspond to a system frame in which an RAP is transmitted.

A wireless device may send (e.g., transmit) a first RAP to a base station. The wireless device may transmit the first RAP via an s_id, a t_id, an f_id, and a ul_carrier_id. The wireless device may transmit the first RAP in a first system frame. The base station may transmit one or more downlink control messages (e.g., downlink control signals, RARs). The base station may transmit, for example, the MAC PDU 4702. At least one of the one or more RARs 4704 (e.g., a first RAR 4704-1), in the MAC PDU 4702, may be based on (e.g., responsive to) the first RAP. The first RAR 4704-1 may comprise an indication (e.g., index) of the first system frame. The indication of the first system frame may be an SFN (or a portion thereof) of the first system frame. An RA-RNTI used for receiving the MAC PDU 4702 may be determined based on, for example, any of RA-RNTI equations described herein that do not use an SFN indicator for determining the RA-RNTI.

The wireless device may monitor a downlink control channel for the MAC PDU 4702. The wireless device may evaluate one or more RARs 4704, in the MAC PDU 4702, to determine the first RAR 4704-1 that is based on the first RAP transmitted by the wireless device. The wireless device may determine (e.g., identify) the first RAR 4704-1, for example, based on the RA-RNTI that is used to receive the first RAR 4704-1, and/or based on the indication of the first system frame in the first RAR 4704-1. The wireless device may determine (e.g., identify) that the MAC PDU 4702 may comprise the first RAR 4704-1, corresponding to the first RAP transmitted by the wireless device, for example, based on the MAC PDU 4702 detected based on the RA-RNTI. The wireless device may determine (e.g., identify) that the MAC PDU 4702 may comprise one or more second RARs 4704, corresponding to one or more second RAPs transmitted via a same s_id, t_id, f_id, and ul_carrier_id (e.g., as used to transmit the first RAP), for example, based on the MAC PDU 4702 detected based on the RA-RNTI. The one or more second RAPs may be transmitted in a same system frame as the first RAP, or in a different system frame from the first RAP. The wireless device may determine (e.g., identify) the first RAR 4704-1, corresponding to the first RAP transmitted by the wireless device, from the one or more second RARs, based on the indication of the first system frame in the first RAR 4704-1.

With reference to FIG. 43, for example, the first wireless device may transmit a first RAP via slot 0 in SFN k, and the second wireless device may transmit a second RAP via slot 0 in SFN k+1. Both the first wireless device and the second wireless device may be configured with RAR windows of 20 ms length (e.g., the first RAR window 4306 and the second RAR window 4308).

The first wireless device and the second wireless device may monitor a downlink control channel for corresponding responses (e.g., downlink control messages, downlink control signals, RARs) in respective RAR windows. A MAC PDU may be received based on an RA-RNTI by the first wireless device and the second wireless device during overlapping time 4312 (e.g., via the downlink control channel). The RA-RNTI may be determined, for example, using Equation (1). The MAC PDU may comprise a first RAR corresponding to the first RAP and a second RAR corresponding to the second RAP. The first wireless device may determine (e.g., identify) a first RAR corresponding to the first RAP based on an indication of the SFN k in the first RAR. The second wireless device may determine (e.g., identify) a second RAR corresponding to the second RAP based on an indication of the SFN k+1 in the second RAR. The first RAR may comprise a first field indicating an index of the SFN k and the second RAR may comprise a second field indicating an index of the SFN k+1.

Figure 48A:
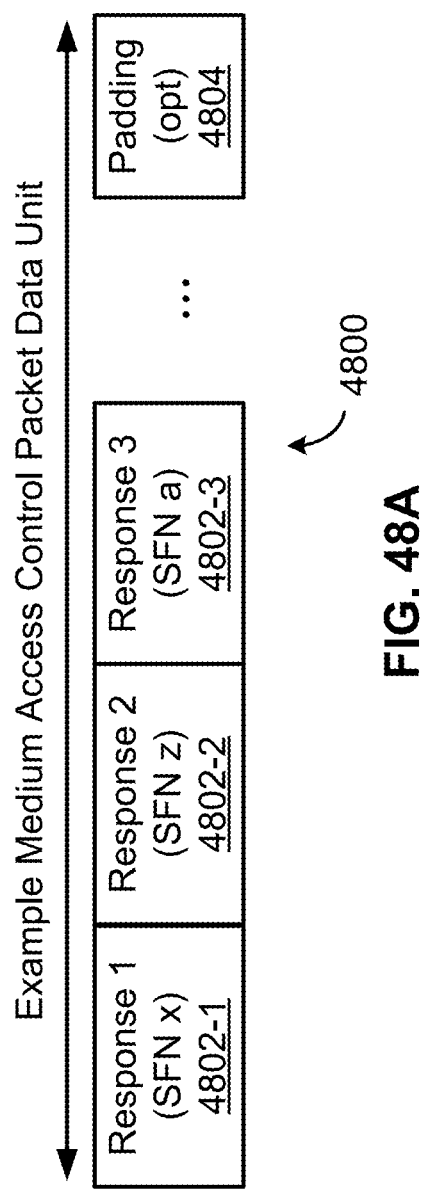
FIG. 48A and FIG. 48B show example MAC PDUs.

A base station may multiplex one or more responses (e.g., RARs) corresponding to one or more preambles (e.g., RAPs) transmitted via different SFNs into a single packet (e.g., a MAC PDU). Each of the one or more responses may comprise a field indicating an SFN corresponding to a respective preamble. FIG. 48A shows an example MAC PDU 4800. The MAC PDU 4800 may comprise one or more responses 4802. The MAC PDU 4800 may comprise optional padding bits 4804. Each of the one or more responses 4802 may comprise respective fields indicating respective SFNs. Each of the one or more responses 4802 may comprise, for example, MAC subPDUs comprising corresponding MAC subheaders and MAC RARs. SFNs may be indicated in respective MAC subheaders or MAC RARs of respective responses 4802.

A wireless device may decode the one or more responses 4802 (e.g., one by one) at least until a preamble index (e.g., RAPID) and SFN indicator (e.g., index) in a response of one of the one or more responses 4802 are matched with information corresponding to a preamble transmitted by the wireless device. The wireless device may, for example, determine that the response 2 4802-2 corresponds to the preamble transmitted by the wireless device based on (i) matching a preamble index corresponding to the response 2 4802-2 to the preamble transmitted by the wireless device, and/or (ii) matching an SFN indicator to an SFN of a system frame in which the wireless device transmits the preamble.

A base station may multiplex one or more responses (e.g., RARs) corresponding to one or more preambles (e.g., RAPs) transmitted via a same SFN into a single packet (e.g., a MAC PDU). Each of the one or more responses may comprise an indication of the same SFN. A wireless device may decode at least one of the one or more responses to determine (e.g. identify) the SFN.

A base station may multiplex one or more responses (e.g., RARs) corresponding to one or more preambles (e.g., RAPs) transmitted via a same SFN into a MAC PDU. Each of the one or more responses may not comprise an indication of the same SFN. A downlink control message (e.g., a medium access control packet indicating the one or more responses, a downlink control signal) may indicate an SFN. The SFN may be applied to the one or more responses in the MAC PDU. A wireless device may not parse (or decode) at least one of the one or more responses if the SFN is different from a first SFN in which the wireless device transmits a preamble. A wireless device may parse (or decode) at least one of the one or more responses if the SFN is the same to a first SFN in which the wireless device transmits a preamble.

Figure 48B:
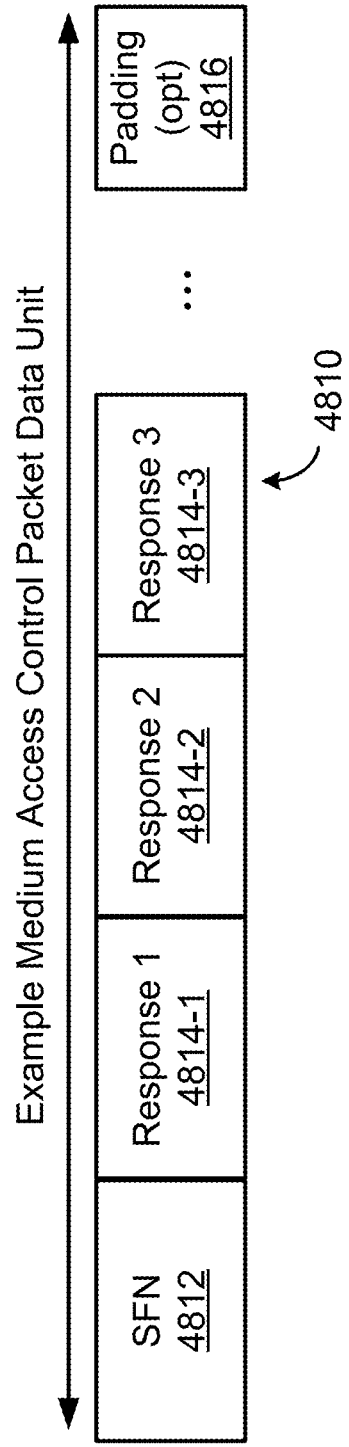

A base station may multiplex one or more responses (e.g., RARs) corresponding to one or more preambles (e.g., RAPs) transmitted via a same SFN into a single packet (e.g. a MAC PDU). A MAC PDU may comprise a field indicating the same SFN and the one or more responses. FIG. 48B shows an example MAC PDU 4810. The MAC PDU 4810 may comprise an SFN field 4812, one or more responses 4814, and, optionally, padding bits 4816. The SFN field 4812 may comprise an indication of an SFN via which the one or more preambles were transmitted. The SFN indicated by the SFN field 4812 may be applied to the one or more responses 4814. The SFN field 4812 and the responses 4814 may be respective MAC subPDUs. Each of the respective MACsubPDUs may comprise respective MAC subheaders. The SFN field 4812 may be a MAC subheader comprising an indication of the SFN.

A wireless device may decode the one or more responses 4814 (e.g., one by one) at least until a preamble index (e.g., RAPID) in a response of one of the one or more responses 4814 are matched with a preamble index corresponding to a preamble transmitted by the wireless device.

The wireless device may, for example, determine that the response 2 4814-2 corresponds to the preamble transmitted by the wireless device based on (i) matching a preamble index corresponding to the response 2 4814-2 to the preamble transmitted by the wireless device, and/or (ii) matching an SFN indicated by the SFN field 4812 to a system frame in which the wireless device transmits the preamble.

Figure 49A:
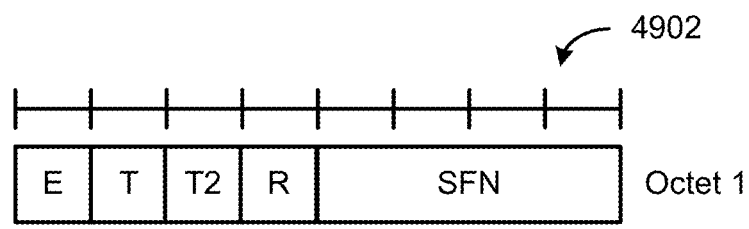
FIGS. 49A, 49B, and 49C show example MAC subheaders.
Figure 49B:
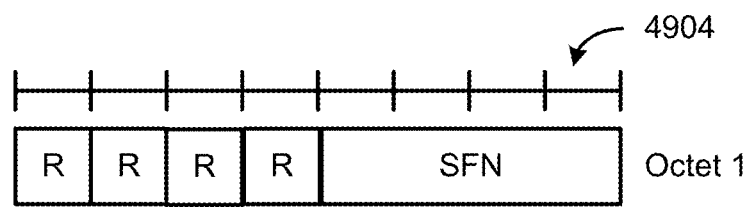
Figure 49C:
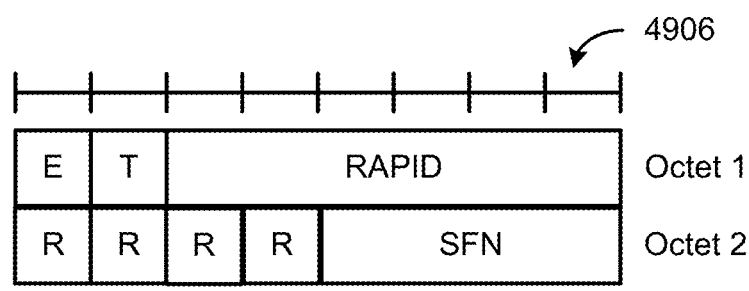

FIGS. 49A, 49B, and 49C show example MAC subheaders. The MAC subheaders may be used in the MAC PDU 4710, MAC PDU 4800, and/or MAC PDU 4810. A MAC subheader 4902 may comprise E/T/T2/R fields and an SFN field. The E field may be set to "1" to indicate that at least one more MAC subPDU follows that the MAC subPDU comprising the MAC subheader 4902, and/or may be set to "0" to indicate that the MAC subPDU comprising the MAC subheader 4902 is a last MAC subPDU in the MAC PDU. The T field and the T2 field may be used to indicate whether the MAC subheader 4902 comprises a BI, a RAPID, or an SFN. The T and T2 fields may be set to "0" and "1" respectively, for example, to indicate that the MAC subheader 4902 comprises an SFN field. The R field may indicate a reserved bit and may be set to "0". The SFN field may comprise an indication of an SFN.

A MAC subheader 4904 may comprise an SFN field and reserved bits R. The R fields may indicate reserved bits and may be set to "0". The SFN field may comprise an indication of an SFN. The MAC subheader 4904 may be used in a beginning of a MAC PDU. The MAC subheader 4904 may be included, for example, in the SFN field 4812.

A MAC subheader 4906 may be similar to the MAC subheader with RAPID (e.g., as shown in FIG. 27C), but may further comprise an SFN field. The SFN field may comprise an indication of an SFN. The SFN fields in the MAC subheader 4902, the MAC subheader 4904, and the MAC subheader 4906 are shown as comprising 4 bits. In other examples, the SFN fields may comprise any quantity of bits different than 4.

An RAR, transmitted based on an RAP, may be configured to indicate a BWP indicator. The BWP indicator may correspond to a BWP in which the RAP is transmitted. A MAC PDU (e.g., comprising an RAR), transmitted by a base station, may comprise an indication (e.g., an index) of a BWP in which a wireless device transmits a preamble (e.g., an RAP corresponding to the RAR), and/or in which a base station may receive the preamble. The MAC PDU may be received by a wireless device based on an RA-RNTI that may be determined, for example, based on any of RA-RNTI equations described herein that do not use a BWP indicator (e.g., a bwp_id) for calculating the RA-RNTI. An RA-RNTI may be determined, for example, using Equation (1) or Equation (26). A base station may multiplex one or more responses (e.g., RARs) corresponding to one or more preambles (e.g., RAPs) into a MAC PDU. A wireless device may determine (e.g., identify) a BWP of each preamble corresponding to each of the one or more responses, for example, by using the RA-RNTI and the indication of the BWP.

Figures 50A, 50B:
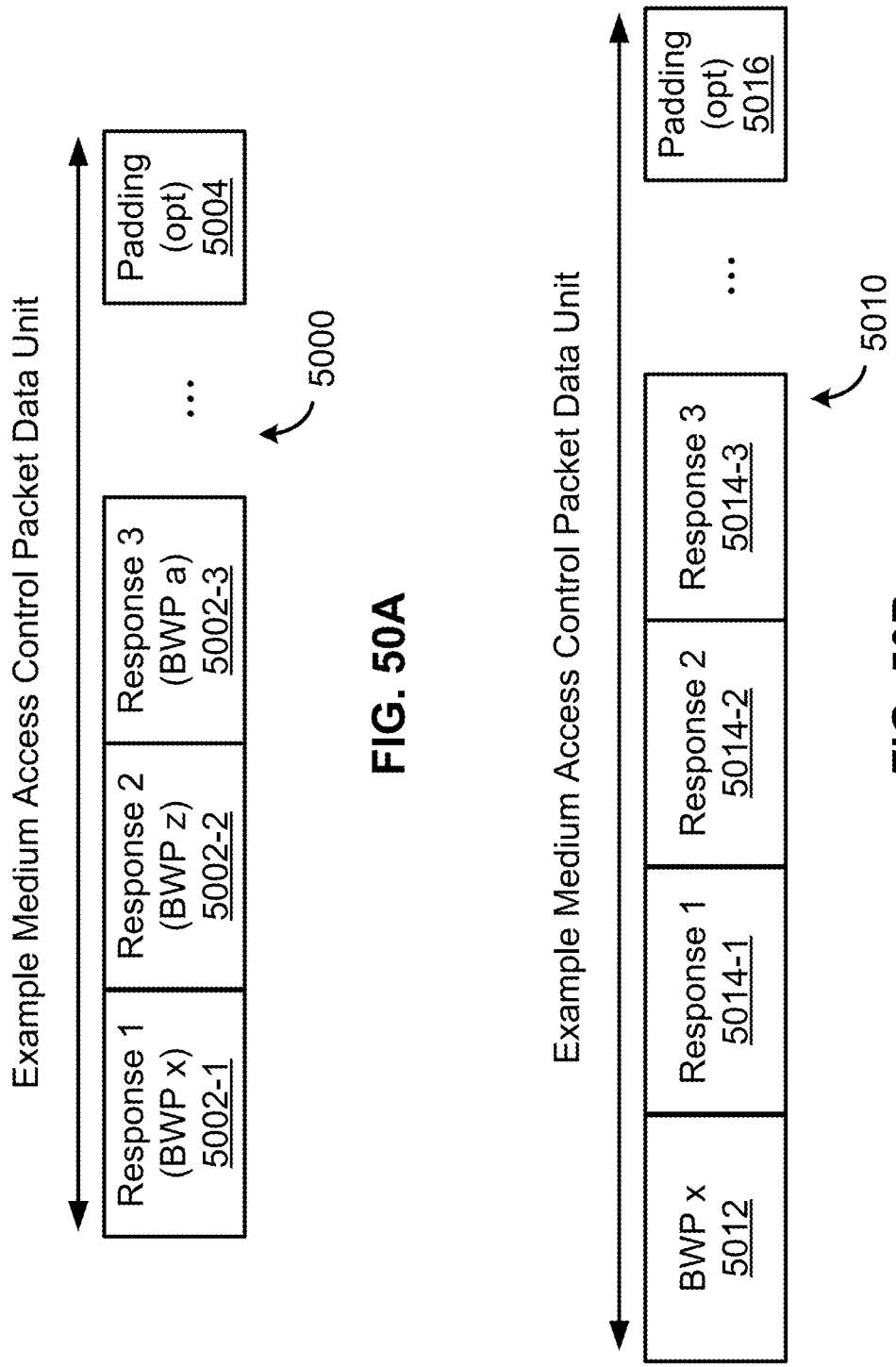
FIG. 50A and FIG. 50B shows example MAC PDUs.

A base station may multiplex one or more responses (e.g., RARs) corresponding to one or more preambles (e.g., RAPs) transmitted via different BWPs into a MAC PDU. Each of one or more responses may comprise a field indicating a BWP corresponding to the respective preamble. FIG. 50A shows an example MAC PDU 5000. The MAC PDU 5000 may comprise one or more responses 5002. The MAC PDU 5000 may comprise optional padding bits 5004. Each of the one or more responses 5002 may comprise respective fields indicating respective BWPs. Each of the one or more responses 5002 may comprise, for example, MAC subPDUs with corresponding MAC subheaders and MAC RARs. BWPs may be indicated in respective MAC subheaders or MAC RARs of respective responses 5002.

A wireless device may decode the one or more responses 5002 (e.g., one by one). The wireless device may decode the one or more responses 5002, for example, at least until a preamble index (e.g., RAPID) and a BWP indicator (e.g., index), in a response of one of the one or more responses 5002, are matched with information corresponding to a preamble transmitted by the wireless device. The wireless device may determine that the response 2 5002-2 corresponds to the preamble transmitted by the wireless device based on: (i) matching a preamble index corresponding to the response 2 5002-2 to the preamble transmitted by the wireless device, and/or (ii) matching a BWP indicator in the response 5002-2 to a BWP indicator of a BWP in which the wireless device transmits the preamble.

A base station may multiplex one or more responses (e.g., RARs) corresponding to one or more preambles (e.g., RAPs) transmitted via a same BWP into a MAC PDU. Each of the one or more responses may comprise an indication of the same BWP. A wireless device may decode at least one of the one or more responses to determine (e.g., identify) the BWP.

A base station may multiplex one or more responses (e.g., RARs) corresponding to one or more preambles (e.g., RAPs) transmitted via a same BWP into a MAC PDU. A MAC PDU may comprise a field indicating the same BWP and the one or more responses. FIG. 50B shows an example MAC PDU 5010. The MAC PDU 5010 may comprise a BWP field 5012, one or more responses 5014, and optionally, padding bits 5016. The BWP field 5012 may comprise an indication of a BWP via which the one or more preambles were transmitted. The BWP indicated in the BWP field 5012 may be applied to the one or more responses. The BWP field 5012 and the responses 5014 may be respective MAC subPDUs. Each of the respective MACsubPDUs may comprise respective MAC subheaders. The BWP field 5012 may be a MAC subheader comprising an indication of the SFN.

A wireless device may decode the one or more responses 5014 (e.g., one by one). The wireless device may decode (e.g., parse) the one or more responses 5014, for example, at least until a preamble index (e.g., RAPID) in a response of one of the one or more responses 5014 are matched with an index corresponding to a preamble transmitted by the wireless device. The wireless device may determine that the response 2 5014-2 corresponds to the preamble transmitted by the wireless device based on: (i) matching a preamble index corresponding to the response 2 5014-2 to the preamble transmitted by the wireless device, and/or (ii) matching a BWP indicator in the BWP field 5012 to a BWP indicator of a BWP in which the wireless device transmits the preamble.

A MAC subheader, similar to the MAC subheaders 4902, 4904, and/or 4906 may be used in the MAC PDU 4710, MAC PDU 4800, and/or MAC PDU 4810 to indicate a BWP (e.g., in MAC PDUs 5000 and 5010). A MAC subheader, similar to the MAC subheader 4902, for example, may comprise an indication of a BWP instead of an indication of an SFN.

A MAC PDU may comprise one or more SFN indicators and/or one or more BWP indicators. FIG. 51A, FIG. 51B, FIG. 51C, and FIG. 51D show example MAC PDUs with one or more SFN indicators and one or more BWP indicators. A MAC PDU may be received by a wireless device based on an RA-RNTI that may be determined based on any of RA-RNTI equations described herein that do not use a BWP index and/or an SFN index. An RA-RNTI may be determined, for example, using Equation (1).

Figure 51A:
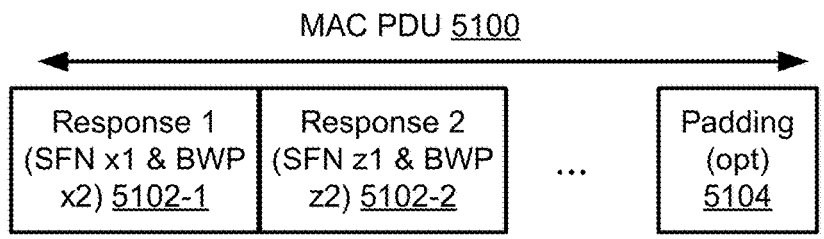
FIG. 51A, FIG. 51B, FIG. 51C, and FIG. 51D show example MAC PDUs.

A base station may multiplex one or more responses (e.g., RARs) corresponding to one or more preambles (e.g., RAPs) in a MAC PDU. The one or more preambles may be transmitted via different BWPs and/or via different SFNs. Each of the one or more responses may comprise an SFN indicator and/or a BWP indicator. FIG. 51A shows example MAC PDU 5100. The MAC PDU 5100 may comprise one or more responses 5102. Each of the one or more responses 5102 may comprise an SFN indicator and/or a BWP indicator. A base station may multiplex one or more responses corresponding to one or more preambles transmitted via different BWPs and/or via different SFNs. The base station may transmit the MAC PDU 5100.

Figure 51B:
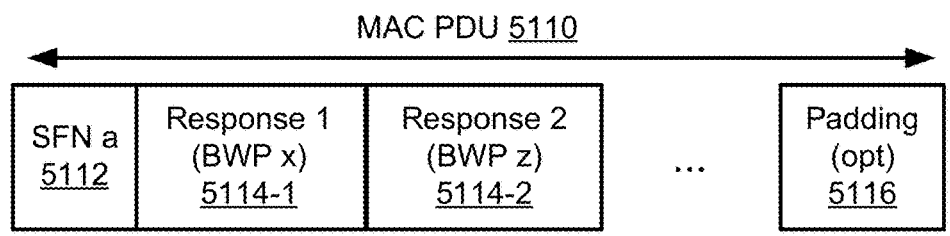

A base station may multiplex one or more responses (e.g., RARs), corresponding to one or more preambles (e.g., RAPs), in a MAC PDU. The one or more preambles may be transmitted via different BWPs and/or using a same SFN. The MAC PDU may comprise a field indicating the same SFN and the one or more responses corresponding to one or more preambles. Each of the one or more responses may comprise a BWP indicator. Each BWP indicator may indicate a BWP via which a corresponding preamble was transmitted. FIG. 51B shows an example MAC PDU 5110. The MAC PDU 5110 may comprise an SFN field 5112 and/or one or more responses 5114. The SFN field 5112 may comprise an indication of an SFN a. A base station may multiplex, in the MAC PDU 5110, one or more responses corresponding to one or more preambles transmitted via different BWPs and/or using the SFN a.

Figure 51C:
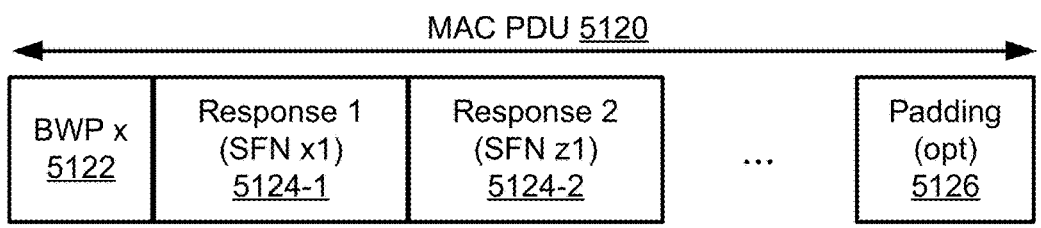

A base station may multiplex one or more responses (e.g., RARs) corresponding to one or more preambles (e.g., RAPs) in a MAC PDU. The one or more preambles may be transmitted via a same BWP and/or via different SFNs. The MAC PDU may comprise a field indicating the same BWP and the one or more responses corresponding to one or more preambles. Each of the one or more responses may comprise an SFN indicator. Each SFN indicator may indicate an SFN via which a corresponding preamble was transmitted. FIG. 51C shows an example MAC PDU 5120. The MAC PDU 5120 may comprise a BWP field 5122 and/or one or more responses 5124. The BWP field 5122 may comprise an indication of a BWP x. A base station may multiplex, in the MAC PDU 5120, one or more responses corresponding to one or more preambles transmitted via the BWP x and/or via different SFNs.

Figure 51D:
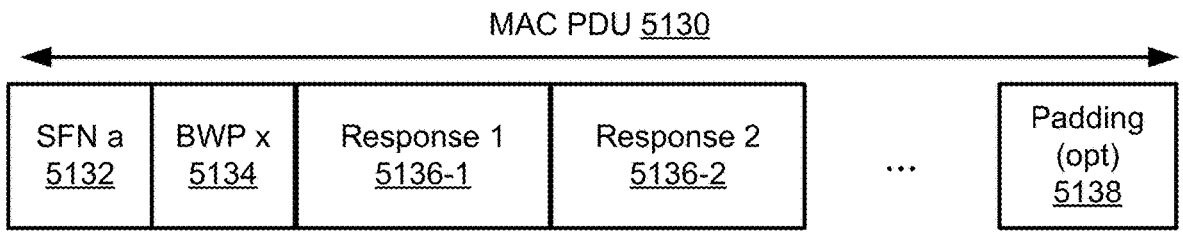

A base station may multiplex one or more responses (e.g., RARs) corresponding to one or more preambles (e.g., RAPs) in a MAC PDU. The one or more preambles may be transmitted via a same BWP and/or via a same SFN. The MAC PDU may comprise a first field indicating the same BWP, a second field indicating the same SFN, and/or the one or more responses. Each of the one or more responses may not comprise a first indicator of the same BWP and/or a second indicator of the same SFN. FIG. 51D shows an example MAC PDU 5130. The MAC PDU 5130 may comprise an SFN field 5132, a BWP field 5134, and one or more responses 5136.

The SFN field 5132 may comprise an indication of an SFN a. The BWP field 5122 may comprise an indication of a BWP x. A base station may multiplex, in the MAC PDU 5130, one or more responses corresponding to one or more preambles transmitted via the SFN a and/or the BWP x.

One or more random access resource parameters (e.g., ul_carrier_id) may be introduced in a MAC PDU in a similar way as described above. The ul_carrier_id may be indicated, for example, in a MAC subheader and/or a MAC RAR. A MAC PDU may be received by a wireless device based on an RA-RNTI determined (e.g., calculated), for example, by one of the RA-RNTI equations provided above without the one or more RA resource parameters.

Figure 52:
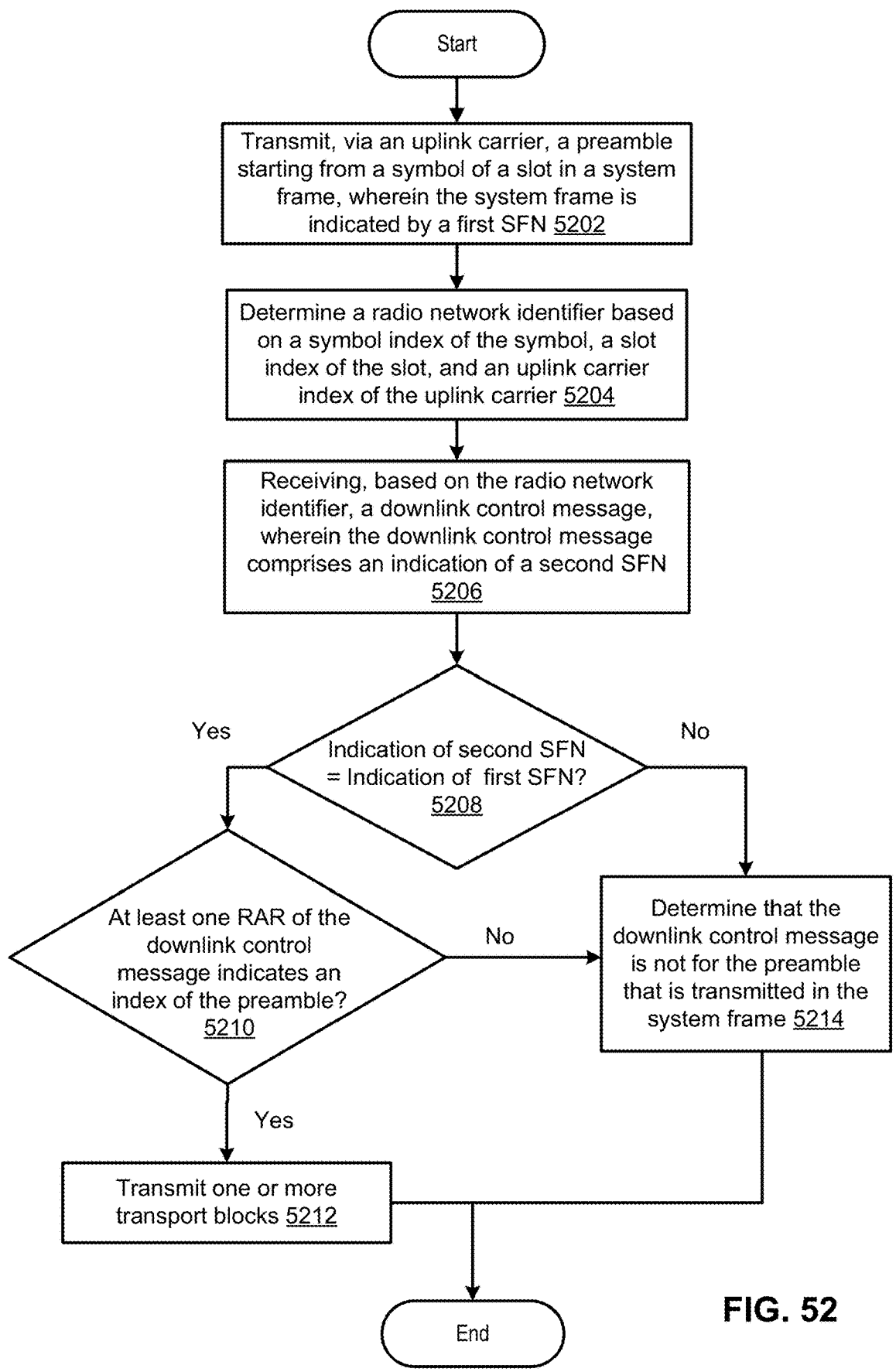
FIG. 52 shows an example method of an RA operation.

FIG. 52 shows an example method of an RA operation. At step S202, a wireless device may transmit, via an uplink carrier (e.g., an NUL carrier or an SUL carrier), a preamble (e.g., RAP) at least starting from a symbol of a slot in a system frame, wherein the system frame may be indicated (e.g., identified) by a first SFN. At step S204, the wireless device may determine a radio network identifier based on a symbol index of the symbol, a slot index of the slot, and an uplink carrier index (e.g., an NUL carrier index or an SUL carrier index) of the uplink carrier (e.g., an NUL carrier or an SUL carrier). The radio network identifier may be, for example, an RA-RNTI. At step S206, the wireless device may receive, based on the radio network identifier, a downlink control message (e.g., downlink control signal, RAR, MAC PDU). The downlink control message may comprise an indication of a second SFN. At step S210, the wireless device may determine that the downlink control message comprises at least one RAR for the preamble that is transmitted in the system frame (e.g., at step S202), for example, if the wireless device determines that the indication of the second SFN is the same as the indication of the first SFN and/or the at least RAR indicates an index of the preamble. At step S212, the wireless device may transmit one or more transport blocks. At step S214, the wireless device may determine that the downlink control message is not for the preamble that is transmitted in the system frame (e.g., at step S202), for example, if the wireless device determines that the indication of the second SFN is different from the indication of the first SFN and/or no RAR of the downlink control message indicates an index of the preamble.

Figure 53:
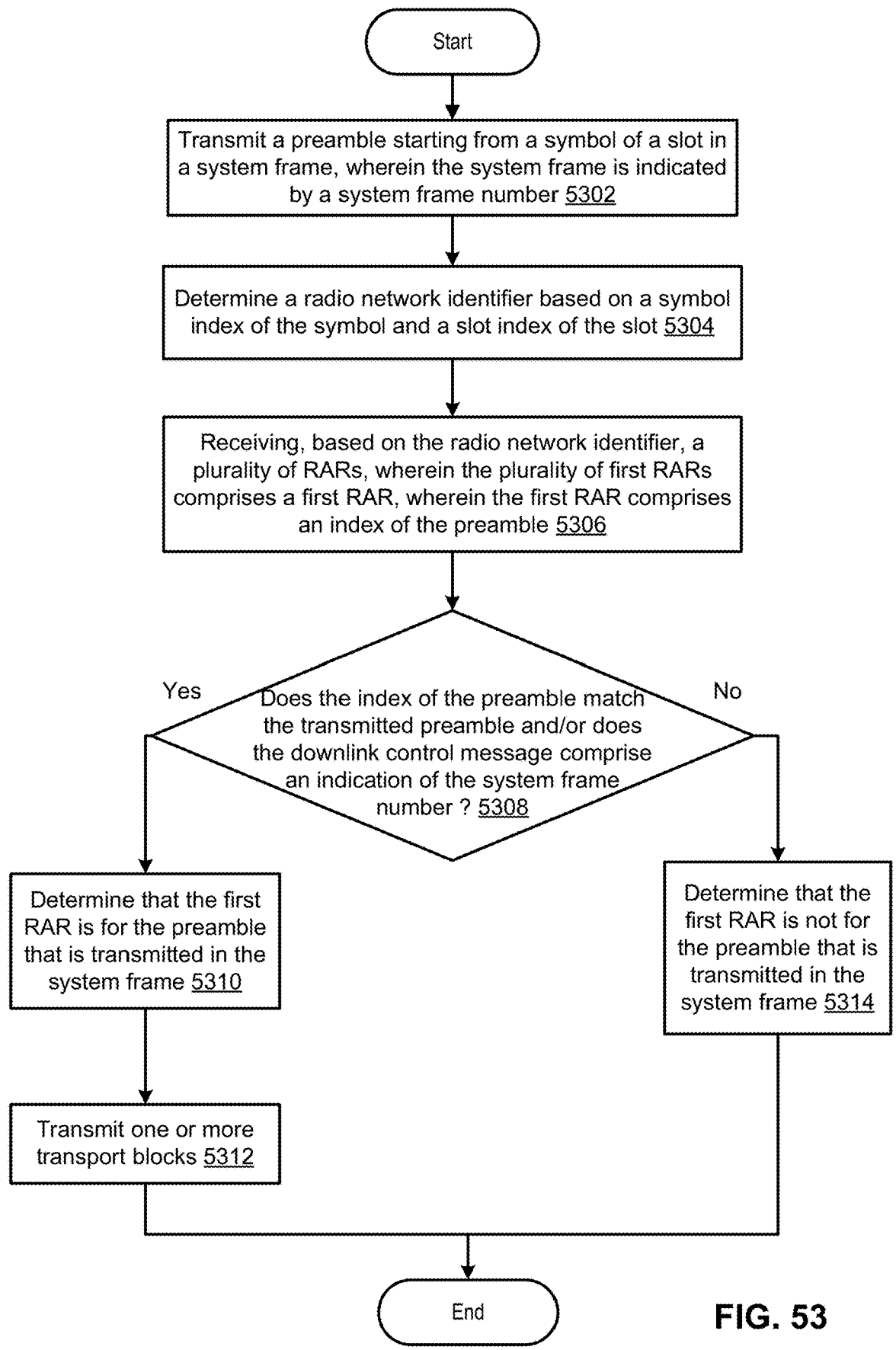
FIG. 53 shows an example method of an RA operation.

FIG. 53 shows an example method of an RA operation. At step S302, a wireless device may transmit a preamble (e.g., an RAP) starting from a symbol of a slot in a system frame, wherein the system frame may be indicated (e.g., identified) by a SFN. At step S304, the wireless device may determine a radio network identifier based on a symbol index of the symbol and a slot index of the slot. The radio network identifier may be, for example, an RA-RNTI. At step S306, the wireless device may receive, based on the radio network identifier, a downlink control message (e.g., MAC PDU). The downlink control message (e.g., MAC PDU) may comprise one or more RARs. The one or more RARs may comprise a first RAR, wherein the first RAR may indicate an index of the preamble. At step S310, the wireless device may determine that the first RAR is for the preamble that is transmitted in the system frame (e.g., at step S302), for example, if the wireless device determines that the index of the preamble matches the transmitted preamble and/or if the downlink control message indicates the SFN. At step S312, the wireless device may transmit one or more transport blocks. At step S312, the wireless device may determine that the first RAR is not for the preamble that is transmitted in the system frame (e.g., at step S302), for example, if the wireless device determines that the index of the preamble does not match the transmitted preamble and/or if the does not indicate the SFN.

Figure 54:
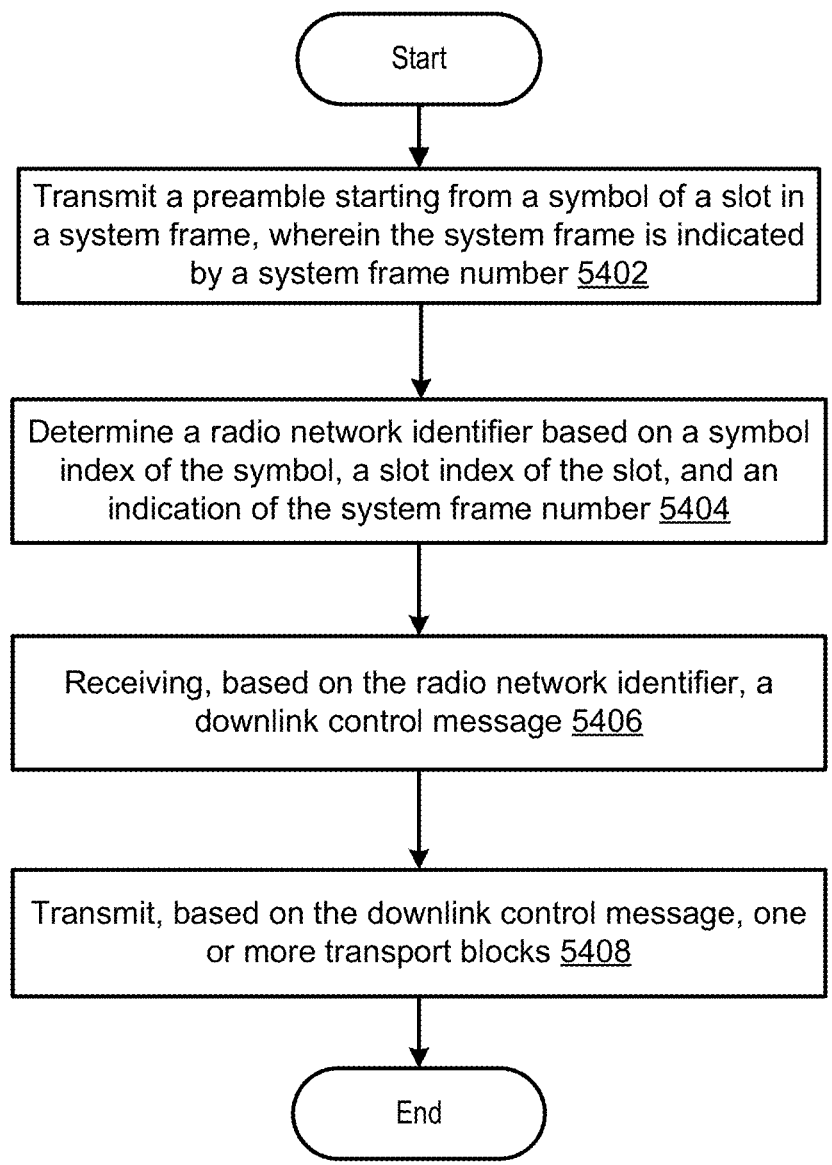
FIG. 54 shows an example method of an RA operation.

FIG. 54 shows an example method of an RA operation. At step S402, a wireless device may transmit a preamble (e.g., RAP) starting from a symbol of a slot in a system frame, wherein the system frame may be indicated (e.g., identified) by a first SFN. At step S404, the wireless device may determine a radio network identifier based on a symbol index of the symbol, a slot index of the slot, and/or an indication of the first SFN. At step S406, the wireless device may receive, based on the radio network identifier, a downlink control message (e.g., a MAC packet comprising an RAR, a downlink control signal). At step S412, the wireless device may transmit, based on the RAR, one or more transport blocks.

A wireless device may receive, from a base station, a control message comprising RA configuration parameters. The RA configuration parameters may indicate at least one RA radio resource comprising: a first symbol of a first slot in a first system frame, and/or a first frequency in a first uplink carrier. The wireless device may transmit at least one preamble via the at least one RA radio resource. The wireless device may transmit the at least one preamble via the first system frame. The wireless device may determine a radio network identifier based on one or more indices corresponding to at least one of following: the first symbol, the first slot, the first frequency, and/or the first uplink carrier. The wireless device may receive at least one downlink control message (e.g., at least one RAR) based on the radio network identifier. The at least one RAR may comprise at least one of: a preamble identifier corresponding to the at least one preamble, a first index of the first system frame, and/or an uplink grant. The wireless device may transmit one or more transport blocks via an uplink radio resource indicated by the uplink grant, for example, based on (e.g., after or in response to) receiving the at least one RAR.

The wireless device may monitor, for the response, a downlink control channel based on (e.g., in response to) transmitting the at least one preamble. The configuration parameters may comprise a value determining a length of an RAR window timer. The wireless device may start the RAR window timer at a second symbol of a control resource set. The wireless device may be configured to receive at least one control message based on the start of the RAR window timer. The control resource set may comprise a downlink control channel common search space. The control resource set may be an earliest control resource set that is at least one or more symbols, for example, after a last symbol of the at least one RA radio resource. The control resource set may be an earliest control resource set that is at least one or more symbols, for example, after the last symbol of preamble transmission. The wireless device may stop the RAR window timer based on (e.g., after or in response) to receiving the at least one RAR.

The first frequency may be within a first bandwidth part. The at least one RAR may further comprise a second index corresponding to the first bandwidth part. One or more indices (e.g., in the at least one RAR) may comprise a second index corresponding to the first bandwidth part. The first system frame may comprise one or more slots comprising the first slot. The first slot may comprise one or more symbols comprising the first symbol.

The wireless device may receive, from a base station, a second downlink control message (e.g., a second RAR) using the radio network identifier. The second RAR may comprise a second index of a second system frame different from the first system frame. The wireless device may monitor a downlink control channel for the at least one RAR, for example, after or in response to receiving the second RAR.

The wireless device may receive the control message with one or more reference signals. The one or more reference signals may be synchronization signal blocks. The one or more reference signals may be channel state information reference signals. The control message may comprise one or more parameters indicating an association between the at least one RA radio channel and the one or more reference signals. The wireless device may determine the first uplink carrier based on received power measurements of the one or more reference signals. The control message may comprise at least one parameter with which the wireless device may generate the at least one preamble. The wireless device may generate the at least one preamble based on a size of the one or more transport blocks. The wireless device may start a timer based on (e.g., after or in response to) transmitting the one or more transport blocks.

A wireless device may receive, from a base station, a control message comprising RA configuration parameters. The RA configuration parameters may indicate at least one RA radio resource comprising: a first symbol of a first slot and a first frequency in a first uplink carrier.

The wireless device may transmit at least one preamble via the at least one RA radio resource in a first system frame. The wireless device, for example, may determine a radio network identifier based on a modular operation with a first value representing a valid range for the radio network identifier. The wireless device may receive, from a base station, at least one downlink control message (e.g., at least one RAR) using the radio network identifier. The at least one RAR may comprise a preamble identifier corresponding to the at least one preamble.

A wireless device may receive, from a base station, a control message comprising RA configuration parameters indicating: at least one random access radio resource comprising a value of a random access response window. The wireless device may transmit at least one preamble via the at least one RA radio resource in a first system frame. The wireless device may determine a radio network identifier at least based on: a first modular operation with a first value determined based on the value of the RA response window; and/or a second modular operation with a second value within a valid range for the radio network identifier. The wireless device may receive, from a base station, at least one RAR using the radio network identifier.

The at least one RAR response may comprise a preamble identifier corresponding to the at least one preamble.

A wireless device may perform a method comprising multiple operations. A wireless device may transmit a preamble starting from a symbol of a slot in a system frame, wherein the system frame is indicated by a system frame number. The wireless device may determine based on a symbol index of the symbol and a slot index of the slot, a radio network identifier. The wireless device may receive, based on the radio network identifier, a downlink control message, wherein the downlink control message comprises a system frame information field, and wherein the system frame information field comprises an indication of the system frame number of the system frame. The wireless device may determine, based on the indication of the system frame number of the system frame, that a first random access response of one or more random access responses indicated by the downlink control message is for the preamble. The wireless device may transmit, based on the determining that the first random access response is for the preamble, one or more transport blocks.

The wireless device may also perform one or more additional operations or include additional elements in conjunction with the described method. The downlink control message may be a downlink medium access control packet comprising the one or more random access responses. The wireless device may transmit the preamble via a random access channel occasion, wherein the random access channel occasion starts from the symbol of the slot in the system frame. The determining the radio network identifier may be further based on a frequency index of the random access channel occasion and an uplink carrier index of an uplink carrier in which the random access channel occasion is configured. The receiving the downlink control message may comprise receiving a medium access control packet data unit comprising the one or more random access responses, wherein the one or more random access responses comprise the first random access response. The determining that the first random access response is for the preamble may be further based on determining a field in the first random access response indicating an index of the preamble. The one or more random access responses may correspond to one or more preambles transmitted via the system frame. The first random access response may comprise a subheader, wherein the subheader comprises the system frame information field. The indication of the system frame number may be one of: one or more most significant bits (MSBs) of the system frame number; or one or more least significant bits (LSBs) of the system frame number. The wireless device may receive, based on the radio network identifier, a second downlink control message, wherein the second downlink control message comprises an indication of a second system frame number different from the system frame number. The wireless device may determine, based on at least the indication of the second system frame number in the second downlink control message, that the one or more second random access responses indicated by the second downlink control message is not for the preamble that is transmitted in the system frame.

Systems, devices and media may be configured with the method. A computing device may comprise one or more processors; and memory storing instructions that, when executed, cause the computing device to perform the described method, additional operations and/or include the additional elements.

A system may comprise a first computing device configured to perform the described method, additional operations and/or include the additional elements; and a second computing device configured to send the downlink control message. A computer-readable medium may store instructions that, when executed, cause performance of the described method, additional operations and/or include the additional elements.

A wireless device may perform a method comprising multiple operations. A wireless device may transmit a preamble starting from a symbol of a slot in a system frame, wherein the system frame is indicated by a system frame number. The wireless device may determine based on a symbol index of the symbol and a slot index of the slot, a radio network identifier. The wireless device may receive, based on the radio network identifier, a downlink control message comprising: a system frame information field comprising an indication of the system frame number; and an index of a preamble. The wireless device may determine, based on the system frame number and the index of the preamble that the downlink control message is for the preamble. The wireless device may transmit, based on the determining that the downlink control message is for the preamble, one or more transport blocks.

The wireless device may also perform one or more additional operations or include additional elements in conjunction with the described method. The downlink control message may be a downlink medium access control packet comprising a random access response. The transmitting the preamble may be via a random access channel occasion. The random access channel occasion may starts from the symbol of the slot in the system frame. The determining the radio network identifier may be further based on a frequency index of the random access channel occasion. The downlink control message may comprise a subheader and a medium access control packet. The subheader may comprise the index of the preamble. The indication of the system frame number may be one of: one or more most significant bits (MSBs) of the system frame number; or one or more least significant bits (LSBs) of the system frame number. The determining the radio network identifier may be further based on an uplink carrier index of an uplink carrier used for transmitting the preamble. The uplink carrier index may be: zero, if the uplink carrier is a normal uplink carrier; or non-zero, if the uplink carrier is a supplementary uplink carrier.

Systems, devices and media may be configured with the method. A computing device may comprise one or more processors; and memory storing instructions that, when executed, cause the computing device to perform the described method, additional operations and/or include the additional elements.

A system may comprise a first computing device configured to perform the described method, additional operations and/or include the additional elements; and a second computing device configured to send the downlink control message. A computer-readable medium may store instructions that, when executed, cause performance of the described method, additional operations and/or include the additional elements.

A wireless device may perform a method comprising multiple operations. A wireless device may transmit a preamble starting from a symbol of a slot in a system frame. The system frame may be indicated by a system frame number. The wireless device may determine a radio network identifier. The determining the radio network identifier may be based on: a symbol index of the symbol; a slot index of the slot; and an indication of the system frame number.

The wireless device may receive, based on the radio network identifier, a downlink control message. The wireless device may transmit, based on the downlink control message, one or more transport blocks.

The wireless device may also perform one or more additional operations or include additional elements in conjunction with the described method. The downlink control message may be a downlink medium access control packet comprising a random access response. The downlink control message may comprise a subheader and a medium access control packet. The subheader may comprise an index of the preamble. The indication of the system frame number may be one of: one or more most significant bits (MSBs) of the system frame number; or one or more least significant bits (LSBs) of the system frame number. The transmitting the preamble may be via a bandwidth part. The determining the radio network identifier may be further based on an indication of the bandwidth part. Determining the radio network identifier may comprise using at least one of: a subtraction operation; or a modulo operation on the system frame number.

Systems, devices and media may be configured with the method. A computing device may comprise one or more processors; and memory storing instructions that, when executed, cause the computing device to perform the described method, additional operations and/or include the additional elements.

A system may comprise a first computing device configured to perform the described method, additional operations and/or include the additional elements; and a second computing device configured to send the downlink control message. A computer-readable medium may store instructions that, when executed, cause performance of the described method, additional operations and/or include the additional elements.

A wireless device may perform a method comprising multiple operations. A wireless device may transmit a preamble starting from a symbol of a slot in a system frame. The system frame may be identified by a system frame number. The wireless device may determine a radio network identifier based on a symbol index of the symbol and a slot index of the slot. The wireless device may receive based on the radio network identifier a medium access control packet data unit comprising: a system frame information field; and one or more random access responses comprising a first random access response. The wireless device may determine that the first random access response is for the preamble based on: the system frame information field indicating the system frame number in which the preamble is transmitted; and a preamble identifier field in the first random access response indicating an index of the preamble. The wireless device may transmit, based on the determining, one or more transport blocks.

A wireless device may perform a method comprising multiple operations. A wireless device may receive a message indicating a duration of a random access response window. The wireless device may select, based on a received signal strength of at least one downlink pathloss reference, an uplink carrier from a normal uplink carrier and a supplementary uplink carrier.

The wireless device may transmit a preamble via a random access radio resource in a first system frame of the selected uplink carrier. The wireless device may determine a radio network identifier based on: the duration of the random access response window; a first identifier of the first system frame; and a second identifier of the selected uplink carrier. The wireless device may receive a random access response based on the radio network identifier.

A wireless device may perform a method comprising multiple operations. A wireless device may transmit a preamble via a random access radio resource. The wireless device may determine a radio network identifier based on a modulo operation. The modulo operation may be performed: on a first value calculated based on one or more identifiers of the random access radio resource; and with a modulus value indicating a range for the radio network identifier. The wireless device may receive, based on the radio network identifier, a random access response comprising a preamble identifier of the preamble.

Figure 55:
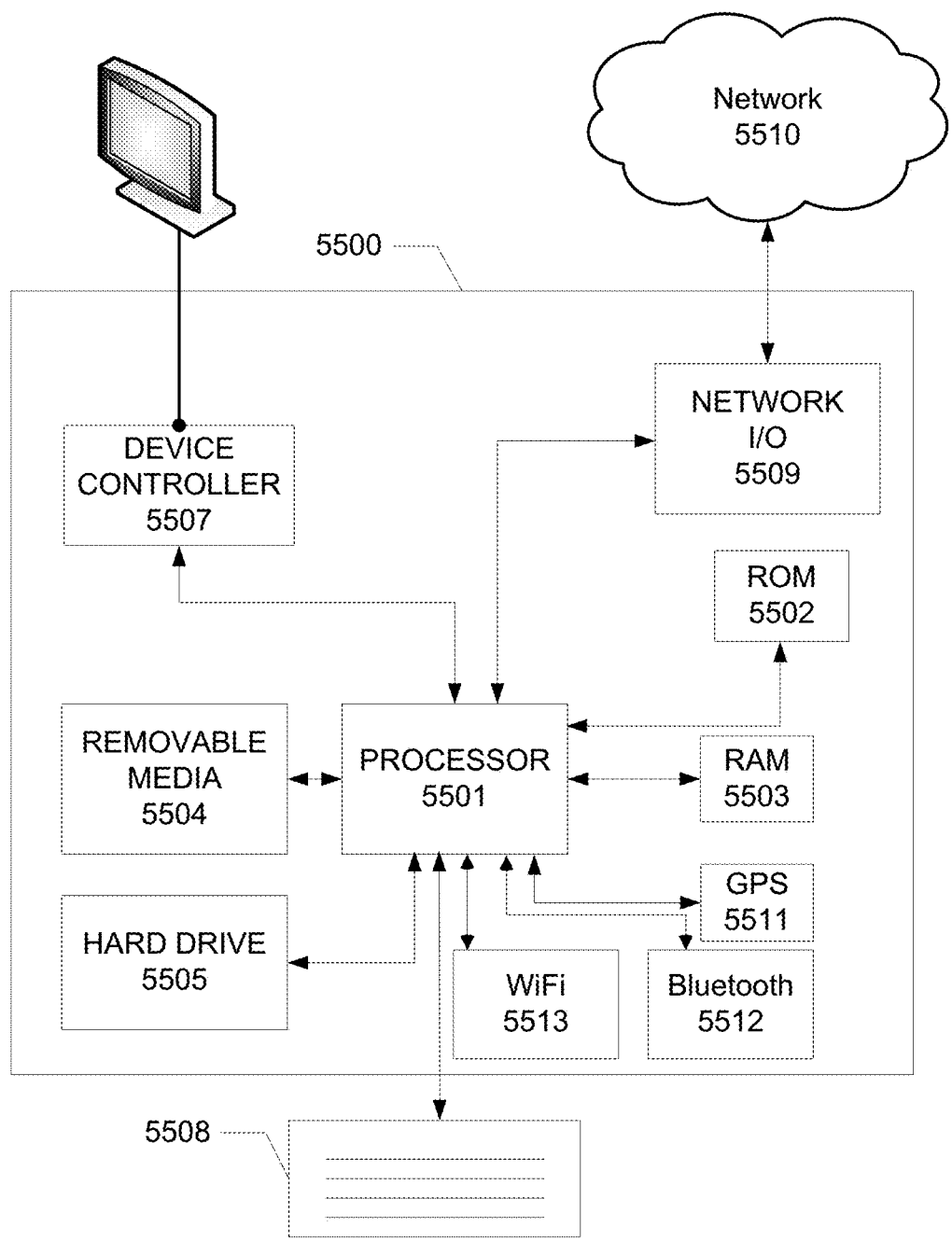
FIG. 55 shows example elements of a computing device that may be used to implement any of the various devices described herein.

FIG. 55 shows example elements of a computing device that may be used to implement any of the various devices described herein, including, e.g., the base station 120A and/or 120B, the wireless device 110 (e.g., 110A and/or 110B), or any other base station, wireless device, or computing device described herein. The computing device 5500 may include one or more processors 5501, which may execute instructions stored in the random-access memory (RAM) 4103, the removable media 5504 (such as a Universal Serial Bus (USB) drive, compact disk (CD) or digital versatile disk (DVD), or floppy disk drive), or any other desired storage medium. Instructions may also be stored in an attached (or internal) hard drive 5505. The computing device 5500 may also include a security processor (not shown), which may execute instructions of one or more computer programs to monitor the processes executing on the processor 5501 and any process that requests access to any hardware and/or software components of the computing device 5500 (e.g., ROM 5502, RAM 5503, the removable media 5504, the hard drive 5505, the device controller 5507, a network interface 5509, a GPS 5511, a Bluetooth interface 5512, a WiFi interface 5513, etc.). The computing device 5500 may include one or more output devices, such as the display 5506 (e.g., a screen, a display device, a monitor, a television, etc.), and may include one or more output device controllers 5507, such as a video processor. There may also be one or more user input devices 5508, such as a remote control, keyboard, mouse, touch screen, microphone, etc. The computing device 5500 may also include one or more network interfaces, such as a network interface 5509, which may be a wired interface, a wireless interface, or a combination of the two. The network interface 5509 may provide an interface for the computing device 5500 to communicate with a network 5510 (e.g., a RAN, or any other network). The network interface 5509 may include a modem (e.g., a cable modem), and the external network 5510 may include communication links, an external network, an in-home network, a provider's wireless, coaxial, fiber, or hybrid fiber/coaxial distribution system (e.g., a DOCSIS network), or any other desired network. Additionally, the computing device 5500 may include a location-detecting device, such as a global positioning system (GPS) microprocessor 5511, which may be configured to receive and process global positioning signals and determine, with possible assistance from an external server and antenna, a geographic position of the computing device 5500.

The example in FIG. 55 may be a hardware configuration, although the components shown may be implemented as software as well. Modifications may be made to add, remove, combine, divide, etc. components of the computing device 5500 as desired. Additionally, the components may be implemented using basic computing devices and components, and the same components (e.g., processor 5501, ROM storage 5502, display 5506, etc.) may be used to implement any of the other computing devices and components described herein. For example, the various components described herein may be implemented using computing devices having components such as a processor executing computer-executable instructions stored on a computer-readable medium, as shown in FIG. 55. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology.

Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device.

The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs).

Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner.

Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
    transmitting, by a wireless device, a preamble starting from a symbol of a slot in a system frame, wherein the system frame is indicated by a system frame number;
    determining, based on a symbol index of the symbol and a slot index of the slot, a radio network identifier;
    receiving, based on the radio network identifier, a downlink control message, wherein the downlink control message comprises a system frame information field, and wherein the system frame information field comprises an indication of the system frame number of the system frame;
    determining, based on the indication of the system frame number of the system frame, that a first random access response of one or more random access responses indicated by the downlink control message is for the preamble; and
    transmitting, based on the determining that the first random access response is for the preamble, one or more transport blocks.

2. The method of claim 1, wherein the downlink control message is a downlink medium access control packet comprising the one or more random access responses.

3. The method of claim 1, wherein:
    the transmitting the preamble is via a random access channel occasion;
    the random access channel occasion starts from the symbol of the slot in the system frame; and
    the determining the radio network identifier is further based on a frequency index of the random access channel occasion and an uplink carrier index of an uplink carrier in which the random access channel occasion is configured.

4. The method of claim 1, wherein:
    the receiving the downlink control message comprises receiving a medium access control packet data unit comprising the one or more random access responses, wherein the one or more random access responses comprise the first random access response; and
    the determining that the first random access response is for the preamble is further based on determining a field in the first random access response indicating an index of the preamble.

5. The method of claim 1, wherein the one or more random access responses correspond to one or more preambles transmitted via the system frame.

6. The method of claim 1, wherein the first random access response comprises a subheader, wherein the subheader comprises the system frame information field.

7. The method of claim 1, wherein the indication of the system frame number is one of:
    one or more most significant bits (MSBs) of the system frame number; or
    one or more least significant bits (LSBs) of the system frame number.

8. The method of claim 1, further comprising:
    receiving, based on the radio network identifier, a second downlink control message, wherein the second downlink control message comprises an indication of a second system frame number different from the system frame number; and
    determining, based on at least the indication of the second system frame number in the second downlink control message, that one or more second random access responses indicated by the second downlink control message is not for the preamble that is transmitted in the system frame.

9. A method comprising:
    transmitting, by a wireless device, a preamble starting from a symbol of a slot in a system frame, wherein the system frame is indicated by a system frame number;
    determining, based on a symbol index of the symbol and a slot index of the slot, a radio network identifier;
    receiving, based on the radio network identifier, a downlink control message comprising:
        a system frame information field comprising an indication of the system frame number; and
        an index of the preamble;
    determining, based on the system frame number and the index of the preamble, that the downlink control message is for the preamble; and
    transmitting, based on the determining that the downlink control message is for the preamble, one or more transport blocks.

10. The method of claim 9, wherein the downlink control message is a downlink medium access control packet comprising a random access response.

11. The method of claim 9, wherein:
    the transmitting the preamble is via a random access channel occasion;
    the random access channel occasion starts from the symbol of the slot in the system frame; and
    the determining the radio network identifier is further based on a frequency index of the random access channel occasion.

12. The method of claim 9, wherein the downlink control message comprises a subheader and a medium access control packet, and wherein the subheader comprises the index of the preamble.

13. The method of claim 9, wherein the indication of the system frame number is one of:
one or more most significant bits (MSBs) of the system frame number; or
one or more least significant bits (LSBs) of the system frame number.

14. The method of claim 9, wherein the determining the radio network identifier is further based on an uplink carrier index of an uplink carrier used for transmitting the preamble, and wherein the uplink carrier index is:
zero, if the uplink carrier is a normal uplink carrier; or
non-zero, if the uplink carrier is a supplementary uplink carrier.

15. The method of claim 1, further comprising receiving the one or more random access responses.

16. The method of claim 1, wherein the one or more random access responses are associated with a random access response window starting from transmission of the preamble in the system frame, the method further comprising:
receiving, within the random access response window, a second downlink control message comprising an indication of a second system frame number; and
determining, based on the second system frame number, that a second random access response indicated by the second downlink control message is not for the preamble.

17. A wireless device comprising:
one or more processors; and
memory storing instructions, that when executed by the one or more processors, cause the wireless device to:
transmit a preamble starting from a symbol of a slot in a system frame, wherein the system frame is indicated by a system frame number;
determine, based on a symbol index of the symbol and a slot index of the slot, a radio network identifier;
receive, based on the radio network identifier, a downlink control message, wherein the downlink control message comprises a system frame information field, and wherein the system frame information field comprises an indication of the system frame number of the system frame;
determine, based on the indication of the system frame number of the system frame, that a first random access response of one or more random access responses indicated by the downlink control message is for the preamble; and
transmit, based on a determination that the first random access response is for the preamble, one or more transport blocks.

18. The wireless device of claim 17, wherein the instructions, when executed by the one or more processors, cause the wireless device to:
transmit the preamble via a random access channel occasion that starts from the symbol of the slot in the system frame; and
determine the radio network identifier based on a frequency index of the random access channel occasion and an uplink carrier index of an uplink carrier in which the random access channel occasion is configured.

19. The wireless device of claim 17, wherein the instructions, when executed by the one or more processors, cause the wireless device to:
receive a medium access control packet data unit comprising the one or more random access responses, wherein the one or more random access responses comprise the first random access response; and
determine that the first random access response is for the preamble based on a determination of a field in the first random access response indicating an index of the preamble.

20. The wireless device of claim 17, wherein the one or more random access responses correspond to one or more preambles transmitted via the system frame.

21. The wireless device of claim 17, wherein the first random access response comprises a subheader, wherein the subheader comprises the system frame information field.

22. The wireless device of claim 17, wherein the indication of the system frame number is one of:
one or more most significant bits (MSBs) of the system frame number; or
one or more least significant bits (LSBs) of the system frame number.

23. The wireless device of claim 17, wherein the instructions, when executed by the one or more processors, cause the wireless device to:
receive, based on the radio network identifier, a second downlink control message, wherein the second downlink control message comprises an indication of a second system frame number different from the system frame number; and
determine, based on at least the indication of the second system frame number in the second downlink control message, that one or more second random access responses indicated by the second downlink control message is not for the preamble that is transmitted in the system frame.

24. The wireless device of claim 17, wherein the downlink control message is a downlink medium access control packet comprising the one or more random access responses.

25. The wireless device of claim 17, wherein the instructions, when executed by the one or more processors, cause the wireless device to receive the one or more random access responses.

26. The wireless device of claim 17, wherein the one or more random access responses are associated with a random access response window starting from transmission of the preamble in the system frame, and wherein the instructions, when executed by the one or more processors, cause the wireless device to:
receive, within the random access response window, a second downlink control message comprising an indication of a second system frame number; and
determine, based on the second system frame number, that a second random access response indicated by the second downlink control message is not for the preamble.

27. A non-transitory computer-readable medium storing instructions that, when executed, cause a wireless device to:
transmit a preamble starting from a symbol of a slot in a system frame, wherein the system frame is indicated by a system frame number;
determine, based on a symbol index of the symbol and a slot index of the slot, a radio network identifier;
receive, based on the radio network identifier, a downlink control message, wherein the downlink control message comprises a system frame information field, and wherein the system frame information field comprises an indication of the system frame number of the system frame;

determine, based on the indication of the system frame number of the system frame, that a first random access response of one or more random access responses indicated by the downlink control message is for the preamble; and transmit, based on a determination that the first random access response is for the preamble, one or more transport blocks.

28. The computer-readable medium of claim 27, wherein the instructions, when executed, cause the wireless device to:

transmit the preamble via a random access channel occasion that starts from the symbol of the slot in the system frame; and determine the radio network identifier based on a frequency index of the random access channel occasion and an uplink carrier index of an uplink carrier in which the random access channel occasion is configured.

29. The computer-readable medium of claim 27, wherein the instructions, when executed, cause the wireless device to:

receive a medium access control packet data unit comprising the one or more random access responses, wherein the one or more random access responses comprise the first random access response; and determine that the first random access response is for the preamble based on a determination of a field in the first random access response indicating an index of the preamble.

30. The computer-readable medium of claim 27, wherein the one or more random access responses correspond to one or more preambles transmitted via the system frame.

31. The computer-readable medium of claim 27, wherein the first random access response comprises a subheader, wherein the subheader comprises the system frame information field.

32. The computer-readable medium of claim 27, wherein the indication of the system frame number is one of:

one or more most significant bits (MSBs) of the system frame number; or one or more least significant bits (LSBs) of the system frame number.

33. The computer-readable medium of claim 27, wherein the instructions, when executed, cause the wireless device to:

receive, based on the radio network identifier, a second downlink control message, wherein the second downlink control message comprises an indication of a second system frame number different from the system frame number; and determine, based on at least the indication of the second system frame number in the second downlink control message, that one or more second random access responses indicated by the second downlink control message is not for the preamble that is transmitted in the system frame.

34. The computer-readable medium of claim 27, wherein the downlink control message is a downlink medium access control packet comprising the one or more random access responses.

35. The computer-readable medium of claim 27, wherein the instructions, when executed, cause the wireless device to receive the one or more random access responses.

36. The computer-readable medium of claim 27, wherein the one or more random access responses are associated with a random access response window starting from transmission of the preamble in the system frame, and wherein the instructions, when executed, cause the wireless device to:

receive, within the random access response window, a second downlink control message comprising an indication of a second system frame number; and determine, based on the second system frame number, that a second random access response indicated by the second downlink control message is not for the preamble.

37. A system comprising:
a wireless device comprising:
one or more first processors; and
first memory storing first instructions, that when executed by the one or more first processors, cause the wireless device to:

transmit, a preamble starting from a symbol of a slot in a system frame, wherein the system frame is indicated by a system frame number;

determine, based on a symbol index of the symbol and a slot index of the slot, a radio network identifier;

receive, based on the radio network identifier, a downlink control message, wherein the downlink control message comprises a system frame information field, and wherein the system frame information field comprises an indication of the system frame number of the system frame;

determine, based on the indication of the system frame number of the system frame, that a first random access response of one or more random access responses indicated by the downlink control message is for the preamble; and transmit, based on a determination that the first random access response is for the preamble, one or more transport blocks; and a base station comprising:
one or more second processors; and
second memory storing second instructions, that when executed by the one or more second processors, cause the base station to:
receive the preamble; and
transmit the downlink control message.

38. The system of claim 37, wherein the first instructions, when executed by the one or more first processors, cause the wireless device to:

transmit the preamble via a random access channel occasion that starts from the symbol of the slot in the system frame; and determine the radio network identifier based on a frequency index of the random access channel occasion and an uplink carrier index of an uplink carrier in which the random access channel occasion is configured.

39. The system of claim 37, wherein the first instructions, when executed by the one or more first processors, cause the wireless device to:

receive a medium access control packet data unit comprising the one or more random access responses, wherein the one or more random access responses comprise the first random access response; and determine that the first random access response is for the preamble based on a determination of a field in the first random access response indicating an index of the preamble.

40. The system of claim 37, wherein the one or more random access responses correspond to one or more preambles transmitted via the system frame.

41. The system of claim 37, wherein the first random access response comprises a subheader, wherein the subheader comprises the system frame information field.

42. The system of claim 37, wherein the indication of the system frame number is one of:
one or more most significant bits (MSBs) of the system frame number; or
one or more least significant bits (LSBs) of the system frame number.

43. The system of claim 37, wherein the first instructions, when executed by the one or more first processors, cause the wireless device to:
receive, based on the radio network identifier, a second downlink control message, wherein the second downlink control message comprises an indication of a second system frame number different from the system frame number; and
determine, based on at least the indication of the second system frame number in the second downlink control message, that one or more second random access responses indicated by the second downlink control message is not for the preamble that is transmitted in the system frame.

44. The system of claim 37, wherein the downlink control message is a downlink medium access control packet comprising the one or more random access responses.

45. The system of claim 37, wherein the first instructions, when executed by the one or more first processors, cause the wireless device to receive the one or more random access responses.

46. The system of claim 37, wherein the one or more random access responses are associated with a random access response window starting from transmission of the preamble in the system frame, and wherein the first instructions, when executed by the one or more first processors, cause the wireless device to:
receive, within the random access response window, a second downlink control message comprising an indication of a second system frame number; and
determine, based on the second system frame number, that a second random access response indicated by the second downlink control message is not for the preamble.

47. A wireless device comprising:
one or more processors; and
memory storing instructions that, when executed by the one or more processors, cause the wireless device to:
transmit a preamble starting from a symbol of a slot in a system frame, wherein the system frame is indicated by a system frame number;
determine, based on a symbol index of the symbol and a slot index of the slot, a radio network identifier;
receive, based on the radio network identifier, a downlink control message comprising:
a system frame information field comprising an indication of the system frame number; and
an index of the preamble;
determine, based on the system frame number and the index of the preamble, that the downlink control message is for the preamble; and
transmit, based on a determination that the downlink control message is for the preamble, one or more transport blocks.

48. The wireless device of claim 47, wherein the instructions, when executed by the one or more processors, cause the wireless device to:
transmit the preamble via a random access channel occasion that starts from the symbol of the slot in the system frame; and
determine the radio network identifier based on a frequency index of the random access channel occasion.

49. The wireless device of claim 47, wherein the downlink control message comprises a subheader and a medium access control packet, and wherein the subheader comprises the index of the preamble.

50. The wireless device of claim 47, wherein the indication of the system frame number is one of:
one or more most significant bits (MSBs) of the system frame number; or
one or more least significant bits (LSBs) of the system frame number.

51. The wireless device of claim 47, wherein the instructions, when executed by the one or more processors, cause the wireless device to determine the radio network identifier based on an uplink carrier index of an uplink carrier used for transmitting the preamble, wherein the uplink carrier index is:
zero, if the uplink carrier is a normal uplink carrier; or
non-zero, if the uplink carrier is a supplementary uplink carrier.

52. The wireless device of claim 47, wherein the downlink control message is a downlink medium access control packet comprising a random access response.

53. A non-transitory computer-readable medium storing instructions that, when executed, cause a wireless device to:
transmit a preamble starting from a symbol of a slot in a system frame, wherein the system frame is indicated by a system frame number;
determine, based on a symbol index of the symbol and a slot index of the slot, a radio network identifier;
receive, based on the radio network identifier, a downlink control message comprising:
a system frame information field comprising an indication of the system frame number; and
an index of the preamble;
determine, based on the system frame number and the index of the preamble, that the downlink control message is for the preamble; and
transmit, based on a determination that the downlink control message is for the preamble, one or more transport blocks.

54. The computer-readable medium of claim 53, wherein the instructions, when executed, cause the wireless device to:
transmit the preamble via a random access channel occasion that starts from the symbol of the slot in the system frame; and
determine the radio network identifier based on a frequency index of the random access channel occasion.

55. The computer-readable medium of claim 53, wherein the downlink control message comprises a subheader and a medium access control packet, and wherein the subheader comprises the index of the preamble.

56. The computer-readable medium of claim 53, wherein the indication of the system frame number is one of:
one or more most significant bits (MSBs) of the system frame number; or
one or more least significant bits (LSBs) of the system frame number.

57. The computer-readable medium of claim 53, wherein the instructions, when executed, cause the wireless device to determine the radio network identifier based on an uplink carrier index of an uplink carrier used for transmitting the preamble, wherein the uplink carrier index is:
  zero, if the uplink carrier is a normal uplink carrier; or
  non-zero, if the uplink carrier is a supplementary uplink carrier.

58. The computer-readable medium of claim 53, wherein the downlink control message is a downlink medium access control packet comprising a random access response.

59. A system comprising:
  a wireless device comprising:
    one or more first processors; and
    first memory storing first instructions that, when executed by the one or more first processors, cause the wireless device to:
      transmit a preamble starting from a symbol of a slot in a system frame, wherein the system frame is indicated by a system frame number;
      determine, based on a symbol index of the symbol and a slot index of the slot, a radio network identifier;
      receive, based on the radio network identifier, a downlink control message comprising:
        a system frame information field comprising an indication of the system frame number; and
        an index of the preamble;
      determine, based on the system frame number and the index of the preamble, that the downlink control message is for the preamble; and
      transmit, based on a determination that the downlink control message is for the preamble, one or more transport blocks; and
  a base station comprising:
    one or more second processors; and
    second memory storing second instructions that, when executed by the one or more second processors, cause the base station to:
      receive the preamble; and
      transmit the downlink control message.

60. The system of claim 59, wherein the first instructions, when executed by the one or more first processors, cause the wireless device to:
  transmit the preamble via a random access channel occasion that starts from the symbol of the slot in the system frame; and
  determine the radio network identifier based on a frequency index of the random access channel occasion.

61. The system of claim 59, wherein the downlink control message comprises a subheader and a medium access control packet, and wherein the subheader comprises the index of the preamble.

62. The system of claim 59, wherein the indication of the system frame number is one of:
  one or more most significant bits (MSBs) of the system frame number; or
  one or more least significant bits (LSBs) of the system frame number.

63. The system of claim 59, wherein the first instructions, when executed by the one or more first processors, cause the wireless device to determine the radio network identifier based on an uplink carrier index of an uplink carrier used for transmitting the preamble, wherein the uplink carrier index is:
  zero, if the uplink carrier is a normal uplink carrier; or
  non-zero, if the uplink carrier is a supplementary uplink carrier.

64. The system of claim 59, wherein the downlink control message is a downlink medium access control packet comprising a random access response.

* * * * *

UNITED STATES PATENT AND TRADEMARK OFFICE
CERTIFICATE OF CORRECTION

PATENT NO. : 11,272,532 B2
APPLICATION NO. : 16/672045
DATED : March 8, 2022
INVENTOR(S) : Jeon et al.

Page 1 of 10

It is certified that error appears in the above-identified patent and that said Letters Patent is hereby corrected as shown below:

On the Title Page

Page 3, Column 2, (56) Other Publications, Line 12:
Delete "proceudre" and insert --procedure-- therefor In the Specification Column 11, Detailed Description, Line 13:
After "an", delete "¶"

Column 11, Detailed Description, Line 52:
Delete "MasterinformationBlock" and insert --MasterInformationBlock-- therefor Column 13, Detailed Description, Line 51:
After "base station 2", insert --, 120B--

Column 15, Detailed Description, Line 12:
After "channel", insert --.--

Column 16, Detailed Description, Line 18:
After "a", delete "¶"

Column 18, Detailed Description, Line 24:
Delete "Domain," and insert --domain,-- therefor Column 19, Detailed Description, Line 22:
After "more", delete "¶"

Column 21, Detailed Description, Line 38:
After "device.", delete "¶"

Signed and Sealed this
Eighteenth Day of July, 2023

Katherine Kelly Vidal
*Director of the United States Patent and Trademark Office*

Column 21, Detailed Description, Line 40:
After "packets.", delete "¶"

Column 22, Detailed Description, Line 46:
After "device.", delete "¶"

Column 26, Detailed Description, Line 62:
After "timer.", delete "¶"

Column 27, Detailed Description, Line 41:
After "stations.", delete "¶"

Column 28, Detailed Description, Line 7:
Delete "1119)." and insert --1118).-- therefor Column 28, Detailed Description, Line 62:
After "device.", delete "¶"

Column 29, Detailed Description, Line 24:
After "gap).", delete "¶"

Column 29, Detailed Description, Line 30:
After "procedure.", delete "¶"

Column 32, Detailed Description, Line 27:
After "TC-RNTI.", delete "¶"

Column 32, Detailed Description, Line 63:
After "TTIs.", delete "¶"

Column 33, Detailed Description, Line 42:
After "channels.", delete "¶"

Column 33, Detailed Description, Line 65:
After "MCG.", delete "¶"

Column 36, Detailed Description, Line 54:
After "context.", delete "¶"

Column 37, Detailed Description, Line 5:
After "reduced.", delete "¶"

Column 37, Detailed Description, Line 7:
After "improved.", delete "¶"

Column 38, Detailed Description, Line 35:
After "size.", delete "¶"

Column 42, Detailed Description, Lines 19-20:
Delete "ra-Preamblelndex)" and insert --ra-PreambleIndex)-- therefor Column 42, Detailed Description, Line 50:
Delete "1E)" and insert --IE)-- therefor Column 42, Detailed Description, Line 66:
Delete "ra-Preamblelndex)" and insert --ra-PreambleIndex)-- therefor Column 43, Detailed Description, Line 40:
Delete "beamFailurelnstanceMaxCount)" and insert --beamFailureInstanceMaxCount)-- therefor Column 44, Detailed Description, Lines 5-6:
Delete "PREAMBLE_POWER RAMPING_STEP;" and insert
--PREAMBLE_POWER_RAMPING_STEP;-- therefor Column 44, Detailed Description, Line 7:
Delete "PREAMBLE BACKOFF;" and insert --PREAMBLE_BACKOFF;-- therefor Column 44, Detailed Description, Line 37:
Delete "ra-Preamblelndex" and insert --ra-PreambleIndex-- therefor Column 44, Detailed Description, Line 43:
Delete "ra-Preamblelndex)" and insert --ra-PreambleIndex)-- therefor Column 44, Detailed Description, Line 58:
Delete "ra-Preamblelndex)" and insert --ra-PreambleIndex)-- therefor Column 45, Detailed Description, Line 2:
Delete "ra-Preamblelndex)" and insert --ra-PreambleIndex)-- therefor Column 45, Detailed Description, Line 15:
Delete "ra-Preamblelndex)" and insert --ra-PreambleIndex)-- therefor Column 45, Detailed Description, Line 21:
Delete "ra-Preamblelndex)" and insert --ra-PreambleIndex)-- therefor Column 45, Detailed Description, Lines 24-25:
Delete "ra-Preamblelndex)." and insert --ra-PreambleIndex).-- therefor Column 46, Detailed Description, Line 63:
After "RAP.", delete "¶"

Column 47, Detailed Description, Line 43:
After "etc.).", delete "¶"

Column 49, Detailed Description, Line 54:
Delete "is" and insert --µs-- therefor Column 50, Detailed Description, Line 2:
Delete "is" and insert --µs-- therefor Column 50, Detailed Description, Line 2:
After "period", insert --.--

Column 50, Detailed Description, Line 4:
After "supported.", delete "¶"

Column 52, Detailed Description, Line 7:
After "activated.", delete "¶"

Column 52, Detailed Description, Line 31:
After "carrier.", delete "¶"

Column 52, Detailed Description, Line 52:
After "acquired.", delete "¶"

Column 52, Detailed Description, Line 64:
After "configurations.", delete "¶"

Column 53, Detailed Description, Line 5:
After "BWP.", delete "¶"

Column 55, Detailed Description, Lines 5-6:
Delete "locationAndBanddwidth)" and insert --locationAndBandwidth)-- therefor Column 55, Detailed Description, Line 8:
After "RIV.", delete "¶"

Column 55, Detailed Description, Line 61:
After "cell.", delete "¶"

Column 56, Detailed Description, Line 30:
After "expiry.", delete "¶"

Column 57, Detailed Description, Line 31:
Delete ""O"" and insert --"0"-- therefor

CERTIFICATE OF CORRECTION (continued)
U.S. Pat. No. 11,272,532 B2

Column 57, Detailed Description, Line 36:
Delete ""O"" and insert --"0"-- therefor Column 57, Detailed Description, Line 54:
Delete ""O";" and insert --"0";-- therefor Column 58, Detailed Description, Line 26:
After "RAR.", delete "¶"

Column 60, Detailed Description, Line 55:
After "SCell", insert --.--

Column 61, Detailed Description, Line 24:
Delete "TypeO-PDCCH" and insert --Type0-PDCCH-- therefor Column 61, Detailed Description, Line 54:
Delete "BWP=275," and insert -- $N_{BWP}^{size} = 275,$ -- therefor Column 64, Detailed Description, Line 62:
After "references", insert --.--

Column 66, Detailed Description, Line 43:
After "on", delete "¶"

Column 67, Detailed Description, Line 50:
Delete "3240" and insert --3220-- therefor Column 67, Detailed Description, Line 51:
Delete "1120" and insert --120-- therefor Column 68, Detailed Description, Line 50:
Delete "ra-ssb-OccasionMasklndex)." and insert --ra-ssb-OccasionMaskIndex).-- therefor Column 69, Detailed Description, Line 48:
After "threshold", insert --.--

Column 70, Detailed Description, Line 56:
After "busy).", insert --¶--

Column 70, Detailed Description, Line 59:
After "band.", delete "¶"

Column 72, Detailed Description, Line 11:
Delete "LTB" and insert --LBT-- therefor Column 72, Detailed Description, Line 56:
Delete "3650." and insert --3610.-- therefor Column 75, Detailed Description, Line 5:
Delete "25 as, 16 as," and insert --25 µs, 16 µs,-- therefor Column 75, Detailed Description, Line 67:
After "freq. 2).", delete "¶"

Column 76, Detailed Description, Line 14:
After "transmissions.", delete "¶"

Column 78, Detailed Description, Line 17:
After "k+1.", delete "¶"

Column 78, Detailed Description, Line 21:
Delete "numerology=3)" and insert --numerology µ=3)-- therefor Column 78, Detailed Description, Line 29:
After "frame(s).", delete "¶"

Column 80, Detailed Description, Line 18:
Delete "ip)." and insert --µ).-- therefor Column 80, Detailed Description, Line 34:
Delete "ra-ResponseWindow=sl10)" and insert --ra-ResponseWindow=sl10)-- therefor Column 80, Detailed Description, Line 36:
Delete "ra-ResponseWindow=sl20)" and insert --ra-ResponseWindow=sl20)-- therefor Column 80, Detailed Description, Line 37:
Delete "ra-ResponseWindow=sl40)" and insert --ra-ResponseWindow=sl40)-- therefor Column 80, Detailed Description, Line 39:
Delete "ra-ResponseWindow=sl80)" and insert --ra-ResponseWindow=sl80)-- therefor Column 80, Detailed Description, Line 52:
After "device.", delete "¶"

Column 82, Detailed Description, Line 55:
After "RA-RNTI).", delete "¶"

Column 83, Detailed Description, Line 7:
After "Equation (1)).", delete "¶"

Column 84, Detailed Description, Line 23:
Delete "t=3 µs" and insert --µ=3 is-- therefor Column 84, Detailed Description, Line 65:
Delete "num_s_id*in" and insert --num_s_id* in-- therefor Column 85, Detailed Description, Line 12:
Delete "values.Num_s_id" and insert --values. Num_s_id-- therefor Column 85, Detailed Description, Line 17:
Delete "one one" and insert --one-- therefor Column 85, Detailed Description, Line 19:
Delete "t=0," and insert --µ=0,-- therefor Column 85, Detailed Description, Line 30:
Delete "numerology=1Num_t_id" and insert --numerology µ=1Num_t_id-- therefor Column 85, Detailed Description, Line 44:
After "integer.", delete "¶"

Column 87, Detailed Description, Line 3:
Delete "4402)" and insert --4404)-- therefor Column 87, Detailed Description, Line 20:
Delete "µs" and insert --is-- therefor Column 88, Detailed Description, Line 22:
After "identifier.", delete "¶"

Column 88, Detailed Description, Line 34:
After "values.", delete "¶"

Column 89, Detailed Description, Line 9:
Delete "µs" and insert --is-- therefor

Column 89, Detailed Description, Line 48:
After "num_s_id*=num_s_id+1.", delete "¶"

Column 89, Detailed Description, Line 51:
Delete "num_s_id*in" and insert --num_s_id* in-- therefor Column 89, Detailed Description, Line 63:
Delete "µs" and insert --is-- therefor Column 91, Detailed Description, Line 36:
Delete "us" and insert --is-- therefor Column 92, Detailed Description, Line 7:
After "num_s_id*=num_s_id+1.", delete "¶"

Column 92, Detailed Description, Line 10:
Delete "num_s_id*in" and insert --num_s_id* in-- therefor Column 92, Detailed Description, Line 20:
Delete "µs" and insert --is-- therefor Column 95, Detailed Description, Line 7:
After "num_s_id*=num_s_id+1.", delete "¶"

Column 95, Detailed Description, Line 10:
Delete "num_s_id*in" and insert --num_s_id* in-- therefor Column 96, Detailed Description, Lines 45-46:
After "transmitted.", delete "¶"

Column 98, Detailed Description, Line 43:
After "4308).", delete "¶"

Column 99, Detailed Description, Line 65:
After "device.", delete "¶"

Column 100, Detailed Description, Line 8:
Delete "4710," and insert --4702,-- therefor Column 101, Detailed Description, Line 55:
Delete "4710," and insert --4702,-- therefor Column 102, Detailed Description, Line 59:
After "5136.", delete "¶"

Column 103, Detailed Description, Line 7:
Delete "S202," and insert --5202,-- therefor Column 103, Detailed Description, Line 11:
Delete "S204," and insert --5204,-- therefor Column 103, Detailed Description, Line 17:
Delete "S206," and insert --5206,-- therefor Column 103, Detailed Description, Line 21:
Delete "S210," and insert --5210,-- therefor Column 103, Detailed Description, Line 24:
Delete "S202)," and insert --5202),-- therefor Column 103, Detailed Description, Line 28:
Delete "S212," and insert --5212,-- therefor Column 103, Detailed Description, Line 29:
Delete "S214," and insert --5214,-- therefor Column 103, Detailed Description, Line 32:
Delete "S202)," and insert --5202),-- therefor Column 103, Detailed Description, Line 37:
Delete "S302," and insert --5302,-- therefor Column 103, Detailed Description, Line 40:
Delete "S304," and insert --5304,-- therefor Column 103, Detailed Description, Line 43:
Delete "S306," and insert --5306,-- therefor Column 103, Detailed Description, Line 49:
Delete "S310," and insert --5310,-- therefor Column 103, Detailed Description, Line 51:
Delete "S302)," and insert --5302),-- therefor Column 103, Detailed Description, Line 54:
Delete "S312," and insert --5312,-- therefor Column 103, Detailed Description, Line 56:
Delete "S312," and insert --5312,-- therefor Column 103, Detailed Description, Line 58:
Delete "S302)," and insert --5302),-- therefor Column 103, Detailed Description, Line 63:
Delete "S402," and insert --5402,-- therefor Column 103, Detailed Description, Line 66:
Delete "S404," and insert --5404,-- therefor

CERTIFICATE OF CORRECTION (continued)
U.S. Pat. No. 11,272,532 B2

Column 104, Detailed Description, Line 2:
Delete "S406," and insert --5406,-- therefor Column 104, Detailed Description, Line 5:
Delete "S412," and insert --5412,-- therefor Column 105, Detailed Description, Line 16:
After "carrier.", delete "¶"

Column 105, Detailed Description, Line 39:
After "identifier.", delete "¶"

Column 106, Detailed Description, Line 37:
After "elements.", delete "¶"

Column 107, Detailed Description, Line 22:
After "elements.", delete "¶"

Column 107, Detailed Description, Line 38:
After "number.", delete "¶"

Column 107, Detailed Description, Line 65:
After "elements.", delete "¶"

Column 108, Detailed Description, Line 31:
After "carrier.", delete "¶"

Column 109, Detailed Description, Line 62:
After "technology.", delete "¶"

Column 110, Detailed Description, Line 22:
After "device.", delete "¶"

Column 110, Detailed Description, Line 55:
After "(CPLDs).", delete "¶"

Column 111, Detailed Description, Lines 28-29:
After "manner.", delete "¶"